US009797341B2

(12) United States Patent
Langenfeld et al.

(10) Patent No.: US 9,797,341 B2
(45) Date of Patent: Oct. 24, 2017

(54) LINEAR CROSS-HEAD BEARING FOR STIRLING ENGINE

(71) Applicant: New Power Concepts LLC, Manchester, NH (US)

(72) Inventors: Christopher C. Langenfeld, Nashua, NH (US); Prashant Bhat, Manchester, NH (US); Mithun R. Bhat, Manchester, NH (US); Dean Kamen, Bedford, NH (US)

(73) Assignee: New Power Concepts LLC, Manchester, NH (US)

( * ) Notice: Subject to any disclaimer, the term of this patent is extended or adjusted under 35 U.S.C. 154(b) by 341 days.

(21) Appl. No.: 14/657,719

(22) Filed: Mar. 13, 2015

(65) Prior Publication Data

US 2015/0184614 A1    Jul. 2, 2015

Related U.S. Application Data

(63) Continuation-in-part of application No. 14/553,824, filed on Nov. 25, 2014, which is a
(Continued)

(51) Int. Cl.
*F02G 1/053* (2006.01)
*F02G 1/055* (2006.01)
(Continued)

(52) U.S. Cl.
CPC .............. *F02G 1/053* (2013.01); *F01K 25/00* (2013.01); *F02G 1/044* (2013.01); *F02G 1/055* (2013.01);
(Continued)

(58) Field of Classification Search
CPC .. F02G 1/04; F02G 1/043; F01B 29/10; F01B 75/32
See application file for complete search history.

(56) References Cited

U.S. PATENT DOCUMENTS

| 124,805 A | 3/1872 | Fryer |
| 444,195 A | 1/1891 | Monroe |

(Continued)

FOREIGN PATENT DOCUMENTS

| CN | 105190001 A | 12/2015 |
| DE | 4127300 A1 | 2/1993 |

(Continued)

OTHER PUBLICATIONS

*International Search Report and Written Opinion*, dated Aug. 10, 2011, received in International Application No. PCT/US2010/040841 (178W0), 15 pgs.

(Continued)

*Primary Examiner* — Mark Laurenzi
*Assistant Examiner* — Shafiq Mian
(74) *Attorney, Agent, or Firm* — Michael George Norris

(57) ABSTRACT

An external combustion engine including a burner element, a heater head, a piston cylinder containing a piston, a cooler and a crankcase. The crankcase includes a crankshaft, a piston rod connected to the piston, a drive mechanism for converting the linear motion of the piston rod to rotary motion of the crankshaft and a linear cross-head bearing that is connected rigidly to the piston rod at one end and to the drive mechanism at the other end. Also the external combustion engine includes a piston clearance seal and a piston rod seal unit that has floating rod seals. The piston includes a inner dome to reduce axial heat transfer via radiation and convection.

26 Claims, 112 Drawing Sheets

Related U.S. Application Data continuation-in-part of application No. 14/211,621, filed on Mar. 14, 2014, which is a continuation-in-part of application No. 13/836,946, filed on Mar. 15, 2013, which is a continuation-in-part of application No. 13/447,990, filed on Apr. 16, 2012, now Pat. No. 9,534,561, which is a continuation-in-part of application No. 12/829,320, filed on Jul. 1, 2010.

(60) Provisional application No. 61/908,468, filed on Nov. 25, 2013, provisional application No. 61/476,180, filed on Apr. 15, 2011, provisional application No. 61/482,897, filed on May 5, 2011, provisional application No. 61/222,361, filed on Jul. 1, 2009.

(51) Int. Cl.

| | |
|---|---|
| F16C 9/04 | (2006.01) |
| F01K 25/00 | (2006.01) |
| F02G 1/044 | (2006.01) |
| F16J 3/06 | (2006.01) |
| F16J 15/44 | (2006.01) |
| F16J 15/52 | (2006.01) |
| F28F 1/40 | (2006.01) |
| F28F 1/42 | (2006.01) |
| F28F 9/02 | (2006.01) |
| F28F 13/06 | (2006.01) |
| F28F 27/00 | (2006.01) |
| F28D 7/02 | (2006.01) |
| F28D 7/06 | (2006.01) |
| F28F 1/12 | (2006.01) |
| F28F 1/14 | (2006.01) |
| F16J 7/00 | (2006.01) |
| F23D 14/64 | (2006.01) |
| F28D 17/02 | (2006.01) |

(52) U.S. Cl.
CPC ............ *F02G 1/0535* (2013.01); *F16C 9/04* (2013.01); *F16J 3/06* (2013.01); *F16J 7/00* (2013.01); *F16J 15/441* (2013.01); *F16J 15/52* (2013.01); *F23D 14/64* (2013.01); *F28D 7/024* (2013.01); *F28D 7/06* (2013.01); *F28F 1/124* (2013.01); *F28F 1/126* (2013.01); *F28F 1/14* (2013.01); *F28F 1/40* (2013.01); *F28F 1/42* (2013.01); *F28F 9/026* (2013.01); *F28F 13/06* (2013.01); *F28F 27/00* (2013.01); *F02G 2244/52* (2013.01); *F02G 2244/54* (2013.01); *F02G 2253/03* (2013.01); *F02G 2253/06* (2013.01); *F02G 2253/08* (2013.01); *F02G 2253/10* (2013.01); *F02G 2254/10* (2013.01); *F02G 2254/50* (2013.01); *F02G 2254/60* (2013.01); *F02G 2256/04* (2013.01); *F02G 2257/00* (2013.01); *F02G 2270/40* (2013.01); *F02G 2270/85* (2013.01); *F23D 2900/14021* (2013.01); *F28D 17/02* (2013.01); *F28F 2255/14* (2013.01)

(56) References Cited

U.S. PATENT DOCUMENTS

| | | | |
|---|---|---|---|
| 460,319 A | 9/1891 | Courtright | |
| 519,943 A | 5/1894 | Devoissaud | |
| 715,150 A | 12/1902 | Robb | |
| 735,399 A * | 8/1903 | Mitchell | B60P 1/43 414/537 |
| 752,434 A | 2/1904 | Baltzinger | |
| 864,249 A | 8/1907 | Morgan | |
| 931,750 A | 8/1909 | Gifford | |
| 971,583 A | 10/1910 | Bell | |
| 1,033,939 A | 7/1912 | Robb et al. | |
| 1,039,492 A | 9/1912 | Courtwright et al. | |
| 1,389,728 A | 9/1921 | Akimoff | |
| 1,419,159 A | 6/1922 | McKechnie | |
| 1,460,474 A | 7/1923 | Bronander | |
| 1,460,475 A | 7/1923 | Bronander | |
| 1,471,847 A * | 10/1923 | Holliday | F02B 25/00 123/51 B |
| 1,501,459 A | 7/1924 | Kline | |
| 1,614,962 A * | 1/1927 | Koenig | F02G 1/043 60/525 |
| 1,673,280 A | 6/1928 | Evan | |
| 1,736,639 A | 11/1929 | Szydlowski | |
| 1,832,562 A | 11/1931 | Kline | |
| 2,067,049 A | 1/1937 | Goldberg | |
| 2,268,532 A | 12/1941 | Goodman | |
| 2,357,031 A | 8/1944 | Stabler | |
| 2,441,277 A | 5/1948 | Lamphere | |
| 2,500,823 A | 3/1950 | Hickey | |
| 2,616,248 A | 11/1952 | Brey et al. | |
| 2,619,943 A | 12/1952 | Monleone | |
| 3,009,315 A | 11/1961 | Drumm | |
| 3,237,847 A | 3/1966 | Forbes | |
| 3,537,437 A | 11/1970 | Paul et al. | |
| 3,559,398 A | 2/1971 | Meijer et al. | |
| 3,568,436 A | 3/1971 | Heffner et al. | |
| 3,650,262 A | 3/1972 | Root et al. | |
| 3,659,306 A | 5/1972 | Stoltze et al. | |
| 3,662,654 A | 5/1972 | Bax | |
| 3,667,348 A * | 6/1972 | Neelen | F02G 1/0535 60/517 |
| 3,667,349 A * | 6/1972 | Siebert | F02G 1/0535 60/517 |
| 3,697,088 A | 10/1972 | Hummer | |
| 3,783,745 A | 1/1974 | Meijer et al. | |
| 3,822,550 A | 7/1974 | Brandenburg et al. | |
| 3,845,624 A | 11/1974 | Ross | |
| 3,869,002 A | 3/1975 | Koenig, III | |
| 3,934,480 A | 1/1976 | Nederlof | |
| 4,011,842 A | 3/1977 | Davies et al. | |
| 4,082,297 A | 4/1978 | Adams | |
| 4,121,423 A | 10/1978 | Querry et al. | |
| 4,138,897 A | 2/1979 | Ross | |
| 4,255,929 A | 3/1981 | McDougal | |
| 4,257,230 A | 3/1981 | Lundholm | |
| 4,372,116 A * | 2/1983 | Dineen | F02G 1/0435 60/517 |
| 4,381,648 A | 5/1983 | Balas, Jr. | |
| 4,392,168 A | 7/1983 | Maruyama et al. | |
| 4,406,463 A | 9/1983 | Fabrowsky | |
| 4,415,171 A | 11/1983 | Edwards | |
| 4,439,169 A | 3/1984 | Meijer et al. | |
| 4,452,042 A | 6/1984 | Lindskoug | |
| 4,481,771 A | 11/1984 | Meijer et al. | |
| 4,494,760 A | 1/1985 | Spargo | |
| 4,522,030 A | 6/1985 | Corey | |
| 4,523,636 A | 6/1985 | Meijer et al. | |
| 4,532,819 A | 8/1985 | Ross | |
| 4,532,855 A | 8/1985 | Meijer et al. | |
| 4,579,046 A | 4/1986 | Meijer et al. | |
| 4,615,261 A | 10/1986 | Meijer | |
| 4,625,977 A | 12/1986 | Azibert et al. | |
| 4,632,179 A | 12/1986 | Meijer et al. | |
| 4,669,736 A | 6/1987 | Meijer | |
| 4,703,796 A | 11/1987 | Meijer et al. | |
| 4,707,990 A | 11/1987 | Meijer | |
| 4,715,183 A | 12/1987 | Meijer et al. | |
| 4,738,105 A * | 4/1988 | Ross | F02G 1/04 60/517 |
| 4,751,819 A | 6/1988 | Eder | |
| 4,785,633 A | 11/1988 | Meijer et al. | |
| 4,785,875 A | 11/1988 | Meijer et al. | |
| 4,824,149 A * | 4/1989 | Reuchlein | F02G 1/043 290/1 R |
| 4,825,814 A | 5/1989 | Meijer et al. | |
| 4,836,094 A | 6/1989 | Meijer et al. | |
| 4,885,980 A | 12/1989 | Meijer et al. | |
| 4,897,997 A | 2/1990 | Meijer et al. | |

(56) References Cited

U.S. PATENT DOCUMENTS

| | | | |
|---|---|---|---|
| 4,901,790 A | 2/1990 | Meijer | |
| 4,911,144 A | 3/1990 | Godetl et al. | |
| 4,977,742 A | 12/1990 | Meijer | |
| 4,979,428 A | 12/1990 | Nelson | |
| 4,994,004 A | 2/1991 | Meijer et al. | |
| 4,996,841 A | 3/1991 | Meijer et al. | |
| 5,015,000 A | 5/1991 | Perini | |
| 5,058,487 A | 10/1991 | Faitel | |
| 5,074,114 A | 12/1991 | Meijer et al. | |
| 5,146,749 A | 9/1992 | Wood et al. | |
| 5,259,197 A * | 11/1993 | Byung-Mu | F02G 1/0445 60/520 |
| 5,263,404 A | 11/1993 | Gaucher et al. | |
| 5,388,409 A | 2/1995 | Meijer | |
| 5,394,700 A * | 3/1995 | Steele | F02G 1/044 60/517 |
| 5,557,934 A | 9/1996 | Beach | |
| 5,611,201 A * | 3/1997 | Houtman | F02G 1/043 60/517 |
| 5,706,659 A | 1/1998 | Houtman et al. | |
| 5,722,239 A | 3/1998 | Houtman | |
| 5,735,262 A | 4/1998 | Houtman | |
| 5,751,069 A | 5/1998 | Rajashekara et al. | |
| 5,758,938 A | 6/1998 | Osterwisch | |
| 5,771,694 A | 6/1998 | Houtman et al. | |
| 5,813,229 A | 9/1998 | Gaiser | |
| 5,822,964 A | 10/1998 | Kerpays, Jr. | |
| 5,836,846 A | 11/1998 | Hewko et al. | |
| 5,864,770 A | 1/1999 | Ziph et al. | |
| 5,865,091 A | 2/1999 | Domanski et al. | |
| 5,884,481 A | 3/1999 | Johansson et al. | |
| 5,921,764 A | 7/1999 | Marchionna et al. | |
| 5,938,207 A | 8/1999 | Marchionna et al. | |
| 6,282,895 B1 | 9/2001 | Johansson et al. | |
| 6,308,734 B1 | 10/2001 | Smith et al. | |
| 6,318,526 B1 | 11/2001 | Kruckemeyer et al. | |
| 6,381,958 B1 | 5/2002 | Kamen et al. | |
| 6,390,258 B1 | 5/2002 | Hofmann et al. | |
| 6,457,309 B1 * | 10/2002 | Firey | F02G 1/043 60/517 |
| 6,543,215 B2 | 4/2003 | Langenfeld et al. | |
| 6,591,609 B2 | 7/2003 | Kamen et al. | |
| 6,694,731 B2 | 2/2004 | Kamen et al. | |
| 6,698,669 B2 | 3/2004 | Rieben | |
| 6,862,883 B2 | 3/2005 | Kamen et al. | |
| 6,904,888 B1 | 6/2005 | Heifets | |
| 6,922,908 B1 | 8/2005 | Raudales | |
| 6,966,182 B2 | 11/2005 | Kamen et al. | |
| 6,971,235 B2 | 12/2005 | Langenfeld et al. | |
| 7,003,964 B2 | 2/2006 | Solomon | |
| 7,067,933 B2 | 6/2006 | Bassett | |
| 7,111,460 B2 | 9/2006 | Jansen et al. | |
| 7,191,596 B2 | 3/2007 | Yaguchi et al. | |
| 7,194,858 B2 | 3/2007 | Ziph et al. | |
| 7,219,647 B1 | 5/2007 | Brickley | |
| 7,279,800 B2 | 10/2007 | Bassett | |
| 7,308,787 B2 | 12/2007 | Larocque et al. | |
| 7,310,945 B2 | 12/2007 | Gurski et al. | |
| 7,325,399 B2 | 2/2008 | Strimling et al. | |
| 7,373,915 B1 | 5/2008 | Joniec | |
| 7,458,215 B2 | 12/2008 | Yaguchi et al. | |
| 7,468,765 B2 | 12/2008 | Shiota et al. | |
| 7,836,691 B2 * | 11/2010 | Takeuchi | F02G 1/053 60/517 |
| 8,181,461 B2 * | 5/2012 | Strimling | F02G 1/055 60/520 |
| 2002/0035834 A1 | 3/2002 | Cammack | |
| 2002/0175502 A1 | 11/2002 | Tesch et al. | |
| 2005/0122447 A1 | 6/2005 | Shiota et al. | |
| 2005/0250062 A1 | 11/2005 | Kornbluth et al. | |
| 2006/0048728 A1 | 3/2006 | Scalzo | |
| 2006/0096810 A1 | 5/2006 | Eto et al. | |
| 2007/0079788 A1 * | 4/2007 | Betzmeir | F02B 75/065 123/196 R |
| 2008/0223031 A1 * | 9/2008 | Sollie | F02G 1/043 60/517 |
| 2008/0314356 A1 | 12/2008 | Kamen et al. | |
| 2010/0199658 A1 * | 8/2010 | Johansson | F02G 1/044 60/517 |
| 2010/0199660 A1 * | 8/2010 | Johansson | F02G 1/044 60/525 |
| 2011/0011078 A1 | 1/2011 | Kamen et al. | |
| 2011/0146601 A1 | 6/2011 | Fisher | |
| 2012/0031383 A1 | 2/2012 | Stockhausen | |
| 2014/0000235 A1 | 1/2014 | Kamen et al. | |
| 2015/0040751 A1 | 2/2015 | Langenfeld et al. | |
| 2015/0152809 A1 | 6/2015 | Langenfeld et al. | |

FOREIGN PATENT DOCUMENTS

| | | |
|---|---|---|
| DE | 19938084 A1 | 7/2000 |
| EP | 2449244 | 5/2012 |
| FR | 2459371 | 1/1981 |
| FR | 2497904 | 7/1982 |
| FR | 2796119 | 1/2001 |
| GB | 1311058 | 3/1973 |
| GB | 1394033 | 5/1975 |
| GB | 2249131 | 5/1992 |
| JP | 51048040 | 4/1976 |
| JP | 57 018443 | 1/1982 |
| JP | 61025901 | 2/1986 |
| JP | 61040450 | 2/1986 |
| JP | S63 109271 | 5/1988 |
| JP | 1008346 | 1/1989 |
| JP | 1110 62025 | 3/1998 |
| JP | 2008101477 | 5/2008 |
| WO | WO 1992/009812 | 6/1992 |
| WO | WO 2008/131223 A1 | 10/2008 |
| WO | WO 2009/005426 A1 | 1/2009 |
| WO | WO 2011/003038 A2 | 1/2011 |

OTHER PUBLICATIONS

*International Preliminary Report on Patentability*, dated Jan. 4, 2012, received in the international patent application No. PCT/US2010/040841 (178W0), 8 pgs.

*International Search Report with Written Opinion*, dated Oct. 15, 2008, received in international patent application PCT/US2008/060827 (170W0), 16 pgs.

*International Preliminary Report on Patentability*, dated Nov. 5, 2009, received in the international patent application No. PCT/US2008/060827 (170W0), 7 pgs.

*Invitation to Pay Additional Fees and, Where Applicable, Protest Fee*dated Apr. 27, 2011, received in International patent application No. PCT/US2010/040841 (178W0), 8 pgs.

*International Search Report*, date Jul. 21, 2015, received in International Application No. PCT/US2015/020527 (196W0), 4 pgs.

*Written Opinion*, date Jul. 21, 2015, received in International Application No. PCT/US2015/020527 (196W0), 4 pgs.

* cited by examiner

READY FOR START OF
COMPRESSION STROKE

END OF COMPRESSION STROKE

READY FOR START OF
EXPANSION STROKE

END OF EXPANSION STROKE

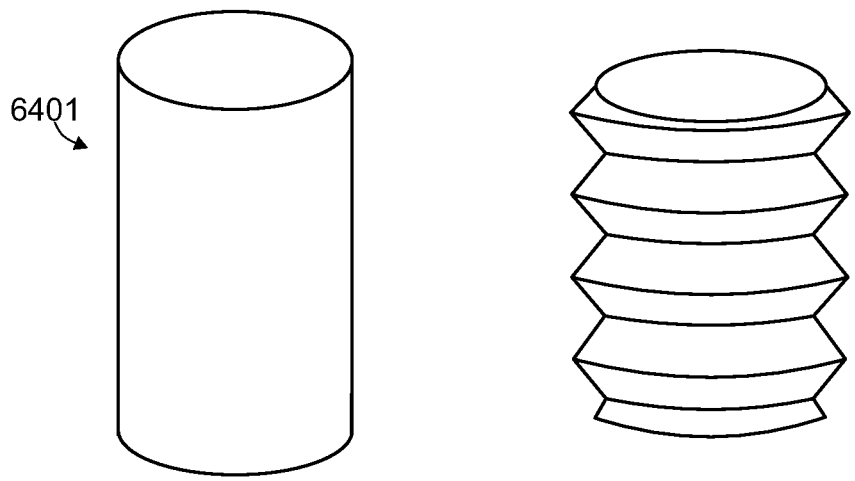
FIG. 24B
FIG. 24C
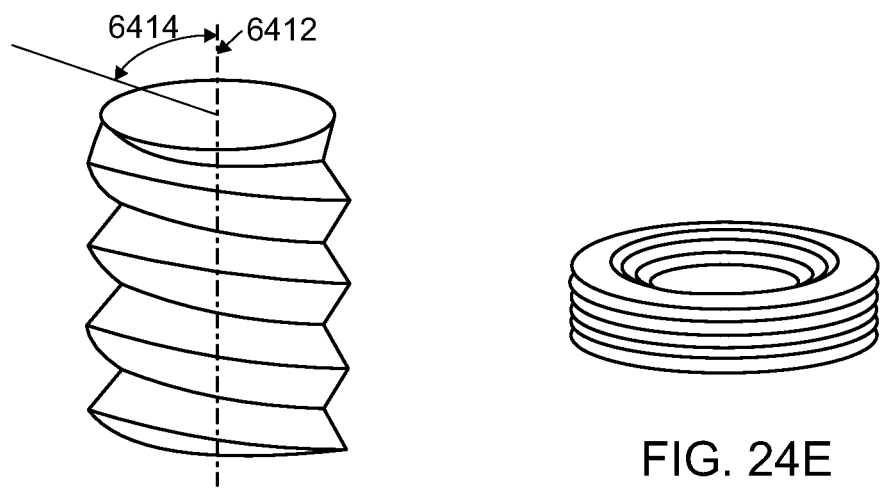
FIG. 24D
FIG. 24E

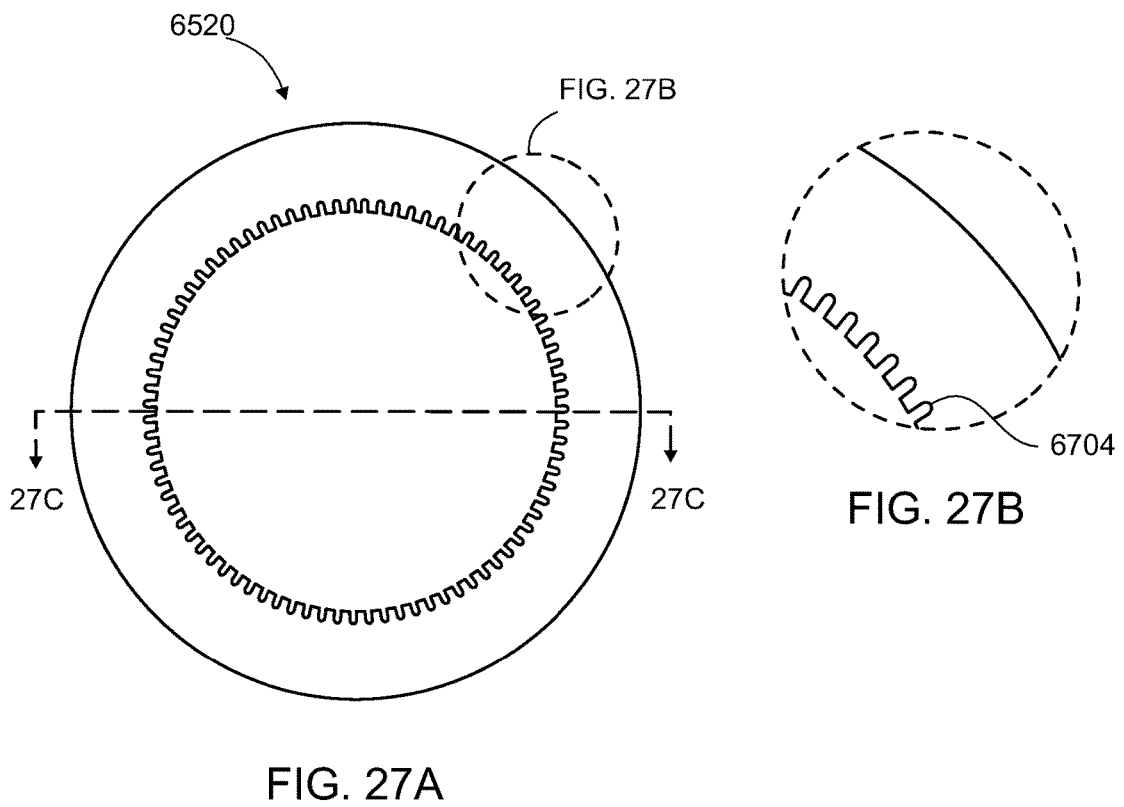
FIG. 27A
FIG. 27B
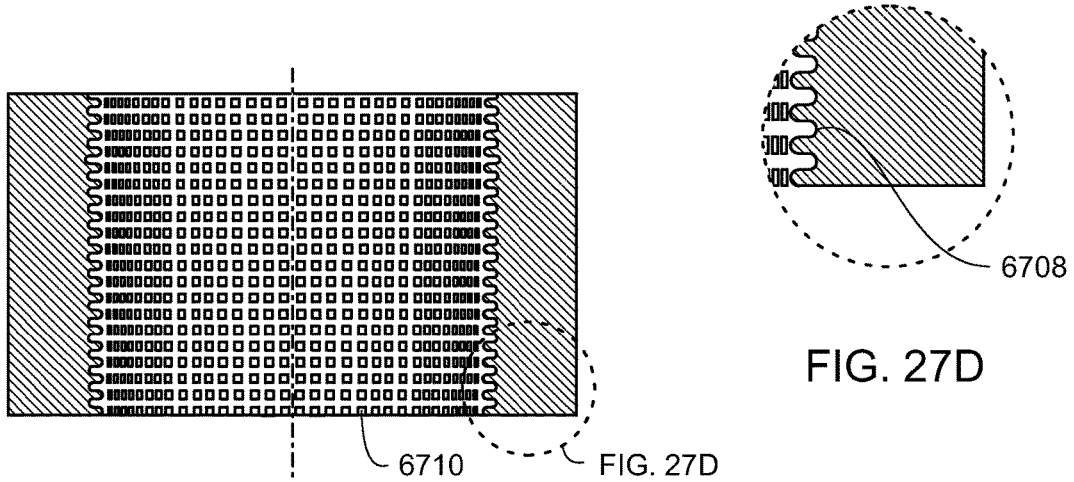
FIG. 27C
FIG. 27D

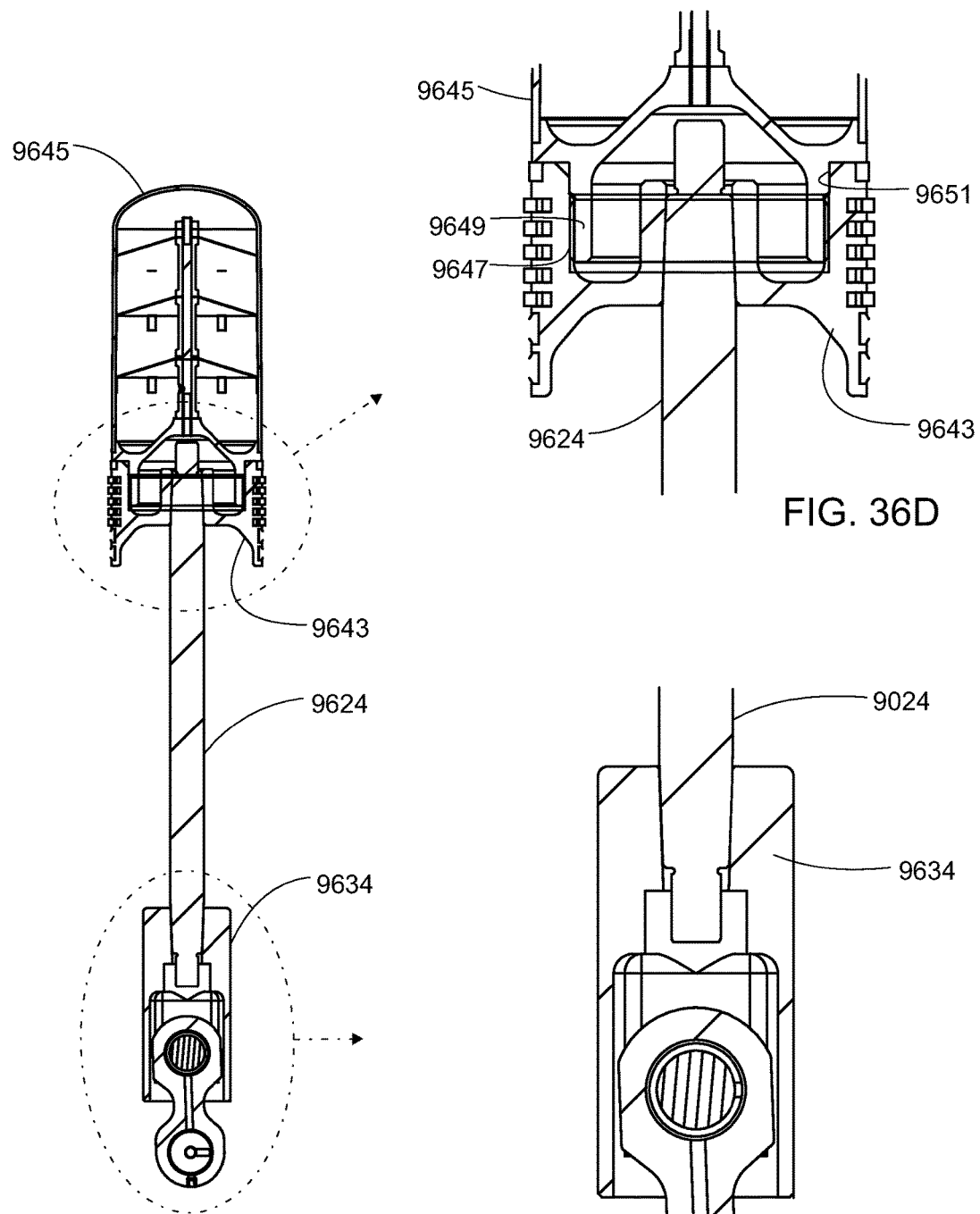

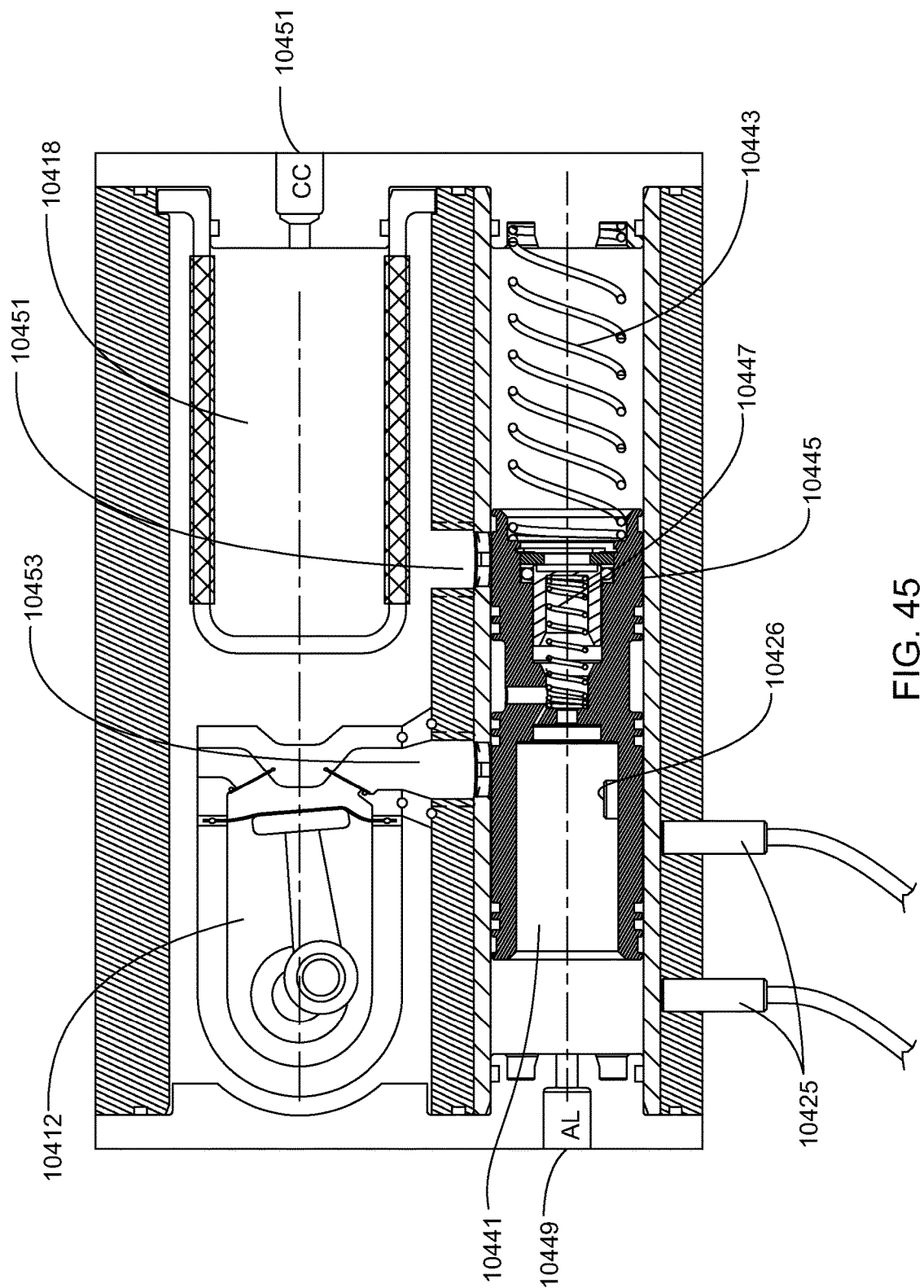

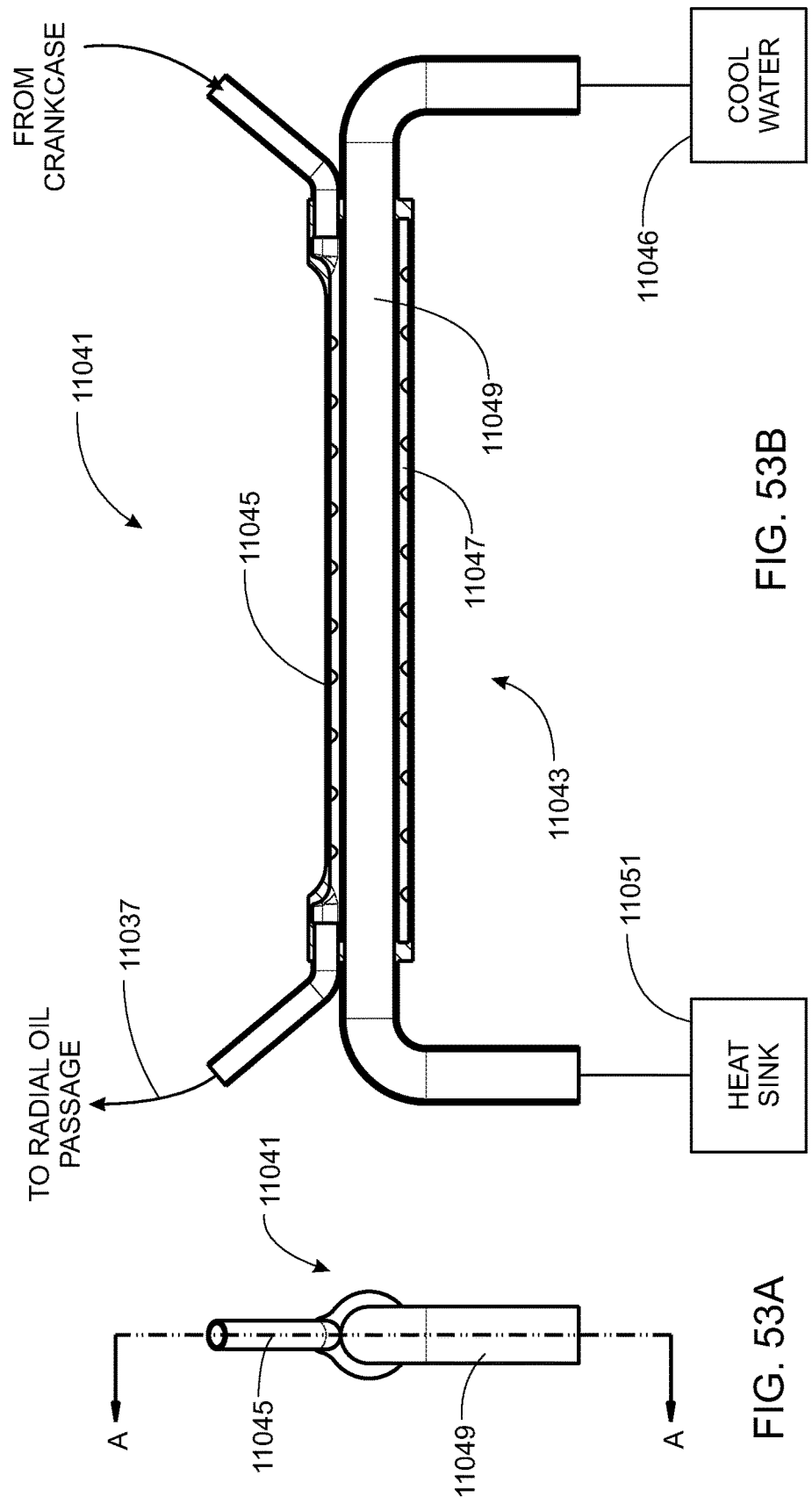

SECTION A-A

SECTION B-B

SECTION A-A

SECTION C-C

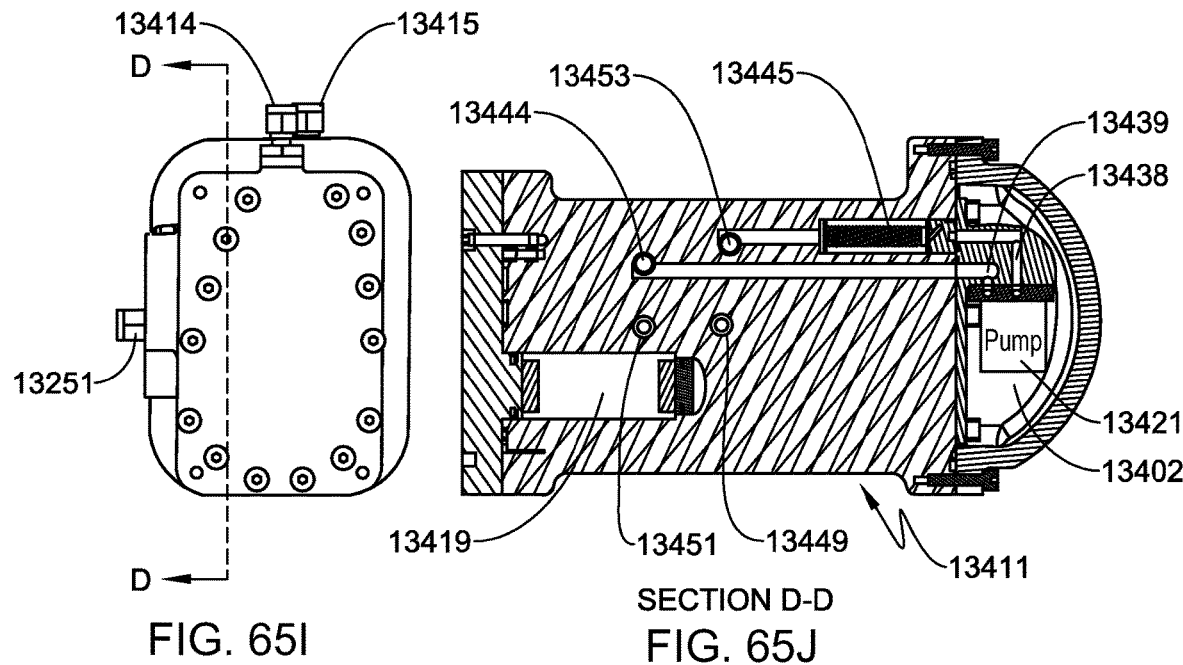
FIG. 65I
SECTION D-D
FIG. 65J
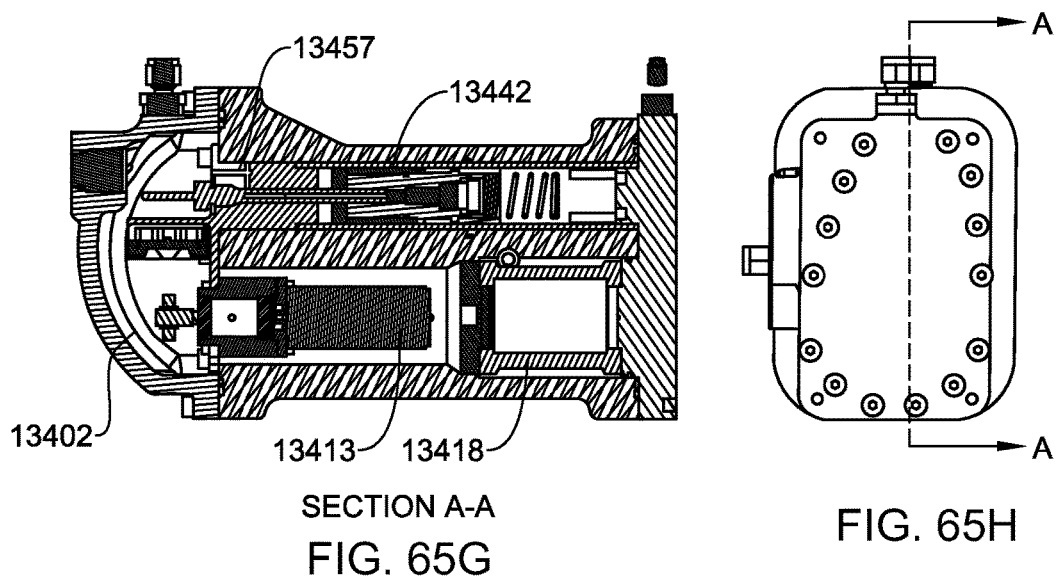
SECTION A-A
FIG. 65G
FIG. 65H

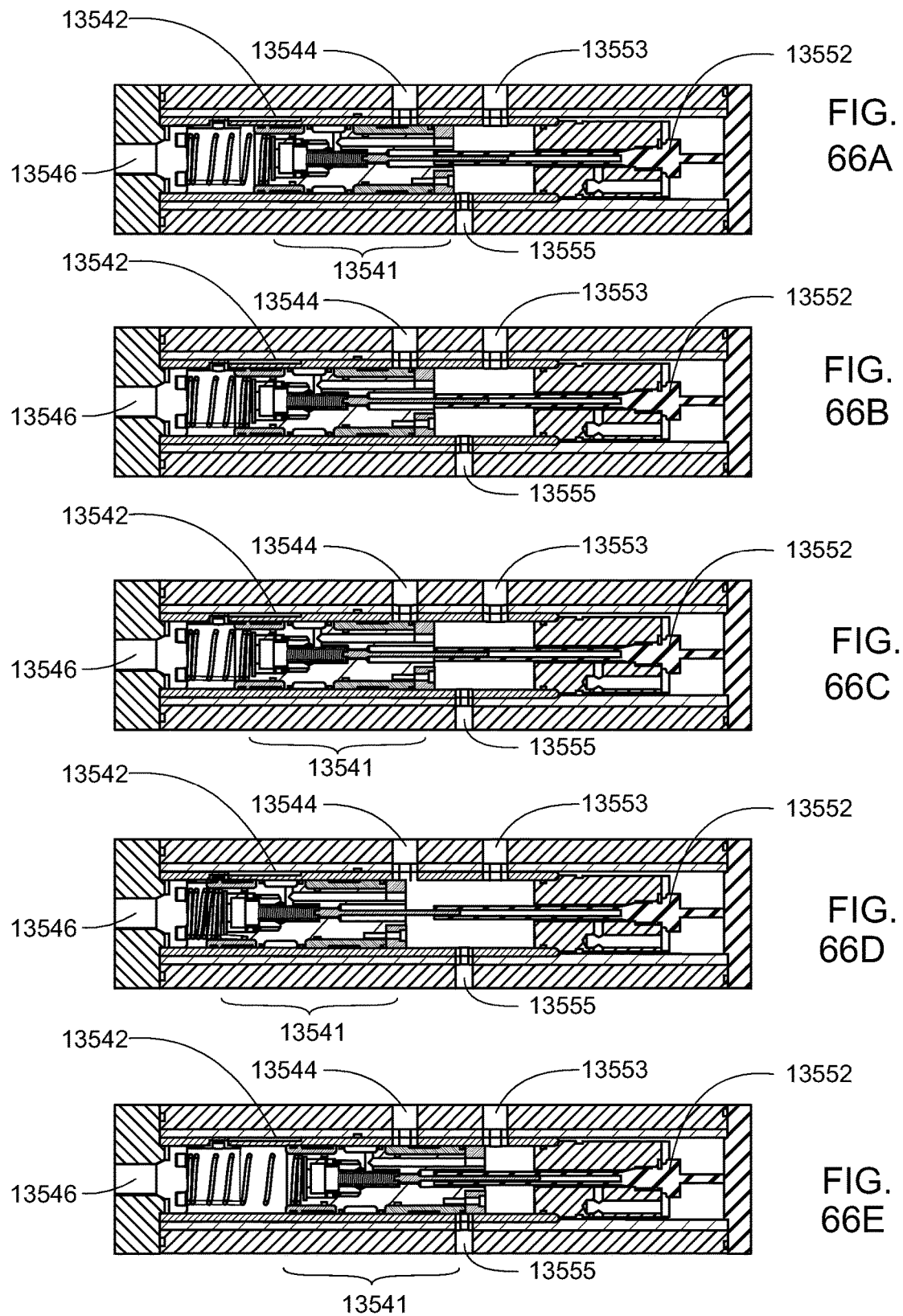

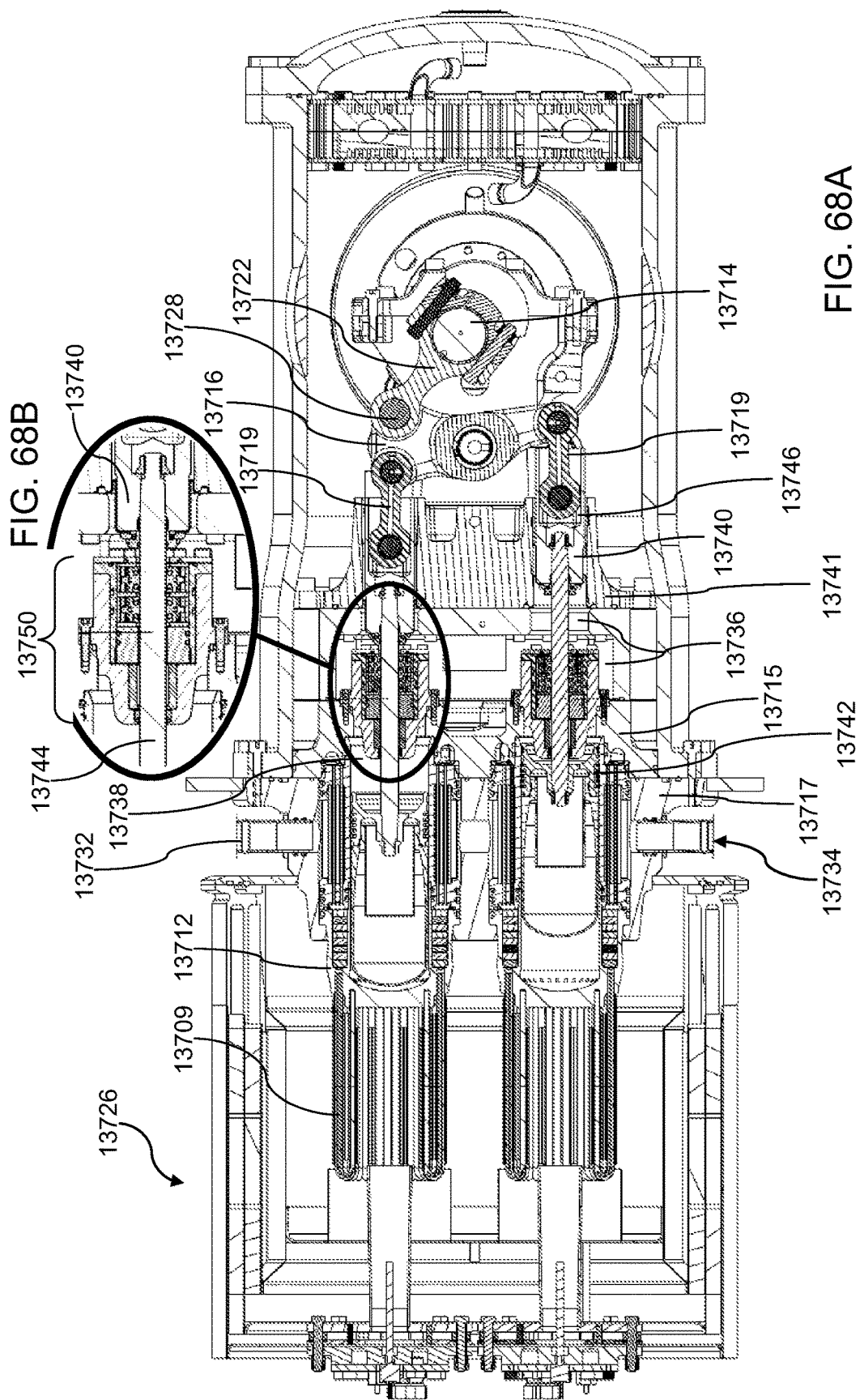

LINEAR CROSS-HEAD BEARING FOR STIRLING ENGINE

CROSS REFERENCE TO RELATED APPLICATIONS

The present application is a Continuation-In-Part of U.S. patent application Ser. No. 14/553,824, filed Nov. 11, 2015, and entitled Annular Venturi Burner for Stirling Engine, which is a Continuation-In-Part of U.S. Patent Application Ser. No. 61/908,468, filed Nov. 25, 2013, and entitled Annular Venturi Burner for Stirling Engine, which is also a Continuation-In-Part of U.S. patent application Ser. No. 14/211,621, filed Mar. 14, 2014, and entitled Stirling Cycle Machine, which is a Continuation-In-Part of U.S. patent application Ser. No. 13/836,946, filed Mar. 15, 2013, and entitled Stirling Cycle Machine, which is a Continuation-In-Part of U.S. patent application Ser. No. 13/447,990, filed Apr. 16, 2012, and entitled Stirling Cycle Machine, which claims priority to:

U.S. Provisional Patent Application Ser. No. 61/476,180, filed Apr. 15, 2011 and entitled Stirling Cycle Machine; and U.S. Provisional Patent Application Ser. No. 61/482,897, filed May 5, 2011 and entitled Stirling Cycle Machine, all of which are hereby incorporated herein by reference in their entireties.

U.S. patent application Ser. No. 13/447,990, filed Apr. 16, 2012, and entitled Stirling Cycle Machine, is also a Continuation-In-Part application of U.S. patent application Ser. No. 12/829,320, filed Jul. 1, 2010 and entitled Stirling Cycle Machine, now U.S. Publication No. US-2011-0011078-A1, published Jan. 20, 2011, which claims priority to U.S. Provisional Patent Application Ser. No. 61/222,361, filed Jul. 1, 2009 and entitled Stirling Cycle Machine, both of which are hereby incorporated herein by reference in their entireties.

TECHNICAL FIELD

The present invention relates to machines and more particularly, to a Stirling cycle machine and components thereof.

BACKGROUND INFORMATION

Many machines, such as internal combustion engines, external combustion engines, compressors, and other reciprocating machines, employ an arrangement of pistons and drive mechanisms to convert the linear motion of a reciprocating piston to rotary motion. In most applications, the pistons are housed in a cylinder. A common problem encountered with such machines is that of friction generated by a sliding piston resulting from misalignment of the piston in the cylinder and lateral forces exerted on the piston by linkage of the piston to a rotating crankshaft. These increased side loads increase engine noise, increase piston wear, and decrease the efficiency and life of the engine. Additionally, because of the side loads, the drive requires more power to overcome these frictional forces, thus reducing the efficiency of the machine.

Improvements have been made on drive mechanisms in an attempt to reduce these side loads, however, many of the improvements have resulted in heavier and bulkier machines.

Accordingly, there is a need for practical machines with minimal side loads on pistons.

SUMMARY

In accordance with one aspect of the present invention, an external combustion engine is disclosed. The external combustion engine containing a working fluid and includes a burner element for heating the working fluid of the engine, at least one heater head defining a working space containing the working fluid, at least one piston cylinder containing a piston for compressing the working fluid, a cooler for cooling the working fluid, a crankcase including a crankshaft for producing an engine output, a rocking beam rotating about a rocker pivot for driving the crankshaft, a piston rod connected to the piston, a rocking beam driven by the piston rod, and a connecting rod connected at a first end to the rocking beam and at a second end to a crankshaft to convert rotary motion of the rocking beam to rotary motion of the crankshaft. Also, the external combustion engine including a piston rod seal unit including a housing, a cylinder gland, and at least one floating rod seal assembly mounted in the cylinder gland, the floating rod seal assembly comprising at least one rod seal mounted onto the floating rod seal assembly.

Some embodiments of this aspect of the present invention include one or more of the following. Where the piston rod seal unit further includes a scraper ring. Where the piston rod seal unit further includes a particle trap. Wherein the piston rod seal unit further includes a port. Wherein the piston rod seal unit further includes a filter. Wherein the floating rod seal assembly further includes an outer ring, and at least one bushing. Wherein the piston rod seal unit further includes wherein the rod seal is a spring energized seal.

In accordance with one aspect of the present invention, a piston rod seal unit is disclosed. The piston rod seal unit includes a housing, a cylinder gland, and at least one floating rod seal assembly mounted in the cylinder gland, the floating rod seal assembly comprising at least one rod seal mounted onto the floating rod seal assembly.

Some embodiments of this aspect of the present invention include one or more of the following. Wherein the piston rod seal unit further includes a scraper ring. Wherein the piston rod seal unit further includes a particle trap. Wherein the piston rod seal unit further includes a port. Wherein the piston rod seal unit further includes a filter. Wherein the floating rod seal assembly further includes an outer ring, and at least one bushing. Wherein the piston rod seal unit further includes wherein the rod seal is a spring energized seal.

In accordance with one aspect of the present invention, an external combustion engine is disclosed. The external combustion engine containing a working fluid and including a piston rod seal unit including a housing, a cylinder gland, and at least one floating rod seal assembly mounted in the cylinder gland, the floating rod seal assembly including at least one rod seal mounted onto the floating rod seal assembly, and an airlock space separating a crankcase and a working space for maintaining a pressure differential between a crankcase housing and a working space housing.

Some embodiments of this aspect of the present invention include one or more of the following. Wherein the airlock pressure regulator is a bidirectional pressure regulator for maintaining a predetermined pressure differential between the crankcase and one of the airlock space and working space. Wherein the airlock pressure regulator includes a filter, a compressor, a pressure regulating spool valve, and a linear position sensor, wherein the linear position sensor produces a signal indicative of the regulating spool valve position. Wherein the airlock pressure regulator further includes a controller. Wherein the linear position sensor is an LVDT. Wherein the controller uses the linear position sensor to regulate a pump speed.

In accordance with one aspect of the present invention, a rod seal assembly is disclosed. The rod seal assembly includes a housing between two spaces configured to receive a reciprocating rod, the reciprocating rod disposed within a first space and a second space, a floating bushing configured to move axially and radially within the housing and disposed coaxially around the reciprocating rod, a rod seal configured to seal the outside diameter of the reciprocating rod relative to an inside surface of the floating bushing, and at least one stationary bushing fixed within the housing that may form a seal with the floating bushing to the axial flow of fluid in the presence of a pressure difference between the two spaces.

Some embodiments of this aspect of the present invention include one or more of the following. Wherein the floating bushing is configured to move radially to center on the piston rod when the pressure difference between the first and second space is small and form the seal with the stationary bushing when the pressure difference is larger. Wherein the rod seal is a spring energized seal. Wherein the floating bushing further comprises a circumferential flange on the outside surface that is configured to extend into the annular space and form a seal with one of the stationary bushings. Wherein the rod seal is formed of a PTFE composite. Wherein the floating bushing and stationary bushing are formed of a wear resistance metal. Wherein the assembly further includes a scraper ring disposed coaxially around the piston rod and disposed within housing between the floating seal and the first space, and a passage connecting the first space to an annular gap disposed around the reciprocating rod between the scraper ring and the floating seal. Wherein the assembly further includes a magnetic particle trap disposed between the scraper ring and floating seal.

In accordance with one aspect of the present invention, a rod seal assembly is disclosed. The rod seal assembly includes a housing between two spaces configured to receive a reciprocating rod, the reciprocating rod disposed between a first space and a second space, a floating clearance bushing configured to move axially and radially within the housing and disposed coaxially around the reciprocating rod and forms a clearance seal with the reciprocating rod, and at least one stationary annular element fixed within the housing configured to form a face seal with the floating clearance bushing.

Some embodiments of this aspect of the present invention include one or more of the following. Wherein the floating clearance bushing is configured to move radially to center on the piston rod when the pressure difference between the first and second space is small and form the seal with the stationary annular element when the pressure difference is larger. Wherein the assembly further includes a spring energized face seal on at least one end of the floating clearance bushing. Wherein the assembly further includes a second floating clearance bushing disposed around the reciprocating rod, and two spring energized lip seals disposed around the reciprocating piston rod and axially located within or between the two floating clearance bushings. Wherein the assembly further includes a scraper ring disposed coaxially around the piston rod and disposed within housing between the floating seal and the first space, and a passage connecting the first space to an annular gap disposed around the reciprocating rod between the scraper ring and the floating seal. Wherein the assembly further includes a magnetic particle trap disposed between the scraper ring and floating seal.

In accordance with one aspect of the present invention, a floating rod seal is disclosed. The floating seal includes a rod seal attached to a floating bushing, wherein the rod seal forms a leak tight joint with a floating bushing, two annular shaped stationary bushings that are located approximately coaxially with respect to the rod seal and placed on the inside diameter of an outer ring such that the two ends of the stationary bushings form an axial gap, and the floating bushing which includes an inner surface to seal to the rod seal and a circumferential rib on the outside surface, where the circumferential rib is captured in the axial gap and may move radially within the outer ring and may form a seal with one bushing.

In accordance with one aspect of the present invention, a floating rod seal is disclosed. The floating seal includes a floating clearance bushing that forms a clearance seal with the piston rod and floats within cylinder-gland housing located between a workspace the air lock. The floating clearance bushing moves radially when the pressure difference between the workspace and the air lock are minimal and forms a seal with a fixed annular section of the housing when the pressure difference is large.

In accordance with one aspect of the present invention, an external combustion engine is disclosed containing a working fluid and comprising a burner element for heating the working fluid of the engine, at least one heater head defining a working space containing the working fluid, at least one piston cylinder containing a piston for compressing the working fluid, at least one cooler for cooling the working fluid and a crankcase. The crankcase comprises a crankshaft for producing an engine output, a piston rod connected to the piston, a drive mechanism that converts the linear motion of the piston rod to rotary motion of the crankshaft, and a linear cross-head bearing comprising a journal and a guide. One end of the journal bearing is rigidly attached to the piston rod and the other end is attached to the drive mechanism. The guide is located outside the working space and the linear cross-head bearing solely constrains the motion of the piston.

Some embodiments of this aspect of the present invention include one or more of the following: the ratio of the linear cross-head bearing length over diameter is greater than 2.0; the linear cross-head bearing is a hydrodynamic bearing supplied with pressurized oil from an annulus on the guide; a piston rod seal unit including a housing; a floating clearance bushing configured to move axially and radially within the housing and disposed coaxially around the piston rod and at least one stationary annular element fixed within the housing configured to form a face seal with the floating clearance bushing; a piston rod seal unit including a housing, a floating rod seal assembly with at least one rod seal mounted onto the floating rod seal assembly, a piston rod seal unit including a housing, a cylinder gland, and at least one floating rod seal assembly mounted in the cylinder gland where a rod seal is mounted onto the floating rod seal assembly; the rod seal is an spring energized seal; the piston includes a clearance seal where the clearance seal may include radial grooves on the outside diameter and O-rings on the inside diameter and the clearance seal may include at least one of the following materials; graphite, PTFE, UHM-WPE, antimony.

In accordance with one aspect of the present invention, an external combustion engine is disclosed containing a working fluid and comprising a burner element for heating the working fluid of the engine, at least one heater head defining a working space containing the working fluid, at least one piston cylinder containing a piston for compressing the working fluid, at least one cooler for cooling the working fluid and a crankcase. The crankcase comprises a crankshaft for producing an engine output, a piston rod connected to the piston, a rocking beam rotating about a rocker pivot for driving the crankshaft, a rocking beam driven by the piston rod, and a connecting rod connected at a first end to the rocking beam and at a second end to a crankshaft to convert rotary motion of the rocking beam to rotary motion of the crankshaft and a linear cross-head bearing comprising a journal and a guide. One end of the journal bearing is rigidly attached to the piston rod and the other end is attached to the drive mechanism. The guide is located outside the working space and the linear cross-head bearing solely constrains the motion of the piston.

Some embodiments of this aspect of the present invention include one or more of the following: the ratio of the linear cross-head bearing length over diameter is greater than 2.0; the linear cross-head bearing is a hydrodynamic bearing supplied with pressurized oil from an annulus on the guide; a piston rod seal unit including a housing; a floating clearance bushing configured to move axially and radially within the housing and disposed coaxially around the piston rod and at least one stationary annular element fixed within the housing configured to form a face seal with the floating clearance bushing; a piston rod seal unit including a housing, a floating rod seal assembly with at least one rod seal mounted onto the floating rod seal assembly, a piston rod seal unit including a housing, a cylinder gland, and at least one floating rod seal assembly mounted in the cylinder gland where a rod seal is mounted onto the floating rod seal assembly; the rod seal is an spring energized seal; the piston includes a clearance seal where the clearance seal may include radial grooves on the outside diameter and O-rings on the inside diameter and the clearance seal may include at least one of the following materials; graphite, PTFE, UHM-WPE, antimony.

In accordance with one aspect of the present invention, an external combustion engine is disclosed containing a working fluid and comprising a burner element for heating the working fluid of the engine, at least one heater head defining a working space containing the working fluid, at least one piston cylinder containing a piston for compressing the working fluid, at least one cooler for cooling the working fluid and a crankcase. The crankcase comprises a crankshaft for producing an engine output, a piston rod connected to the piston, a drive mechanism that converts the linear motion of the piston rod to rotary motion of the crankshaft, and a piston comprising a piston base with a seal, an outer shell that mounts on the base and an inner shell that is shorter and narrower than the outer shell and defines with the piston base a volume above the inner surface of the piston base.

Some embodiments of this aspect of the present invention include one or more of the following: a small orifice in the piston base, an orifice in the piston base with a diameter between 0.002 and 0.008 inches, and port in the inner shell. In accordance with one aspect of the present invention, an external combustion engine is disclosed. The external combustion engine containing a working fluid and including a burner element for heating the working fluid of the engine, at least one heater head defining a working space containing the working fluid, at least one piston cylinder containing a piston for compressing the working fluid, a cooler for cooling the working fluid, a crankcase. The crankcase includes a crankshaft for producing an engine output, a rocking beam rotating about a rocker pivot for driving the crankshaft, a piston rod connected to the piston, a rocking beam driven by the piston rod, and a connecting rod connected at a first end to the rocking beam and at a second end to a crankshaft to convert rotary motion of the rocking beam to rotary motion of the crankshaft. The external combustion engine also includes an airlock space separating the crankcase and the working space for maintaining a pressure differential between the crankcase housing and the working space housing and an airlock pressure regulator connected between the crankcase and one of the airlock space and working space.

Some embodiments of this aspect of the present invention include one or more of the following. A first seal for sealing the crankcase from the airlock space, wherein the seal is a rolling diaphragm. A seal for sealing the workspace from the airlock space, wherein the seal is a pair of oppositely disposed rolling diaphragms. A second seal for sealing the workspace from the airlock space, wherein the seal is a high pressure seal. Wherein the airlock pressure regulator is a bidirectional pressure regulator for maintaining a predetermined pressure differential between the crankcase and one of the airlock space and working space. Wherein the airlock pressure regulator includes a filter, a compressor, a pressure regulating spool valve, and a linear position sensor, wherein the linear position sensor produces a signal indicative of the regulating spool valve position. Wherein the airlock pressure regulator further includes a controller. Wherein the linear position sensor is an LVDT. Wherein the controller uses the linear position sensor to regulate a pump speed. Wherein the airlock pressure regulator further includes a drain port and a fill port, wherein the drain port and the fill port are selectively connected. Wherein the controller sends a stop command to the drive based at least in part on the position of the linear position sensor. Wherein the external combustion engine further includes a burner controller for a multi-burner including a master controller and an individual combustion control circuit. Wherein the master controller controls a variable resistance element connected to the fuel line in each burner in the multi-burner. Wherein the external combustion engine further includes an over-temperature circuit, wherein the over-temperature circuit monitors a temperature on each of the heater head temperatures and may disable the fuel valve supplying a burner heating a heater head. Wherein the external combustion engine further includes a flow-detection circuit wherein the flow-detection circuit disables all the fuel valves when the flow-detection circuit detects a flow that is below a predetermined threshold.

In accordance with one aspect of the present invention, a rocking beam drive mechanism for a machine is disclosed. The drive mechanism includes a rocking beam having a rocker pivot, at least one cylinder and at least one piston. The piston is housed within a respective cylinder. The piston is capable of substantially linearly reciprocating within the respective cylinder. Also, the drive mechanism includes at least one coupling assembly having a proximal end and a distal end. The proximal end is connected to the piston and the distal end is connected to the rocking beam by an end pivot. The linear motion of the piston is converted to rotary motion of the rocking beam.

Some embodiments of this aspect of the present invention include one or more of the following: where the rocking beam is coupled to a crankshaft by way of a connecting rod. In this embodiment, the rotary motion of the rocking beam is transferred to the crankshaft. Also, where the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means is located beneath the linear bearing. Also, where the drive mechanism also includes a seal, where the seal is sealably connected to the piston rod. Also, where the seal is a rolling diaphragm. Also, in some embodiments, the coupling means is a flexible joint. In some embodiments, the coupling means is a roller bearing. In some embodiments, the coupling means is a hinge. In some embodiments, the coupling means is a flexure. In some embodiments, the coupling means is a journal bearing joint.

In accordance with another aspect of the present invention, a Stirling cycle machine is disclosed. The machine includes at least one rocking drive mechanism where the rocking drive mechanism includes: a rocking beam having a rocker pivot, at least one cylinder and at least one piston. The piston is housed within a respective cylinder. The piston is capable of substantially linearly reciprocating within the respective cylinder. Also, the drive mechanism includes at least one coupling assembly having a proximal end and a distal end. The proximal end is connected to the piston and the distal end is connected to the rocking beam by an end pivot. The linear motion of the piston is converted to rotary motion of the rocking beam. Also, a crankcase housing the rocking beam and housing a first portion of the coupling assembly is included. A crankshaft coupled to the rocking beam by way of a connecting rod is also included. The rotary motion of the rocking beam is transferred to the crankshaft. The machine also includes a working space housing the at least one cylinder, the at least one piston and a second portion of the coupling assembly. A seal is included for sealing the workspace from the crankcase.

Some embodiments of this aspect of the present invention include one or more of the following: where the seal is a rolling diaphragm. Also, the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means may be located beneath the linear bearing. Also, the machine may also include a lubricating fluid pump in the crankcase. In some embodiments, the lubricating fluid pump is a mechanical lubricating fluid pump driven by a pump drive assembly, the pump drive assembly being connected to and driven by the crankshaft. In some embodiments, the lubricating fluid pump is an electric lubricating fluid pump. The machine may also include a motor connected to the crankshaft. The machine may also include a generator connected to the crankshaft.

In accordance with another aspect of the present invention, a Stirling cycle machine is disclosed. The machine includes at least two rocking drive mechanisms. The rocking drive mechanisms each include a rocking beam having a rocker pivot, two cylinders, and two pistons. The pistons each housed within a respective cylinder. The pistons are capable of substantially linearly reciprocating within the respective cylinder. Also, the drive mechanisms include two coupling assemblies having a proximal end and a distal end, the proximal end being connected to the piston and the distal end being connected to the rocking beam by an end pivot. The linear motion of the piston is converted to rotary motion of the rocking beam. The machine also includes a crankcase housing the rocking beam and housing a first portion of the coupling assemblies. Also, a crankshaft coupled to the rocking beam by way of a connecting rod. The rotary motion of the rocking beam is transferred to the crankshaft. The machine also includes a lubricating fluid pump in the crankcase for pumping lubricating fluid to lubricate the crankshaft and the rocking beam and the first portion of the coupling assemblies. Also, a working space housing the cylinders, the pistons and the second portion of the coupling assemblies. A rolling diaphragm for sealing the workspace from the crankcase is also included.

Some embodiments of this aspect of the present invention include one or more of the following: where the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means may be located beneath the linear bearing. Also, where the coupling means is a flexible joint. In some embodiments, also disclosed is where the coupling means is a roller bearing.

Other embodiments of this aspect of the present invention relate to one or more of an external combustion engine containing a working fluid comprising a burner element for heating the working fluid of the engine, at least one heater head defining a working space containing the working fluid, at least one piston cylinder containing a piston for compressing the working fluid, a cooler for cooling the working fluid, a crankcase comprising a crankshaft for producing an engine output, a rocking beam rotating about a rocker pivot for driving the crankshaft, a piston rod connected to the piston, a rocking beam driven by the piston rod, and a connecting rod connected at a first end to the rocking beam and at a second end to the crankshaft to convert rotary motion of the rocking beam to rotary motion of the crankshaft wherein the piston reciprocates along a substantially linear piston axis in the crankcase and the crankshaft is arranged below a limit of the piston axis in the crankcase.

A still further embodiment of the invention relate to one or more embodiments of an external combustion engine containing a working fluid comprising a burner element for heating the working fluid of the engine, at least one heater head defining a working space containing the working fluid, at least one piston cylinder containing a piston for compressing the working fluid, a cooler for cooling the working fluid, a crankcase comprising, a crankshaft for producing an engine output, a rocking beam rotating about a rocker pivot for driving the crankshaft, a piston rod connected to the piston, a rocking beam driven by the piston rod, a connecting rod connected at a first end to the rocking beam and at a second end to a crankshaft to convert rotary motion of the rocking beam to rotary motion of the crankshaft, and an airlock space separating the crankcase and the working space for maintaining a pressure differential between the crankcase housing and the working space housing.

A still further embodiment of the invention relate to one or more embodiments of a heating element for heating an external combustion engine or machine comprising a burner element for heating the working fluid of the engine, a blower providing air or other gas for facilitating ignition and combustion in the burner, a preheater defining an incoming air passage and an exhaust passage separated by an exhaust manifold wall for heating incoming air from the hot exhaust expelled from the heating element, a fuel injector for supplying fuel to mix with the incoming air, an igniter to ignite the fuel/air mixture, a prechamber defining an inlet for receiving the fuel/air mixture and promoting ignition of the mixture, a combustion chamber disposed linearly below the prechamber for maintaining supporting a flame developed and ignited in the prechamber, an electronic control unit for controlling ignition and combustion operations of the burner, and wherein the combustion chamber is connected to the exhaust passage into which the exhausted combustion gases are pushed to heat the incoming air following combustion and heating of the engine or machine. These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIGS. 24A-24E show various configurations of a regenerator of a Stirling cycle engine in accordance with various embodiments;

FIGS. 27A and 27B show a view of a cooler for an engine in accordance with one embodiment;

FIGS. 27C and 27D show a view of a cooler for an engine in accordance with one embodiment;

FIGS. 36C-36E show various views of a piston and piston rod assembly in accordance with one embodiment;

FIG. 45 shows a bidirectional regulator according to one embodiment;

FIGS. 53A and 53B show views of a tube-in-tube heat exchanger according to one embodiment;

FIGS. 65E-65J is an embodiment of an Airlock delta Pressure Regulation (AdPR) block;

FIGS. 66A-66E show a further embodiment of various positions of a spool valve in a bidirectional regulator in accordance with various embodiments;

FIG. 68A is a cross-section of one embodiment of a Stirling Engine with a piston rod seal unit;

FIG. 68B is a detailed view of the piston rod seal unit in FIG. 68A;

DETAILED DESCRIPTION

Figure 1A:
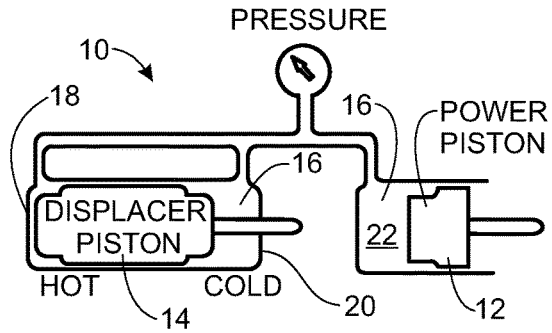
FIGS. 1A-1E depict the principle of operation of a prior art Stirling cycle machine.

Stirling cycle machines, including engines and refrigerators, have a long technological heritage, described in detail in Walker, Stirling Engines, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. Additional background regarding aspects of Stirling cycle machines and improvements thereto is discussed in Hargreaves, The Phillips Stirling Engine (Elsevier, Amsterdam, 1991), which is herein incorporated by reference.

The principle of operation of a Stirling cycle machine is readily described with reference to FIGS. 1A-1E, wherein identical numerals are used to identify the same or similar parts. Many mechanical layouts of Stirling cycle machines are known in the art, and the particular Stirling cycle machine designated generally by numeral 10 is shown merely for illustrative purposes. In FIGS. 1A to 1D, piston 12 and a displacer 14 move in phased reciprocating motion within the cylinders 16 which, in some embodiments of the Stirling cycle machine, may be a single cylinder, but in other embodiments, may include greater than a single cylinder. A working fluid contained within cylinders 16 is constrained by seals from escaping around piston 12 and displacer 14. The working fluid is chosen for its thermodynamic properties, as discussed in the description below, and is typically helium at a pressure of several atmospheres, however, any gas, including any inert gas, may be used, including, but not limited to, hydrogen, argon, neon, nitrogen, air and any mixtures thereof. The position of the displacer 14 governs whether the working fluid is in contact with the hot interface 18 or the cold interface 20, corresponding, respectively, to the interfaces at which heat is supplied to and extracted from the working fluid. The supply and extraction of heat is discussed in further detail below. The volume of working fluid governed by the position of the piston 12 is referred to as the compression space 22.

Figure 1B:
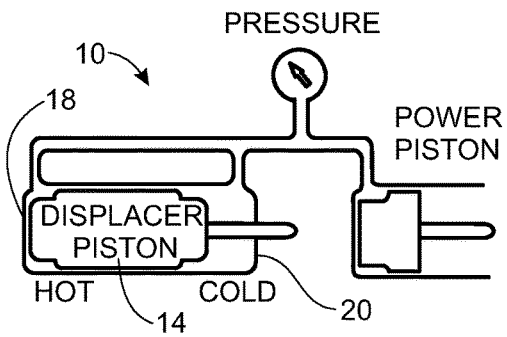
Figure 1C:
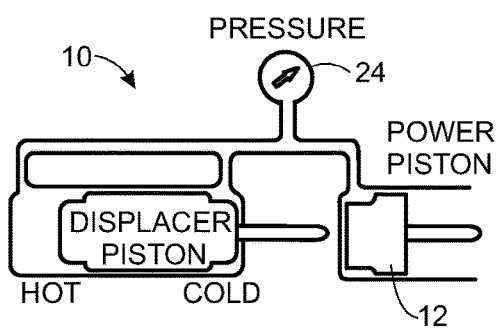

During the first phase of the Stirling cycle, the starting condition of which is depicted in FIG. 1A, the piston 12 compresses the fluid in the compression space 22. The compression occurs at a substantially constant temperature because heat is extracted from the fluid to the ambient environment. The condition of the Stirling cycle machine 10 after compression is depicted in FIG. 1B. During the second phase of the cycle, the displacer 14 moves in the direction of the cold interface 20, with the working fluid displaced from the region of the cold interface 20 to the region of the hot interface 18. This phase may be referred to as the transfer phase. At the end of the transfer phase, the fluid is at a higher pressure since the working fluid has been heated at constant volume. The increased pressure is depicted symbolically in FIG. 1C by the reading of the pressure gauge 24.

Figure 1D:
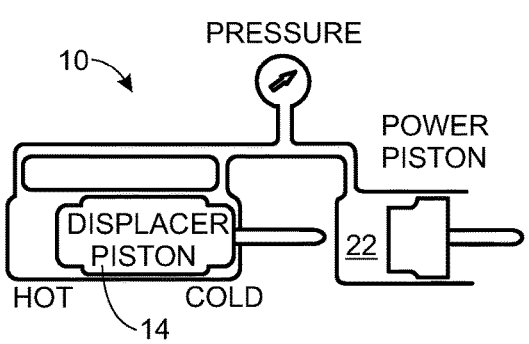
Figure 1E:
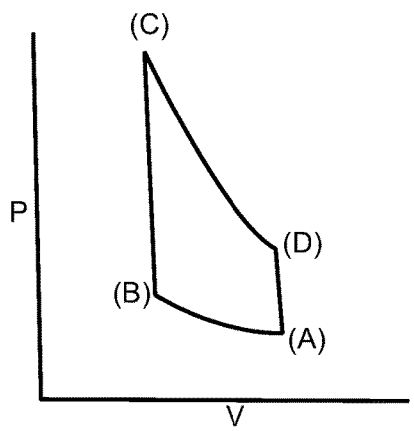

During the third phase (the expansion stroke) of the Stirling cycle machine, the volume of the compression space 22 increases as heat is drawn in from outside the Stirling cycle machine 10, thereby converting heat to work. In practice, heat is provided to the fluid by means of a heater head (not shown) which is discussed in greater detail in the description below. At the end of the expansion phase, the compression space 22 is full of cold fluid, as depicted in FIG. 1D. During the fourth phase of the Stirling cycle machine 10, fluid is transferred from the region of the hot interface 18 to the region of the cold interface 20 by motion of the displacer 14 in the opposing sense. At the end of this second transfer phase, the fluid fills the compression space 22 and cold interface 20, as depicted in FIG. 1A, and is ready for a repetition of the compression phase. The Stirling cycle is depicted in a P-V (pressure-volume) diagram as shown in FIG. 1E.

Additionally, on passing from the region of the hot interface 18 to the region of the cold interface 20. In some embodiments, the fluid may pass through a regenerator (shown as 408 in FIG. 4). A regenerator is a matrix of material having a large ratio of surface area to volume which serves to absorb heat from the fluid when it enters from the region of the hot interface 18 and to heat the fluid when it passes from the region of the cold interface 20.

Stirling cycle machines have not generally been used in practical applications due to several daunting challenges to their development. These involve practical considerations such as efficiency and lifetime. Accordingly, there is a need for more Stirling cycle machines with minimal side loads on pistons, increased efficiency and lifetime.

The principle of operation of a Stirling cycle machine or Stirling engine is further discussed in detail in U.S. Pat. No. 6,381,958, issued May 7, 2002, to Kamen et al., which is herein incorporated by reference in its entirety.

Rocking Beam Drive

Figure 2:
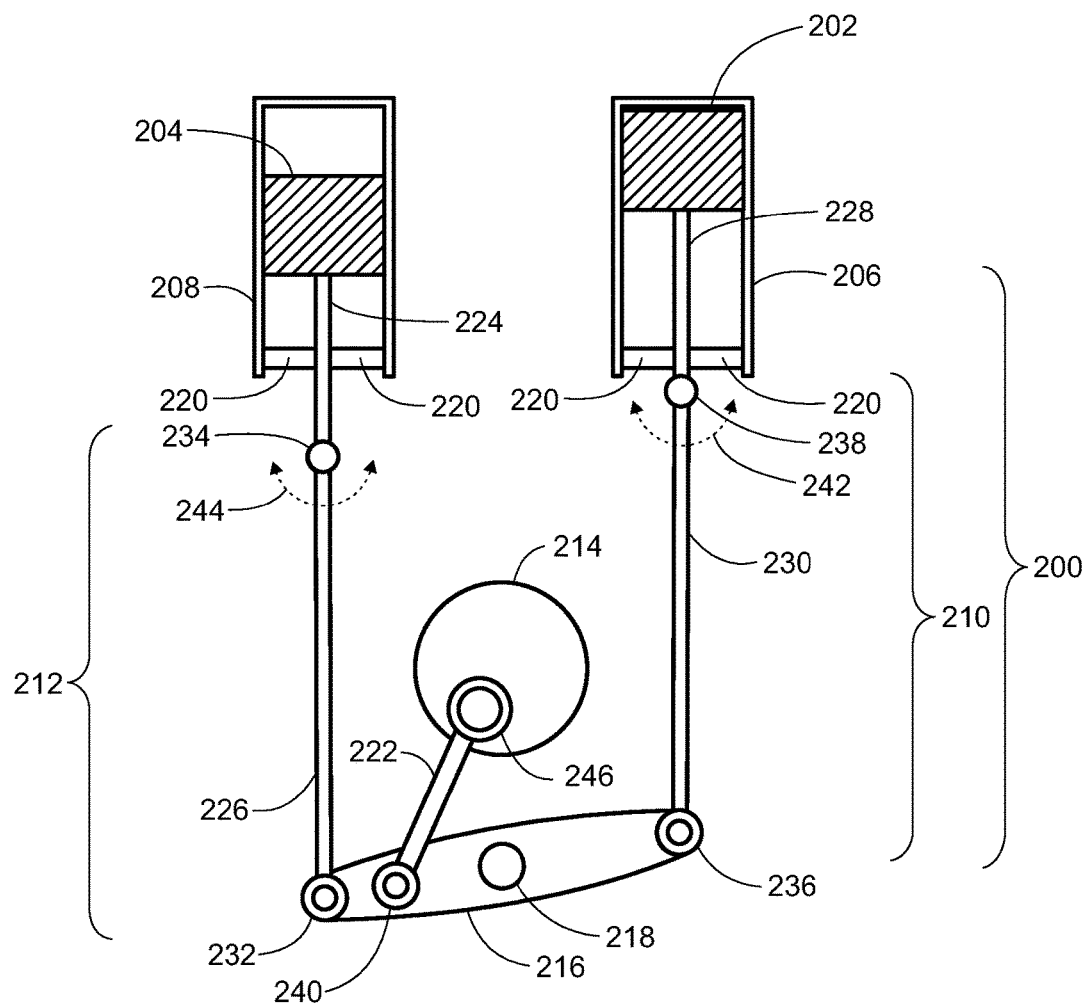
FIG. 2 shows a view of a rocking beam drive in accordance with one embodiment.
Figure 3:
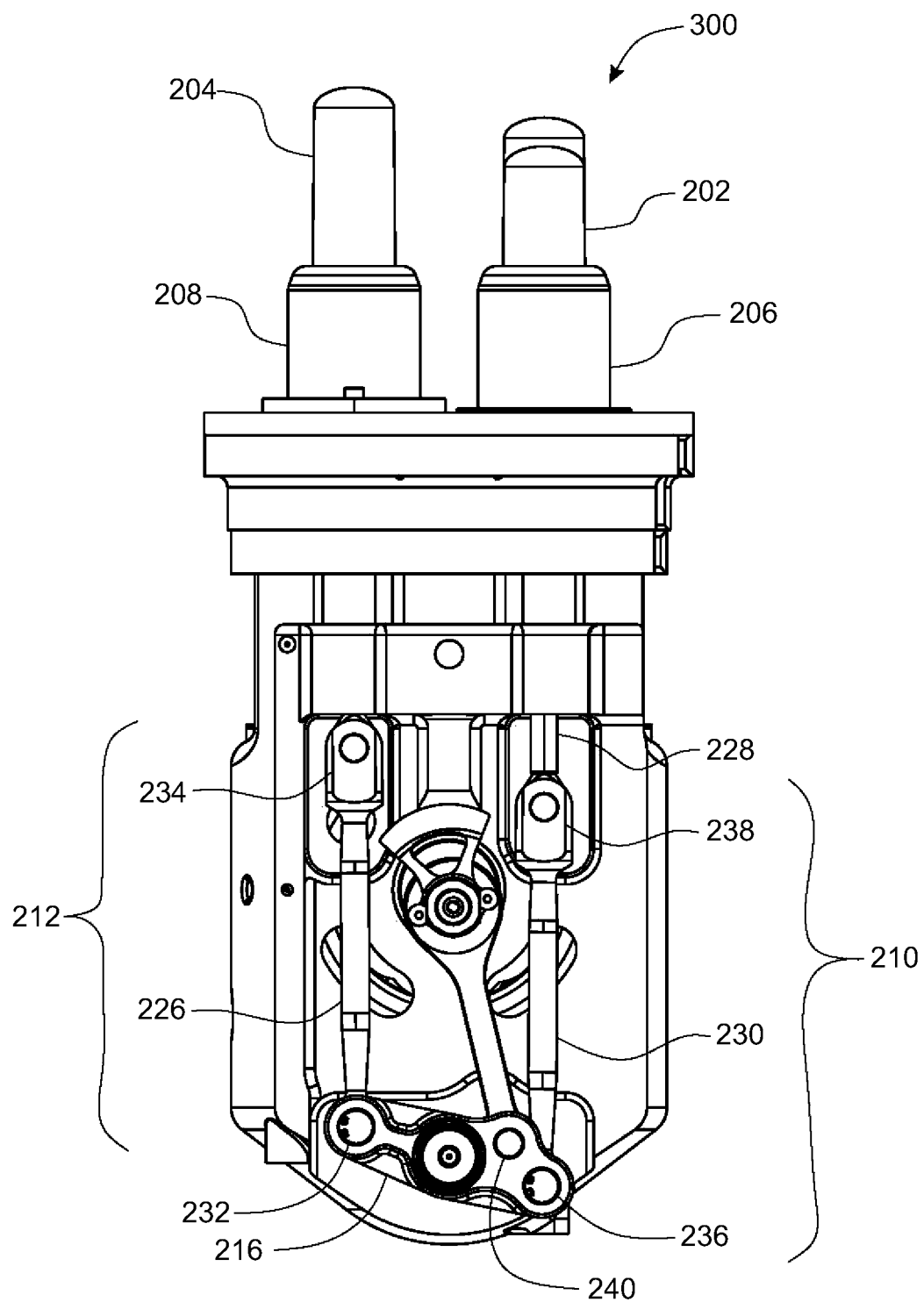
FIG. 3 shows a view of a rocking beam drive in accordance with one embodiment.
Figure 4:
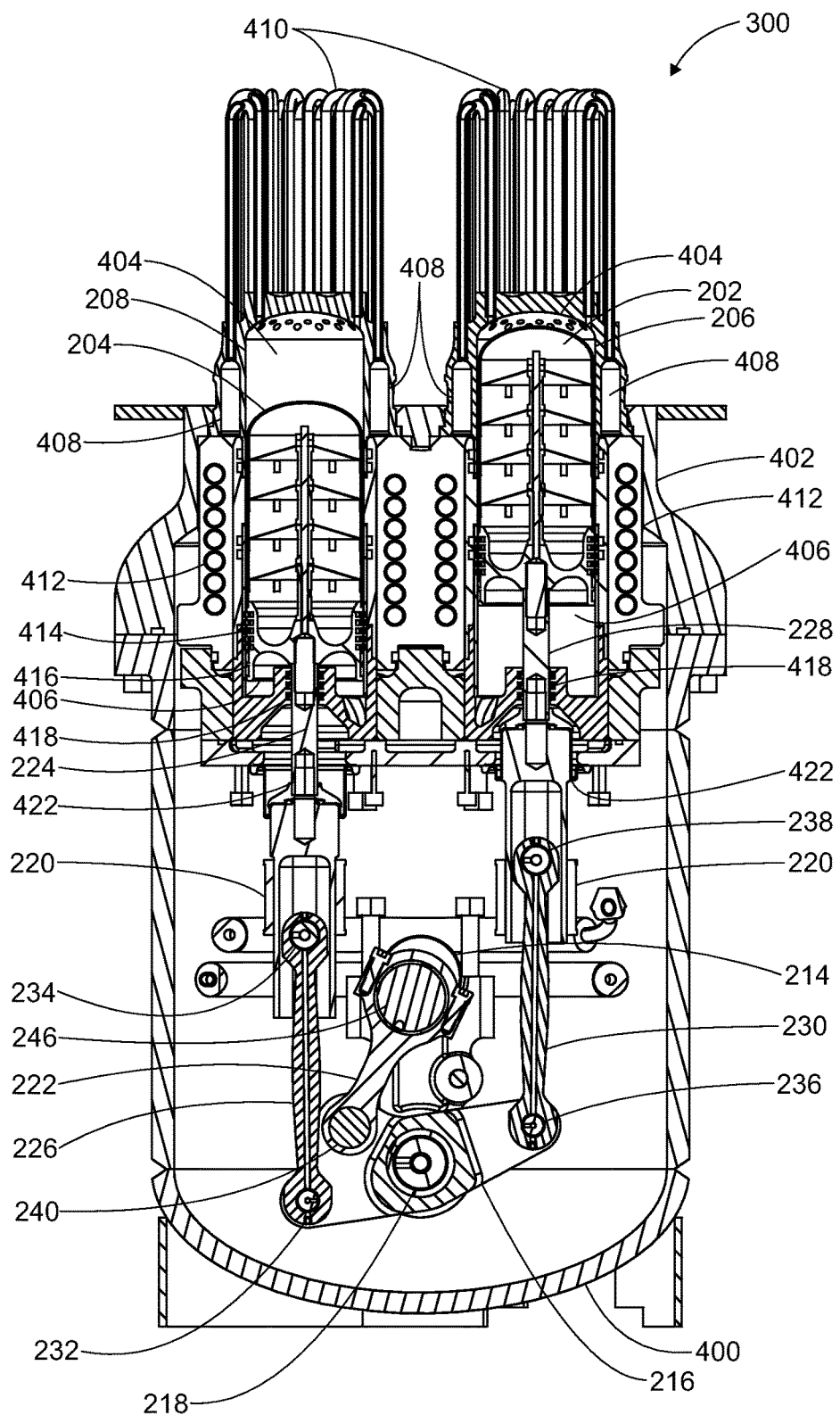
FIG. 4 shows a view of an engine in accordance with one embodiment.

Referring now to FIGS. 2-4, embodiments of a Stirling cycle machine, according to one embodiment, are shown in cross-section. The engine embodiment is designated generally by numeral 300. While the Stirling cycle machine will be described generally with reference to the Stirling engine 300 embodiments shown in FIGS. 2-4, it is to be understood that many types of machines and engines, including but not limited to refrigerators and compressors may similarly benefit from various embodiments and improvements which are described herein, including but not limited to, external combustion engines and internal combustion engines.

FIG. 2 depicts a cross-section of an embodiment of a rocking beam drive mechanism 200 (the term "rocking beam drive" is used synonymously with the term "rocking beam drive mechanism") for an engine, such as a Stirling engine, having linearly reciprocating pistons 202 and 204 housed within cylinders 206 and 208, respectively. The cylinders include linear bearings 220. Rocking beam drive 200 converts linear motions of pistons 202 and 204 into the rotary motion of a crankshaft 214. Rocking beam drive 200 has a rocking beam 216, rocker pivot 218, a first coupling assembly 210, and a second coupling assembly 212. Pistons 202 and 204 are coupled to rocking beam drive 200, respectively, via first coupling assembly 210 and second coupling assembly 212. The rocking beam drive is coupled to crankshaft 214 via a connecting rod 222.

In some embodiments, the rocking beam and a first portion of the coupling assembly may be located in a crankcase, while the cylinders, pistons and a second portion of the coupling assembly is located in a workspace.

In FIG. 4 a crankcase 400 most of the rocking beam drive 200 is positioned below the cylinder housing 402. Crankcase 400 is a space to permit operation of rocking beam drive 200 having a crankshaft 214, rocking beam 216, linear bearings 220, a connecting rod 222, and coupling assemblies 210 and 212. Crankcase 400 intersects cylinders 206 and 208 transverse to the plane of the axes of pistons 202 and 204. Pistons 202 and 204 reciprocate in respective cylinders 206 and 208, as also shown in FIG. 2. Cylinders 206 and 208 extend above crankshaft housing 400. Crankshaft 214 is mounted in crankcase 400 below cylinders 206 and 208.

Figure 6:
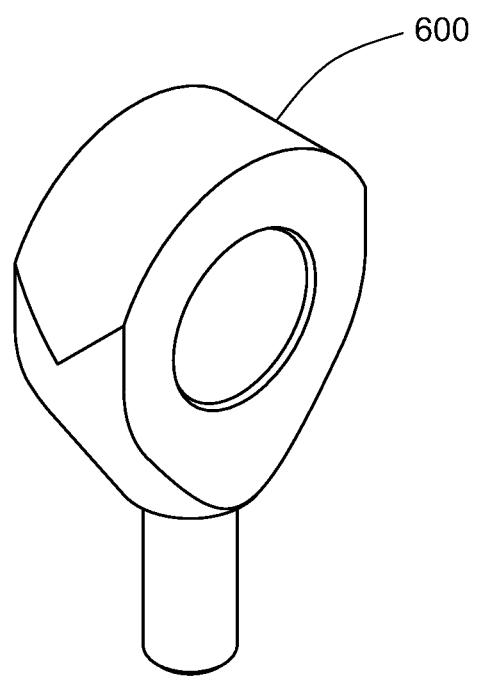
FIG. 6 shows a bearing style rod connector in accordance with one embodiment.
Figure 7A:
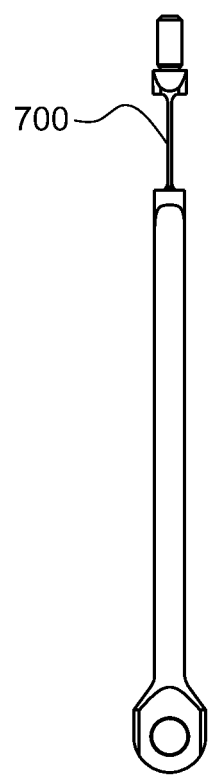
FIGS. 7A-7B show a flexure in accordance with one embodiment.
Figure 7B:
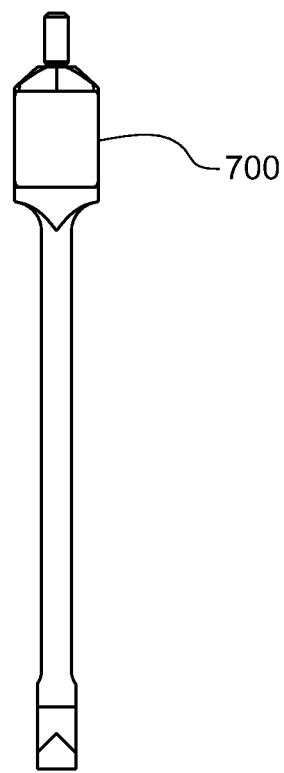

FIG. 2 shows one embodiment of rocking beam drive 200. Coupling assemblies 210 and 212 extend from pistons 202 and 204, respectively, to connect pistons 202 and 204 to rocking beam 216. Coupling assembly 212 for piston 204, in some embodiments, may comprise a piston rod 224 and a link rod 226. Coupling assembly 210 for piston 202, in some embodiments, may comprise a piston rod 228 and a link rod 230. Piston 204 operates in the cylinder 208 vertically and is connected by the coupling assembly 212 to the end pivot 232 of the rocking beam 216. The cylinder 208 provides guidance for the longitudinal motion of piston 204. The piston rod 224 of the coupling assembly 212 attached to the lower portion of piston 204 is driven axially by its link rod 226 in a substantially linear reciprocating path along the axis of the cylinder 208. The distal end of piston rod 224 and the proximate end of link rod 226, in some embodiments, may be jointly hinged via a coupling means 234. The coupling means 234, may be any coupling means known in the art, including but not limited to, a flexible joint, roller bearing element, hinge, journal bearing joint (shown as 600 in FIG. 6), and flexure (shown as 700 in FIGS. 7A and 7B). The distal end of the link rod 226 may be coupled to one end pivot 232 of rocking beam 216, which is positioned vertically and perpendicularly under the proximate end of the link rod 226. A stationary linear bearing 220 may be positioned along coupling assembly 212 to further ensure substantially linear longitudinal motion of the piston rod 224 and thus ensuring substantially linear longitudinal motion of the piston 204. In an exemplary embodiment, link rod 226 does not pass through linear bearing 220. This ensures, among other things, that piston rod 224 retains a substantially linear and longitudinal motion.

In the exemplary embodiment, the link rods may be made from aluminum, and the piston rods and connecting rod are made from D2 Tool Steel. Alternatively, the link rods, piston rods, connecting rods, and rocking beam may be made from 4340 steel. Other materials may be used for the components of the rocking beam drive, including, but not limited to, titanium, aluminum, steel or cast iron. In some embodiments, the fatigue strength of the material being used is above the actual load experienced by the components during operation.

Still referring to FIGS. 2-4, piston 202 operates vertically in the cylinder 206 and is connected by the coupling assembly 210 to the end pivot 236 of the rocking beam 216. The cylinder 206 serves, amongst other functions, to provide guidance for longitudinal motion of piston 202. The piston rod 228 of the coupling assembly 210 is attached to the lower portion of piston 202 and is driven axially by its link rod 230 in a substantially linear reciprocating path along the axis of the cylinder 206. The distal end of the piston rod 228 and the proximate end of the link rod 230, in some embodiments, is jointly hinged via a coupling means 238. The coupling means 238, in various embodiments may include, but are not limited to, a flexure (shown as 700 in FIGS. 7A and 7B, roller bearing element, hinge, journal bearing (shown as 600 in FIG. 6), or coupling means as known in the art. The distal end of the link rod 230, in some embodiments, may be coupled to one end pivot 236 of rocking beam 216, which is positioned vertically and perpendicularly under the proximate end of link rod 230. A stationary linear bearing 220 may be positioned along coupling assembly 210 to further ensure linear longitudinal motion of the piston rod 228 and thus ensuring linear longitudinal motion of the piston 202. In an exemplary embodiment, link rod 230 does not pass through linear bearing 220 to ensure that piston rod 228 retains a substantially linear and longitudinal motion.

Figure 5A:
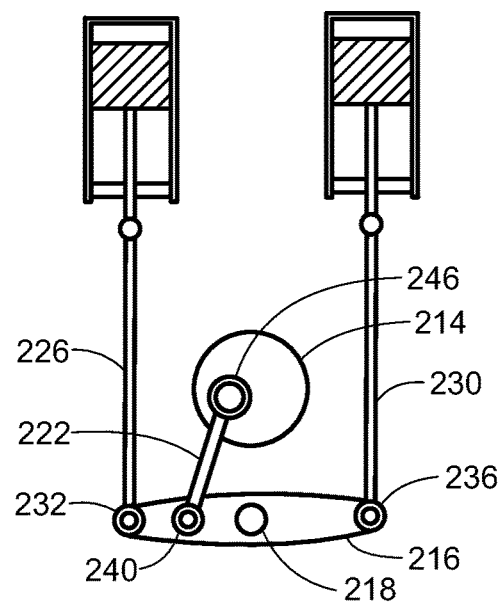
FIGS. 5A-5D depicts various views of a rocking beam drive in accordance with one embodiment.
Figure 5B:
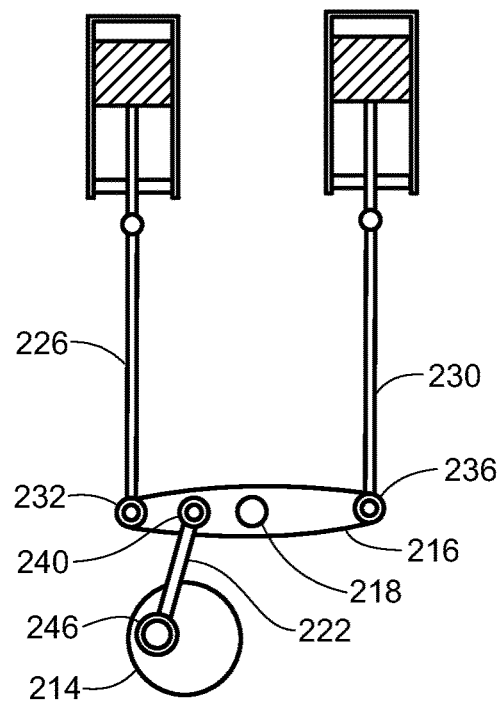

The coupling assemblies 210 and 212 change the alternating longitudinal motion of respective pistons 202 and 204 to oscillatory motion of the rocking beam 216. The delivered oscillatory motion is changed to the rotational motion of the crankshaft 214 by the connecting rod 222, wherein one end of the connecting rod 222 is rotatably coupled to a connecting pivot 240 positioned between an end pivot 232 and a rocker pivot 218 in the rocking beam 216, and another end of the connecting rod 222 is rotatably coupled to crankpin 246. The rocker pivot 218 may be positioned substantially at the midpoint between the end pivots 232 and 236 and oscillatory support the rocking beam 216 as a fulcrum, thus guiding the respective piston rods 224 and 228 to make sufficient linear motion. In the exemplary embodiment, the crankshaft 214 is located above the rocking beam 216, but in other embodiments, the crankshaft 214 may be positioned below the rocking beam 216 (as shown in FIGS. 5B and 5D) or in some embodiments, the crankshaft 214 is positioned to the side of the rocking beam 216, such that it still has a parallel axis to the rocking beam 216.

Still referring to FIGS. 2-4, the rocking beam oscillates about the rocker pivot 218, the end pivots 232 and 236 follow an arc path. Since the distal ends of the link rods 226 and 230 are connected to the rocking beam 216 at pivots 232 and 236, the distal ends of the link rods 226 and 230 also follow this arc path, resulting in an angular deviation 242 and 244 from the longitudinal axis of motion of their respective pistons 202 and 204. The coupling means 234 and 238 are configured such that any angular deviation 244 and 242 from the link rods 226 and 230 experienced by the piston rods 224 and 228 is minimized. Essentially, the angular deviation 244 and 242 is absorbed by the coupling means 234 and 238 so that the piston rods 224 and 228 maintain substantially linear longitudinal motion to reduce side loads on the pistons 204 and 202. A stationary linear bearing 220 may also be placed inside the cylinder 208 or 206, or along coupling assemblies 212 or 210, to further absorb any angular deviation 244 or 242 thus keeping the piston push rod 224 or 228 and the piston 204 or 202 in linear motion along the longitudinal axis of the piston 204 or 202.

Therefore, in view of reciprocating motion of pistons 202 and 204, it is necessary to keep the motion of pistons 202 and 204 as close to linear as possible because the deviation 242 and 244 from longitudinal axis of reciprocating motion of pistons 202 and 204 causes noise, reduction of efficiency, increase of friction to the wall of cylinder, increase of side-load, and low durability of the parts. The alignment of the cylinders 206 and 208 and the arrangement of crankshaft 214, piston rods 224 and 228, link rods 226 and 230, and connecting rod 222, hence, may influence on, amongst other things, the efficiency and/or the volume of the device. For the purpose of increasing the linearity of the piston motion as mentioned, the pistons (shown as 202 and 204 in FIGS. 2-4) are preferably as close to the side of the respective cylinders 206 and 208 as possible.

In another embodiment reducing angular deviation of link rods, link rods 226 and 230 substantially linearly reciprocate along longitudinal axis of motion of respective pistons 204 and 202 to decrease the angular deviation and thus to decrease the side load applied to each piston 204 and 202. The angular deviation defines the deviation of the link rod 226 or 230 from the longitudinal axis of the piston 204 or 202. Numerals 244 and 242 designate the angular deviation of the link rods 226 and 230, as shown in FIG. 2. Therefore, the position of coupling assembly 212 influences the angular displacement of the link rod 226, based on the length of the distance between the end pivot 232 and the rocker pivot 218 of the rocking beam 216. Thus, the position of the coupling assemblies may be such that the angular displacement of the link rod 226 is reduced. For the link rod 230, the length of the coupling assembly 210 also may be determined and placed to reduce the angular displacement of the link rod 230, based on the length of the distance between the end pivot 236 and the rocker pivot 218 of the rocking beam 216. Therefore, the length of the link rods 226 and 230, the length of coupling assemblies 212 and 210, and the length of the rocking beam 216 are significant parameters that greatly influence and/or determine the angular deviation of the link rods 226 and 230 as shown in FIG. 2.

The exemplary embodiment has a straight rocking beam 216 having the end points 232 and 236, the rocker pivot 218, and the connecting pivot 240 along the same axis. However, in other embodiments, the rocking beam 216 may be bent, such that pistons may be placed at angles to each other, as shown in FIGS. 5C and 5D.

Referring now to FIGS. 2-4 and FIGS. 7A-7B, in some embodiments of the coupling assembly, the coupling assemblies 212 and 210, may include a flexible link rod that is axially stiff but flexible in the rocking beam 216 plane of motion between link rods 226 and 230, and pistons 204 and 202, respectively. In this embodiment, at least one portion, the flexure (shown as 700 in FIGS. 7A and 7B), of link rods 226 and 230 is elastic. The flexure 700 acts as a coupling means between the piston rod and the link rod. The flexure 700 may absorb the crank-induced side loads of the pistons more effectively, thus allowing its respective piston to maintain linear longitudinal movement inside the piston's cylinder. This flexure 700 allows small rotations in the plane of the rocking beam 216 between the link rods 226 and 230 and pistons 204 or 202, respectively. Although depicted in this embodiment as flat, which increases the elasticity of the link rods 226 and 230, the flexure 700, in some embodiments, is not flat. The flexure 700 also may be constructed near to the lower portion of the pistons or near to the distal end of the link rods 226 and 230. The flexure 700, in one embodiment, may be made of #D2 Tool Steel Hardened to 58-62 RC. In some embodiments, there may be more than one flexure (not shown) on the link rod 226 or 230 to increase the elasticity of the link rods.

Figure 5C:
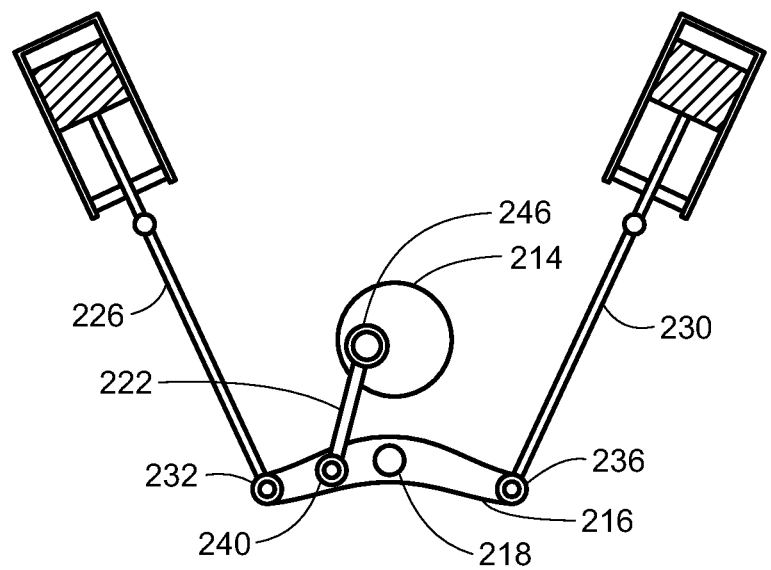
Figure 5D:
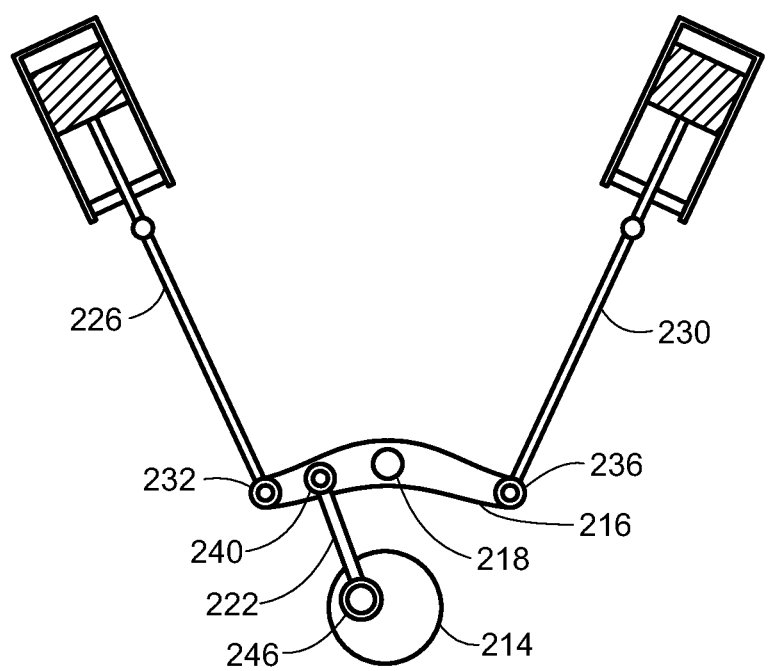

In alternate embodiment, the axes of the pistons in each cylinder housing may extend in different directions, as depicted in FIGS. 5C and 5D. In the exemplary embodiment, the axes of the pistons in each cylinder housing are substantially parallel and preferably substantially vertical, as depicted in FIGS. 2-4, and FIGS. 5A and 5B. FIGS. 5A-5D include various embodiments of the rocking beam drive mechanism including like numbers as those shown and described with respect to FIGS. 2-4. It will be understood by those skilled in that art that changing the relative position of the connecting pivot 240 along the rocking beam 216 will change the stroke of the pistons.

Accordingly, a change in the parameters of the relative position of the connecting pivot 240 in the rocking beam 216 and the length of the piston rods 224 and 228, link rods 230 and 226, rocking beam 216, and the position of rocker pivot 218 will change the angular deviation of the link rods 226 and 230, the phasing of the pistons 204 and 202, and the size of the device 300 in a variety of manner. Therefore, in various embodiments, a wide range of piston phase angles and variable sizes of the engine may be chosen based on the modification of one or more of these parameters. In practice, the link rods 224 and 228 of the exemplary embodiment have substantially lateral movement within from −0.5 degree to +0.5 degree from the longitudinal axis of the pistons 204 and 202. In various other embodiments, depending on the length of the link rod, the angle may vary anywhere from approaching 0 degrees to 0.75 degrees. However, in other embodiments, the angle may be higher including anywhere from approaching 0 to the approximately 20 degrees. As the link rod length increases, however, the crankcase/overall engine height increases as well as the weight of the engine.

One feature of the exemplary embodiment is that each piston has its link rod extending substantially to the attached piston rod so that it is formed as a coupling assembly. In one embodiment, the coupling assembly 212 for the piston 204 includes a piston rod 224, a link rod 226, and a coupling means 234 as shown in FIG. 2. More specifically, one proximal end of piston rod 224 is attached to the lower portion of piston 204 and the distal end piston rod 224 is connected to the proximate end of the link rod 226 by the coupling means 234. The distal end of the link rod 226 extends vertically to the end pivot 232 of the rocking beam 216. As described above, the coupling means 234 may be, but is not limited to, a joint, hinge, coupling, or flexure or other means known in the art. In this embodiment, the ratio of the piston rod 224 and the link rod 226 may determine the angular deviation of the link rod 226 as mentioned above.

Referring now to FIG. 4, one embodiment of the engine is shown. Here the pistons 202 and 204 of engine 300 operate between a hot chamber 404 and a cold chamber 406 of cylinders 206 and 208 respectively. Between the two chambers there may be a regenerator 408. The regenerator 408 may have variable density, variable area, and, in some embodiments, is made of wire. The varying density and area of the regenerator may be adjusted such that the working gas has substantially uniform flow across the regenerator 408. Various embodiments of the regenerator 408 are discussed in detail below, and in U.S. Pat. No. 6,591,609, issued Jul. 17, 2003, to Kamen et al., and U.S. Pat. No. 6,862,883, issued Mar. 8, 2005, to Kamen et al., which are herein incorporated by reference in their entireties. When the working gas passes through the hot chamber 404, a heater head 410 may heat the gas causing the gas to expand and push pistons 202 and 204 towards the cold chamber 406, where the gas compresses. As the gas compresses in the cold chamber 406, pistons 202 and 204 may be guided back to the hot chamber to undergo the Stirling cycle again. The heater head 410 may have one of several forms including a pin head, a fin head, a folded fin head, or heater tubes as shown in FIG. 4 or any other heater head embodiment known, including, but not limited to, those described below. Various embodiments of heater head 410 are discussed in detail below, and in U.S. Pat. No. 6,381,958, issued May 7, 2002, to Kamen et al., U.S. Pat. No. 6,543,215, issued Apr. 8, 2003, to Langenfeld et al., U.S. Pat. No. 6,966,182, issued Nov. 22, 2005, to Kamen et al, and U.S. Pat. No. 7,308,787, issued Dec. 18, 2007, to LaRocque et al., and in U.S. patent application Ser. No. 13/447,990, filed Apr. 16, 2012 and entitled Stirling Cycle Machine, all of which are hereby incorporated herein by reference in their entireties.

In some embodiments, a cooler 412 may be positioned alongside cylinders 206 and 208 to further cool the gas passing through to the cold chamber 406. Various embodiments of cooler 412 are discussed in detail in the proceeding sections, and in U.S. Pat. No. 7,325,399, issued Feb. 5, 2008, to Strimling et al, which is herein incorporated by reference in its entirety.

In some embodiments, at least one piston seal 414 may be positioned on pistons 202 and 204 to seal the hot section 404 off from the cold section 406. Additionally, at least one piston guide ring 416 may be positioned on pistons 202 and 204 to help guide the pistons' motion in their respective cylinders. Various embodiments of piston seal 414 and guide ring 416 are described in detail below, and in U.S. patent application Ser. No. 10/175,502, filed Jun. 19, 2002, published Feb. 6, 2003 (now abandoned), which is herein incorporated by reference in its entirety.

In some embodiments, at least one piston rod seal 418 may be placed against piston rods 224 and 228 to prevent working gas from escaping into the crankcase 400, or alternatively into airlock space 420. The piston rod seal 418 may be an elastomer seal, or a spring-loaded seal. Various embodiments of the piston rod seal 418 are discussed in detail below.

In some embodiments, the airlock space may be eliminated, for example, in the rolling diaphragm and/or bellows embodiments described in more detail below. In those cases, the piston rod seals 224 and 228 seal the working space from the crankcase.

In some embodiments, at least one rolling diaphragm/bellows 422 may be located along piston rods 224 and 228 to prevent airlock gas from escaping into the crankcase 400. Various embodiments of rolling diaphragm 422 are discussed in more detail below.

Figure 10A:
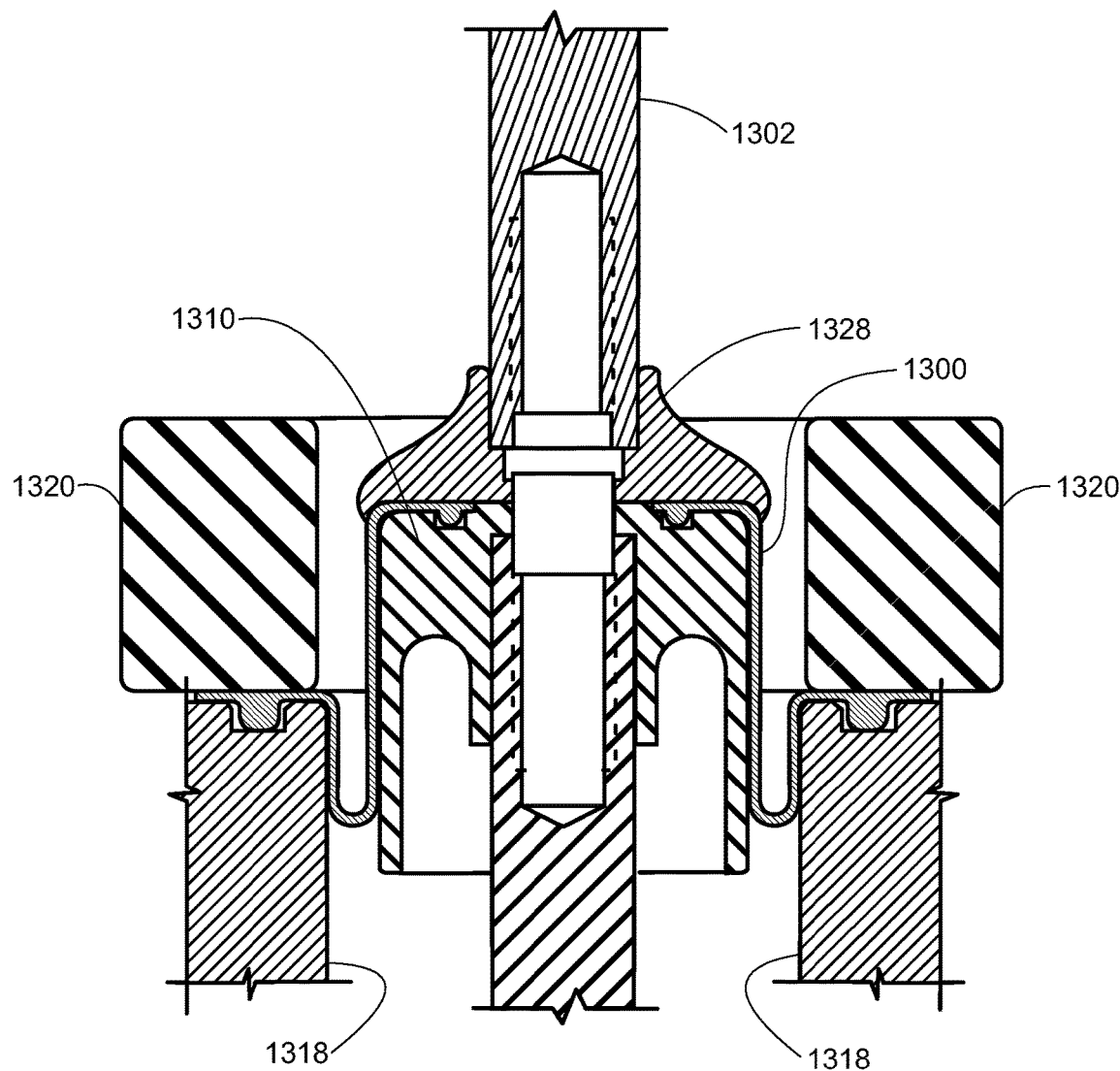
FIG. 10A shows a view of a rolling diaphragm, along with supporting top seal piston and bottom seal piston, in accordance with one embodiment.
Figure 10B:
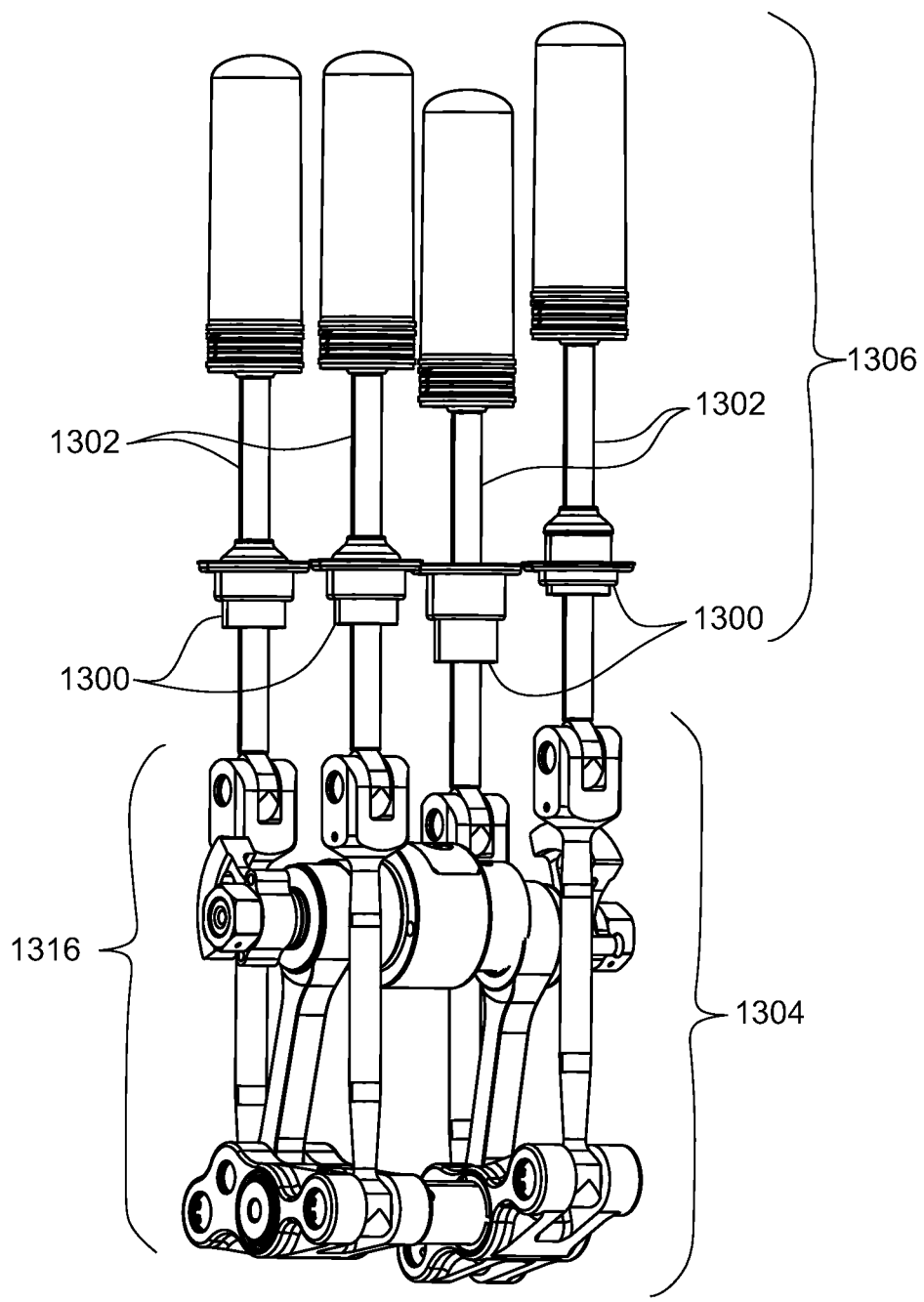
FIG. 10B shows an exploded view of a rocking beam driven engine in accordance with one embodiment.

Although FIG. 4 shows a cross section of engine 300 depicting only two pistons and one rocking beam drive, it is to be understood that the principles of operation described herein may apply to a four cylinder, double rocking beam drive engine, as designated generally by numeral 800 in FIG. 10B.

Piston Operation

Figure 8:
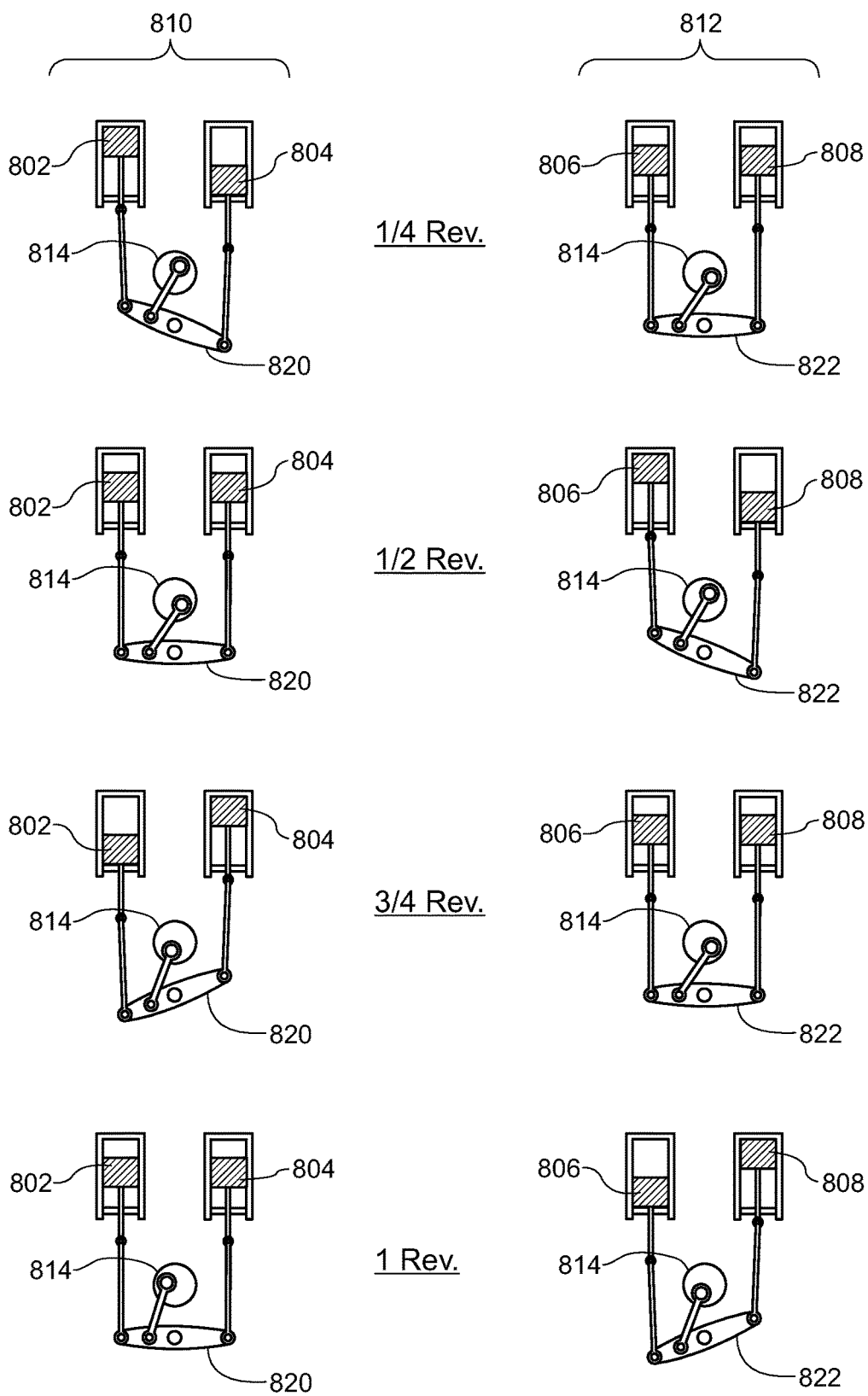
FIG. 8 shows the operation of pistons of an engine in accordance with one embodiment.
Figure 9A:
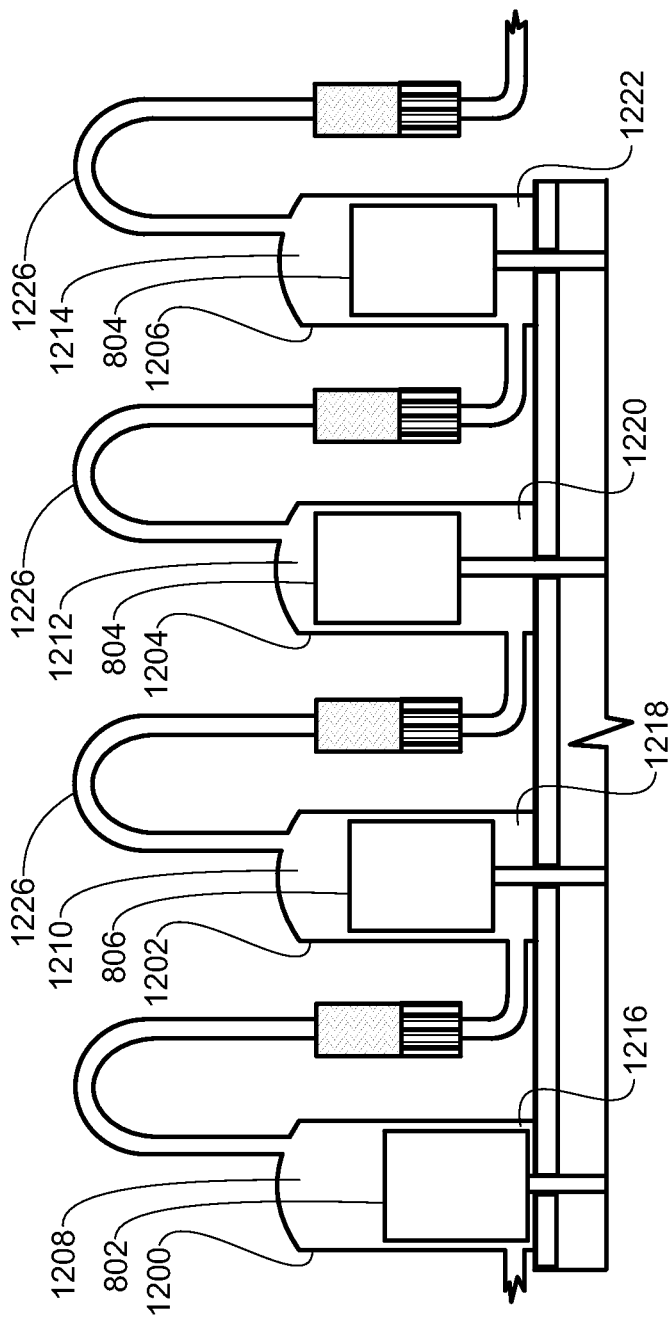
FIG. 9A shows an unwrapped schematic view of a working space and cylinders in accordance with one embodiment.

Referring now to FIG. 8 that shows the operation of pistons 802, 804, 806, and 808 during one revolution of crankshaft 814. With a ¼ revolution of crankshaft 814, piston 802 is at the top of its cylinder, otherwise known as top dead center, piston 806 is in upward midstroke, piston 804 is at the bottom of its cylinder, otherwise known as bottom dead center, and piston 808 is in downward midstroke. With a ½ revolution of crankshaft 814, piston 802 is in downward midstroke, piston 806 is at top dead center, piston 804 is in upward midstroke, and piston 808 is at bottom dead center. With ¾ revolution of crankshaft 814, piston 802 is at bottom dead center, piston 806 is in downward midstroke, piston 804 is at top dead center, and piston 808 is in upward midstroke. Finally, with a full revolution of crankshaft 814, piston 802 is in upward midstroke, piston 806 is at bottom dead center, piston 804 is in downward midstroke, and piston 808 is at top dead center. During each ¼ revolution, there is a 90 degree phase difference between pistons 802 and 806, a 180 degree phase difference between pistons 802 and 804, and a 270 degree phase difference between pistons 802 and 808. FIG. 9A illustrates the relationship of the pistons being approximately 90 degrees out of phase with the preceding and succeeding piston. Additionally, FIG. 8 shows the exemplary embodiment machine means of transferring work. Thus, work is transferred from piston 802 to piston 806 to piston 804 to piston 808 so that with a full revolution of crankshaft 814, all pistons have exerted work by moving from the top to the bottom of their respective cylinders.

Figure 9B:
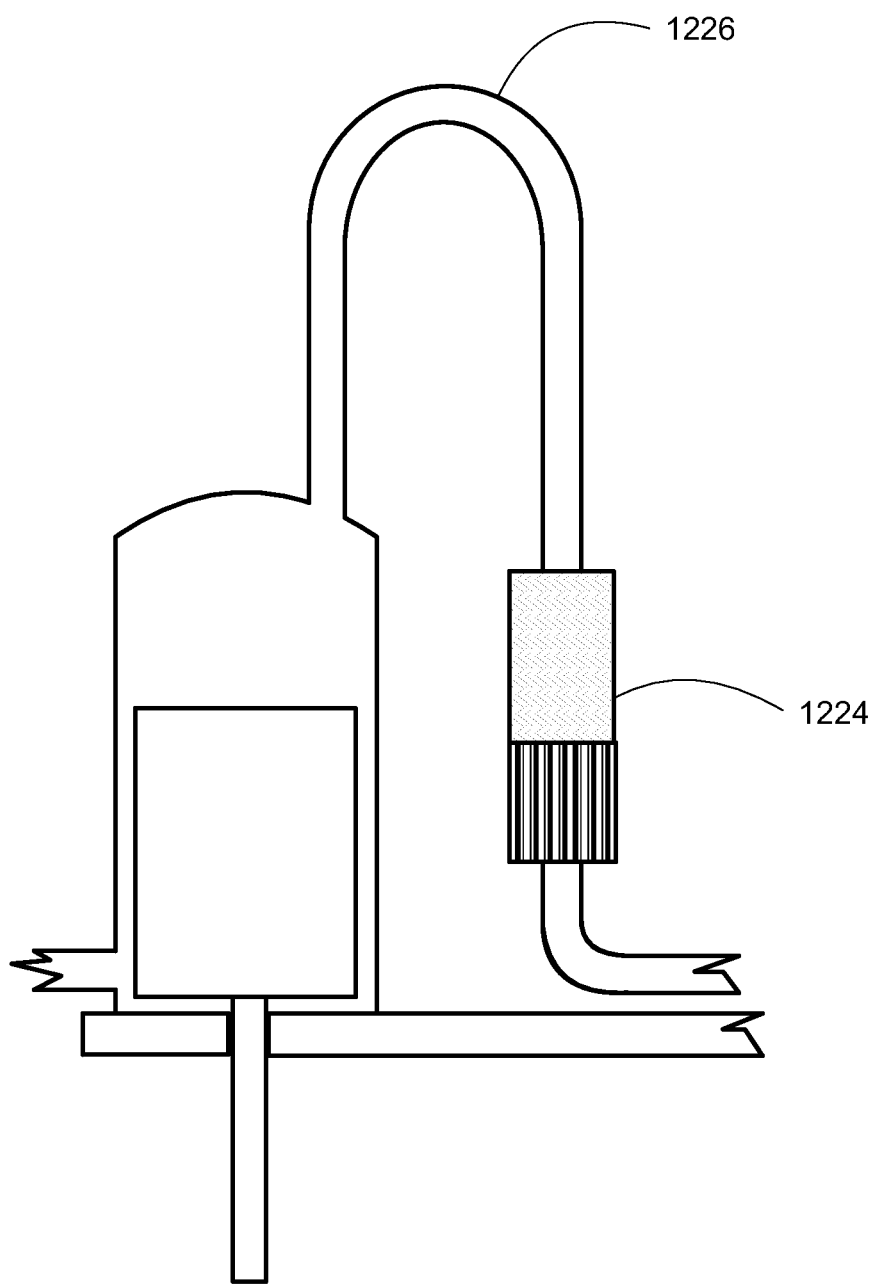
FIG. 9B shows a schematic view of a cylinder, heater head, and regenerator in accordance with one embodiment.
Figure 9C:
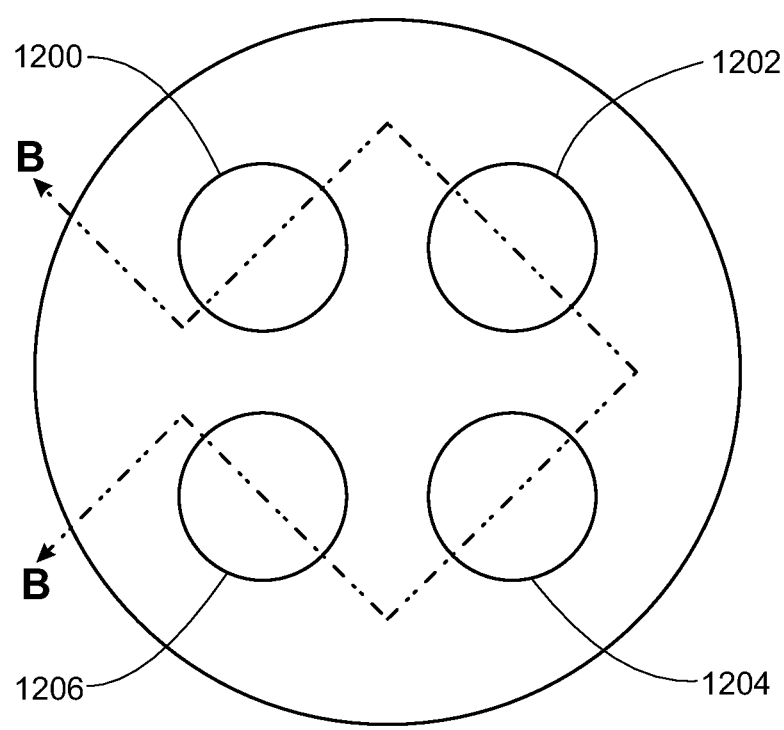
FIG. 9C shows a view of a cylinder head in accordance with one embodiment.

Referring now to FIG. 8, together with FIGS. 9A-9C, illustrate the 90 degree phase difference between the pistons in the exemplary embodiment. Referring now to FIG. 9A, although the cylinders are shown in a linear path, this is for illustration purposes only. In the exemplary embodiment of a four cylinder Stirling cycle machine, the flow path of the working gas contained within the cylinder working space follows a figure eight pattern. Thus, the working spaces of cylinders 1200, 1202, 1204, and 1206 are connected in a figure eight pattern, for example, from cylinder 1200 to cylinder 1202 to cylinder 1204 to cylinder 1208, the fluid flow pattern follows a figure eight. Still referring to FIG. 9A, an unwrapped view of cylinders 1200, 1202, 1204, and 1206, taken along the line B-B (shown in FIG. 9C) is illustrated. The 90 degree phase difference between pistons as described above allows for the working gas in the warm section 1212 of cylinder 1204 to be delivered to the cold section 1222 of cylinder 1206. As piston 802 and 808 are 90 degrees out of phase, the working gas in the warm section 1214 of cylinder 1206 is delivered to the cold section 1216 of cylinder 1200. As piston 802 and piston 806 are also 90 degrees out of phase, the working gas in the warm section 1208 of cylinder 1200 is delivered to the cold section 1218 of cylinder 1202. And as piston 804 and piston 806 are also 90 degrees out of phase, so the working gas in the warm section 1210 of cylinder 1202 is delivered to the cold section 1220 of cylinder 1204. Once the working gas of a warm section of a first cylinder enters the cold section of a second cylinder, the working gas begins to compress, and the piston within the second cylinder, in its down stroke, thereafter forces the compressed working gas back through a regenerator 1224 and heater head 1226 (shown in FIG. 9B), and back into the warm section of the first cylinder. Once inside the warm section of the first cylinder, the gas expands and drives the piston within that cylinder downward, thus causing the working gas within the cold section of that first cylinder to be driven through the preceding regenerator and heater head, and into the cylinder. This cyclic transmigration characteristic of working gas between cylinders 1200, 1202, 1204, and 1206 is possible because pistons 802, 804, 806, and 808 are connected, via drives 810 and 812, to a common crankshaft 814 (shown in FIG. 8), in such a way that the cyclical movement of each piston is approximately 90 degrees in advance of the movement of the proceeding piston, as depicted in FIG. 9A.

Rolling Diaphragm, Metal Bellows, Airlock, and Pressure Regulator

In some embodiments of the Stirling cycle machine, lubricating fluid is used. To prevent the lubricating fluid from escaping the crankcase, a seal is used.

Referring now to FIGS. 10A-13B, some embodiments of the Stirling cycle machine include a fluid lubricated rocking beam drive that utilizes a rolling diaphragm 1300 positioned along the piston rod 1302 to prevent lubricating fluid from escaping the crankcase, not shown, but the components that are housed in the crankcase are represented as 1304, and entering areas of the engine that may be damaged by the lubricating fluid. It is beneficial to contain the lubricating fluid for if lubricating fluid enters the working space, not shown, but the components that are housed in the working space are represented as 1306, it would contaminate the working fluid, come into contact with the regenerator 1308, and may clog the regenerator 1308. The rolling diaphragm 1300 may be made of an elastomer material, such as rubber or rubber reinforced with woven fabric or non-woven fabric to provide rigidity. The rolling diaphragm 1300 may alternatively be made of other materials, such as fluorosilicone or nitrile with woven fabric or non-woven fabric. The rolling diaphragm 1300 may also be made of carbon nanotubes or chopped fabric, which is non-woven fabric with fibers of polyester or KEVLAR®, for example, dispersed in an elastomer. In the some embodiments, the rolling diaphragm 1300 is supported by the top seal piston 1328 and the bottom seal piston 1310. In other embodiments, the rolling diaphragm 1300 as shown in FIG. 10A is supported via notches in the top seal piston 1328.

Figure 10C:
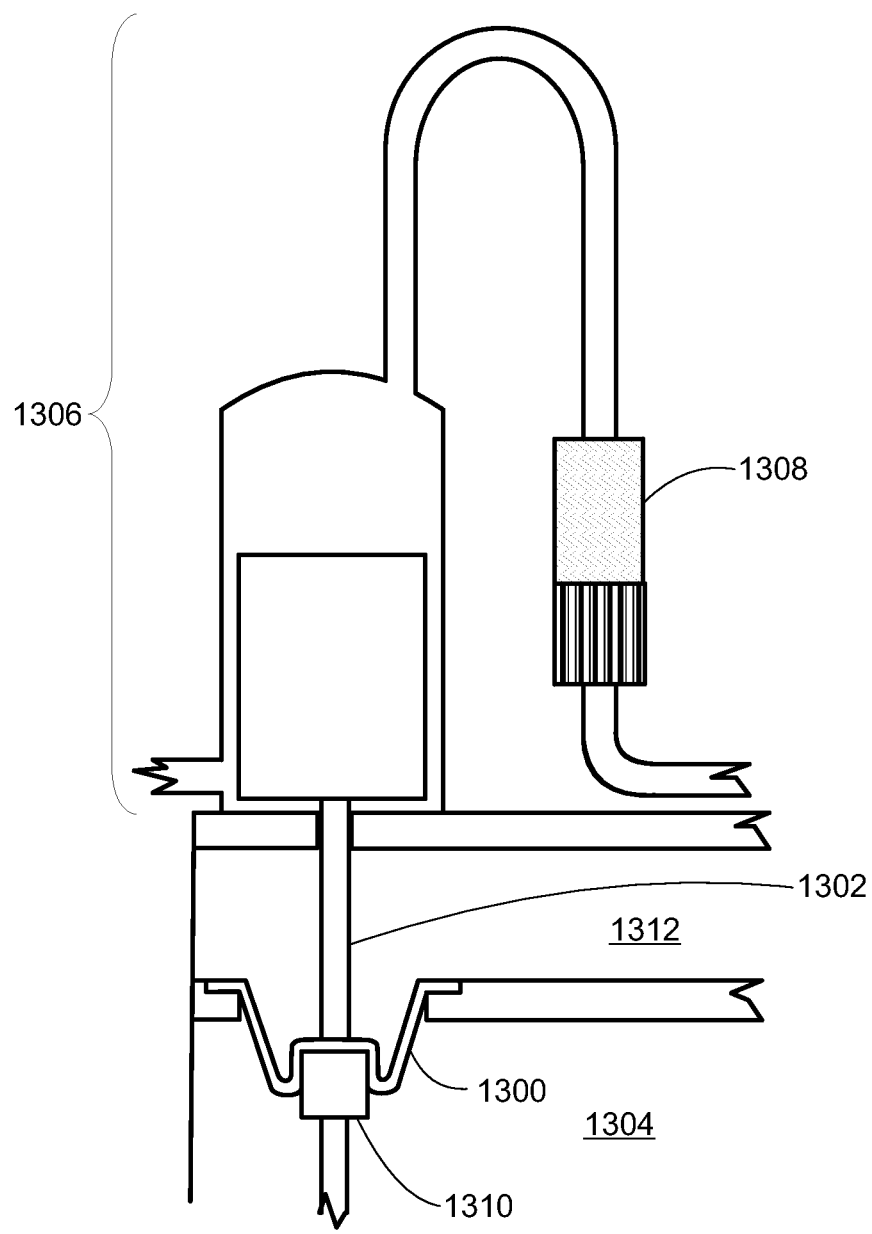
FIG. 10C shows a view of a cylinder, heater head, regenerator, and rolling diaphragm, in accordance with one embodiment.
Figure 10D:
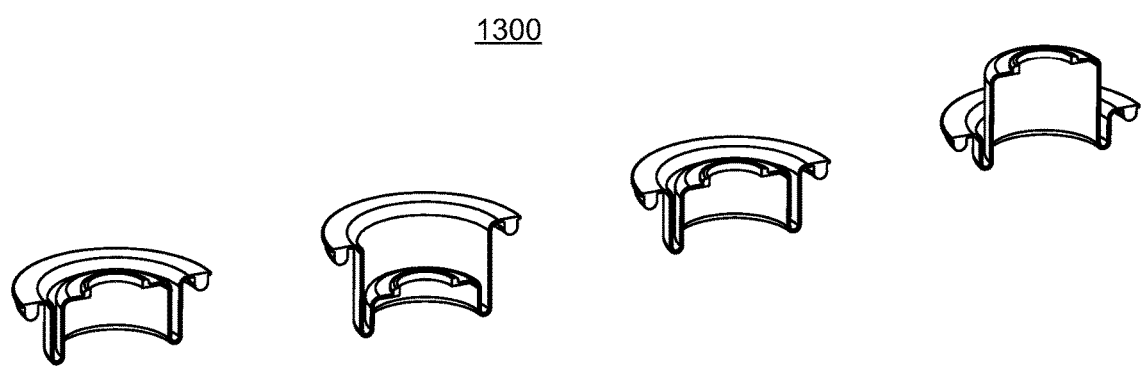
FIG. 10D shows various views of a rolling diaphragm during operation, in accordance with one embodiment.

In some embodiments, a pressure differential is placed across the rolling diaphragm 1300 such that the pressure above the seal 1300 is different from the pressure in the crankcase 1304. This pressure differential inflates seal 1300 and allows seal 1300 to act as a dynamic seal as the pressure differential ensures that rolling diaphragm maintains its form throughout operation. FIGS. 10A, and FIGS. 10C-10D illustrate how the pressure differential effects the rolling diaphragm. The pressure differential causes the rolling diaphragm 1300 to conform to the shape of the bottom seal piston 1310 as it moves with the piston rod 1302, and prevents separation of the seal 1300 from a surface of the piston 1310 during operation. Such separation may cause seal failure. The pressure differential causes the rolling diaphragm 1300 to maintain constant contact with the bottom seal piston 1310 as it moves with the piston rod 1302. This occurs because one side of the seal 1300 will always have pressure exerted on it thereby inflating the seal 1300 to conform to the surface of the bottom seal piston 1310. In some embodiments, the top seal piston 1328 'rolls over' the corners of the rolling diaphragm 1300 that are in contact with the bottom seal piston 1310, so as to further maintain the seal 1300 in contact with the bottom seal piston 1310. In the exemplary embodiment, the pressure differential is in the range of 10 to 15 PSI. The smaller pressure in the pressure differential is preferably in crankcase 1304, so that the rolling diaphragm 1300 may be inflated into the crankcase 1304. However, in other embodiments, the pressure differential may have a greater or smaller range of value.

The pressure differential may be created by various methods including, but not limited to, the use of the following: a pressurized lubrication system, a pneumatic pump, sensors, an electric pump, by oscillating the rocking beam to create a pressure rise in the crankcase 1304, by creating an electrostatic charge on the rolling diaphragm 1300, or other similar methods. In some embodiments, the pressure differential is created by pressurizing the crankcase 1304 to a pressure that is below the mean pressure of the working space 1306. In some embodiments the crankcase 1304 is pressurized to a pressure in the range of 10 to 15 PSI below the mean pressure of the working space 1306, however, in various other embodiments, the pressure differential may be smaller or greater. Further detail regarding the rolling diaphragm is included below.

Figure 11:
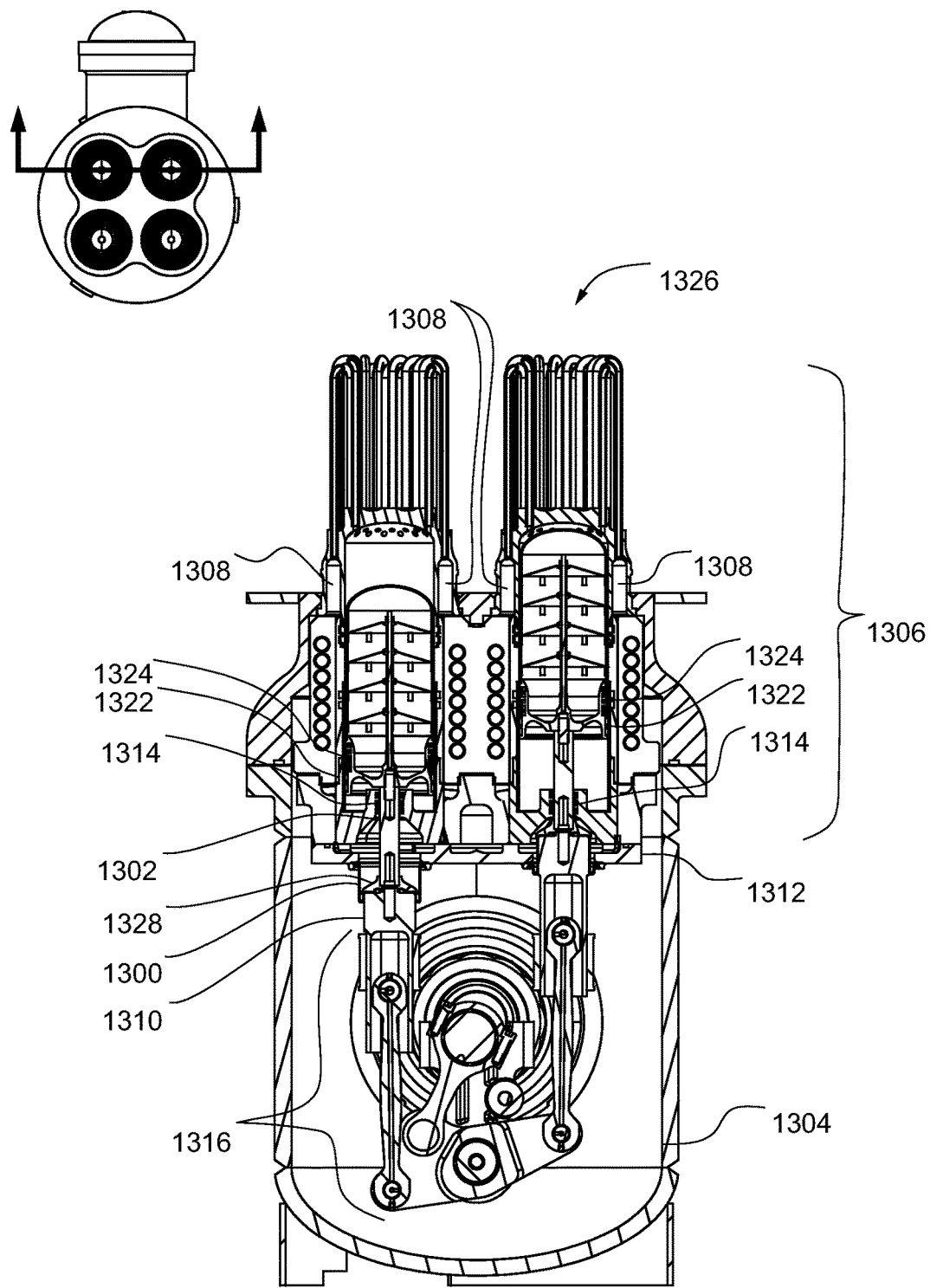
FIG. 11 shows a view of an external combustion engine in accordance with one.

Referring now to FIGS. 10C, and 11, however, another embodiment of the Stirling machine is shown, wherein airlock space 1312 is located between working space 1306 and crankcase 1304. Airlock space 1312 maintains a constant volume and pressure necessary to create the pressure differential necessary for the function of rolling diaphragm 1300 as described above. In one embodiment, airlock 1312 is not absolutely sealed off from working space 1306, so the pressure of airlock 1312 is equal to the mean pressure of working space 1306. Thus, in some embodiments, the lack of an effective seal between the working space and the crankcase contributes to the need for an airlock space. Thus, the airlock space, in some embodiments, may be eliminated by a more efficient and effective seal.

During operation, the working space 1306 mean pressure may vary so as to cause airlock 1312 mean pressure to vary as well. One reason the pressure may tend to vary is that during operation the working space may get hotter, which in turn may increase the pressure in the working space, and consequently in the airlock as well since the airlock and working space are in fluid communication. In such a case, the pressure differential between airlock 1312 and crankcase 1304 will also vary, thereby causing unnecessary stresses in rolling diaphragms 1300 that may lead to seal failure. Therefore, some embodiments of the machine, the mean pressure within airlock 1312 is regulated so as to maintain a constant desired pressure differential between airlock 1312 and crankcase 1304, and ensuring that rolling diaphragms 1300 stay inflated and maintains their form. In some embodiments, a pressure transducer is used to monitor and manage the pressure differential between the airlock and the crankcase, and regulate the pressure accordingly so as to maintain a constant pressure differential between the airlock and the crankcase. Various embodiments of the pressure regulator that may be used are described in further detail below, and in U.S. Pat. No. 7,310,945, issued Dec. 25, 2007, to Gurski et al., which is herein incorporated by reference in its entirety.

A constant pressure differential between the airlock 1312 and crankcase 1304 may be achieved by adding or removing working fluid from airlock 1312 via a pump or a release valve. Alternatively, a constant pressure differential between airlock 1312 and crankcase 1304 may be achieved by adding or removing working fluid from crankcase 1304 via a pump or a release valve. The pump and release valve may be controlled by the pressure regulator. Working fluid may be added to airlock 1312 (or crankcase 1304) from a separate source, such as a working fluid container, or may be transferred over from crankcase 1304. Should working fluid be transferred from crankcase 1304 to airlock 1312, it may be desirable to filter the working fluid before passing it into airlock 1312 so as to prevent any lubricant from passing from crankcase 1304 into airlock 1312, and ultimately into working space 1306, as this may result in engine failure.

In some embodiments of the machine, crankcase 1304 may be charged with a fluid having different thermal properties than the working fluid. For example, where the working gas is helium or hydrogen, the crankcase may be charged with argon. Thus, the crankcase is pressurized. In some embodiments, helium is used, but in other embodiments, any inert gas, as described herein, may be used. Thus, the crankcase is a wet pressurized crankcase in the exemplary embodiment. In other embodiments where a lubricating fluid is not used, the crankcase is not wet.

In the exemplary embodiments, rolling diaphragms 1300 do not allow gas or liquid to pass through them, which allows working space 1306 to remain dry and crankcase 1304 to be wet sumped with a lubricating fluid. Allowing a wet sump crankcase 1304 increases the efficiency and life of the engine as there is less friction in rocking beam drives 1316. In some embodiments, the use of roller bearings or ball bearings in drives 1316 may also be eliminated with the use of lubricating fluid and rolling diaphragms 1300. This may further reduce engine noise and increase engine life and efficiency.

FIGS. 12A-12E show cross sections of various embodiments of the rolling diaphragm (shown as 1400, 1410, 1412, 1422 and 1424) configured to be mounted between top seal piston and bottom seal piston (shown as 1328 and 1310 in FIG. 10A), and between a top mounting surface and a bottom mounting surface (shown as 1320 and 1318 in FIG. 10A). In some embodiments, the top mounting surface may be the surface of an airlock or working space, and the bottom mounting surface may be the surface of a crankcase.

Figure 12A:
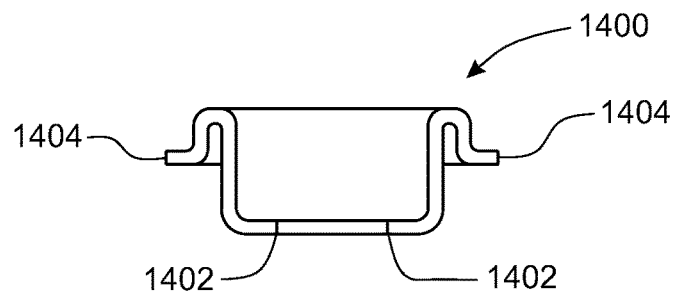
FIGS. 12A-12E show views of various embodiments of a rolling diaphragm.
Figure 12B:
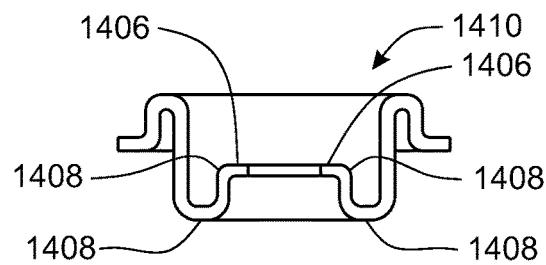
Figure 12C:
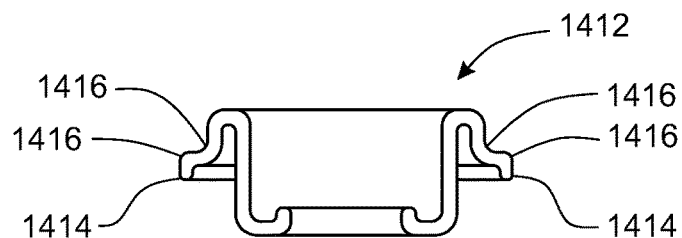

FIG. 12A shows one embodiment of the rolling diaphragm 1400, where the rolling diaphragm 1400 includes a flat inner end 1402 that may be positioned between a top seal piston and a bottom seal piston, so as to form a seal between the top seal piston and the bottom seal piston. The rolling diaphragm 1400 also includes a flat outer end 1404 that may be positioned between a top mounting surface and a bottom mounting surface, so as to form a seal between the top mounting surface and the bottom mounting surface. FIG. 12B shows another embodiment of the rolling diaphragm, wherein rolling diaphragm 1410 may include a plurality of bends 1408 leading up to flat inner end 1406 to provide for additional support and sealing contact between the top seal piston and the bottom seal piston. FIG. 12C shows another embodiment of the rolling diaphragm, wherein rolling diaphragm 1412 includes a plurality of bends 1416 leading up to flat outer end 1414 to provide for additional support and sealing contact between the top mounting surface and the bottom mounting surface.

Figure 12D:
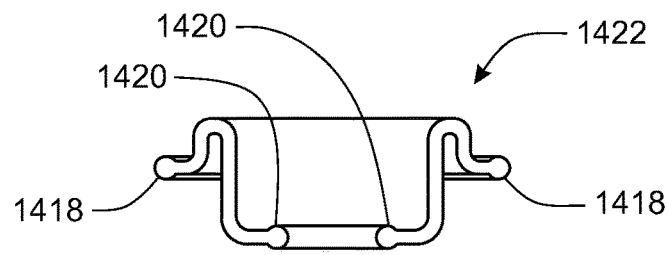
Figure 12E:
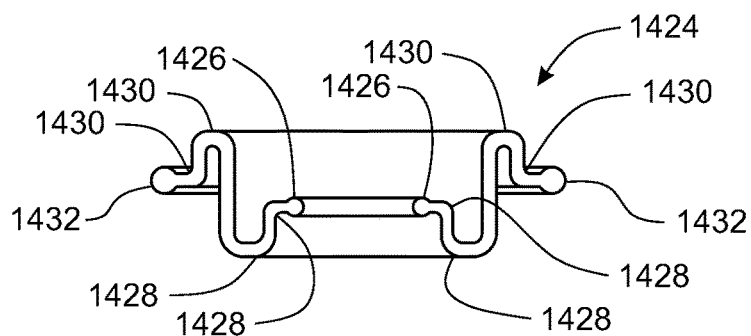

FIG. 12D shows another embodiment of the rolling diaphragm where rolling diaphragm 1422 includes a bead along an inner end 1420 thereof, so as to form an 'o-ring' type seal between a top seal piston and a bottom seal piston, and a bead along an outer end 1418 thereof, so as to form an 'o-ring' type seal between a bottom mounting surface and a top mounting surface. FIG. 12E shows another embodiment of the rolling diaphragm, wherein rolling diaphragm 1424 includes a plurality of bends 1428 leading up to beaded inner end 1426 to provide for additional support and sealing contact between the top seal piston and the bottom seal piston. Rolling diaphragm 1424 may also include a plurality of bends 1430 leading up to beaded outer end 1432 to provide for additional support and sealing contact between the top seal piston and the bottom seal piston.

Although FIGS. 12A through 12E depict various embodiments of the rolling diaphragm, it is to be understood that rolling diaphragms may be held in place by any other mechanical means known in the art. Alternatively, the rolling diaphragm may be replaced by metal bellows as disclosed in U.S. patent application Ser. No. 13/447,990, filed Apr. 16, 2012 and entitled Stirling Cycle Machine, which is hereby incorporated herein by reference in its entirety.

Rolling Diaphragm and/or Bellows Embodiments

Various embodiments of the rolling diaphragm and/or bellows, which function to seal, are described above. Further embodiments will be apparent to those of skill in the art based on the description above and the additional description below relating to the parameters of the rolling diaphragm and/or bellows.

In some embodiments, the pressure atop the rolling diaphragm or bellows, in the airlock space or airlock area (both terms are used interchangeably), is the mean-working-gas pressure for the machine, which, in some embodiments is an engine, while the pressure below the rolling diaphragm and/or bellows, in the crankcase area, is ambient/atmospheric pressure. In these embodiments, the rolling diaphragm and/or bellows is required to operate with as much as 3000 psi across it (and in some embodiments, up to 1500 psi or higher). In this case, the rolling diaphragm and/or bellows seal forms the working gas (helium, hydrogen, or otherwise) containment barrier for the machine (engine in the exemplary embodiment). Also, in these embodiments, the need for a heavy, pressure-rated, structural vessel to contain the bottom end of the engine is eliminated, since it is now required to simply contain lubricating fluid (oil is used as a lubricating fluid in the exemplary embodiment) and air at ambient pressure, like a conventional internal combustion ("IC") engine.

Figure 13A:
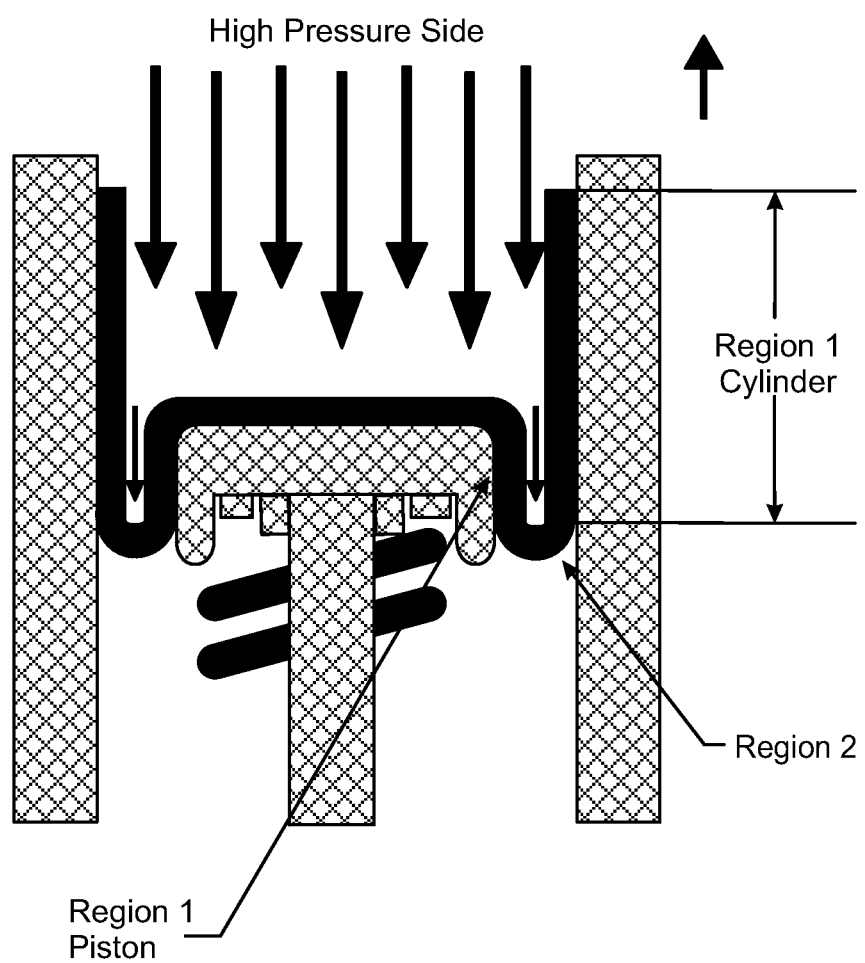
FIG. 13A shows a schematic of a rolling diaphragm identifying various load regions.
Figure 13B:
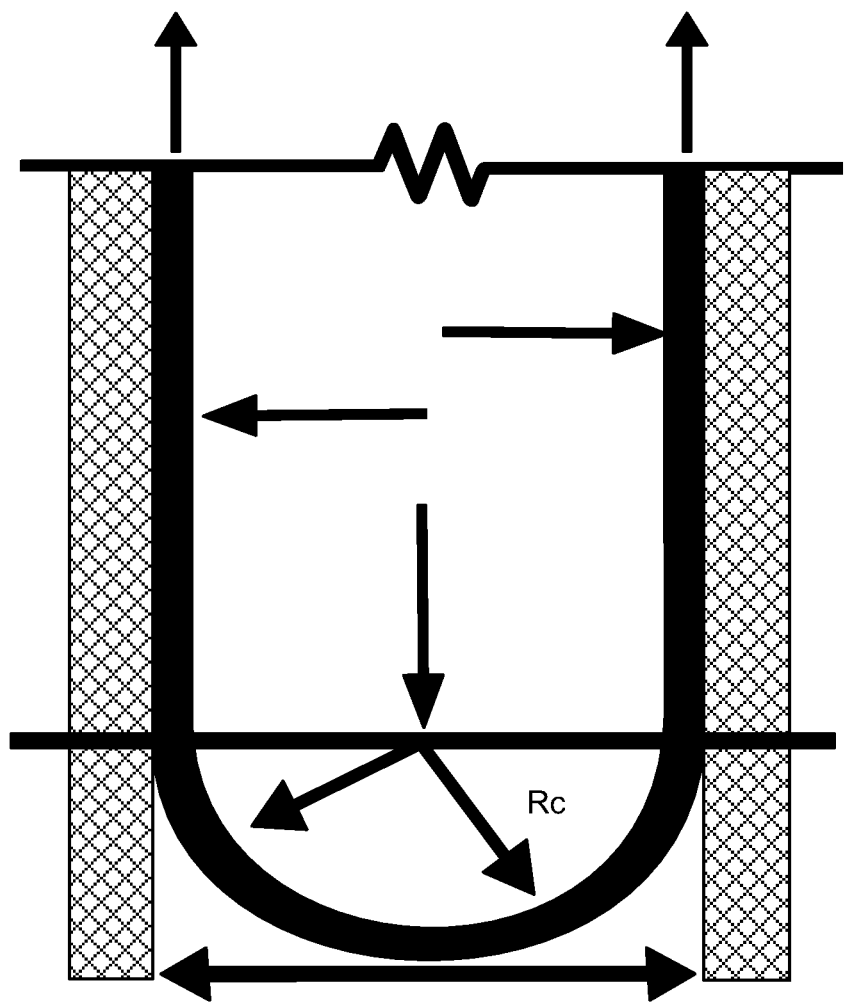
FIG. 13B shows a schematic of the rolling diaphragm identifying the convolution region.

The capability to use a rolling diaphragm and/or bellows seal with such an extreme pressure across it depends on the interaction of several parameters. Referring now to FIG. 13A, an illustration of the actual load on the rolling diaphragm or bellows material is shown. As shown, the load is a function of the pressure differential and the annular gap area for the installed rolling diaphragm or bellows seal.

Region 1 represents the portions of the rolling diaphragm and/or bellows that are in contact with the walls formed by the piston and cylinder. The load is essentially a tensile load in the axial direction, due to the pressure differential across the rolling diaphragm and/or bellows. This tensile load due to the pressure across the rolling diaphragm and/or bellows can be expressed as:

$$L_t = P_d * A_a$$

Where
$L_t$=Tensile Load and
$P_d$=Pressure Differential
$A_a$=Annular Area
and $$A_a = p/4 * (D^2 - d^2)$$

Where
D=Cylinder Bore and
d=Piston Diameter

The tensile component of stress in the bellows material can be approximated as:

$$S_t = L_t / (p * (D+d) * t_b)$$

Which reduces to:

$$S_t = P_d / 4 * (D-d) / tb$$

Later, we will show the relationship of radius of convolution, $R_c$, to Cylinder bore (D) and Piston Diameter (d) to be defined as:

$$R_c = (D-d)/4$$

So, this formula for St reduces to its final form:

$$S_t = P_d * R_c / t_b$$

Where
$t_b$=thickness of bellows material

Still referring to FIG. 13A, Region 2 represents the convolution. As the rolling diaphragm and/or bellows material turns the corner, in the convolution, the hoop stress imposed on the rolling diaphragm and/or bellows material may be calculated. For the section of the bellows forming the convolution, the hoop component of stress can be closely approximated as:

$$S_h = P_d * R_c / t_b$$

The annular gap that the rolling diaphragm and/or bellows rolls within is generally referred to as the convolution area. The rolling diaphragm and/or bellows fatigue life is generally limited by the combined stress from both the tensile (and hoop) load, due to pressure differential, as well as the fatigue due to the bending as the fabric rolls through the convolution. The radius that the fabric takes on during this 'rolling' is defined here as the radius of convolution, Rc.

$$R_c = (D-d)/4$$

The bending stress, Sb, in the rolling diaphragm and/or bellows material as it rolls through the radius of convolution, Rc, is a function of that radius, as well as the thickness of the materials in bending. For a fiber-reinforced material, the stress in the fibers themselves (during the prescribed deflection in the exemplary embodiments) is reduced as the fiber diameter decreases. The lower resultant stress for the same level of bending allows for an increased fatigue life limit. As the fiber diameter is further reduced, flexibility to decrease the radius of convolution Rc is achieved, while keeping the bending stress in the fiber under its endurance limit. At the same time, as Rc decreases, the tensile load on the fabric is reduced since there is less unsupported area in the annulus between the piston and cylinder. The smaller the fiber diameter, the smaller the minimum Rc, the smaller the annular area, which results in a higher allowable pressure differential.

For bending around a prescribed radius, the bending moment is approximated by:

$$M = E * I / R$$

Where:
M=Bending Moment
E=Elastic Modulus
I=Moment of Inertia
R=Radius of Bend
Classical bending stress, $S_b$, is calculated as:

$$S_b = M * Y / I$$

Where:
Y=Distance above neutral axis of bending
Substituting yields:

$$S_b = (E * I / R) * Y / I$$

$$S_b = E * Y / R$$

Assuming bending is about a central neutral axis:

$$Y_{max} = t_b / 2$$

$$S_b = E * t_b / (2 * R)$$

In some embodiments, rolling diaphragm and/or bellows designs for high cycle life are based on geometry where the bending stress imposed is kept about one order of magnitude less than the pressure-based loading (hoop and axial stresses). Based on the equation: Sb=E*tb/(2*R), it is clear that minimizing tb in direct proportion to Rc should not increase the bending stress. The minimum thickness for the exemplary embodiments of the rolling diaphragm and/or bellows material or membrane is directly related to the minimum fiber diameter that is used in the reinforcement of the elastomer. The smaller the fibers used, the smaller resultant Rc for a given stress level.

Another limiting component of load on the rolling diaphragm and/or bellows is the hoop stress in the convolution (which is theoretically the same in magnitude as the axial load while supported by the piston or cylinder). The governing equation for that load is as follows:

$$Sh = Pd * Rc/tb$$

Thus, if Rc is decreased in direct proportion to tb, then there is no increase of stress on the membrane in this region. However, if this ratio is reduced in a manner that decreases Rc to a greater ratio than tb then parameters must be balanced. Thus, decreasing tb with respect to Rc requires the rolling diaphragm and/or bellows to carry a heavier stress due to pressure, but makes for a reduced stress level due to bending. The pressure-based load is essentially constant, so this may be favorable—since the bending load is cyclic, therefore it is the bending load component that ultimately limits fatigue life.

For bending stress reduction, tb ideally should be at a minimum, and Rc ideally should be at a maximum. E ideally is also at a minimum. For hoop stress reduction, Rc ideally is small, and tb ideally is large.

Thus, the critical parameters for the rolling diaphragm and/or bellows membrane material are:

E, Elastic Modulus of the membrane material;
tb, membrane thickness (and/or fiber diameter);
Sut, Ultimate tensile strength of the rolling diaphragm and/or bellows; and
Slcf, The limiting fatigue strength of the rolling diaphragm and/or bellows.

Thus, from E, tb and Sut, the minimum acceptable Rc may be calculated. Next, using Rc, Slcf, and tb, the maximum Pd may be calculates. Rc may be adjusted to shift the bias of load (stress) components between the steady state pressure stress and the cyclic bending stress. Thus, the ideal rolling diaphragm and/or bellows material is extremely thin, extremely strong in tension, and very limber in flexion.

Thus, in some embodiments, the rolling diaphragm and/or bellows material (sometimes referred to as a "membrane"), is made from carbon fiber nanotubes. However, additional small fiber materials may also be used, including, but not limited to nanotube fibers that have been braided, nanotube untwisted yarn fibers, or any other conventional materials, including but not limited to KEVLAR, glass, polyester, synthetic fibers and any other material or fiber having a desirable diameter and/or other desired parameters as described in detail above.

Piston Seals and Piston Rod Seals

Figure 14:
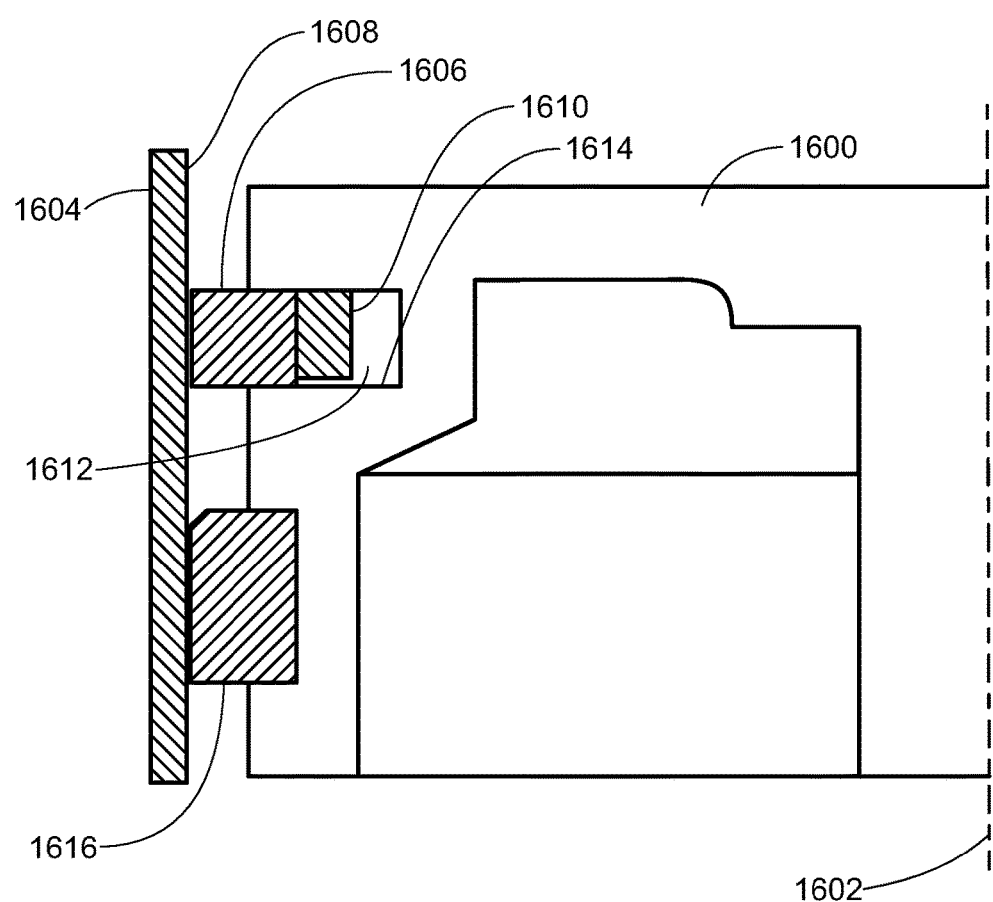
FIG. 14 shows a view of a piston and piston seal in accordance with one embodiment.

Referring now to FIG. 11, an embodiment of the machine is shown wherein an engine 1326, such as a Stirling cycle engine, includes at least one piston rod seal 1314, a piston seal 1324, and a piston guide ring 1322, (shown as 1616 in FIG. 14). Various embodiments of the piston seal 1324 and the piston guide ring 1322 are further discussed below, and in U.S. patent application Ser. No. 10/175,502 (now abandoned), which, as mentioned before, is incorporated by reference.

FIG. 14 shows a partial cross section of the piston 1600, driven along the central axis 1602 of cylinder, or the cylinder 1604. The piston seal (shown as 1324 in FIG. 11) may include a seal ring 1606, which provides a seal against the contact surface 1608 of the cylinder 1604. The contact surface 1608 is typically a hardened metal (preferably 58-62 RC) with a surface finish of 12 RMS or smoother. The contact surface 1608 may be metal which has been case hardened, such as 8260 hardened steel, which may be easily case hardened and may be ground and/or honed to achieve a desired finish. The piston seal may also include a backing ring 1610, which is sprung to provide a thrust force against the seal ring 1606 thereby providing sufficient contact pressure to ensure sealing around the entire outward surface of the seal ring 1606. The seal ring 1606 and the backing ring 1610 may together be referred to as a piston seal composite ring. In some embodiments, the at least one piston seal may seal off a warm portion of cylinder 1604 from a cold portion of cylinder 1604.

Figure 15:
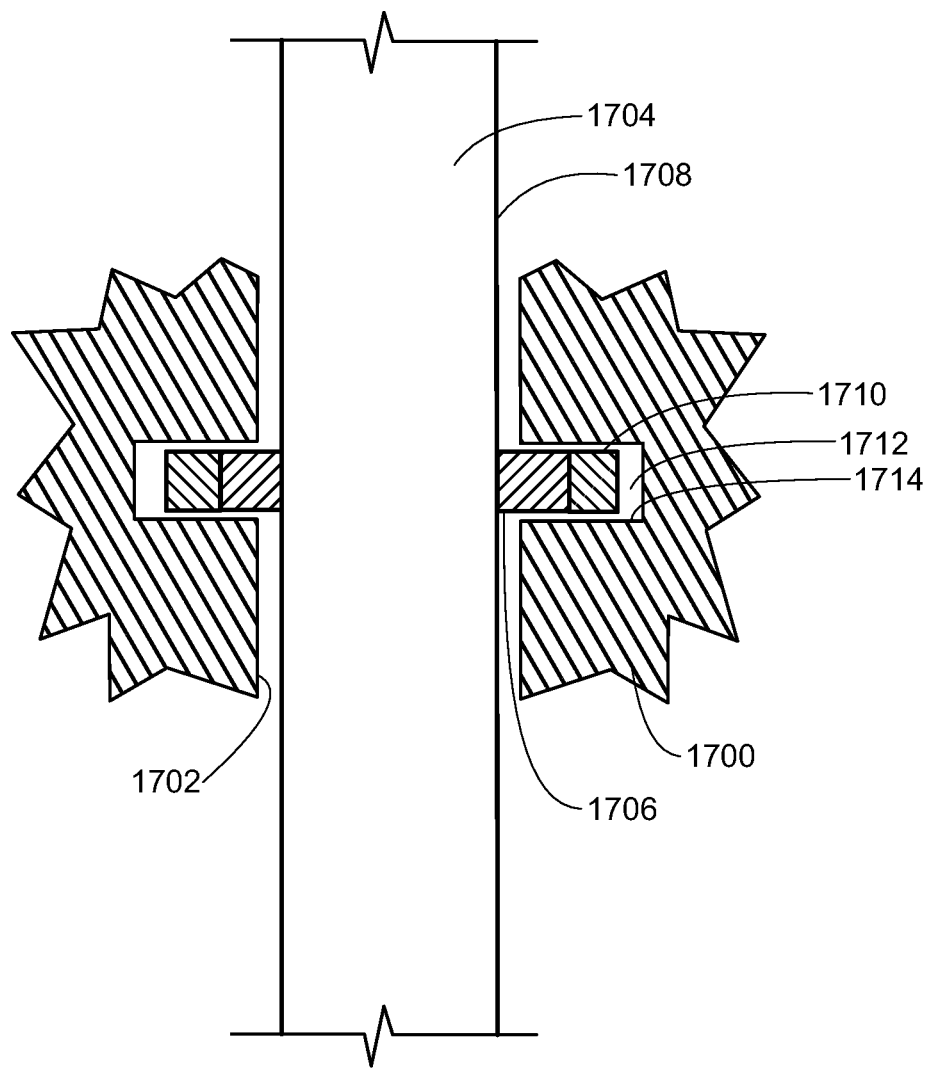
FIG. 15 shows a view of a piston rod and piston rod seal in accordance with one embodiment.

Referring now to FIG. 15, some embodiments include a piston rod seal (shown as 1314 in FIG. 11) mounted in the piston rod cylinder wall 1700, which, in some embodiments, may include a seal ring 1706, which provides a seal against the contact surface 1708 of the piston rod 1604 (shown as 1302 in FIG. 11). The contact surface 1708 in some embodiments is a hardened metal (preferably 58-62 RC) with a surface finish of 12 RMS or smoother. The contact surface 1708 may be metal which has been case hardened, such as 8260 hardened steel, which may be easily case hardened and may be ground and/or honed to achieve a desired finish. The piston seal may also include a backing ring 1710, which is sprung to provide a radial or hoop force against the seal ring 1706 thereby providing sufficient contact hoop stress to ensure sealing around the entire inward surface of seal ring 1706. The seal ring 1706 and the backing ring 1710 may together be referred to as a piston rod seal composite ring.

In some embodiments, the seal ring and the backing ring may be positioned on a piston rod, with the backing exerting an outward pressure on the seal ring, and the seal ring may come into contact with a piston rod cylinder wall 1702. These embodiments require a larger piston rod cylinder length than the previous embodiment. This is because the contact surface on the piston rod cylinder wall 1702 will be longer than in the previous embodiment, where the contact surface 1708 lies on the piston rod itself. In yet another embodiment, piston rod seals may be any functional seal known in the art including, but not limited to, an o-ring, a graphite clearance seal, graphite piston in a glass cylinder, or any air pot, or a spring energized lip seal. In some embodiments, anything having a close clearance may be used, in other embodiments, anything having interference, for example, a seal, is used. In the exemplary embodiment, a spring energized lip seal is used. Any spring energized lip seal may be used, including those made by BAL SEAL Engineering, Inc., Foothill Ranch, Calif. In some embodiments, the seal used is a BAL SEAL Part Number X558604.

The material of the seal rings 1606 and 1706 is chosen by considering a balance between the coefficient of friction of the seal rings 1606 and 1706 against the contact surfaces 1608 and 1708, respectively, and the wear on the seal rings 1606 and 1706 it engenders. In applications in which piston lubrication is not possible, such as at the high operating temperatures of a Stirling cycle engine, the use of engineering plastic rings is used. The embodiments of the composition include a nylon matrix loaded with a lubricating and wear-resistant material. Examples of such lubricating materials include PTFE/silicone, PTFE, graphite, etc. Examples of wear-resistant materials include glass fibers and carbon fibers. Examples of such engineering plastics are manufactured by LNP Engineering Plastics, Inc. of Exton, Pa. Backing rings 1610 and 1710 is preferably metal.

The fit between the seal rings 1606 and 1706 and the seal ring grooves 1612 and 1712, respectively, is preferably a clearance fit (about 0.002"), while the fit of the backing rings 1610 and 1710 is preferably a looser fit, of the order of about 0.005" in some embodiments. The seal rings 1606 and 1706 provide a pressure seal against the contact surfaces 1608 and 1708, respectively, and also one of the surfaces 1614 and 1714 of the seal ring grooves 1612 and 1712, respectively, depending on the direction of the pressure difference across the rings 1606 and 1706 and the direction of the piston 1600 or the piston rod 1704 travel.

Figure 16A:
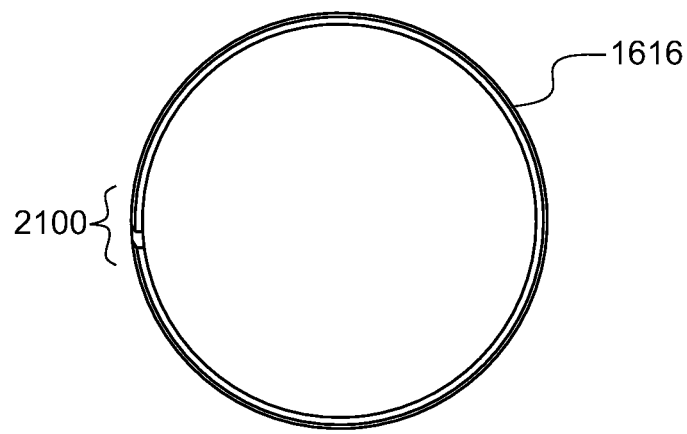
FIGS. 16A-16B show views of a piston guide ring in accordance with one embodiment.
Figure 16B:
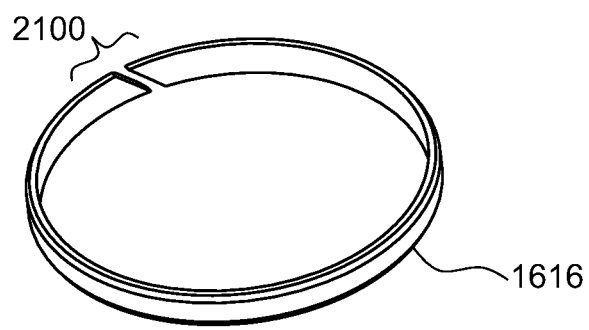

Referring again to FIG. 14, at least one guide ring 1616 may also be provided, in accordance with some embodiments, for bearing any side load on piston 1600 as it moves up and down the cylinder 1604. Guide ring 1616 is also preferably fabricated from an engineering plastic material loaded with a lubricating material. A perspective view of guide ring 1616 is shown in FIGS. 16A, 16B. An overlapping joint 2100 is shown and may be diagonal to the central axis of guide ring 1616. The guide ring 1616 and other guide elements located on the moving piston or on matting stationary parts can bear significant side loads that are larger than the side loads supported by the pressure seal sand the associated backing ring. In a preferred embodiment, the backing ring 1610 exerts less than 15 psi, when fully compressed. The backing ring 1610 and pressure seal 1606 can bear a significant side load and thus are not designed to guide the piston 1600.

Referring now to FIG. 68A, which shows a cross-section of an embodiment of a Stirling engine and burner, in some embodiments, the length of time of performance, i.e., the life, of the rod seals on the piston rod may be extended and/or maximized by reducing and/or minimizing the axial misalignment between the rod seals and the piston rod. In some embodiments, a rod seal may float radially when the pressure difference between the workspace and air lock is low, while forming a gas seal when the pressure difference between the workspace and air lock is high. A rod seal assembly comprising a cylinder-gland housing between the working space and the air lock space is configured to receive the reciprocating piston rod that is disposed within the workspace and the airlock space. A floating bushing is configured to move axially and radially within the cylinder gland and is disposed coaxially around the reciprocating rod. A rod seal is configured to seal the outside diameter of the reciprocating rod relative to an inside surface of the floating bushing and at least one stationary bushing fixed within the housing that may form a seal with the floating bushing to limit the flow of gas between the workspace and the airlock. The rod seal may be a spring energized seal. The floating bushing may further comprises a circumferential flange on the outside surface that is configured to extend into the annular space formed by two stationary bushings and form a seal with one of the stationary bushings in the presence of a pressure difference between the workspace and the airlock.

The rod seal assembly may also comprise a scraper ring located coaxially around the piston rod and located within the cylinder-gland housing between the floating seal and the workspace. The cylinder-gland housing may include a port connecting the workspace to an annular gap around the reciprocating rod between the scraper ring and the floating seal, that minimizes the pressure difference across the scraper ring. The rod seal assembly may also comprise a magnetic particle trap between the scraper ring and the floating seal.

In another embodiment, the rod seal assembly comprising a cylinder-gland housing between the working space and the air lock space is configured to receive the reciprocating piston rod that is disposed within the workspace and the airlock space. A floating clearance bushing configured to move axially and radially within the housing and is disposed coaxially around the reciprocating piston rod and forms a clearance seal with the piston rod. The cylinder-gland contains at least one stationary annular element that is fixed within the housing and configured to form a face seal with the floating clearance bushing.

Referring now to FIGS. 68A-69F, a piston rod seal unit 13750 is shown that allows the rod seal 13770 to move radially in order to minimize forces on and maximize the life of the rod seal 13770. In addition, the piston rod seal unit 13750 includes components to protect the rod seals 13770 from particles. In various embodiments, the piston rod seal units 13750 mount in the duct plate 13715 of the Stirling engine drive and provides gas seals between the working spaces under the pistons 13738 from the airlock 13736 on each piston rod 13744. The piston rod seal unit 13750 is presented in FIGS. 69A-69C with the piston rod 13744 removed for clarity, wherein the rod seal 13770 is mounted in a floating rod seal assembly 13760 and one or more floating rod seal assemblies 13760 are mounted in the cylinder gland 13752. The pressure in the workspaces may vary ±300 psi about the airlock pressure which requires that the rod seals 13770 minimize gas leaks in both directions. A small amount of leakage between the workspace 13738 and the airlock 13736 is tolerable and even desirable to allow the average pressure of each of the multiple workspaces 13738 to equalize with the pressure in the single airlock 13736 and thereby with each other. A large gas leak across any of the piston rod seal units 13750 will reduce the pressure swing in the workspace and thereby the power and efficiency of the Stirling engine. The sliding motion between the piston rod 13744 and the rod seal 13770 may result in wear and abrasion of the seal surface that leads to leaks, seal failure and reduced engine power and efficiency.

Still referring to FIGS. 68A-69C, to minimize the wear, the rod seal 13770, in some embodiments, may be advantageously located concentric with the piston rod 13744 so that the active sealing surfaces of rod seal 13770 are uniformly pressed against piston rod 13744. In some embodiments, and as shown in FIG. 68A, the location and motion path of the piston rod 13744 may be constrained by the crosshead bearing 13746 at one end and the piston guide ring 13742 in the cylinder at the other end. Misalignment or radial movement of either the crosshead bearing 13746 or the piston guide ring 13742 may result in the piston rod 13744 not being centered in mounting structure for the rod seal 13770 (e.g. the cylinder gland 13752) or in slight movement of the piston rod 13744 during the stroke. The floating rod seal assembly 13760 (FIG. 69B) allows the rod seal 13770 to move radially in order to center itself on the piston rod 13744 or minimize the variation of radial forces on the sealing surfaces around the circumference of the rod seal 13770. The floating rod seal assembly 13760 may also maintain a significant seal, but in some embodiments, not a perfect seal, to the flow of working gas between the workspace 13738 and airlock 13736, while allowing the radial movement of the piston rod seal 13370.

Still referring to FIGS. 68A-69C, the piston rod seal units 13750 including one or more floating rod seal assemblies 13760 mounted in the cylinder gland 13752, may be bolted to the duct plate 13715. In some embodiments, the piston rod seal units 13750 may be located to align with the heater heads 13712 and or the engine block 13741 that guides the crosshead bearings 13746 via structural features on the cylinder gland 13752 and structural elements that assure proper alignment of duct plate 13715 with the cooler plate 13717 and engine block 13741. In some embodiments, the diameter 13784 on the cylinder gland 13752 mates with a counter-bored diameter on the duct plate 13715.

Still referring to FIGS. 68A-69C, in some embodiments, the piston rod seal unit 13750 includes; a housing 13754, into which one or more floating rod seal assemblies 13760 are pressed and axially constrained therein, a scraper ring 13778, a particle trap 13780 and a port 13782 to minimize the pressure difference across the scraper ring 13778. The floating rod seal assemblies 13760 include an outer ring 13762, at least one bushing 13764, (wherein, in some embodiments, may include two bushings 13764), a floating bushing 13766 and the rod seal 13770. In some embodiments, the elements of the floating rod seal assembly 13760 may be assembled by pressing a first bushing 13764 into the outer ring 13762 until the one end of the bushing 13764 is flush with one end of the outer ring 13762; placing the floating bushing 13766 in the outer ring 13762 on the non-flush end of the first bushing 13764; pressing the second bushing 13764 into the outer ring 13762 unit one end of the second bushing 13764 is flush with one end of the outer ring 13762 and the floating bushing 13766 is captured between the two bushings 13764; and pressing the rod seal 13770 into the floating bushing 13766

Still referring to FIGS. 68A-69C, in various embodiments, the elements of the floating rod seal assembly 13760 may be sized to allow the floating bushing 13766 to move axially and radially, while rigidly holding the bushings 13764 relative to the outer ring 13762. In various embodiments, the outside diameter of the bushings 13764 and inner diameter of the outer ring 13762 may be sized to provide a light interference fit, so that the bushings do not move relative outer ring 13762. In some embodiments, the outside diameter of the bushings 13764 and inner diameter of the outer ring 13762 may be sized to provide a location fit. In various embodiments, the heights of the outer ring 13762 and the two bushings 13764 and the axial thickness of the rib 13766A may be sized so that the axial gap between the assembled bushings 13764 is larger than the axial thickness of the rib 13766A. The resulting axial gap 13768 may range from 0.001 to 0.02 inches. In some embodiments, the axial gap 13768 ranges from about 0.002 to about 0.004 inches. In various embodiments, the outside diameter of the outer ring 13762 and the inner diameter of the housing 13754 are selected to provide leak tight seal. In various embodiments, the outside diameter of the outer ring 13762 and the inner diameter of housing 13754 may be selected to have a light interference fit. In another embodiment, the outside diameter of the outer ring 13762 and the inner diameter of housing 13754 may be selected to have a location fit.

Still referring to FIGS. 68A-69C, in various embodiments, the outer ring 13762 and housing 13754 may be made from metal. In various embodiments, the bushings 13764, 13766 may be made from metal with high wear resistance. In various embodiments, the cylinder gland 13752 may be made of metal or high strength plastics that show resistance to cracking and fatigue failure. In some embodiments, the cylinder gland 13752 may be 4140 steel. In various embodiments, the bushings 13764, 13766, may be made of a wear resistant steel such as P20 (i.e. vacuum treated 4140 steel) or a metal with similar strength and wear resistances. In various embodiments, the outer ring 13762 and housing may be made from 4140 or 4340 steel that has been treated to achieve a Rockwell Hardness of 28-32 or a metal with similar strength and hardness. The surfaces on the floating bushing 13766 and the bushings 13764 that contact each other (e.g. 13769 in FIG. 69B) provide a metal to metal seal. In various embodiments, the contacting surfaces of the floating bushing 13766 and bushings 13764 may have a smooth surface finish. In some embodiments, the surface finish may be less than 32 microinches RA. In another example the surface finish is less than 16 microinches RA.

Still referring to FIGS. 68A-69C, in various embodiments, the rod seal 13770 may be a spring energized seal. In some embodiments, coiled springs 13770A wrapped around the bearing surface may urge the lips of the seal 13770B toward the piston rod 13744. In some embodiments, the bearing surface may be composed of a composite polymer. In some embodiments, the bearing material may be a PFTE composite. In some embodiments, the rod seal 13770 may include an o-ring 13770C around the outside diameter to provide a seal to axial flow of gas on the outside diameter of the rod seal 13370. In some embodiments, the seal may be graphite or a graphite impregnated with antimony and or may be made of any material and/or any combination and/or composite of material. In some embodiments, the seal may be made of antimony impregnated graphite which may be from the SGL Carbon Company of Germany. In some embodiments, the rod seal may be a part supplied by CoorsTek of Golden Colo. or Bal Seal of Foothill Ranch, Calif.

Still referring to FIGS. 68A-69C in some embodiments, the floating rod seal assemblies may be assembled and axially constrained in the housing 13754 following a method of: pressing the first floating rod seal assembly 13760 into the housing 13754 from the flanged end 13754A until it is flush with the flanged end 13754A; pressing the washer 13758 into the housing 13754 from the flanged end 13754A until it is flush with the flanged end 13754A; placing a second washer 13758 on other end of the first floating rod seal assembly 13760; pressing the second floating rod seal assembly 13760 into the housing 13754 from threaded end 13754B place; placing the third washer 13758 on the second floating rod seal assembly 13760; and threading the fitting 13776 into the housing 13754 to axially secure the assemblies and washer 13760, 13758. In some embodiments, the housing 13754 may be secured to a rigid surface while the fitting 13776 is threaded into the housing 13754 and tightened to a predetermined torque. In various embodiments, the floating road seal assemblies 13760, washers 13758 and fitting 13776 may be assembled in using various methods that would be evident to one skilled in the art.

Still referring to FIGS. 68A-69C in some embodiments, the piston rod seal unit 13750 may be assembled by pressing or inserting some or all of the following into the cylinder gland 13752: housing 13754 with the floating rod seal assemblies 13760; and/or the particle trap 13780; and/or a scraper ring 13778. In various embodiments, an end plate 13756 may be bolted to the bottom of the cylinder gland 13752 to capture the floating rod seal assembles 13760, particle trap 13780 and/or scraper ring 13778. In various embodiments, the port 13782 may be threaded into the side of the cylinder gland between the scraper ring 13778 and the housing 13754 containing the floating seals, so that both sides of the scraper ring 13778 are exposed to the same work space pressure. The port 13782 includes a port 13782A and a particle filter 13782B that, in some embodiments, are separate pieces. In various embodiments, one or more circumferential O-rings may be located between the housing 13754 and the cylinder gland 13752, and between the housing 13754 and the fitting 13776 to seal leak paths through piston rod seal unit 137750. In some embodiments, there may be axial or face O-rings between the end plate 13756 and the housing 13754 and between the end plate 13756 and the first washer 13758 to seal leak paths through piston rod seal unit 137750.

In various embodiments, the floating rod seal assembly 13760 may be assembled differently such as pressing the elements into the housing 13754. In another embodiment the outer ring 13762 may be incorporated into the housing 13754, so the bushings 13764, floating bushing 13766 and rod seal 13770 may be directly mounted into the housing 13754. In another embodiment, the floating rod seal assemblies 13760 may be pressed or inserted directly into the cylinder gland 13752 or the duct plate 13715.

Still referring to FIGS. 68A-69C, the scraper ring 13778, particle trap 13780, port 13782, and filter 13782B, may serve to protect the rod seal 13370 and floating rod seal assemblies from particles and/or may prevent particles from entering the piston rod seal unit 13750 with the movement of gas into the piston rod seal unit 13750. Particles may be produced in the workspace, for example, in some embodiments when pieces of the fine wire break off the regenerator. In some embodiments metal particles may be generated when the piston contacts the cylinder. In some embodiments, metal flakes may be generated from oxidation of metal in the heater head or other causes. Metal and/or oxidized metal particles that reach the rod seal 13370 may score the piston rod 13744 or damage the rod seal 13770 leading to leakage and lower power or early seal failure. Particles may also get trapped in the axial gap 13768 between the bushing and the floating bushing 13766, which may create a leak path around the rod seal 13770 that may reduce engine power. Therefore, in various embodiments, it is desirable to minimize and/or prevent metal particles from entering piston rod seal space. In various embodiments, the scraper ring 13778 and/or the filter 13782B may minimize the number of particles that enter the piston rod seal unit 13750. The particle trap 13780 may serve to attract and hold particles that pass by the scraper ring 13778 or filter 13782B. In some embodiments, the particle trap may include one or more magnets 13780A that may attract steel particles and oxides of metal, which may include iron.

In various embodiments, the port 13782 may prevent and/or minimize and/or reduce a pressure difference across the scraper ring 13778 by fluidly connecting the bottom side of the scraper ring 13778 to the same workspace 13738 in which the top of the scraper ring 13778 may be exposed. In various embodiments, the port may prevent and/or minimize and/or reduce a pressure difference across the scraper ring 13778 due to changes in the average workspace pressure which may occur in various stages, for example, but not limited to, during startup and/or due to the action of the scraper ring 13778 allowing flow, for example, in one direction along the piston rod 13744, but not allowing flow in the other direction. Still referring to FIGS. 68A-69C, in some embodiments, the scraper ring 13778 may be a spring energized lip seal. In some embodiments, coiled springs wrapped around the bearing surface urge the ends of the bearing surface toward the piston rod 13744 and the bearing surface. In various embodiments, the bearing surface may be made of a composite polymer. In some embodiments, the bearing surface may be made from a PFTE composite. In some embodiments, the rod seal 13370 may be one supplied by CoorsTek of Golden Colo. or Bal Seal Engineering Inc. of Foothill Ranch, Calif.

Still referring to FIGS. 68A-69C, in some embodiments, the floating rod seal assembly 13760 allows the rod seals 13370 to self-center on the reciprocating piston rod 13744. The floating bushing 13766, which is sealed to the outside diameter of the rod seal 13770 may form a face seal against one of the stationary bearings 13764, 13765 to keep gas from leaking around the rod seal. In some embodiments, the axial movement of the floating bushing 13766 may be constrained by the a small axial distance between the two stationary bushings 13764, 13765 that is 0.002 to 0.004 larger than the thickness of the circumferential rib 13766A of the floating bushing 13766.

Still referring to FIGS. 68A-69C, in some embodiments, the operation of the floating bushing 13766 may be best understood by considering its motion as the axial pressure difference changes direction during every stroke. Herein, the axial pressure difference is the difference in pressure along the axis of the piston rod 13744 from one side of the rod seal 13770 or floating bushing 13766 to the other. The sealing action of the floating rod seal assemblies 13760 may be understood by considering one piston rod 13744 and the mated piston rod seal unit 13760, when the piston rod 13744 is at either the top or the bottom of the its stroke. At this point, there exists a large axial pressure difference across each of the floating rod seal assemblies 13760, which forces the floating bushing 13766 against one of the stationary bushings 13764, 13765 and forming a metal to metal seal 13769. At some point during each stroke of the piston rod 13744, the pressure difference between the workspace 13738 and the airlock 13736 will reverse. At about the same time, the pressure difference reverses, the axial pressure across each floating rod seal assembly 13760 is zero. The floating bushing 13766 may move radially within floating rod seal assembly 13760, when the pressure difference is near zero and self-centered on the piston rod 13744. A delay between a zero pressure difference across the piston rod seal unit 13750 and zero axial pressure difference across the floating rod seal assembly 13760 may be due to flow resistances and volumes within/across the piston rod seal unit 13750. As the piston rod 13744 continues its stroke, the pressure difference across the floating rod seal assembly 13760 reforms in the opposite direction and forces the floating bushing 13766 against the other bushing 13764 or 13765, reforming a metal seal. Thus, the floating bushing 13766 may move radially during part of each stroke to accommodate changes in the motion of the piston rod 13744 and form a seal against one of the bushings 13764, when significant pressure difference occurs between the working space 13738 and the airlock 13736.

Figure 69C:
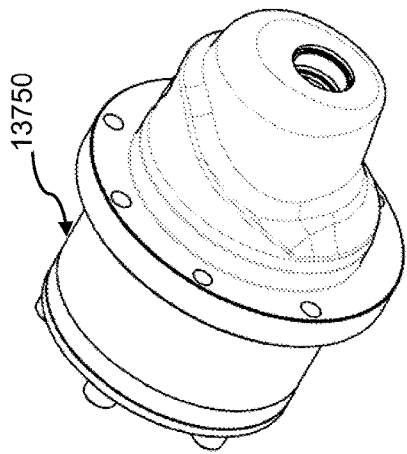
FIG. 69C is an isometric view of one embodiment of a piston rod seal unit.
Figure 69B:
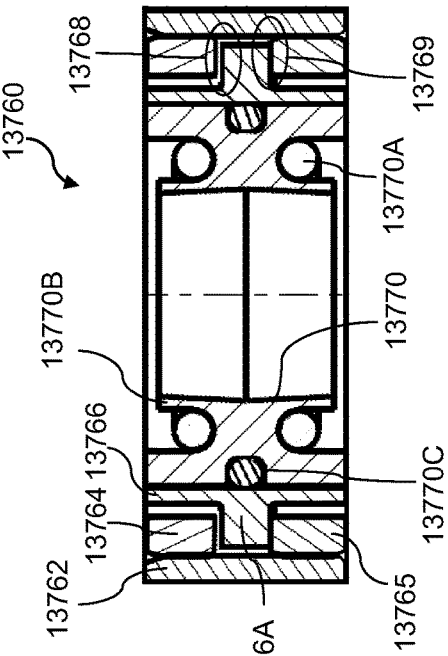
FIG. 69B is a cross-section of one embodiment of a floating rod seal assembly.
Figure 69A:
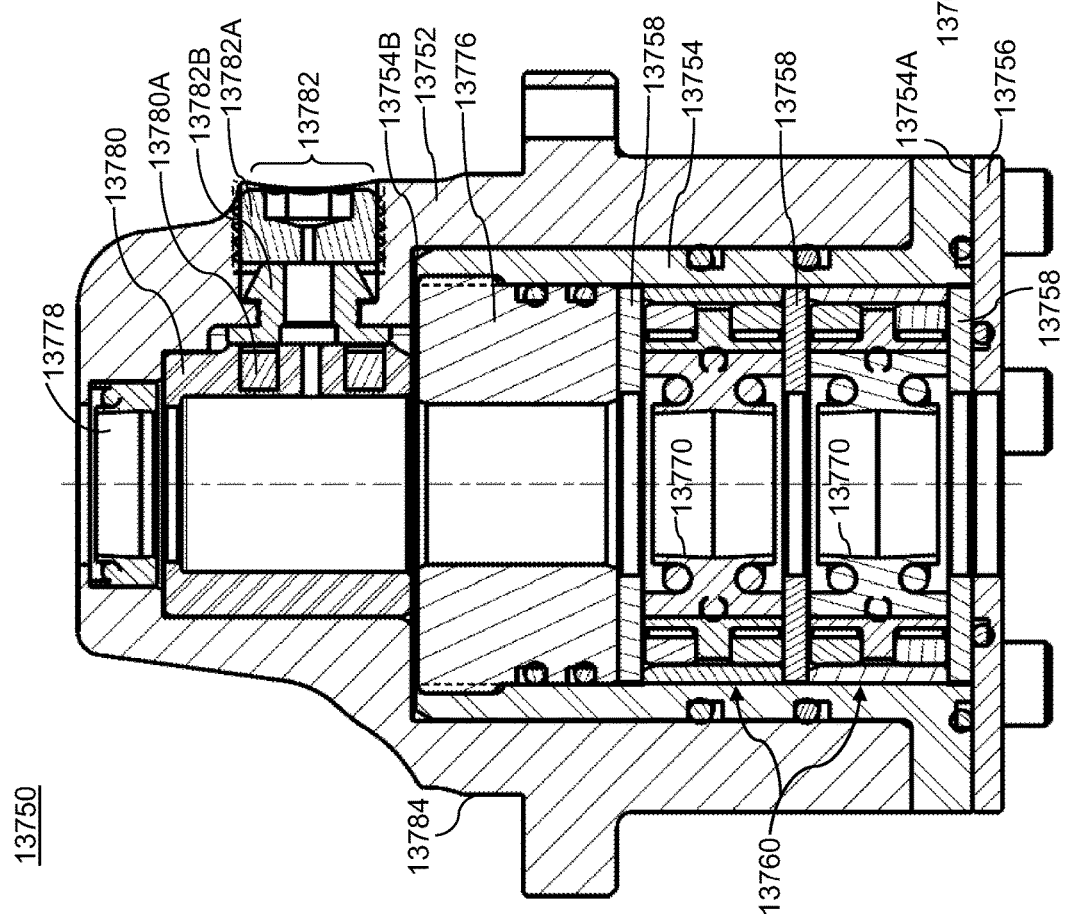
FIG. 69A is a cross-section of one embodiments of a piston rod seal unit.
Figure 69D:
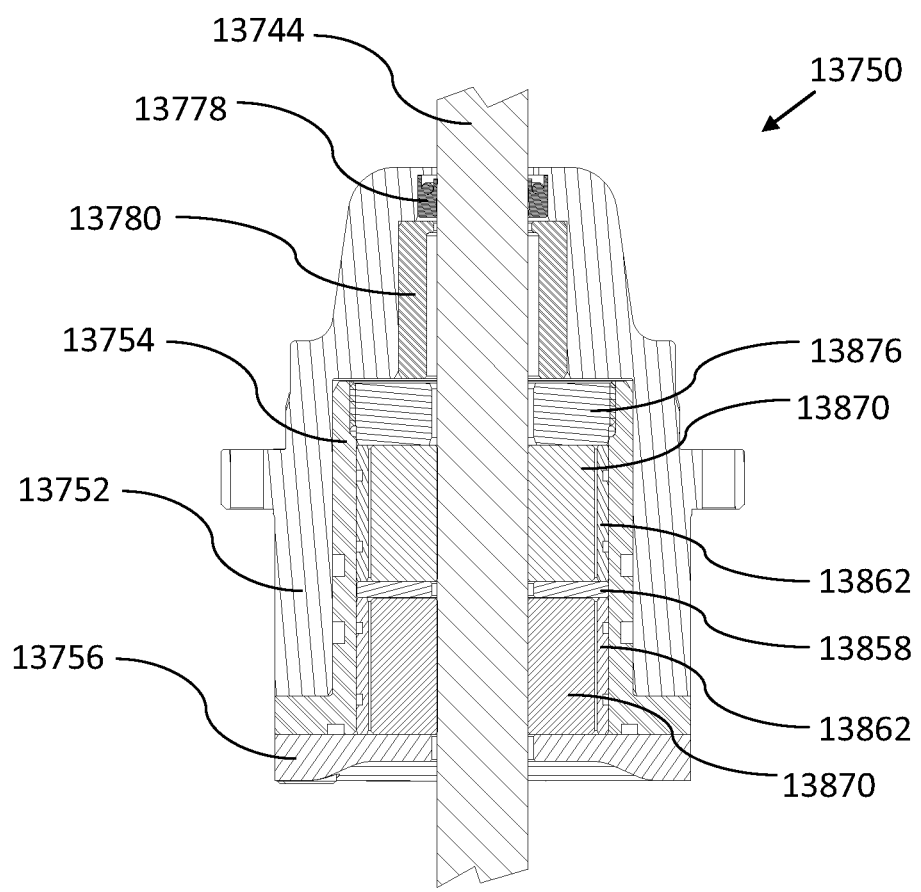
FIG. 69D is a cross-section of an embodiment of a piston rod seal unit with clearance seals.

Referring now to FIG. 69D, in some embodiments, the piston rod seal unit 13750 may include one or more floating clearance bushing 13870 that may provide a clearance seal with the piston rod 13744. The clearance seal is a long and narrow radial gap between the outside diameter of the piston rod 13744 and the inside diameter of the floating clearance bushing 13870 that creates enough flow resistance that an insignificant amount of working gas leaks past the clearance seal. The oscillating pressure of the workspace about the average pressure of the air lock assures that any gas that leaks from the workspace when the workspace pressure is relative to the air lock will leak back to the air lock when the workspace pressure is low.

In some embodiments, the inside diameter of the floating clearance bushing 13870 is 0.0005 to 0.001 inch larger than the outside diameter of the piston rod 13744 at room temperature and the floating clearance bushing 13870 is 0.71 inches long. The piston rod outer diameter, in some embodiments, may increase, for example, by a few ten-thousandths of an inch, due to thermal expansion during operation, when the rod may be approximately 30 to 70° C. above room temperature. In some embodiments, to seal the work space 13738 from the air lock 13736 (FIG. 68A), the floating clearance bushing 13870 (FIG. 69D) may also form an axial seal to prevent gas from flowing around the outside diameter of the floating clearance bushing 13870. When the pressure is higher in the working space than the airlock, the floating clearance bushings 1370 may form axial face seals with end plate 13756 and the washer 13858. When the working space pressure is lower than the air lock pressure, the floating clearance bushings will form an axial face seals with the threaded fitting 13876 and the washer 13858.

In various embodiments, the outer rings 13862 may be sized to allow the floating clearance bushings 13870 to move radially and minimize axial movement. In some embodiments, the outer ring 13862 may have an inner diameter that is, e.g., 0.03 inch, larger than the outside diameter of the floating clearance bushing 13870 and the axial length of the outer ring 13862 may be e.g. 0.0002 to 0.0005 inch, longer than the floating clearance bushing. In some embodiments the length of the outer rings 13862 may be matched to the length of the floating clearance bushing 13870. The floating clearance bushings 13870, washer 13858, outer rings 13862 may be assembled into the housing 13754 and this assembly may be axially held in place between the end plate 13756 and the threaded fitting 13876. The threaded fitting 13876 threads into the housing 13754 and contacts the outer rings 13862, which thereby set the axial spacing for the floating clearance bushings 13870. The embodiment in FIG. 69D may include the particle trap 13780, scrapper ring 13778, port and filter described for FIG. 69A. In other embodiments, the two floating clearance bushings 13870 and washer 13858 in FIG. 69D may be replaced with a single floating clearance bushing to reduce part count and cost. The single floating clearance bushing may in some examples be as long as two of the floating clearance bushings 13870 in FIG. 69D.

Figure 69E:
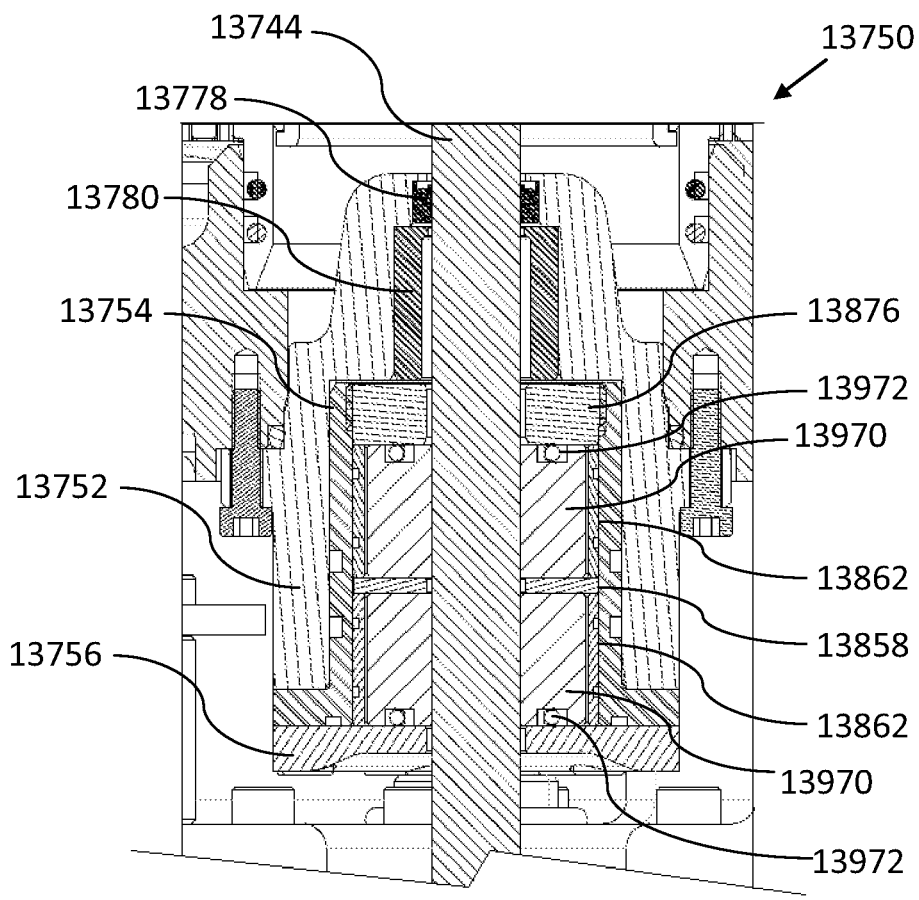
FIG. 69E is a cross-section of an embodiment of a piston rod seal unit with clearance seals.

Referring now to FIG. 69E, in some embodiments, the piston rod seal unit 13750 includes one or more floating clearance bushings 13970 and a face seal 13972 on one end of each floating clearance bushing 13970, where the floating clearance bushing 13970 provides a clearance seal with the piston rod 13744. The face seals 13972 may take many forms including but not limited to energized lip seals or o-rings. The face seals 13972 may provide improved axial sealing of the floating clearance bushing 13970 to the threaded fitting 13876 and end plate 13756. The use of the face seal may be beneficial for many reasons, including but not limited to, it may allow use of rougher surface finishes on the ends of the bushings and mating surfaces. The embodiment in FIG. 69E may include the particle trap 13780, scrapper ring 13778, port and filter described for FIG. 69A and the outer rings 13862, washer 13858, and housing 13754 described in FIG. 69D.

Figure 69F:
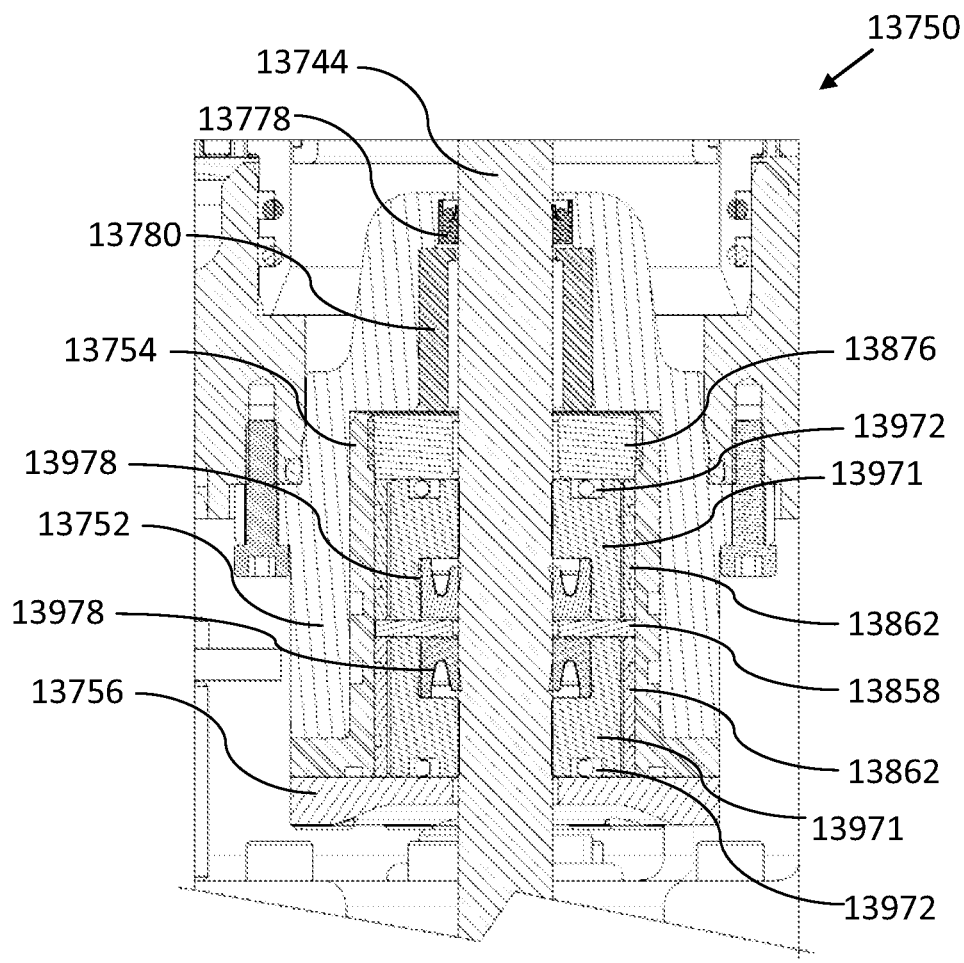
FIG. 69F is a cross-section of an embodiment of a piston rod seal unit with a hybrid clearance and lip seal.

Referring now to FIG. 69F, in some embodiments, the piston rod seal unit 13750 may include a hybrid seal that includes a floating clearance bushing 13971 and an energized lip seal 13752. In some embodiments, the hybrid seal may provide better sealing and a longer "life" or performance time than either a clearance seal or a lip seal could by themselves. The lip seal 13752 may provide a better seal than a clearance seal as the lip seal 13752 contacts the moving piston rod 13744. The clearance seal between the floating clearance bushing 13971 and the piston rod may reduce the pressure drop across the lip seal 13752, which may extend the "life" or performance time of the lip seal. The floating seals 13971 may include face seals 13972 in some embodiments. The embodiment in FIG. 69F may include the particle trap 13780, scrapper ring 13778, port and filter described for FIG. 69A and the outer rings 13862, washer 13858, and housing 13754 described in FIG. 69D.

The floating clearance bushings in FIGS. 69D-69F in various embodiments may be formed from a material with a low coefficient of friction, low wear and high strength. Materials for floating clearance bushings include, but are not limited to, one or more of the following: PTFE, Rulon, engineered plastics, graphite and graphite blends. In some embodiments, the material may be graphite impregnated with antimony, for example, from the SGL Carbon Company of Germany produces graphite impregnated with antimony under the grade EK3205.

Linear Cross-Head Bearing

Figure 71A:
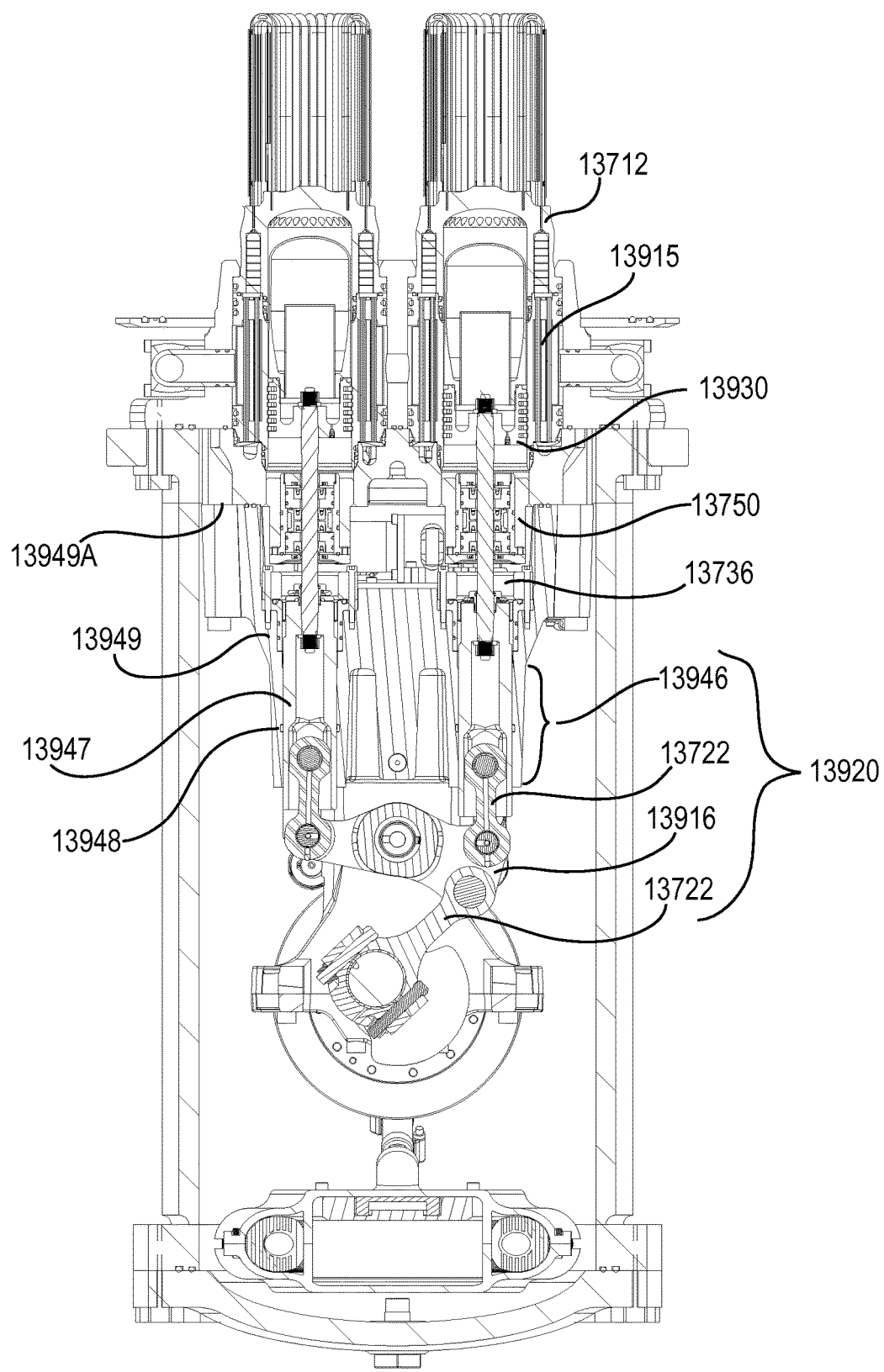
FIG. 71A is a cross-section of one embodiment of a Stirling Engine with an linear-cross-head bearing.

Referring now to FIG. 71A, which shows a cross-section of an embodiment of a Stirling engine with a drive 13920 to convert the linear motion of the piston 13930 into rotary motion of the crankshaft and generator. Drive 13920 is one example of a drive to convert linear motion of the pistons to rotary motion of the generator. Another example of a drive to convert linear motion of the pistons to rotary motion of the generator is in U.S. Pat. No. 6,253,550, which is incorporated by reference.

Still referring to FIG. 71A, the piston 13930 is fully guided by a cross-head in the form of linear bearing 13946. The linear cross-head bearing 13946 receives all the side loads in the lubricated drive of the engine and removes all side loads from seals on the piston and piston rod. The lubricated linear cross-head bearing may absorb the side loads with little friction and near zero wear. The linear cross-head bearing 13946 has a sufficiently large length/diameter ratio, sufficient small radial clearance and/or sufficient accurate alignment with the heater head to assure that the piston 13930 will not contact cylinder walls of the heater head 13712 nor the cooler 13915 during operation of the engine. In addition, the linear cross-head bearing 13946 may receive side loads from the link rod 13719. The linear cross-head bearing 13946 transfers these side loads to the engine block 13949 without negligible wear or acceptable friction loads.

Figure 71B:
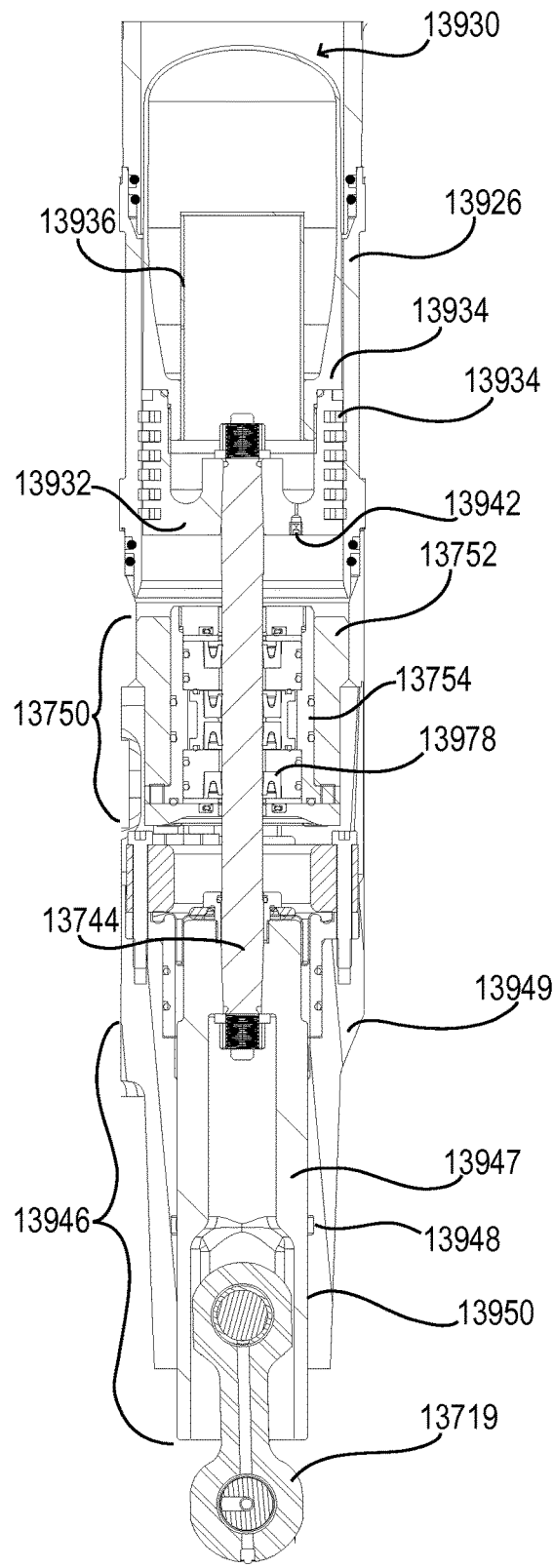
FIG. 71B is a cross-section of one embodiment of a piston, piston rod and linear-cross-head bearing.
Figure 71C:
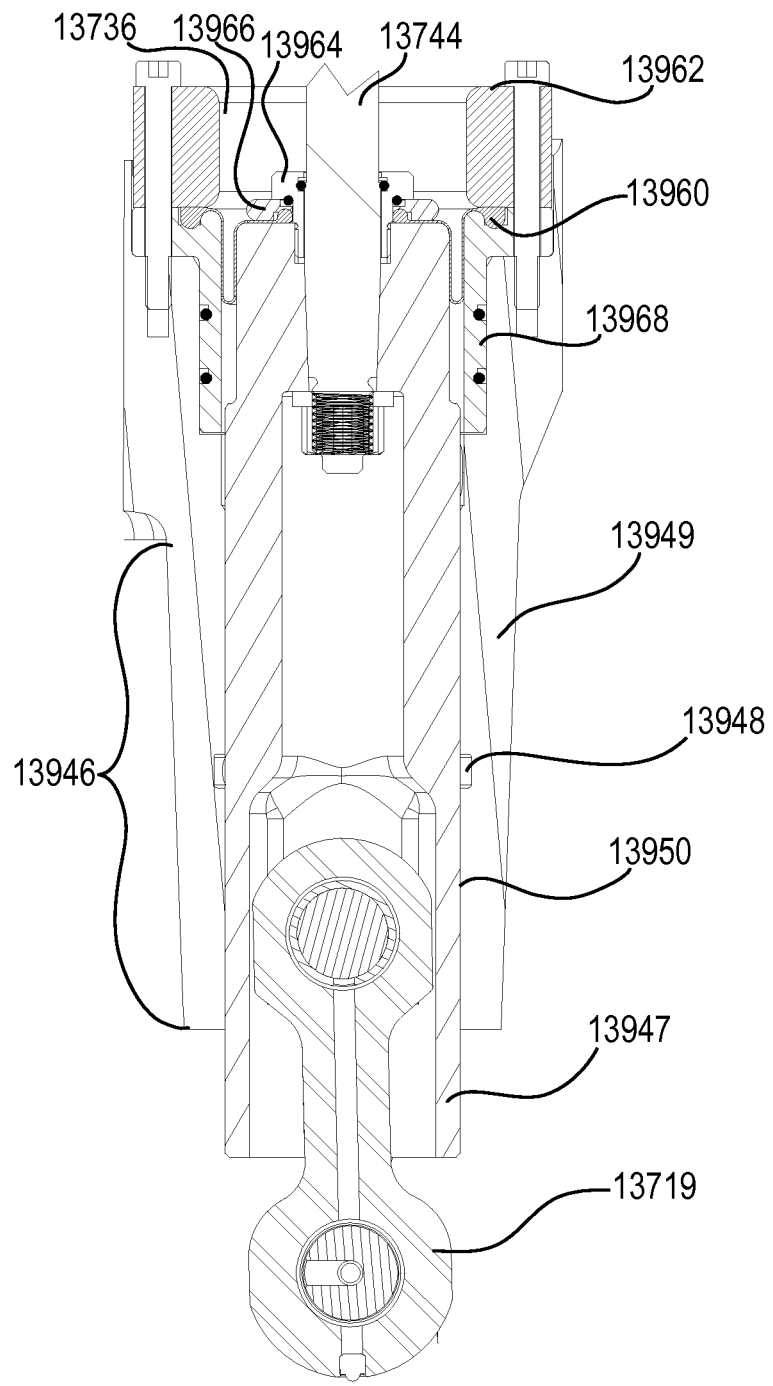
FIG. 71C is a cross-section of one embodiment of a linear-cross-head bearing.

The linear cross-head bearing 13946 in FIGS. 71A-71C is configured to absorb all the side loads from the link rod 13719 and fully guide the piston 13930 and piston rod 13744 without creating side loads on the piston seals 13934 or piston rod seal unit 13750. The linear cross-head bearing 13946 is preferably a hydrodynamic bearing that is fed pressurized oil. In one example, pressurized oil is feed into the bearing 13946 at annulus 13948 from passages (not shown) in the engine block 13949. The ratio of length over the diameter of the linear bearing 13946 is at least 2.0 In a preferred embodiment, length over diameter ratio is 2.20. The diameter of the linear cross-head bearing 13946 has a diameter of 1.45 inches or more than 63% of the heater head 13712 inner diameter. The selection of the linear bearing diameter balances axial stiffness which increases with diameter and frictional losses which also increase with diameter. Other embodiments of the linear cross-head bearing may have different diameters. The diametrical gap of the linear cross-head bearing 13946 is generally equal to the diameter of the bearing divided by 1000. In a preferred embodiment the nominal diametrical gap for the linear cross-head bearing is 0.0015 inches. The axial alignment of the linear cross-head bearings 13746 with the heater head 13712, cooler 13915 and piston rod seal unit 13750 is improved by boring the 4 guide holes for the 4 linear cross-head bearings 13946 in a single setup. The 4 guide holes may be linebored to provide holes that straight and perpendicular to the engine block face 13949A.

Referring now to FIG. 14, the linear cross-head bearing removes the need for guide ring 1616 on the piston 1600. The guide ring 1616 can be a wear component that, in some instances, has a shorter life than the pressure seals 1606, 1614. The guide rings also occupy axial space on the pistons that could be used for additional pressure seals 1606 1614. In some instances, the life of the pressure seals 1606, 1614 increases with the number of seals used on a given piston.

Referring now to FIG. 71B which presents a cross-sectional view of a single piston/cylinder in a multi-cylinder engine and a portion of the drive assembly. The linear cross-head bearing 13946 fully guides the motion of the piston rod 13744 and the piston assembly 13930. The linear cross-head bearing 13946 constrains the piston/piston rod to linear movement with minimal rotation so that the piston 13930 cannot contact the cylinder walls 13926. In one embodiment, the linear cross-section bearing 13946 has a minimum engaged length of 3.2 inches and a diametrical clearance of 0.0015 inches, so that the maximum radial movement of the piston base is less than 0.005 inches which is half of the radial gap between the piston base 13932 and the cylinder wall 13926.

In one embodiment, the linear cross-head bearing 13946 comprises a journal or shaft 13947 that rides on a hydrodynamic layer of oil inside a hole or guide 13950 within the engine block 13949. The journal 13947 may be connected at a first end via a rotatable joint to the link rod 13719 which in turn is connected to the rocking beam 13916 (FIG. 71A). The journal 13947 may be rigidly connected on the second end to the piston rod 13744. An oil pump (not shown) supplies pressurized oil to the gap between the journal 13947 and the guide 13950 via oil annulus 13948 in guide 13950. In a preferred embodiment the oil annulus is located approximately equal distant from both ends of the guide 13950. The diametrical gap between the journal 13947 and the guild 13950 may be a value between 0.001 inch and 0.002 inch. In a preferred embodiment, the diametrical gap is 0.0015 inch. The guide 13950 is the section of the hole through the engine block 13949 that has a nearly constant diameter that is slightly larger than the journal diameter. In a preferred embodiment the guide diameter is 0.001 to 0.002 inch larger than the journal diameter. The linear cross-head bearing 13946 is located below the piston, the piston rod seals and the bellows that isolated the oil lubricated drive from the air lock and the working space.

Referring now to FIG. 71C, in some embodiments the second end of the journal 13947 comprises an inner mount and inner support a rolling diaphragm or bellows 13960 and a mounting point for the piston rod 13744. In one example, the inner bead of the bellows 13960 is compressed to create a gas tight seal by washer 13966 that is held in place by a hollow screw 13964 that threads into the top of the journal 13947 while the piston rod 13744 pass through the hollow screw 13964. The outer bead of the bellows 13960 is trapped between collar 13962 and bellows support 13968 that is mounted in the engine block 13949. In normal operation, the pressure in air lock 13766 is maintained above the crankcase pressure creating a positive pressure difference. The positive pressure forms the bellows as pictured in FIG. 71C. The positive pressure difference presses the bellows 13960 against the outside diameter of the journal 13947 and the inside diameter of the support 13968, so that stress on the bellows is generally limited to a small unsupported U shape. In use, the pressure difference between the airlock 13736 and the crankcase may reverse so that the higher crank case will push the bellows 13960 up into the airlock space. The collar 13962 is sized and includes a smooth lower corner to support the bellows 13960 out the outside diameter in this inverted position which will reduce the stress on the bellows and the likelihood of bellows failure. In a preferred embodiment, the collar 13962 has an inner diameter that matches the inner diameter of the bellows support 13968 and a lower corner radius of 0.10 inches.

Figure 72:
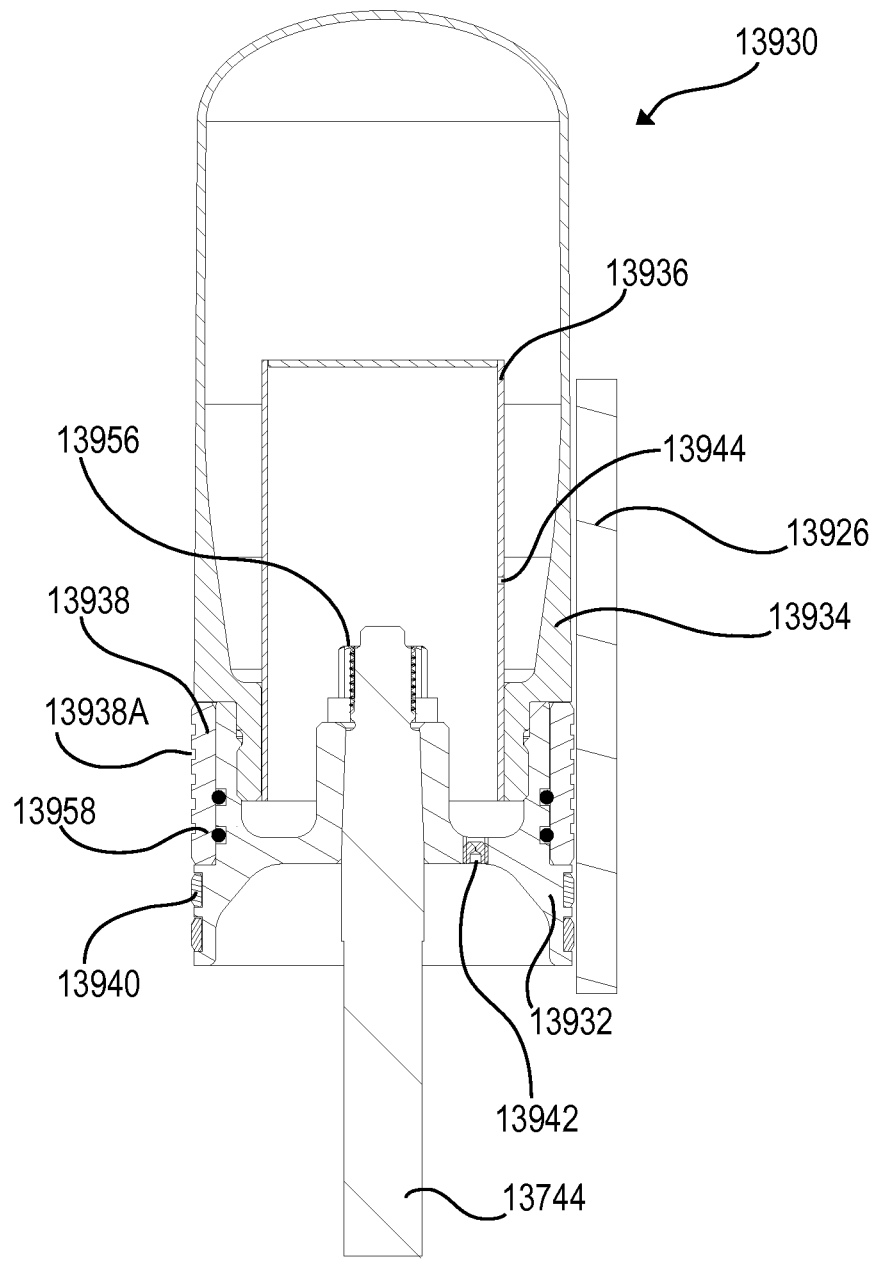
FIG. 72 is a cross-section of one embodiment of a piston with a clearance seal.

Referring now to FIG. 72, one embodiment of the piston 13930 includes a clearance seal 13938 that provides pressure isolation between the workspace above and below the piston without contacting the cylinder walls. A no-contact seal would not wear and would have a much longer or even infinite life. As the piston seals can the first element of a Stirling engine to wear out or fail, a clearance seal could dramatically increase the life and reduce the time between failures or maintenance events of the whole Stirling engine.

The outside diameter of the clearance seal 13938 nearly equal, but just smaller than the inside diameter of the mating cylinder 13926 (in FIG. 71B). In one embodiment, the clearance seal 13938 is fabricated from one or more non-metal materials including but not limited to graphite, PTFE, Ultra High Molecular Weight Polyethylene (UHMWPE), ceramic, composites containing graphite, composites containing antimony, composites containing PTFE, composites containing UHMWPE. The cylinder inner diameter may have a hard surface composed of material including but not limited to tool steel, stainless steel, ceramic coatings. In one embodiment, the outer diameter of the clearance seal 13938 is 0.0005 to 0.001 inch smaller than the matting cylinder inner diameter. In another embodiment, the outer diameter of the clearance seal 13938 is machined to be nominally equal to the cylinder inner diameter. The piston 13930 is assembled into the cylinder and operated to wear down interferences on the softer clearance seal 13938.

In some embodiments, the piston clearance seal 13938 may be graphite or a graphite impregnated with antimony and or may be made of any material and/or any combination and/or composite of material. In some embodiments, the clearance seal 13938 may be made of antimony impregnated graphite which may be from the SGL Carbon Company of Germany.

In one embodiment, the clearance seal 13938 includes a plurality of radial grooves 13938A in the outer diameter. The grooves increase axial flow resistance in the gap between the clearance seal 13938 and the cylinder wall. One theory, among others, suggests that the repeated grooves 13938A perpendicular to axial flow disrupt that flow and increase the flow resistance by creating repeated expansions and contractions. In one embodiment the clearance seal 13938 is mounted in the piston base 13932 and held in place by the piston dome 13934. Gas is prevented from leaking between the clearance seal and the piston base by one or more o-rings 13958.

The piston 13930 comprises a piston base 13942 that mounts to the piston rod 13744, the piston dome 13934 and one or more seals 13938. The piston may also comprise one or more guide rings 13940 that may be required in some embodiments of the engine. In other embodiments of the piston 13930, the guide rings 13940 are not included. The piston dome 13934 may further comprise a inner dome 13936 that reduces the transfer of thermal energy from the closed end of the piston dome 13934 to the piston base 13942. The overall engine efficiency is improved by minimizing parasitic heat transfer from the hot end to the cold end of the engine. Parasitic heat transfer is the transfer of thermal energy from the hot end to the cold end that does not involve the working fluid. One example of parasitic heat transfer is axial heat transfer from the hot closed end of the piston dome 13934 that is near the temperature of the heater to the cold piston base 13932 that is near the temperature of the cooler. Therefore, reducing axial heat transfer through the piston will increase the engine efficiency. In addition, the contact seals 13934 (FIG. 71B) last longer if they are kept cooler, so decreasing the axial heat transfer through the piston will increase the life of the contact seals. One theory, among others, states the inner dome 13936 reduces axial heat transfer as a radiation shield between the closed end of the piston dome 13934 and the piston base 13932. Another theory states inner dome reduces axial heat transfer by reducing convection in the dome created in part by the oscillating movement of the piston. The mass of gas in the piston dome 13934 and inner dome 13936 changes during engine startup and during some transient conditions. A port 13944 in the inner dome 13936 and a small orifice 13942 in the piston base 13932 allow the gas to move into and out of the piston 13930. The orifice 13942 is small enough to act as a low pass filter on the pressure in the piston. The working pressure below the piston base 13932 may change by more than one hundred psi every engine rotation. The orifice 13942 is small enough to keep the pressure in the piston nearly constant over an engine rotation or cycle. In a preferred embodiment, the orifice 13942 has an 0.004 inch diameter. The pressures in the inner dome and the outer dome do not oscillate, so the port 13944 between the two volumes can be ten times larger.

In some Stirling engines, reciprocating seals on piston are wear items that wear away over time with normal use. The life of these piston seals determines the time between failures or the time between maintenance events of the entire engine. A long time between maintenance events and a long life are important to the economic success of the Stirling. The time between maintenance or failures could be dramatically increased if the piston seals and piston rod seals were not wear items such as clearance seals. The decreased maintenance would increase the value and utility of the Stirling engine. An embodiment of the Stirling engine without non-wearing seals comprises an oil lubricated drive 13920 (FIG. 71A) and the linear cross-head bearing 13946 (FIG. 71A-C), a clearance seal 13938 (FIG. 72) on the piston and a piston rod seal unit 13750 with clearance seals 13862 (FIG. 69D, FIG. 69E). This embodiment with an oil lubricated drive and non-contact reciprocating seals may have a time between maintenance events that is many times longer than a Stirling engine with standard sliding seals.

In an embodiment of the Stiring engine where the piston seal and or piston rod seal are contact seals, the linear cross-head bearing improves the life of the seals and extends the time between failures or the time between maintenance events for the engine. The piston and piston rod are fully guided or constrained by the linear cross-head bearing so the possible radial movement of the piston and or piston rod is limited to an acceptably small value as described above. In addition, because the linear cross-head bearing does not wear, the radial movement of the piston and piston rod does not change over time. The reduced radial movement limits the loads applied to the piston seals and the piston rod seals and the reduce loads increases the life of the these seals.

Lubricating Fluid Pump and Lubricating Fluid Passageways

In some embodiments, the lubricating fluid is oil. The lubricating fluid is used to lubricate engine parts in the crankcase 2206, such as hydrodynamic pressure fed lubricated bearings. Lubricating the moving parts of the engine 2200 serves to further reduce friction between engine parts and further increase engine efficiency and engine life. In some embodiments, lubricating fluid may be placed at the bottom of the engine, also known as an oil sump, and distributed throughout the crankcase. The lubricating fluid may be distributed to the different parts of the engine 2200 by way of a lubricating fluid pump, wherein the lubricating fluid pump may collect lubricating fluid from the sump via a filtered inlet. In the exemplary embodiment, the lubricating fluid is oil and thus, the lubricating fluid pump is herein referred to as an oil pump. However, the term "oil pump" is used only to describe the exemplary embodiment and other embodiments where oil is used as a lubricating fluid, and the term shall not be construed to limit the lubricating fluid or the lubricating fluid pump.

Tube Heat Exchanger

Figure 19:
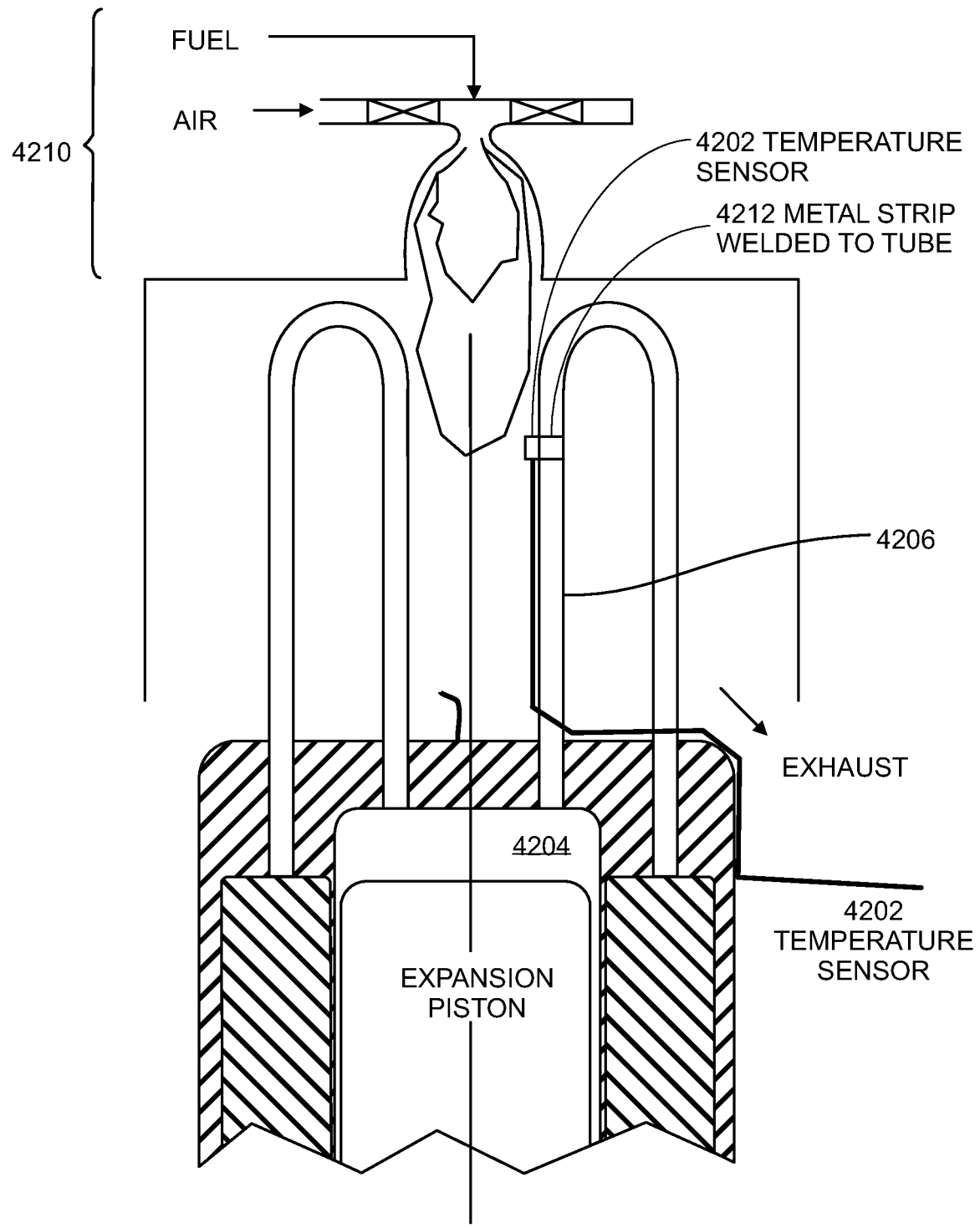
FIG. 19 shows a view of a heater head of an engine in accordance with one embodiment.

External combustion engines, such as, for example, Stirling cycle engines, may use tube heater heads to achieve high power. FIG. 19 is a cross-sectional view of a cylinder and tube heater head of an illustrative Stirling cycle engine. A typical configuration of a tube heater head 4200, as shown in FIG. 19, uses a cage of U-shaped heater tubes 4202 surrounding a combustion chamber 4204. A cylinder 4206 contains a working fluid, such as, for example, helium. The working fluid is displaced by the piston 4208 and driven through the heater tubes 4202. A burner 4210 combusts a combination of fuel and air to produce hot combustion gases that are used to heat the working fluid through the heater tubes 4202 by conduction. The heater tubes 4202 connect a regenerator 4212 with the cylinder 4204. The regenerator 2812 may be a matrix of material having a large ratio of surface to area volume which serves to absorb heat from the working fluid or to heat the working fluid during the cycles of the engine. Heater tubes 2802 provide a high surface area and a high heat transfer coefficient for the flow of the combustion gases past the heater tubes 4202. Various embodiments of tube heater heads are discussed below, and in U.S. Pat. No. 6,543,215 and U.S. Pat. No. 7,308,787, which are, as previously mentioned, incorporated by reference in their entireties.

FIG. 19 is a side view in cross section of a tube heater head and a cylinder. The heater head 4206 is substantially a cylinder having one closed end 4220 (otherwise referred to as the cylinder head) and an open end 4222. Closed end 4220 includes a plurality of U-shaped heater tubes 4204 that are disposed in a burner 4200. Each U-shaped tube 4204 has an outer portion 4216 (otherwise referred to herein as an "outer heater tube") and an inner portion 4218 (otherwise referred to herein as an "inner heater tube"). The heater tubes 4204 connect the cylinder 4202 to regenerator 4210. Cylinder 4202 is disposed inside heater head 4206 and is also typically supported by the heater head 4206. A piston 4224 travels along the interior of cylinder 4202. As the piston 4224 travels toward the closed end 4220 of the heater head 4206, working fluid within the cylinder 4202 is displaced and caused to flow through the heater tubes 4224 and regenerator 4210 as illustrated by arrows 4230 and 4232 in FIG. 19. Referring to FIG. 19, as mentioned above, the closed end of heater head 4220, including the heater tubes 4202, is disposed in a burner 4200 that includes a combustion chamber 4204. Hot combustion gases (otherwise referred to herein as "exhaust gases") in combustion chamber 4204 are in direct thermal contact with heater tubes 4202 of heater head 4220. Thermal energy is transferred by conduction from the exhaust gases to the heater tubes 4202 and from the heater tubes 4202 to the working fluid of the engine, typically helium. Other gases, such as nitrogen, for example, or mixtures of gases, may be used, with a preferable working fluid having high thermal conductivity and low viscosity. Non-combustible gases are used in various embodiments. Heat is transferred from the exhaust gases to the heater tubes 4202 as the exhaust gases flow around the surfaces of the heater tubes 4202. Arrows 4230 show the general radial direction of flow of the exhaust gases. The exhaust gases exiting from the burner 4210 tend to overheat the upper part of the heater tubes 4202 (near the U-bend) because the flow of the exhaust gases is greater near the upper part of the heater tubes than at the bottom of the heater tubes (i.e., near the bottom of the burner 4200).

The overall efficiency of an external combustion engine is dependent in part on the efficiency of heat transfer between the combustion gases and the working fluid of the engine.

Returning to FIG. 19, in general, the inner heater tubes 4218 are warmer than the outer heater tubes 4216 by several hundred degrees Celsius. The burner power and thus the amount of heating provided to the working fluid is therefore limited by the inner heater tube 4218 temperatures. The maximum amount of heat will be transferred to the working gas if the inner and outer heater tubes are nearly the same temperature. Generally, embodiments, as described herein, either increase the heat transfer to the outer heater tubes or decrease the rate of heat transfer to the inner heater tubes.

Figure 17:
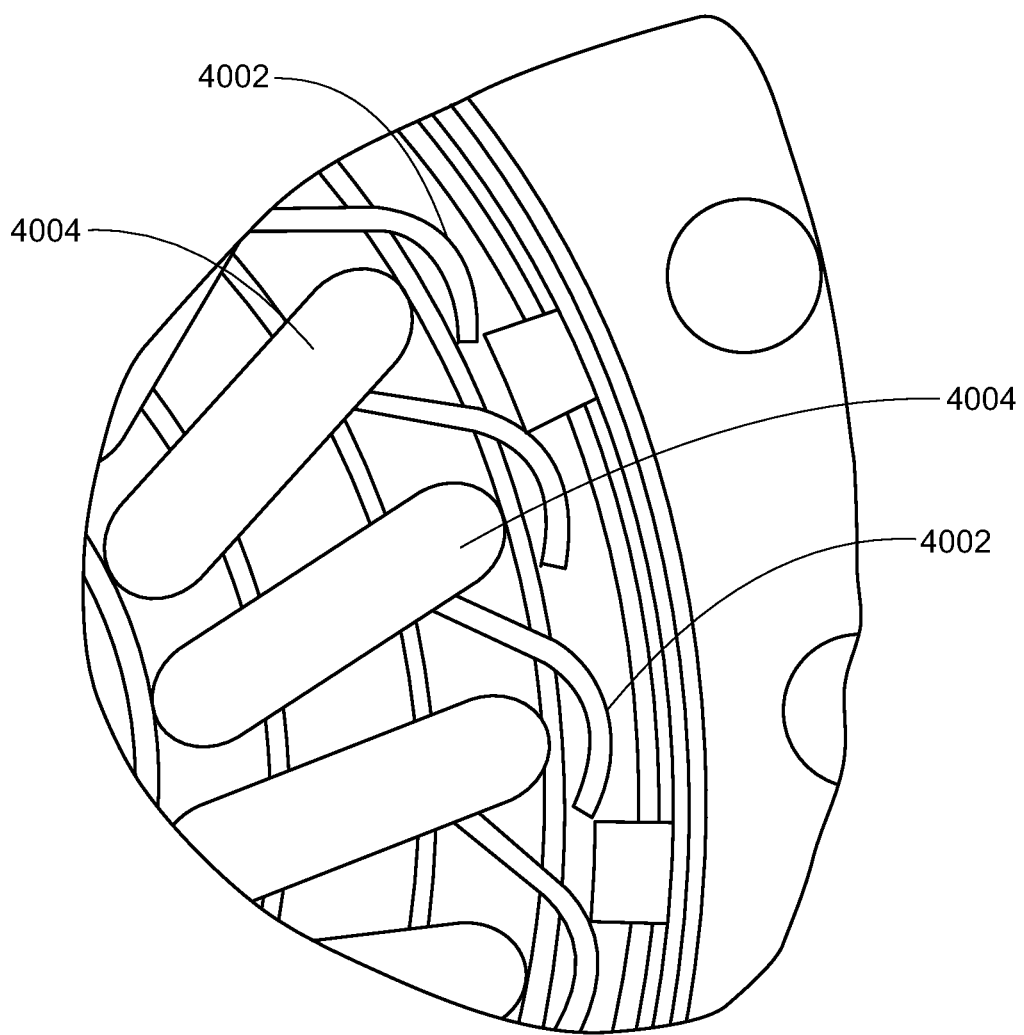
FIG. 17 shows a view of a tube heat exchanger in accordance with one embodiment.

An alternative embodiment of flow diverter fins is shown in FIG. 17. FIG. 17 is a top view of a section of a tube heater head including single flow diverter fins in accordance with an embodiment. In this embodiment, a single flow diverter fin 4002 is connected to each outer heater tube 4004. In some embodiments, the flow diverter fins 4002 are attached to an outer heater tube 4004 using a nickel braze along the full length of the heater tube. Alternatively, the flow diverter fins may be brazed with other high temperature materials, welded or joined using other techniques known in the art that provide a mechanical and thermal bond between the flow diverter fin and the heater tube. Flow diverter fins 4002 are used to direct the exhaust gas flow around the heater tubes 4004, including the downstream side of the heater tubes 4004. In order to increase the heat transfer from the exhaust gas to the heater tubes 4004, flow diverter fins 4002 are thermally connected to the heater tube 4004. Therefore, in addition to directing the flow of exhaust gas, flow diverter fins 4002 increase the surface area for the transfer of heat by conduction to the heater tubes 4004, and thence to the working fluid.

Figure 18:
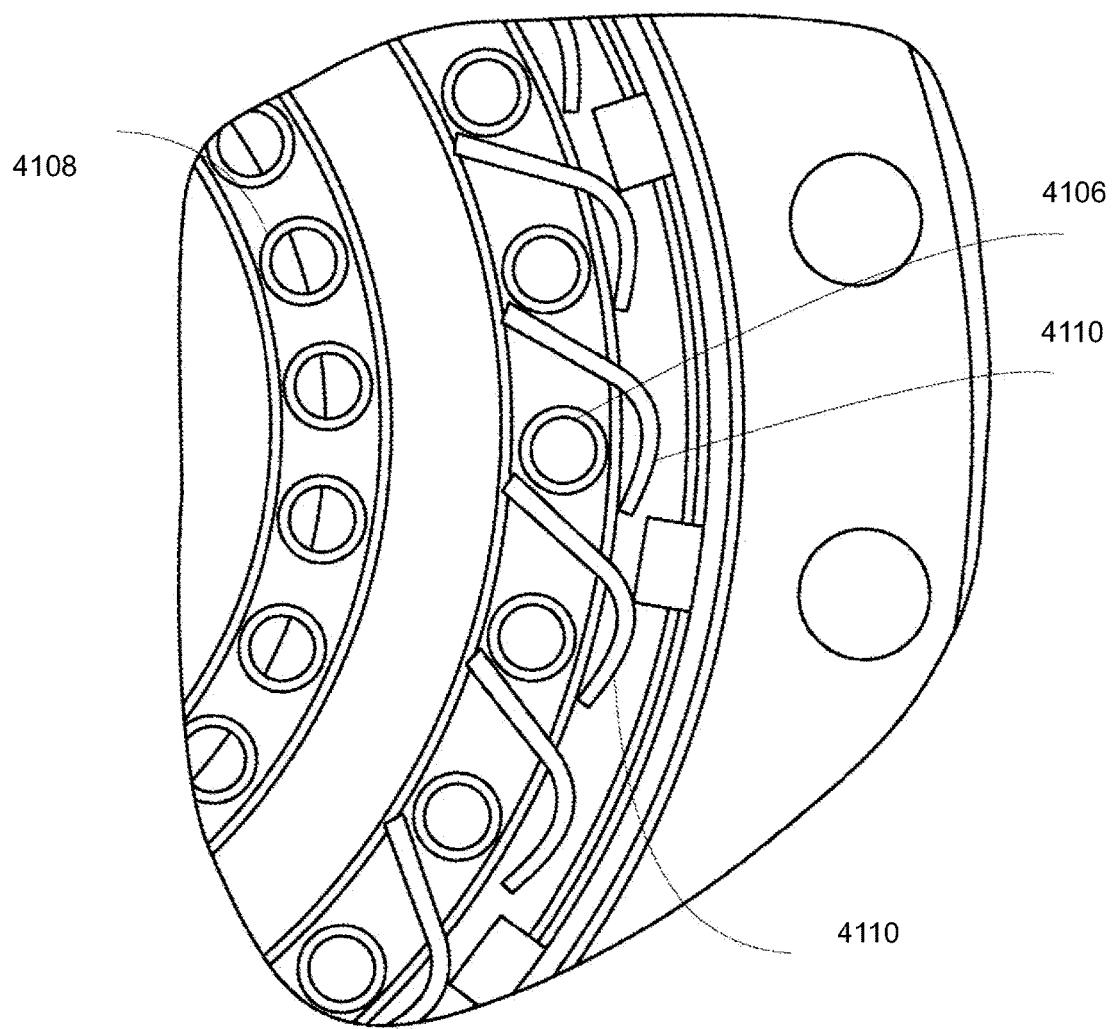
FIG. 18 shows a portion of a cross section of a tube heat exchanger in accordance with one embodiment.

FIG. 18 is a top view in cross-section of a section of a tube heater head including the single flow diverter fins as shown in FIG. 17 in accordance with an embodiment. As shown in FIG. 18, a flow diverter fin 4110 is placed on the upstream side of a heater tube 4106. The diverter fin 4110 is shaped so as to maintain a constant distance from the downstream side of the heater tube 4106 and therefore improve the transfer of heat to the heater tube 4106. In an alternative embodiment, the flow diverter fins could be placed on the inner heater tubes 4108.

Engine performance, in terms of both power and efficiency, is highest at the highest possible temperature of the working gas in the expansion volume of the engine. The maximum working gas temperature, however, is typically limited by the properties of the heater head. For an external combustion engine with a tube heater head, the maximum temperature is limited by the metallurgical properties of the heater tubes. If the heater tubes become too hot, they may soften and fail resulting in engine shut down. Alternatively, at too high of a temperature the tubes will be severely oxidized and fail. It is, therefore, important to engine performance to control the temperature of the heater tubes. A temperature sensing device, such as a thermocouple, may be used to measure the temperature of the heater tubes. The temperature sensor mounting scheme may thermally bond the sensor to the heater tube and isolate the sensor from the much hotter combustion gases. The mounting scheme should be sufficiently robust to withstand the hot oxidizing environment of the combustion-gas and impinging flame that occur near the heater tubes for the life of the heater head. One set of mounting solutions include brazing or welding thermocouples directly to the heater tubes. The thermocouples would be mounted on the part of the heater tubes exposed to the hottest combustion gas. Other possible mounting schemes permit the replacement of the temperature sensor. In one embodiment, the temperature sensor is in a thermowell thermally bonded to the heater tube. In another embodiment, the mounting scheme is a mount, such as a sleeve, that mechanically holds the temperature sensor against the heater tube.

FIG. 19 is a side view in cross section of a cylinder 4204 and a burner 4210. A temperature sensor 4202 is used to monitor the temperature of the heater tubes and provide feedback to a fuel controller (not shown) of the engine in order to maintain the heater tubes at the desired temperature. In some embodiments, the heater tubes are fabricated using Inconel 625 and the desired temperature is 930.degree. C. The desired temperature will be different for other heater tube materials. The temperature sensor 4202 should be placed at the hottest, and therefore the limiting, part of the heater tubes. Generally, the hottest part of the heater tubes will be the upstream side of an inner heater tube 4206 near the top of the heater tube. FIG. 19 shows the placement of the temperature sensor 4202 on the upstream side of an inner heater tube 4206. In some embodiments, as shown in FIG. 19, the temperature sensor 4202 is clamped to the heater tube with a strip of metal 4212 that is welded to the heater tube in order to provide good thermal contact between the temperature sensor 4202 and the heater tube 4206. In one embodiment, both the heater tubes 4206 and the metal strip 4212 may be Inconel 625 or other heat resistant alloys such as Inconel 600, Stainless Steels 310 and 316 and Hastelloy X. The temperature sensor 4202 should be in good thermal contact with the heater tube, otherwise it may read too high a temperature and the engine will not produce as much power as possible. In an alternative embodiment, the temperature sensor sheath may be welded directly to the heater tube.

Figure 20A:
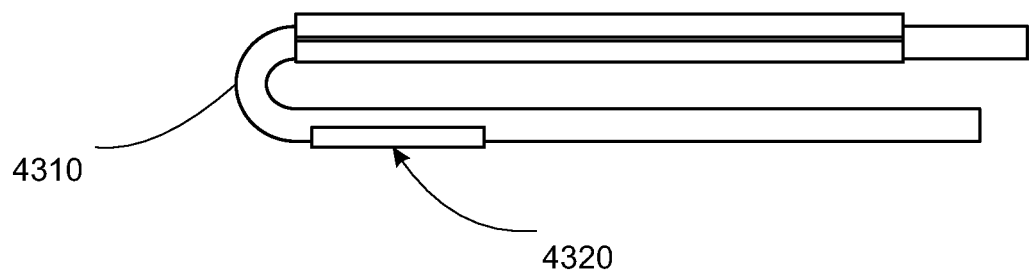
FIG. 20A shows a view of a tube heat exchanger in accordance with one embodiment.
Figure 20B:
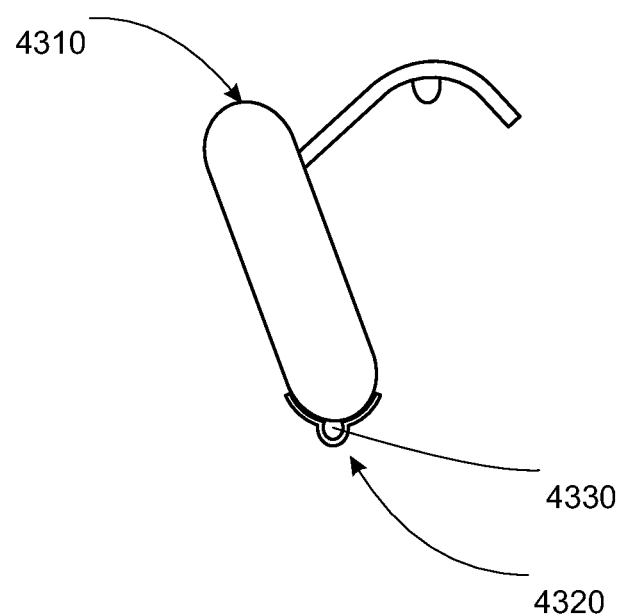
FIG. 20B shows a view of a tube heat exchanger in accordance with one embodiment.

In another embodiment, as shown in FIG. 20A-B, a temperature sensor mount 4320 is created with a formed strip or sheath of a refractory or high temperature resistant metal such as Inconel that is bonded to the exterior of the heater tube 4310. The sensor mount sheath 4320 is formed or shaped into a channel that when attached to the heater tube creates a void that accommodates a device. In a specific embodiment, the channel is V-shaped to accommodate the insertion of a thermal sensor such as a thermocouple device. The shaped channel is then bonded to the exterior of a heater tube 4310 as shown in FIG. 20A.

FIG. 20A shows a side view of the sensor mount sheath 4320 on the heater tube 4310, while FIG. 20B is a view along the axis of the sensor mount sheath 4320. The metal should be thin enough to form, yet thick enough to survive for the rated life of the heater head. In some embodiments, the metal is approximately between 0.005" and 0.020" thick. The metal may be bent such that the bend is along the length of the strip. This "V-channel" sheath 4320 is then affixed to the exterior of the heater tube by high temperature brazing. Prior to brazing, the sheath may be tack welded in several places to insure that the sheath does not move during the brazing process, as shown in FIG. 20A. Preferably, the braze compound used during brazing is typically a high nickel alloy; however, any compound which will withstand the brazing temperature will work. Alternatively the sheath may be bonded to the heater tube by electron beam or laser welding.

Now referring to FIG. 20B, a cavity 4330 is formed by affixing the sheath to the heater tube. This cavity 4330 is formed such that it may accept a device such as a thermocouple. When formed and brazed, the cavity may advantageously be sized to fit the thermocouple. Preferably, the fit is such that the thermocouple is pressed against the exterior of the heater tube. Preferably, the sheath is thermally connected to the heater tube. If the sheath is not thermally connected to the heater tube, the sheath may not be "cooled" by the working gas. The lack of cooling may cause the sheath to operate at or near the combustion gas temperatures, which are typically high enough to eventually burn through any metal. Brazing the sensor mount to the heater tube leads to a good thermal contact. Alternatively, the sensor mount sheath 4320 could be continuously welded along both sides to provide sufficient thermal connection.

Figure 21A:
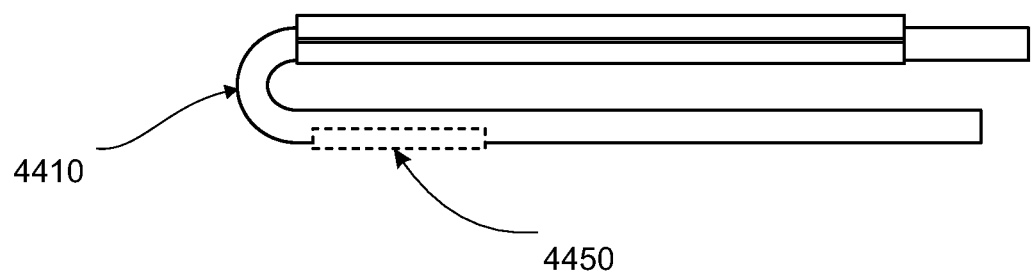
FIG. 21A shows a view of a tube heat exchanger in accordance with one embodiment.
Figure 21B:
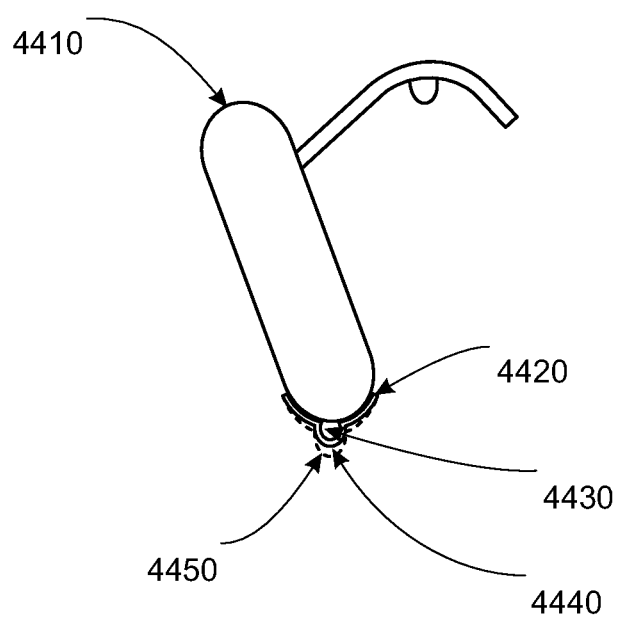
FIG. 21B shows a view of a tube heat exchanger in accordance with one embodiment.

In another embodiment, as shown in FIGS. 21A-B, a second strip of metal can be formed to create a shield 4450 over the sensor mount 4420. The shield 4420 may be used to improve the thermal connection between the temperature sensor, in cavity 4430, and the heater tube 4410. The shield insulates the sensor mount sheath 4420 from the convective heating of the hot combustion gases and thus improves the thermal connection to the heater tube. Furthermore, there is preferably an insulating space 4440 to help further insulate the temperature sensor from the hot combustion gases as shown in FIG. 21B.

Figure 22A:
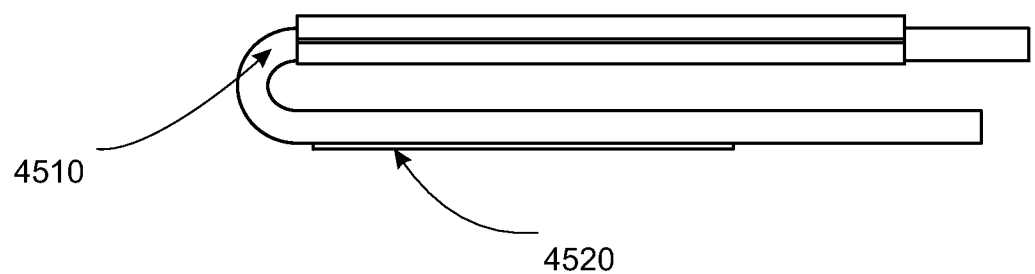
FIG. 22A shows view of a tube heat exchanger in accordance with one embodiment.
Figure 22B:
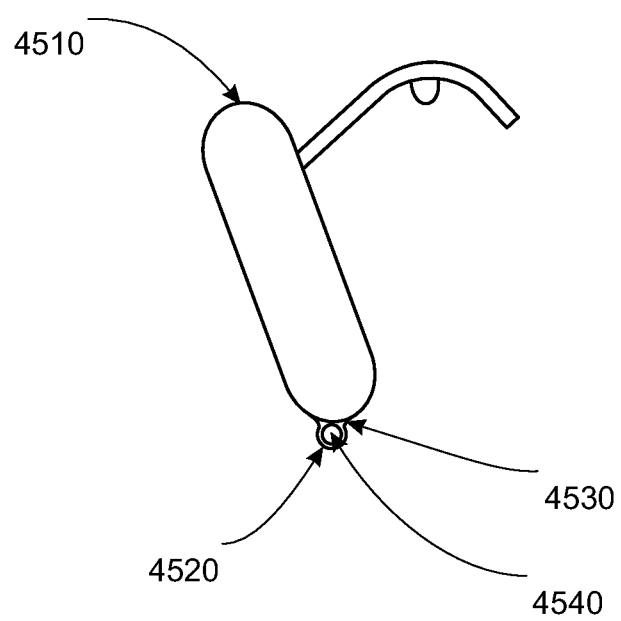
FIG. 22B shows a view of a tube heat exchanger in accordance with one embodiment.

In another specific embodiment, as shown in FIGS. 22A and 22B, the temperature sensor mount 4520 can be a small diameter tube or sleeve 4540 joined to the leading edge of the heater tube 4510. FIG. 22A shows a side view of the mount on the heater tube 4510, while FIG. 22B is a view along the axis of the tube 4540 or sleeve. The sensor tube 4540 is preferably brazed to the heater tube with a substantial braze fillet 4530. The large braze fillet 4530 will maximize the thermal bond between the heater tube and the sensor mount. In another embodiment, the tube or sleeve 4540 may have a shield. As described supra, an outer shield cover may help insulate the temperature sensor mount 4520 from convective heat transfer and improve the thermal connection to the heater tube.

In some embodiments of the heater head, inserts may be placed on the inside of the heater tubes to increase heat transfer between the working gas and the tube walls as disclosed in U.S. patent application Ser. No. 13/447,990, filed Apr. 16, 2012 and entitled Stirling Cycle Machine, which is hereby incorporated herein by reference in its entirety.

Regenerator

A regenerator is used in a Stirling cycle machine, as discussed above and as described in U.S. Pat. No. 6,591,609, and U.S. Pat. No. 6,862,883, to add and remove heat from the working fluid during different phases of the Stirling cycle. The regenerator used in a Stirling cycle machine must be capable of high heat transfer rates which typically suggests a high heat transfer area and low flow resistance to the working fluid. Low flow resistance also contributes to the overall efficiency of the engine by reducing the energy required to pump the working fluid. Additionally, a regenerator must be fabricated in such a manner as to resist spalling or fragmentation because fragments may be entrained in the working fluid and transported to the compression or expansion cylinders and result in damage to the piston seals.

One regenerator design uses several hundred stacked metal screens. While exhibiting a high heat transfer surface, low flow resistance and low spalling, metal screens may suffer the disadvantage that their cutting and handling may generate small metal fragments that must be removed before assembling the regenerator. Additionally, stainless steel woven wire mesh contributes appreciably to the cost of the Stirling cycle engine.

Figure 23A:
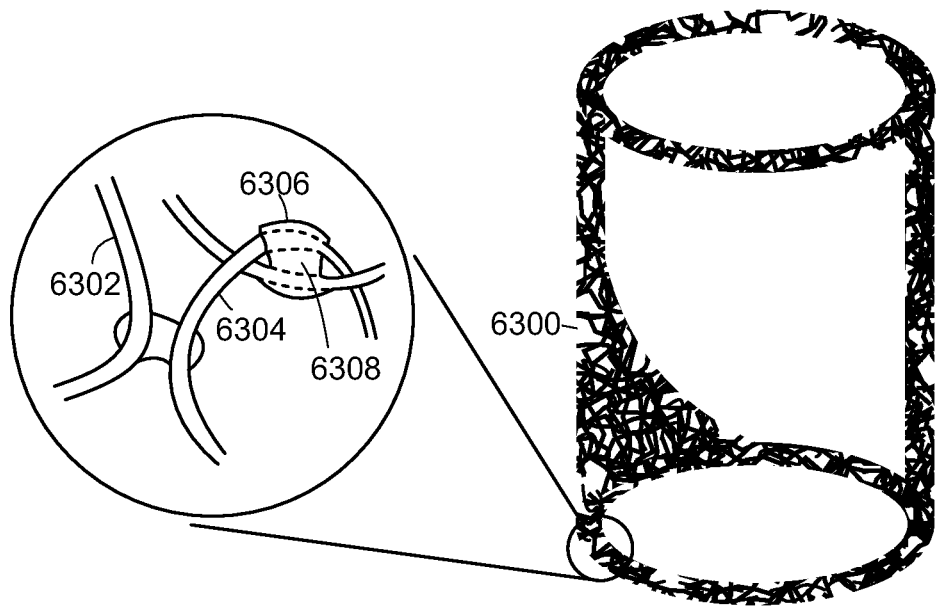
FIGS. 23A and 23B show a regenerator of a Stirling cycle engine in accordance with one embodiment.

A three dimensional random fiber network, such as stainless steel wool or ceramic fiber, for example, may be used as the regenerator, as now described with reference to FIG. 23A. Stainless steel wool regenerator 6300 advantageously provides a large surface area to volume ratio, thereby providing favorable heat transfer rates at low fluid flow friction in a compact form. Additionally, cumbersome manufacturing steps of cutting, cleaning and assembling large numbers of screens are advantageously eliminated. The low mechanical strength of steel wool and the tendency of steel wool to spall may both be overcome as now described. In some embodiments, the individual steel wires 6302 and 6304 are "cross-linked" into a unitary 3D wire matrix.

Figure 23B:
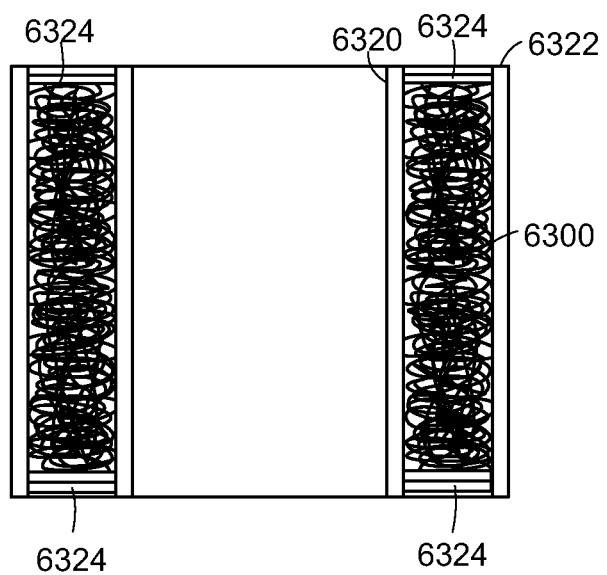

The starting material for the regenerator may be fibrilose and of random fiber form such as either steel or nickel wool. The composition of the fiber may be a glass or a ceramic or a metal such as steel, copper, or other high temperature materials. The diameter of the fiber is preferably in the range from 10 micrometers to 1 millimeter depending on the size of the regenerator and the properties of the metal. The starting material is placed into a form corresponding to the final shape of the regenerator which is depicted in cross-section in FIG. 23B. Inner canister cylindrical wall 6320, outer canister cylindrical wall 6322, and regenerator network 6300 are shown. The density of the regenerator is controlled by the amount of starting material placed in the form. The form may be porous to allow fluids to pass through the form.

In some embodiments, unsintered steel wool is employed as regenerator network 6300. Regenerator network 6300 is then retained within the regenerator canister by regenerator retaining screens 6324 or other filter, thereby comprising a "basket" which may advantageously capture steel wool fragments.

Figure 24A:
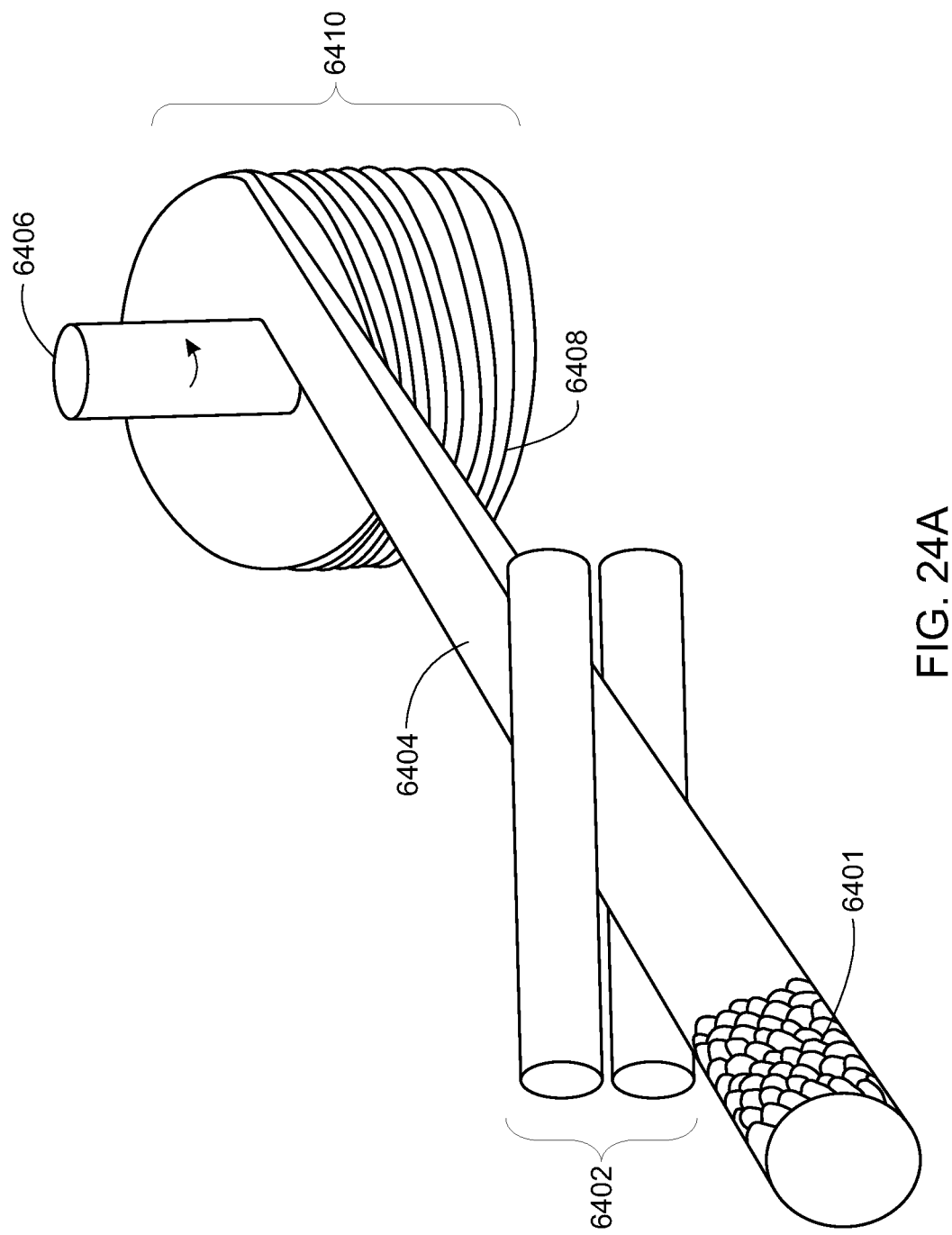

In yet other embodiments, knit or woven wire is employed in fabrication of a regenerator as now described with reference to FIG. 24A. In accordance with these embodiments, knit or woven wire tube 6401 is flattened by rollers 6402 into tape 6404, in which form it is wound about mandrel 6406 into annular layers 6408. Stainless steel is advantageously used for knit wire tube 6401 because of its ability to withstand elevated temperature operation, and the diameter of the wire used is typically in the range of 1-2 mils, however other materials and gauges may be used in various embodiments. Alternatively, a plurality, typically 5-10, of the stainless steel wires may be loosely wound into a multi-filament thread prior to knitting into a wire tube. This process advantageously strengthens the resulting tube 6401. When mandrel 6406 is removed, annular assembly 6410 may be used as a regenerator in a thermal cycle engine.

Still another embodiment is now described with reference to FIGS. 24B through 24E. Knit or woven wire tube 6401, shown in its right cylindrical form in FIG. 24B, is shown scored and partially compressed in FIG. 24C. Alternatively, the scoring may be at an angle 6414 with respect to the central axis 6412 of the tube, as shown in FIG. 24D. Tube 6401 is then axially compressed along central axis 6412 to form the bellows form 6416 shown in FIG. 24E that is then disposed as a regenerator within the regenerator volume 408 (shown in FIG. 4) of a Stirling cycle engine.

It is to be understood that the various regenerator embodiments and methods for their manufacture described herein may be adapted to function in a multiple cylinder configuration.

Coolant Penetrating Cold-End Pressure Vessel

Figure 25A:
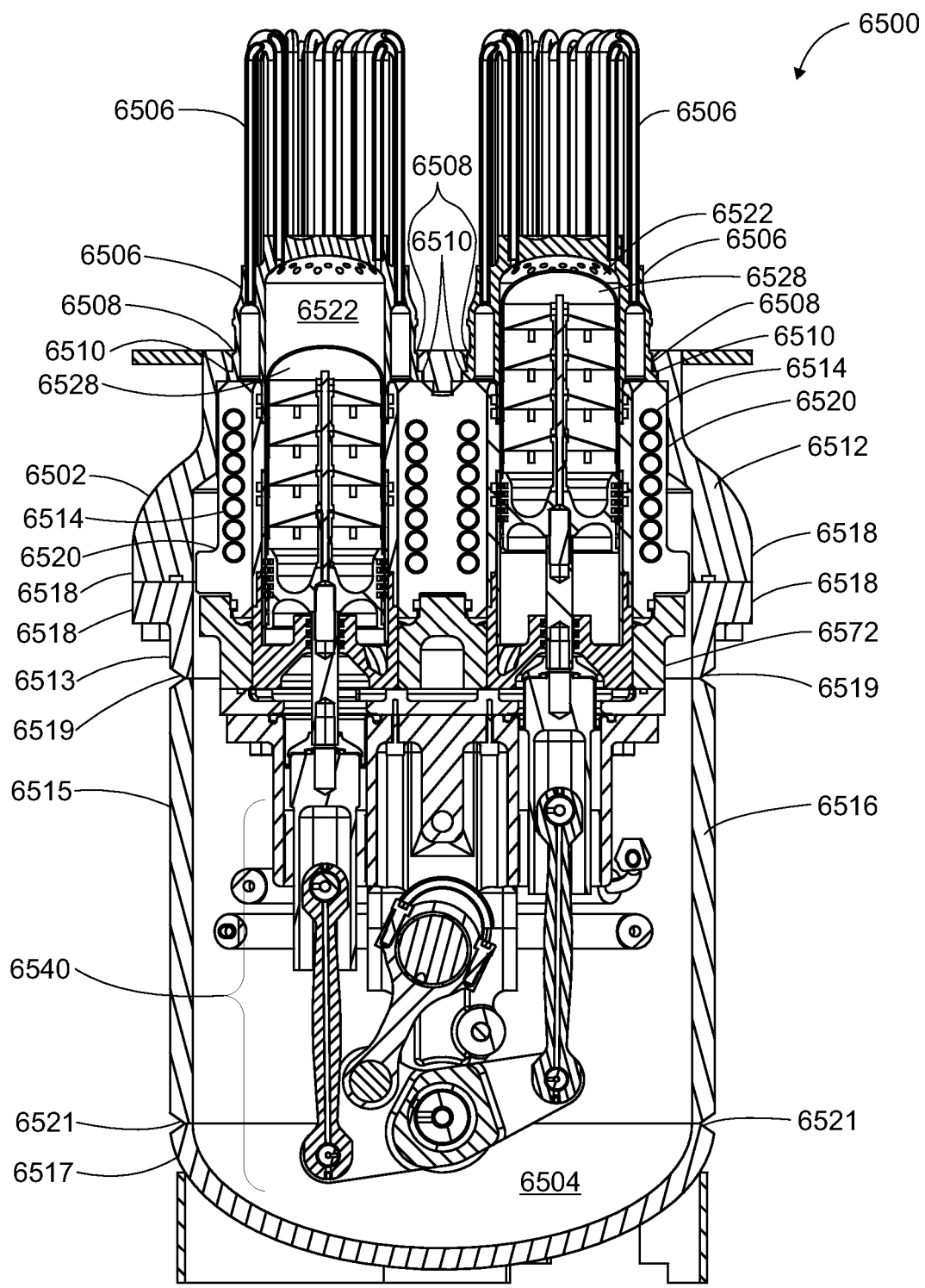
FIGS. 25A-25C show various views of an engine in accordance with several embodiments.
Figure 25B:
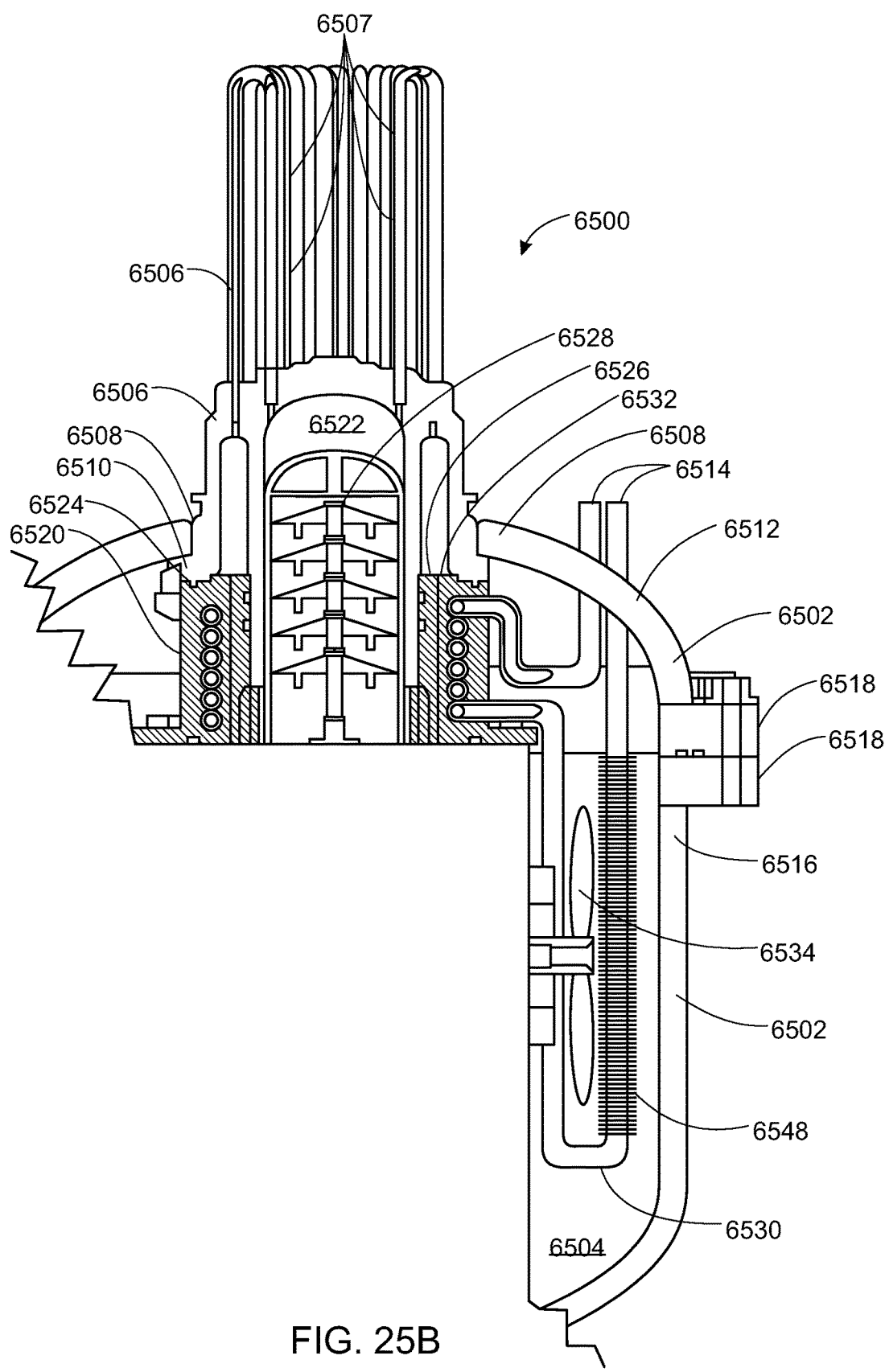
Figure 25C:
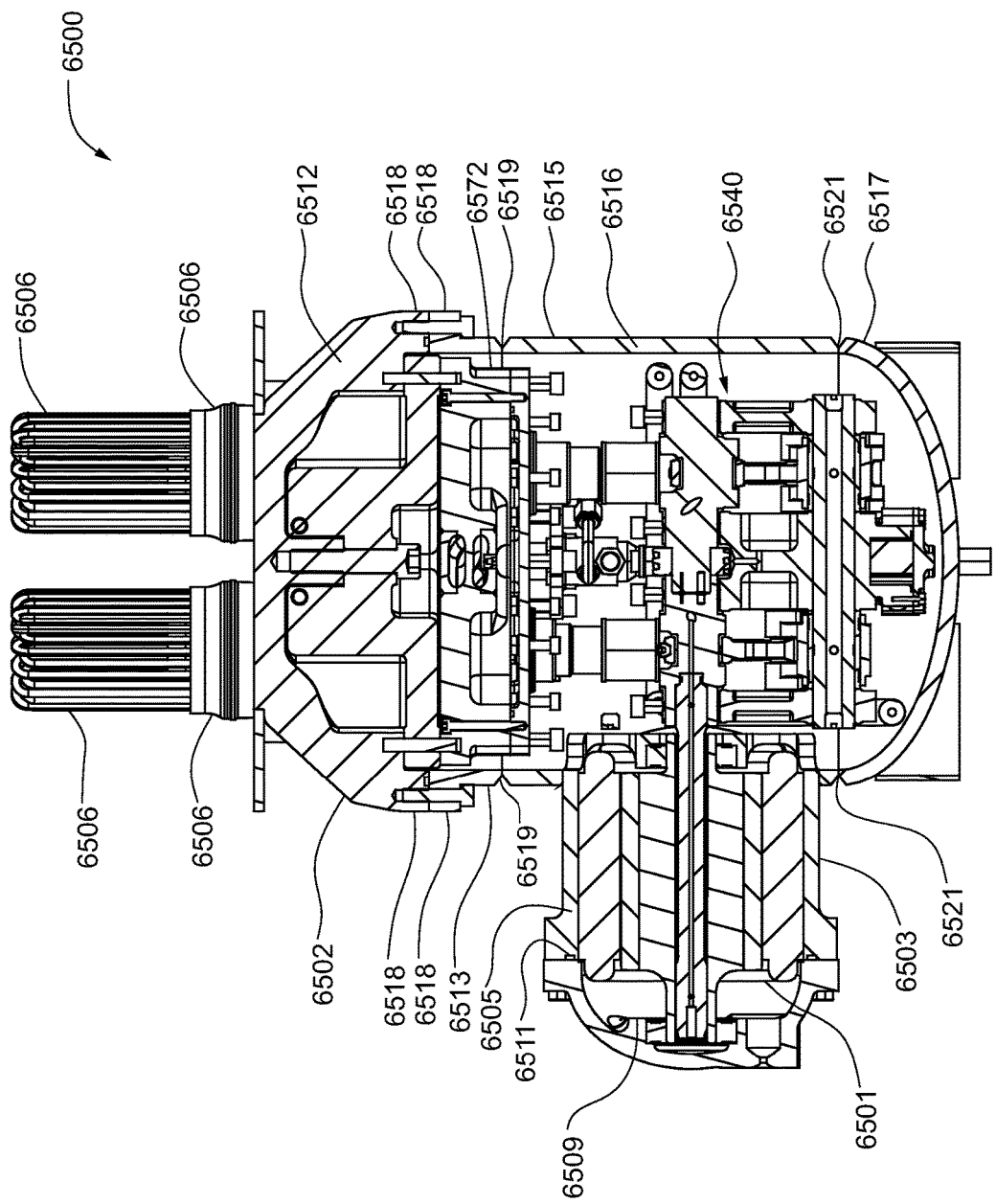

Referring now to FIGS. 25A-C, various cross-sections of an engine, such as a Stirling cycle engine, are shown in accordance with some embodiments. Engine 6500 is hermetically sealed. A crankcase 6502 serves as the cold-end pressure vessel and contains a charge gas in an interior volume 6504. Crankcase 6502 can be made arbitrarily strong without sacrificing thermal performance by using sufficiently thick steel or other structural material. A heater head 6506 serves as the hot-end pressure vessel and is preferably fabricated from a high temperature super-alloy such as Inconel 625, GMR-235, etc. Heater head 6506 is used to transfer thermal energy by conduction from an external thermal source (not shown) to the working fluid. Thermal energy may be provided from various heat sources such as solar radiation or combustion gases. For example, a burner, as previously discussed, may be used to produce hot combustion gases (shown as 6507 in FIG. 25B) that are used to heat the working fluid. An expansion area of cylinder (or warm section) 6522 is disposed inside the heater head 6506 and defines part of a working gas volume as discussed above with respect to FIG. 1. A piston 6528 is used to displace the working fluid contained in the expansion area of cylinder 6522.

In accordance with an embodiment, crankcase 6502 is welded directly to heater head 6506 at joints 6508 to create a pressure vessel that can be designed to hold any pressure without being limited, as are other designs, by the requirements of heat transfer in the cooler. In an alternative embodiment, the crankcase 6502 and heater head 6506 are either brazed or bolted together. The heater head 6506 has a flange or step 6510 that axially constrains the heater head and transfers the axial pressure force from the heater head 6506 to the crankcase 6502, thereby relieving the pressure force from the welded or brazed joints 6508. Joints 6508 serve to seal the crankcase 6502 (or cold-end pressure vessel) and bear the bending and planar stresses. In an alternative embodiment, the joints 6508 are mechanical joints with an elastomer seal. In yet another embodiment, step 6510 is replaced with an internal weld in addition to the exterior weld at joints 6508.

Crankcase 6502 is assembled in two pieces, an upper crankcase 6512 and a lower crankcase 6516. The heater head 6506 is first joined to the upper crankcase 6512. Second, a cooler 6520 is installed with a coolant tubing (shown as 6514 in FIG. 25B) passing through holes in the upper crankcase 6512. Third, the double acting pistons 6528 and drive components (designated generally as numeral 6540 in FIGS. 25A and 25C, not shown in FIG. 25B) are installed. In one embodiment, lower crankcase 6516 is assembled in three pieces, an upper section 6513, a middle section 6515, and a lower section 6517, as shown in FIGS. 25A and 25C. Middle section 6515 is may be connected to upper and lower sections 6513 and 6517 at joints 6519 and 6521, respectively, by any mechanical means known in the art, or by welding.

The lower crankcase 6516 is then joined to the upper crankcase 6512 at joints 6518. Preferably, the upper crankcase 6512 and the lower crankcase 6516 are joined by welding. Alternatively, a bolted flange may be employed (as shown in FIGS. 25B and 25C).

In some embodiments a motor/generator (shown as 6501 in FIG. 25C), such as a PM generator, may be installed into motor/generator housing (shown as 6503 in FIG. 25C), which is attached to the lower crankcase 6516, as shown in FIG. 25C. Motor/generator housing 6503 may be attached to lower crankcase 6516 by any mechanical means known in the art, or may be welded to lower crankcase 6516. Motor/generator housing 6503 may assembled in two pieces, a front section 6505, which is attached to lower crankcase 6516, and a rear section 6509, which may be welded or bolted to front section 6505. In one embodiment a seal 6511 may be positioned between the rear section 6509 and the front section 6505 of the motor/generator housing 6503. In some embodiments rear section 6509 is removable attached to front section 6505, which serves, among other functions, to allow for easy removal and installation of motor/generator 6501 during engine 6500 assembly.

In order to allow direct coupling of the heater head 6506 to the upper crankcase 6512, the cooling function of the thermal cycle is performed by a cooler 6520 that is disposed within the crankcase 6502, thereby advantageously reducing the pressure containment requirements placed upon the cooler. By placing the cooler 6520 within crankcase 6502, the pressure across the cooler is limited to the pressure difference between the working gas in the working gas volume, and the charge gas in the interior volume 6504 of the crankcase. The difference in pressure is created by the compression and expansion of the working gas, and is typically limited to a percentage of the operating pressure. In one embodiment, the pressure difference is limited to less than 30% of the operating pressure.

Coolant tubing 6514 advantageously has a small diameter relative to the diameter of the cooler 6520. The small diameter of the coolant passages, such as provided by coolant tubing 6514, is key to achieving high heat transfer and supporting large pressure differences. The required wall thickness to withstand or support a given pressure is proportional to the tube or vessel diameter. The low stress on the tube walls allows various materials to be used for coolant tubing 6514 including, but not limited to, thin-walled stainless steel tubing or thicker-walled copper tubing.

An additional advantage of locating the cooler 6520 entirely within the crankcase 6502 (or cold-end pressure vessel) volume is that any leaks of the working gas through the cooler 6520 will only result in a reduction of engine performance. In contrast, if the cooler were to interface with the external ambient environment, a leak of the working gas through the cooler would render the engine useless due to loss of the working gas unless the mean pressure of working gas is maintained by an external source. The reduced requirement for a leak-tight cooler allows for the use of less expensive fabrication techniques including, but not limited to, powder metal and die casting.

Cooler 6520 is used to transfer thermal energy by conduction from the working gas and thereby cool the working gas. A coolant, either water or another fluid, is carried through the crankcase 6502 and the cooler 6520 by coolant tubing 6514. The feedthrough of the coolant tubing 6514 through upper crankcase 6512 may be sealed by a soldered or brazed joint for copper tubes, welding, in the case of stainless steel and steel tubing, or as otherwise known in the art.

The charge gas in the interior volume 6504 may also require cooling due to heating resulting from heat dissipated in the motor/generator windings, mechanical friction in the drive, the non-reversible compression/expansion of the charge gas, and the blow-by of hot gases from the working gas volume. Cooling the charge gas in the crankcase 6502 increases the power and efficiency of the engine as well as the longevity of bearings used in the engine.

In one embodiment, an additional length of coolant tubing (shown as 6530 in FIG. 25B) is disposed inside the crankcase 6502 to absorb heat from the charge gas in the interior volume 6504. The additional length of coolant tubing 6530 may include a set of extended heat transfer surfaces (shown as 6548 in FIG. 25B), such as fins, to provide additional heat transfer. As shown in FIG. 25B, the additional length of coolant tubing 6530 may be attached to the coolant tubing 6514 between the crankcase 6502 and the cooler 6520. In an alternative embodiment, the length of coolant tubing 6530 may be a separate tube with its own feedthrough of the crankcase 6502 that is connected to the cooling loop by hoses outside of the crankcase 6502.

In another embodiment the extended coolant tubing 6530 may be replaced with extended surfaces on the exterior surface of the cooler 6520 or the drive housing (shown as 6572 in FIGS. 25A and 25C). Alternatively, a fan (shown as 6534 in FIG. 25B) may be attached to the engine crankshaft (shown as 6542 in FIG. 25C) to circulate the charge gas in interior volume 6504. The fan 6534 may be used separately or in conjunction with the additional coolant tubing 6530 or the extended surfaces on the cooler 6520 or drive housing 6572 to directly cool the charge gas in the interior volume 6504.

Preferably, coolant tubing 6514 is a continuous tube throughout the interior volume 6504 of the crankcase and the cooler 6520. Alternatively, two pieces of tubing could be used between the crankcase and the feedthrough ports of the cooler. One tube carries coolant from outside the crankcase 6502 to the cooler 6520. A second tube returns the coolant from the cooler 6520 to the exterior of the crankcase 6502. In another embodiment, multiple pieces of tubing may be used between the crankcase 6502 and the cooler in order to add tubing with extended heat transfer surfaces inside the crankcase volume 6504 or to facilitate fabrication. The tubing joints and joints between the tubing and the cooler may be brazed, soldered, welded or mechanical joints.

Various methods may be used to join coolant tubing 6514 to cooler 6520. Any known method for joining the coolant tubing 6514 to the cooler 6520 may be used in various embodiments. In one embodiment, the coolant tubing 6514 may be attached to the wall of the cooler 6520 by brazing, soldering or gluing. Cooler 6520 is in the form of a cylinder placed around the cylinder 6522 and the annular flow path of the working gas outside of the cylinder 6522. Accordingly, the coolant tubing 6514 may be wrapped around the interior of the cooler cylinder wall and attached as mentioned above. Various embodiments of cooler configurations may be found in U.S. patent application Ser. No. 13/447,990, filed Apr. 16, 2012 and entitled Stirling Cycle Machine, which is hereby incorporated herein by reference in its entirety.

Returning to FIG. 25B, one method for joining coolant tubing 6514 to cooler 6520 is to overcast the cooler around the coolant tubing. This method is described, with reference to FIGS. 26A and 26B, and may be applied to a pressurized close-cycle machine as well as in other applications where it is advantageous to locate a cooler inside the crankcase.

Figure 26A:
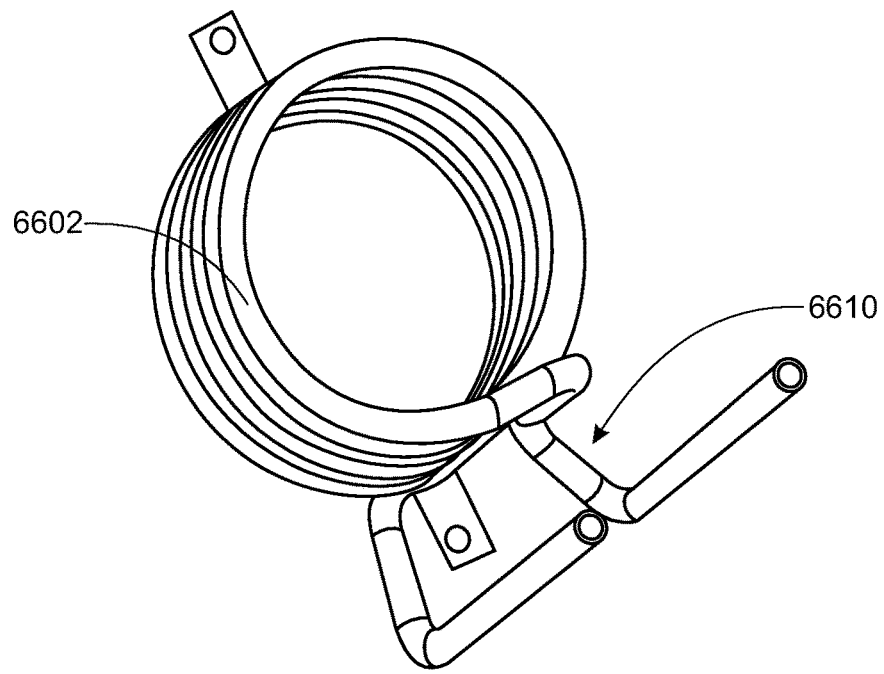
FIGS. 26A and 26B show views of a cooler for an engine in accordance with some embodiments.

Referring to FIG. 26A, a heat exchanger, for example, a cooler 6520 (shown in FIGS. 25A and 25B) may be fabricated by forming a high-temperature metal tubing 6602 into a desired shape. In one embodiment, the metal tubing 6602 is formed into a coil using copper. A lower temperature (relative to the melting temperature of the tubing) casting process is then used to overcast the tubing 6602 with a high thermal conductivity material to form a gas interface 6604 (and 6532 in FIG. 25B), seals 6606 (and 6524 in FIG. 25B) to the rest of the engine and a structure to mechanically connect the drive housing 6572 (shown in FIG. 25C) to the heater head 6506 (shown in FIG. 25B). In one embodiment, the high thermal conductivity material used to overcast the tubing is aluminum. Overcasting the tubing 6602 with a high thermal conductivity metal assures a good thermal connection between the tubing and the heat transfer surfaces in contact with the working gas. A seal is created around the tubing 6602 where the tubing exits the open mold at 6610. This method of fabricating a heat exchanger advantageously provides cooling passages in cast metal parts inexpensively.

Figure 26B:
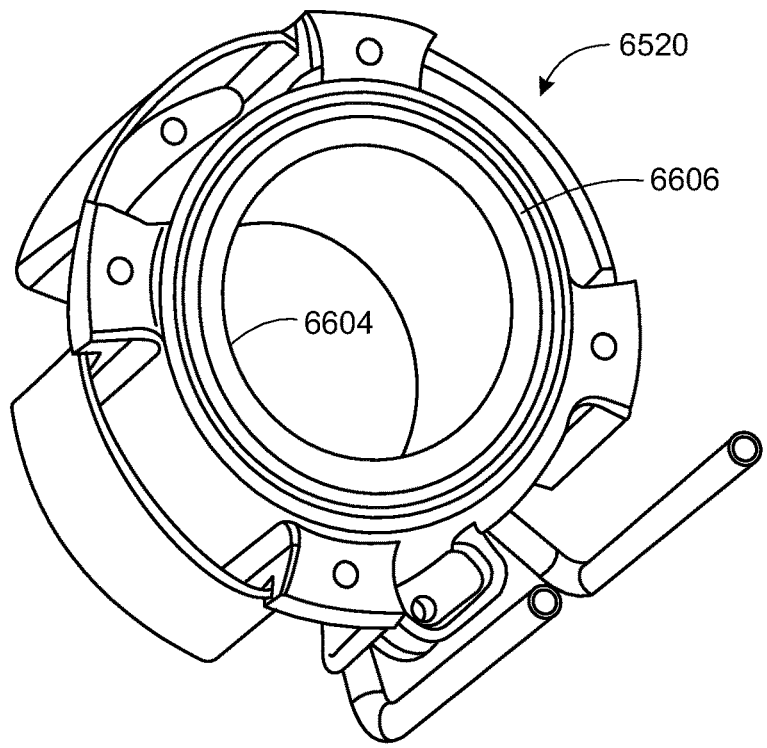

FIG. 26B is a perspective view of a cooling assembly cast over the cooling coil of FIG. 26A. The casting process can include any of the following: die casting, investment casting, or sand casting. The tubing material is chosen from materials that will not melt or collapse during the casting process. Tubing materials include, but are not limited to, copper, stainless steel, nickel, and super-alloys such as Inconel. The casting material is chosen among those that melt at a relatively low temperature compared to the tubing. Typical casting materials include aluminum and its various alloys, and zinc and its various alloys.

The heat exchanger may also include extended heat transfer surfaces to increase the interfacial area 6604 (and 6532 shown in FIG. 25B) between the hot working gas and the heat exchanger so as to improve heat transfer between the working gas and the coolant. Extended heat transfer surfaces may be created on the working gas side of the heat exchanger 6520 by machining extended surfaces on the inside surface (or gas interface) 6604. Referring to FIG. 25B, a cooler liner 6526 (shown in FIG. 25B) may be pressed into the heat exchanger to form a gas barrier on the inner diameter of the heat exchanger. The cooler liner 6526 directs the flow of the working gas past the inner surface of the cooler.

The extended heat transfer surfaces can be created by any of the methods known in the art. In accordance some embodiments, longitudinal grooves 6704 are broached into the surface, as shown in detail in FIG. 27A. Alternatively, lateral grooves 6708 (also shown in enlarged section view FIG. 27D) may be machined in addition to the longitudinal grooves 6704 (also shown in enlarged section view FIG. 27B) thereby creating aligned pins 6710 as shown in FIG. 27C. In some embodiments, grooves are cut at a helical angle to increase the heat exchange area.

In an alternative embodiment, the extended heat transfer surfaces on the gas interface 6604 (as shown in 26B) of the cooler are formed from metal foam, expanded metal or other materials with high specific surface area. For example, a cylinder of metal foam may be soldered to the inside surface of the cooler 6604. As discussed above, a cooler liner 6526 (shown in FIG. 25B) may be pressed in to form a gas barrier on the inner diameter of the metal foam. Other methods of forming and attaching heat transfer surfaces to the body of the cooler are described in U.S. Pat. No. 6,694,731, issued Feb. 24, 2004, entitled Stirling Engine Thermal System Improvements, which is herein incorporated by reference in its entirety.

Additional coolant penetrating cold-end pressure vessel embodiments are described in U.S. Pat. No. 7,325,399. It is to be understood that the various coolant penetrating cold-end pressure vessel embodiments referred to herein may be adapted to function in a multiple cylinder engine configuration.

Intake Manifold

Figure 28A:
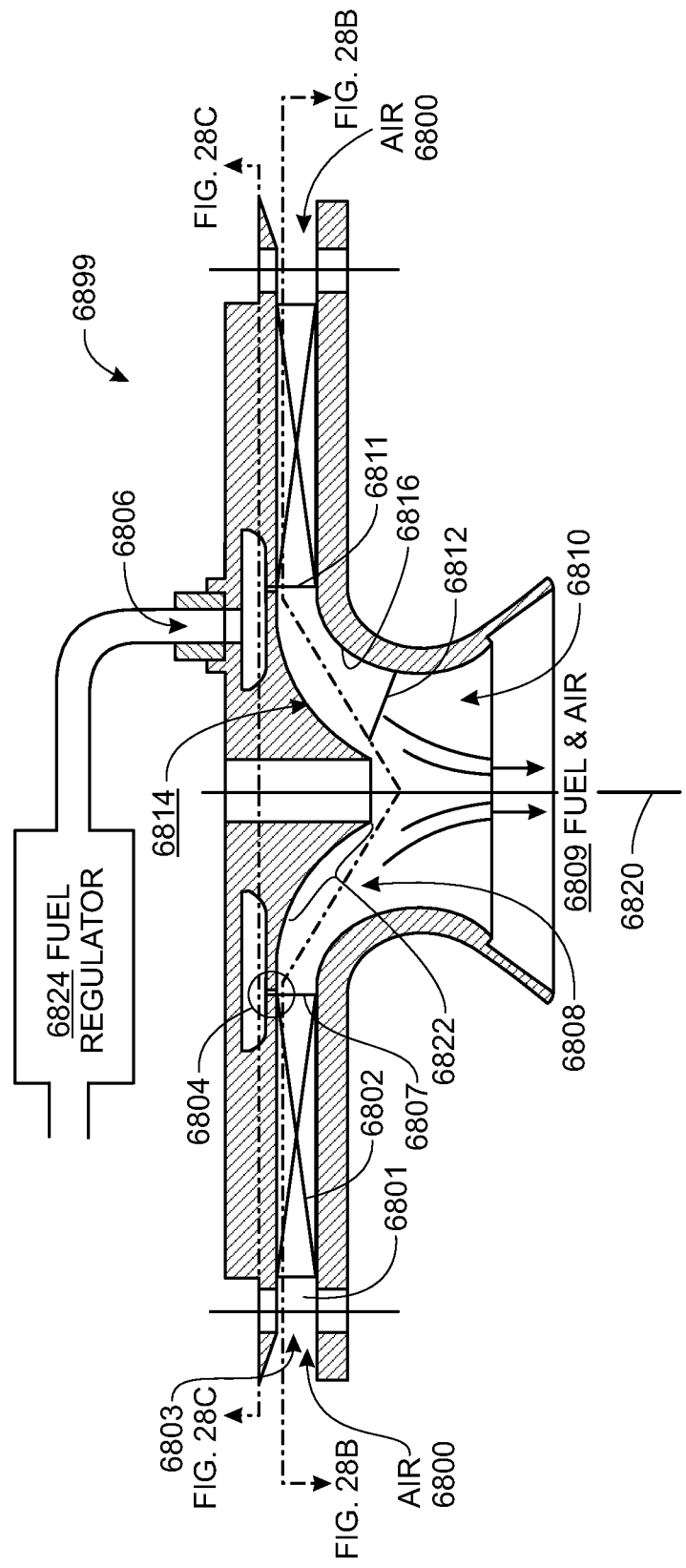
FIGS. 28A-28C show views of an intake manifold for an engine in accordance with one embodiment.
Figure 28B:
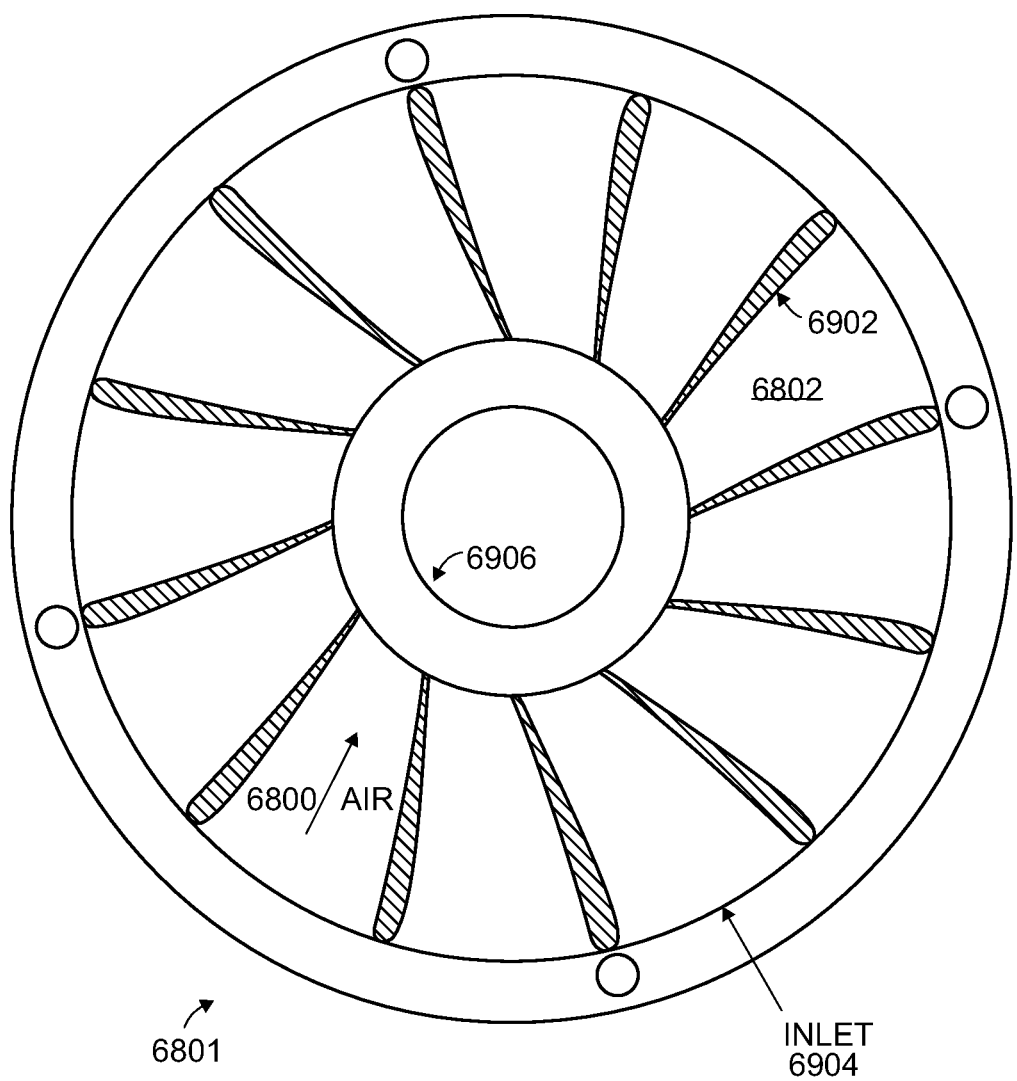
Figure 28C:
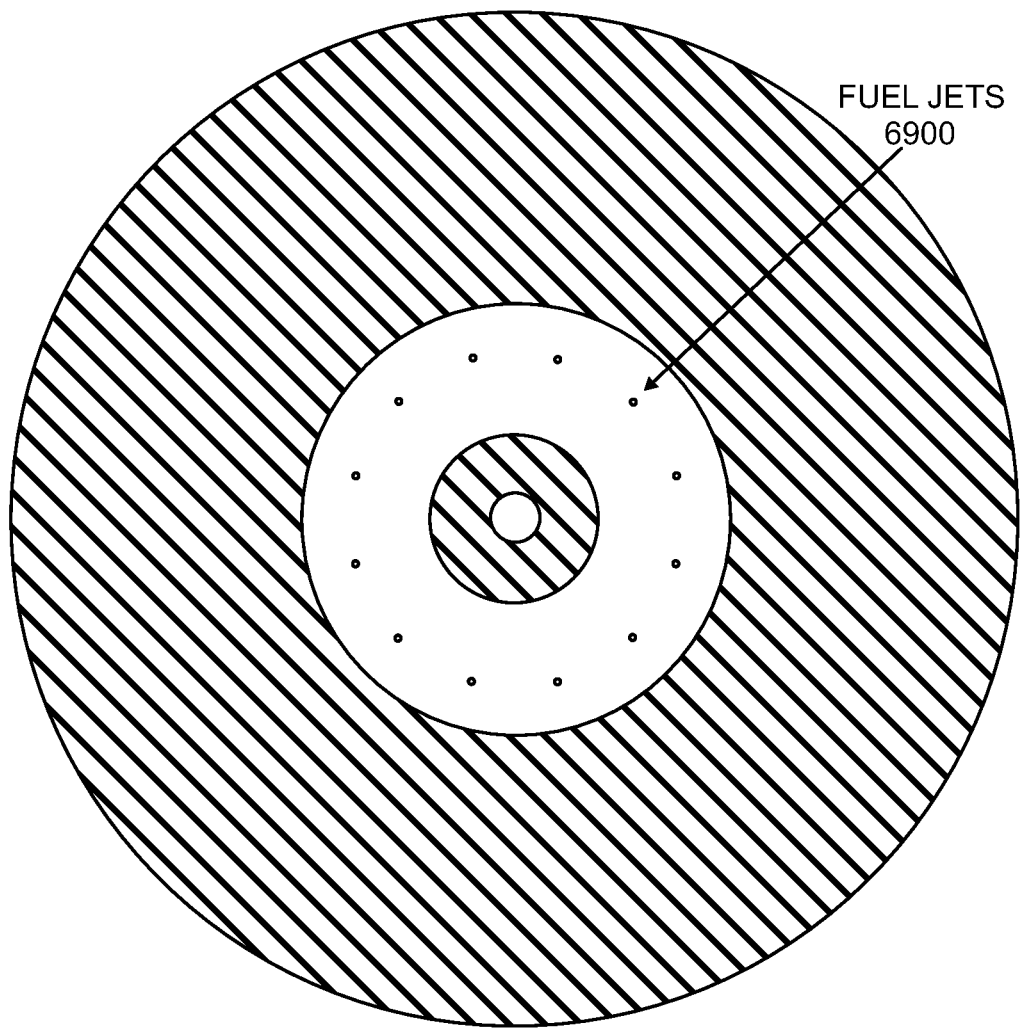

Referring now to FIGS. 28A-28C, an intake manifold 6899, is shown for application to a Stirling cycle engine or other combustion application in accordance with some embodiments. Various embodiments of intake manifold 6899 are further disclosed in U.S. Pat. No. 6,381,958. In accordance with some embodiments, fuel is pre-mixed with air that may be heated above the fuel's auto-ignition temperature and a flame is prevented from forming until the fuel and air are well-mixed. FIG. 28A shows one embodiment including an intake manifold 6899 and a combustion chamber 6810. The intake manifold 6899 has an axisymmetrical conduit 6801 with an inlet 6803 for receiving air 6800. Air 6800 is pre-heated to a temperature, typically above 900 K, which may be above the auto-ignition temperature of the fuel. Conduit 6801 conveys air 6800 flowing inward radially with respect to combustion axis 6820 to a swirler 6802 disposed within the conduit 6801.

FIG. 28B shows a cross sectional view of the conduit 6801 including swirler 6802 in accordance with some embodiments. In the embodiment of FIG. 28B, swirler 6802 has several spiral-shaped vanes 6902 for directing the flow of air 6800 radially inward and imparting a rotational component on the air. The diameter of the swirler section of the conduit decreases from the inlet 6904 to the outlet 6906 of swirler 6802 as defined by the length of the swirler section conduit 6801. The decrease in diameter of swirler vanes 6902 increases the flow rate of air 6800 in substantially inverse proportion to the diameter. The flow rate is increased so that it is above the flame speed of the fuel. At outlet 6906 of swirler 6802, fuel 6806, which in a one embodiment is propane, is injected into the inwardly flowing air.

In some embodiments, fuel 6806 is injected by fuel injector 6804 through a series of nozzles 6900 as shown in FIG. 28C. More particularly, FIG. 28C shows a cross sectional view of conduit 6801 and includes the fuel jet nozzles 6900. Each of the nozzles 6900 is positioned at the exit of the swirler vanes 6902 and is centralized between two adjacent vanes. Nozzles 6900 are positioned in this way for increasing the efficiency of mixing the air and fuel. Nozzles 6900 simultaneously inject the fuel 6806 across the air flow 6800. Since the air flow is faster than the flame speed, a flame will not form at that point even though the temperature of the air and fuel mixture is above the fuel's auto-ignition temperature. In some embodiments, where propane is used, the preheat temperature, as governed by the temperature of the heater head, is approximately 900 K.

Referring again to FIG. 28A, the air and fuel, now mixed, referred to hereafter as "air-fuel mixture" 6809, is transitioned in direction through a throat 6808 which has a contoured fairing 6822 and is attached to the outlet 6807 of the conduit 6801. Fuel 6806 is supplied via fuel regulator 6824.

Throat 6808 has an inner radius 6814 and an outer dimension 6816. The transition of the air-fuel mixture is from a direction which is substantially transverse and radially inward with respect to combustion axis 6820 to a direction which is substantially parallel to the combustion axis. The contour of the fairing 6822 of throat 6808 has the shape of an inverted bell such that the cross sectional area of throat 6808 with respect to the combustion axis remains constant from the inlet 6811 of the throat to outlet 6812 of the throat. The contour is smooth without steps and maintains the flow speed from the outlet of the swirler to the outlet of the throat 6808 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved in practice. Thus, the parasitic power drain of the combustion air fan may be minimized.

Outlet 6812 of the throat flares outward allowing the air-fuel mixture 6809 to disperse into the chamber 6810 slowing the air-fuel mixture 6809 thereby localizing and containing the flame and causing a toroidal flame to form. The rotational momentum generated by the swirler 6802 produces a flame stabilizing ring vortex as well known in the art.

Gaseous Fuel Burner

Definitions: As used in this section of the detailed description, the following terms shall have the meanings indicated, unless the context otherwise requires: Fuel-Air Equivalence ratio (.phi.)=Actual Fuel-Air Mass Ratio/Stoichiometric Fuel-Air Mass Ratio. The stoichiometric fuel-air mass ratio is defined as the mass ratio needed to balance the fuel+air chemical equation. The stoichiometric fuel-air mass ratio is well known for common fuels such as propane (0.0638 g fuel/g air) and calculable for gases such as biogas.

Figure 29:
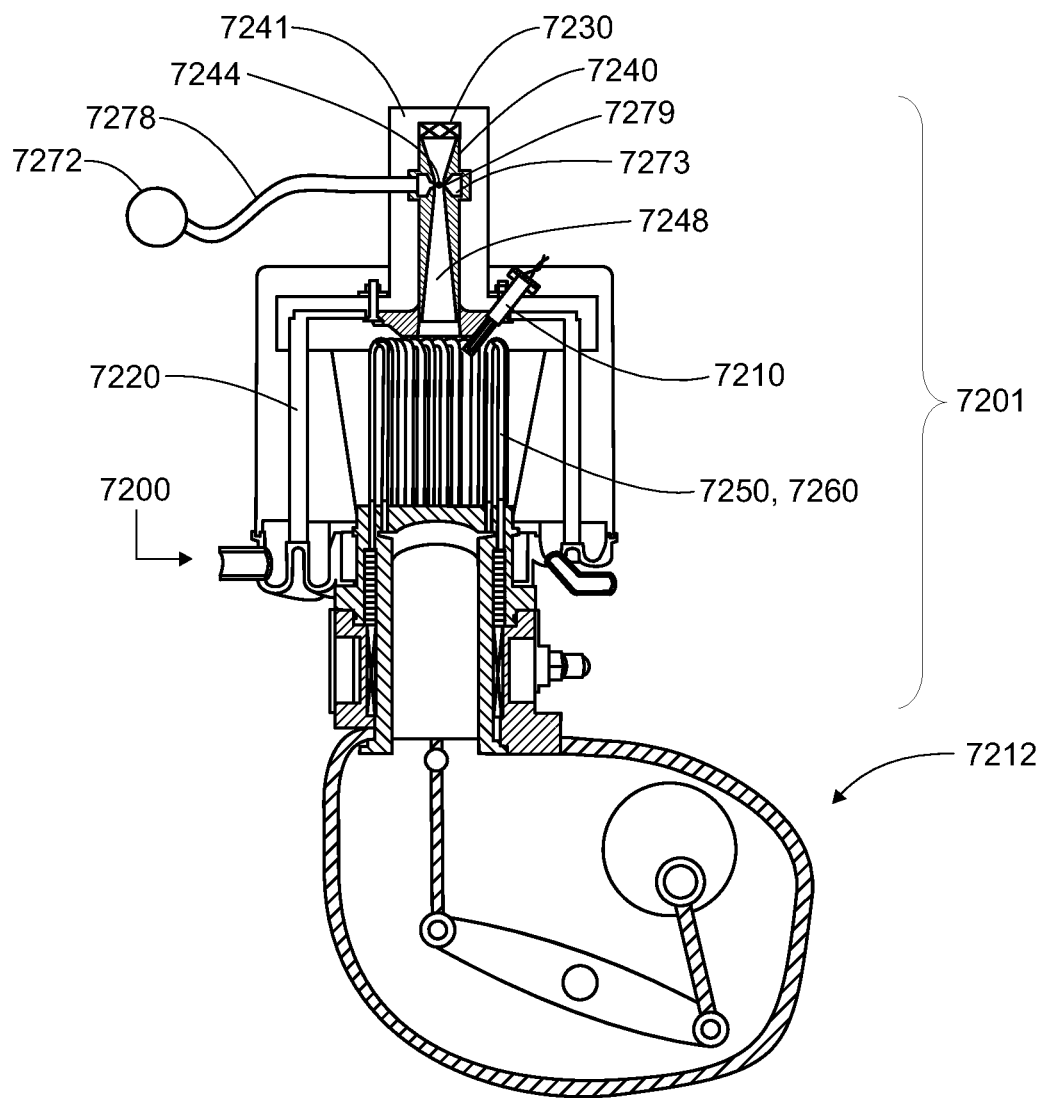
FIG. 29 is a gaseous fuel burner coupled to a Stirling cycle engine, where the ejector is a venturi, according to one embodiment.

FIG. 29 shows one embodiment of the engine 7212 embodiment having a gaseous fuel burner 7201. Various embodiments of the gaseous fuel burner 7201 are also disclosed in U.S. patent application Ser. No. 11/122,447, filed May 5, 2005, published Nov. 10, 2005, which is herein incorporated by reference in its entirety. This embodiment may be used in the context of a Stirling cycle engine, however, other embodiments of the machine are not limited to such applications. Those skilled in the art will appreciate that the present machine may have application in other systems, such as, with other types of external combustion engines.

The use of an ejector in a gaseous fuel burner advantageously can solve some of the challenges faced by the traditional gaseous fuel burners. First, using an ejector can eliminate the need for additional equipment, controls, and space, such as, a gaseous fuel pump, fuel control circuitry, and the associated components. Furthermore, using an ejector such as a venturi simplifies the fuel control system by eliminating the need for a separate fuel control scheme. Based on the corresponding rise of the vacuum with the airflow, and subsequently, an increased fuel flow, the burner power can be regulated by regulating the airflow. Accordingly, removing separate fuel control simplifies the development and implementation of automatic burner control in a gaseous fuel burner with an ejector.

Secondly, the corresponding rise of the vacuum with airflow also results in an approximately steady fuel-air ratio despite changes in temperature and airflow rates. The resulting steady fuel-air ratio simplifies the fuel control and operation of the burner, by eliminating the need for complex exhaust sensor/feedback fuel control mechanisms.

Figure 30A:
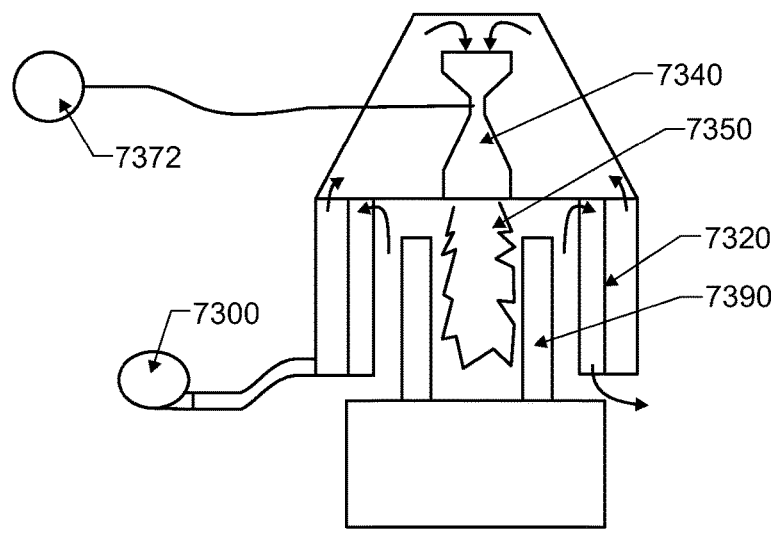
FIG. 30A is the burner of FIG. 29 showing the air and fuel flow paths in accordance with one embodiment.

Referring to FIG. 29, a gaseous fuel burner 7201 comprises an ejector 7240, a heat exchanger 7220, a combustion chamber 7250, and a blower 7200 (shown as 7300 in FIG. 30A). The term ejector as used here includes eductors, siphons, or any device that can use the kinetic energy of one fluid to cause the flow of another fluid. Ejectors are a reliable way of producing vacuum-based fuel flow systems with low initial cost, lack of moving parts, and simplicity of operation.

Referring again to FIG. 29, in a some embodiments, the ejector 7240 is a venturi. The venturi 7240 is positioned downstream of the outlet of the air preheater or heat exchanger 7220, in a venturi plenum 7241 and proximal to the combustion chamber 7250. A blower 7200 forces air through the venturi 7240. The flow of air through the venturi draws in a proportional amount of fuel through the fuel inlet ports 7279. The fuel inlet ports 7279 are placed at the venturi throat 7244 where the throat has the lowest pressure. The ports 7279 are sized to produce plumes of fuel across the airflow that promote good mixing within the venturi 7240. This fuel-air mixture exits the venturi 7240 and forms a swirl-stabilized flame in the combustion chamber 7250. The venturi 7240 draws in an amount of fuel that is substantially linearly proportional to the airflow regardless of airflow rates and temperature of the air entering the venturi 7240.

Figure 30B:
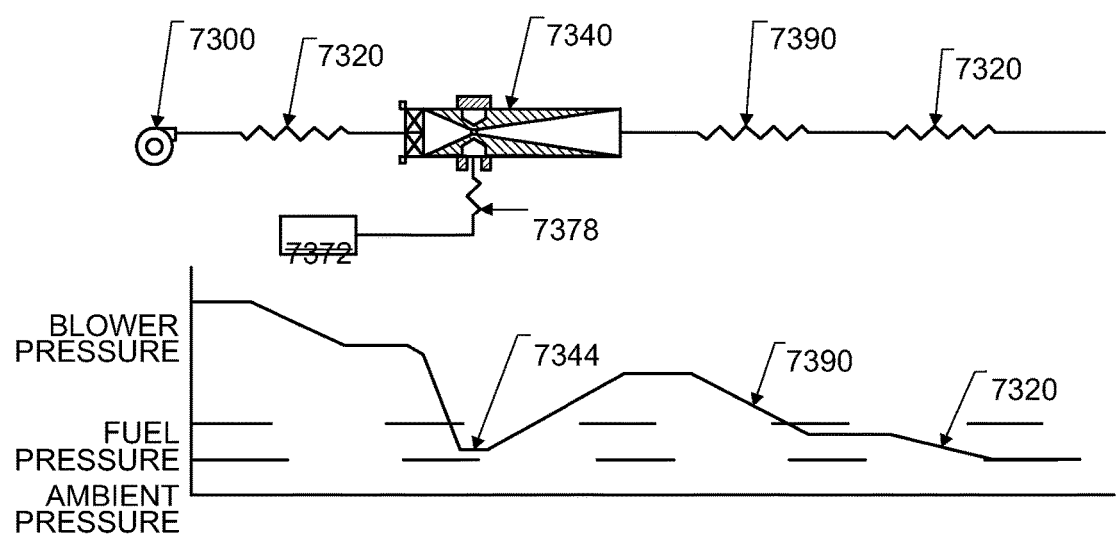
FIG. 30B is a graphical representation of the pressure across the burner in accordance with one embodiment.

In a some embodiments as shown in FIGS. 30A and 30B, placing the venturi 7340 between the air preheater 7320 and the combustion chamber 7350 promotes a substantially steady air-fuel ratio over a wide range of airflows and venturi temperatures. FIG. 30A is a schematic drawing of the burner including the components of the burner such as a blower 7300, a preheater 7320, a venturi 7340, and fuel supply 7372. The drawing also includes a load heat exchanger or heater head 7390 (also shown in FIGS. 31-33 as 7290). The load heat exchanger 7390 is the heat exchanger of the engine or process that absorbs the thermal power of the hot gases leaving the combustion chamber 7350 in the burner at some elevated temperature. The partially cooled burned gases then enter the exhaust side of the air preheater, where they are further cooled by incoming combustion air. FIG. 30B shows the pressure map of the same components arranged linearly. The air pressure supplied by the blower, the fuel supply pressure, and the ambient pressure are all indicated. The mass flow rate (m') of fuel into the burner is controlled by the difference between the fuel supply pressure at 7372 and the pressure in the venturi throat 7344 (shown in FIG. 29 as 7244) and the fuel temperature at the dominant restriction:

$$m'_{FUEL} \varies (P_{FUEL} - P_{THROAT})^{0.5} / T_{FUEL}^{0.5}$$

The pressure in the throat ($P_{THROAT}$) is set by the pressure drop through the exhaust side of the preheater 7320 plus the pressure drop through the heater head tubes 7390 minus the suction generated by the venturi throat 7344. The pressure drops 7320, 7390 and the throat suction pressure 7344 are all proportional to the airflow rate and the venturi temperature.

$$P_{THROAT} \varies m'^2_{AIR} * T_{VENTURI}$$

Combining these equations shows that the fuel flow will vary approximately linearly with the airflow:

$$m'_{FUEL} \varies [P_{FUEL} - (m'^2_{AIR} * T_{VENTURI})]^{0.5} / T_{FUEL}^{0.5}$$

Regulating the fuel pressure to near ambient pressure, the fuel flow is approximately linear with airflow.

$$m'_{FUEL} \varies m'_{AIR} * (T_{VENTURI} / T_{FUEL})^{0.5}$$

Thus, locating the dominant fuel restriction 7378 (shown as 7278 in FIG. 29) within the venturi plenum (shown as 7241 in FIG. 29) provides for an approximately steady fuel-air ratio over a wide range of airflow rates and venturi temperatures.

$$m'_{FUEL} / m'_{AIR} \varies constant$$

FIG. 29 shows one embodiment of the ejector such as the venturi. In this embodiment, the size of the opening of the venturi throat 7244 determines the amount of suction present at the throat 7244. In a specific embodiment, the venturi throat is approximately 0.24 inches in diameter. Referring back to FIG. 29, fuel delivery means are coupled to the venturi 7240. The fuel delivery means may be manifolds, fuel lines or fuel tubes. The fuel delivery means may include other components such as a fuel restriction 7278, fuel inlet ports 7279 and fuel valves (not shown). Fuel supplied by a pressure regulator 7272 flows through a manifold 7273 and fuel inlet ports 7279 into the relatively lower pressure in the throat 7244. In one embodiment the fuel inlet ports 7279 provide the largest portion of the pressure drop in the fuel delivery means. Preferably, making the fuel inlet ports the largest restriction in the fuel delivery means assures that the restriction occurs at the venturi temperature and maximizes fuel-air mixing by producing the largest possible fuel plumes. Referring back to FIG. 29, the fuel and air flow into the divergent cone or diffuser 7248 of the venturi, where static pressure is recovered. In the diffuser 7248, the entrained fuel mixes with the air to form an ignitable fuel air mixture in the combustion chamber 7250. The ignitable fuel-air mixture then enters the combustion chamber 7250, where the igniter 7260 may ignite the mixture, and the tangential flow induced by a swirler 7230 creates a swirl-stabilized flame. Using an ejector 7240 to draw the gaseous fuel into the combustion chamber eliminates the need for a high-pressure gaseous fuel pump to deliver the fuel.

In one embodiment, the venturi 7240 is constructed from high temperature materials to withstand high temperatures and maintain its structural integrity. For the embodiment of FIG. 29, the dimensions of the venturi can be approximately 0.9 inches diameter inlet and outlets with an approximately 0.24 inches diameter throat. The half angles of the convergent cone and divergent cones can be 21.degree. and 7.degree. respectively and the throat can be 0.25 inches long. In this embodiment, the venturi can be constructed from Inconel 600. Alternatively, other high temperature metals could be used including, but not limited to Stainless Steels 310, 316L, 409 and 439, Hastalloy C76, Hastalloy X, Inconel 625 and other super alloys.

In one embodiment, as shown in FIG. 29, a swirler 7230 is located upstream of the venturi 7240 and advantageously creates a tangential flow of air through the venturi. As is well known in the art, the tangential flow from the swirler can create an annular vortex in the combustion chamber, which stabilizes the flame. Additionally, the swirler 7230 increases the suction pressure at the venturi throat 7244 by increasing the local air velocity over the fuel inlet ports 7279. Adding the swirler allows the venturi throat 7244 to be made larger for a given suction pressure. Furthermore, the swirling action induced by the swirler 7230 can suppress fluctuations in the combustion chamber pressure from propagating upstream to the venturi 7240. Such pressure fluctuations can temporarily slow or stop the flow of fuel gas into the venturi 7240. The swirler 7230 thereby facilitates a steady fuel-air ratio in the combustion chamber for steady airflows. The swirler 7230 may be a radial swirler.

Figure 31:
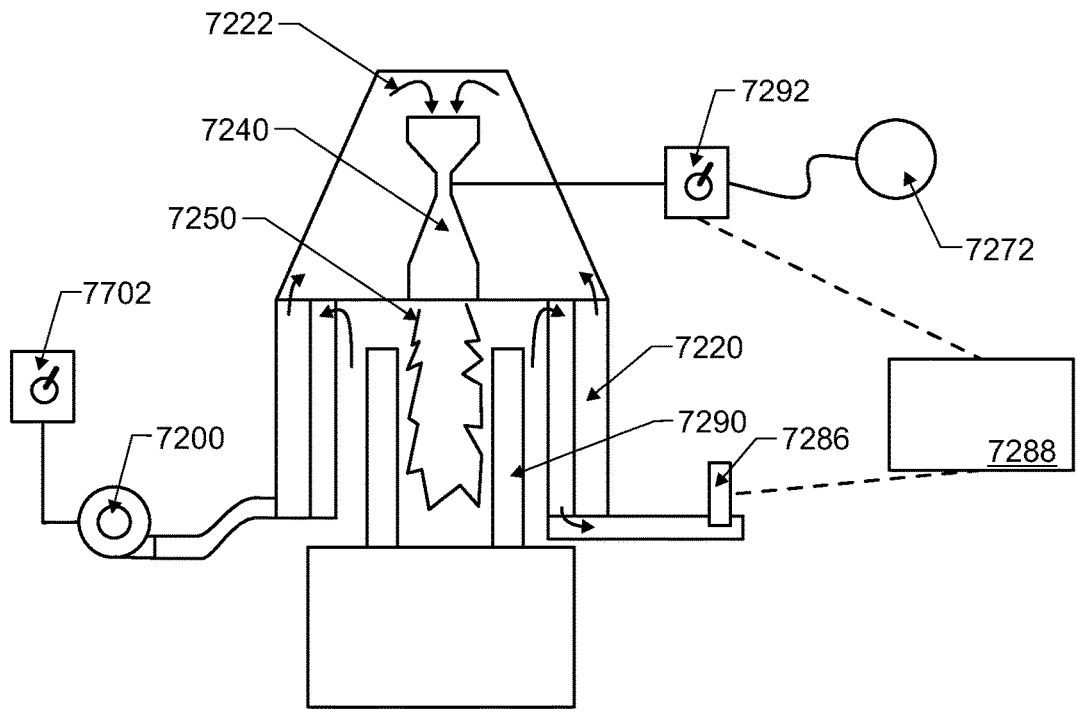
FIG. 31 shows a schematic of an embodiment of the burner with automated fuel control for variable fuel properties.
Figure 32:
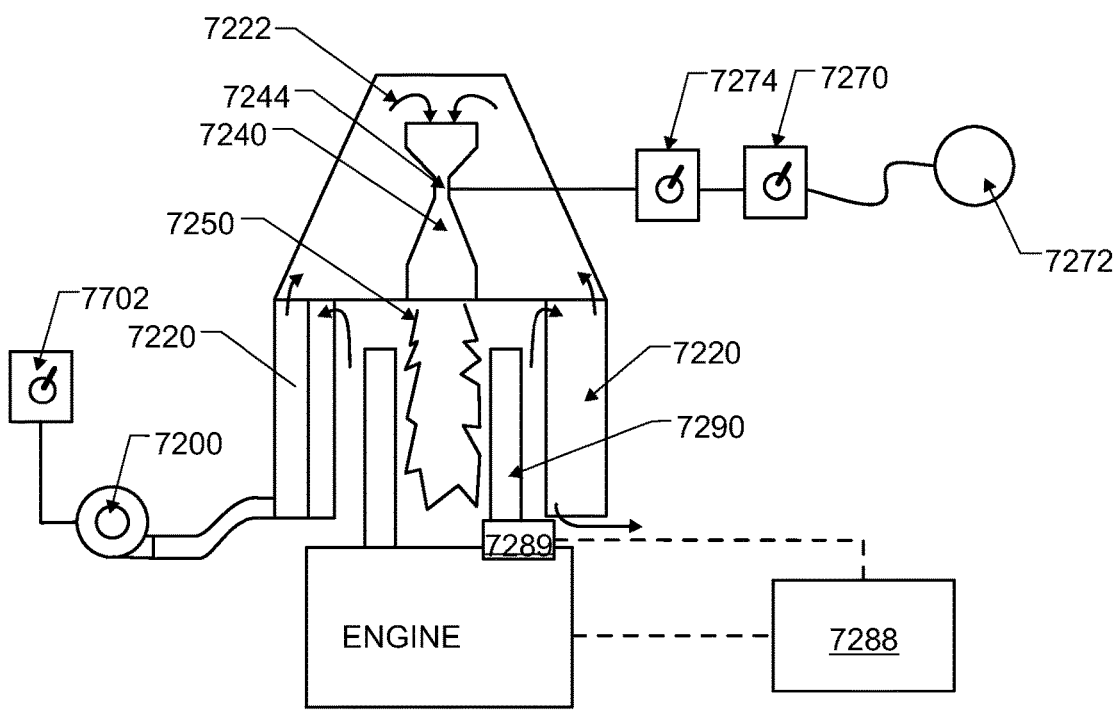
FIG. 32 shows a schematic of another embodiment of the burner with temperature sensor and engine speed control loop.

FIG. 31 depicts an embodiment where an automated controller 7288 adjusts a variable restriction 7292 such as a variable flow valve in the fuel delivery means to hold the exhaust oxygen constant as measured by a wide-range lambda sensor or UEGO 7286. In this embodiment, the automated scheme allows any fuel from biogas to propane to be connected to the burner and the control system can compensate for the changing fuel density. In this embodiment, the automated controller can restrict the fuel path for dense fuels such as propane and open up the fuel path for low-density fuels such as methane and biogas. Ignition would be accomplished by starting the variable restrictor 7292 in the fully open position, which will produce the richest mixture then closing it until the fuel-air mixture is ignited. After ignition, the controller can control the fuel flow to achieve the desired exhaust oxygen level. It is also envisioned that such an embodiment would allow the fuel air ratio to be adjusted during warm-up to optimize efficiency and burner stability.

Figure 33:
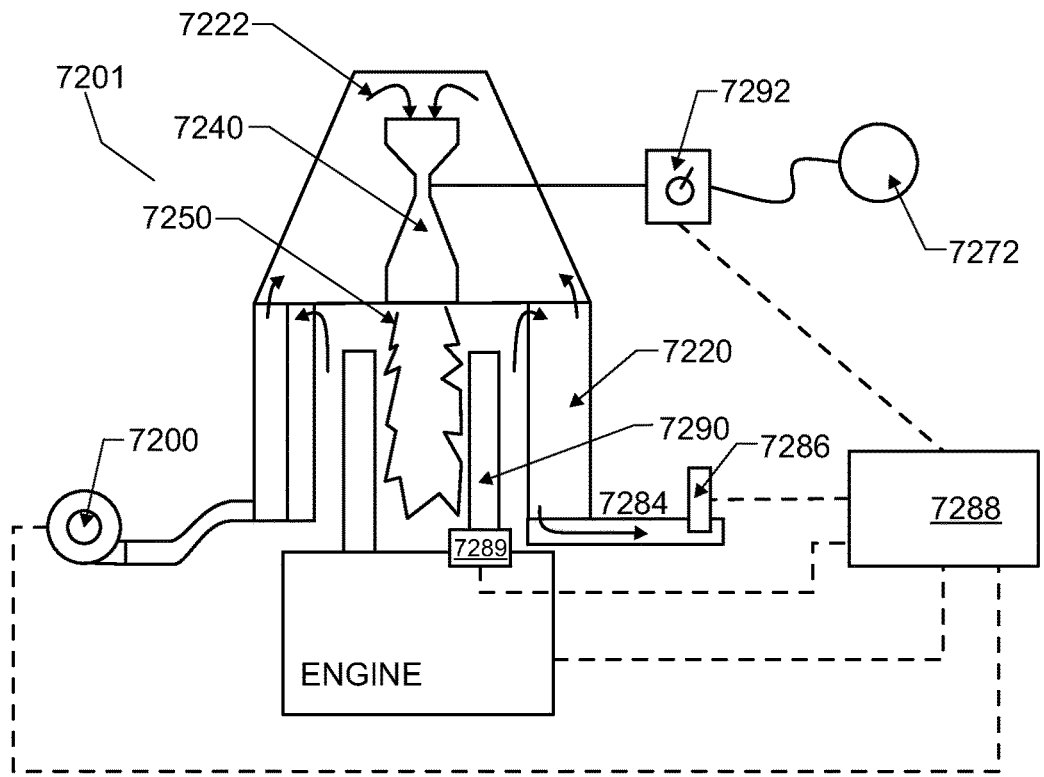
FIG. 33 shows a schematic of yet another embodiment of the burner with temperature sensor and oxygen sensor control loop.
Figure 34:
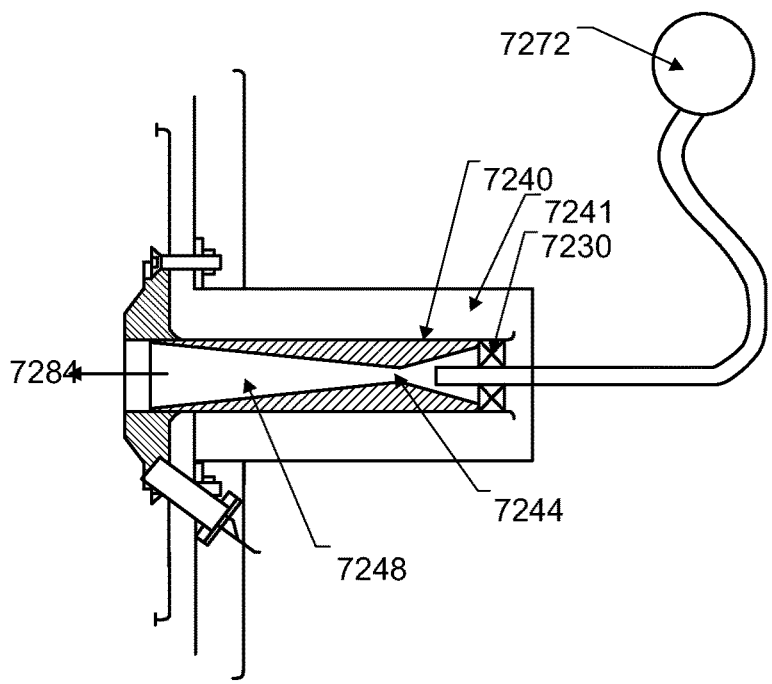
FIG. 34 shows an alternative embodiment of the ejector wherein the fuel is fed directly into the ejector.

Referring now also to FIGS. 33-34 the gaseous fuel burner 7201 may be a high efficiency burner for an external combustion engine such as a Stirling cycle engine. In this embodiment, the burner includes an oxygen sensor 7286 located in the exhaust stream 7284 and a microprocessor/controller 7288 to automatically restrict the fuel flow with the variable restrictor 7292. Additionally, the burner includes a blower controller 7702. The blower controller 7702 may be adjusted by the microprocessor/controller 7288 to match the Stirling engine power output with the load. In this embodiment, the burner temperature is held constant by varying the engine speed and the engine power output is automatically adjusted by setting the blower speed. Accordingly, in this embodiment, the burner may burn most gaseous fuels, including fuels without constant properties such as biogas.

Referring now also to FIG. 34, fuel may be delivered directly into the venturi at a point proximal to the venturi throat 7244. This embodiment may include a swirler 7230 to accommodate the fuel delivery means such as a fuel line or fuel tube. The swirler 7230 may be an axial swirler positioned in the venturi 7240 and upstream of the venturi throat 7244. In operation, the delivered fuel is entrained with the motive air to form the fuel-air mixture. In various embodiments, manual or automatic control mechanisms are adaptable to this alternate fuel delivery embodiment.

Referring back to FIG. 29, the gaseous fuel burner further comprises an igniter 7260 and a flame-monitoring device 7210. Preferably, the igniter 7260 is an excitable hot surface igniter that may reach temperatures greater than 1150.degree. C. Alternatively, the igniter 7260 may be a ceramic hot surface igniter or an excitable glow pin.

With continuing reference to FIG. 29, other embodiments include a flame-monitoring device 7210. The flame-monitoring device 7210 provides a signal in the presence of a flame. For the safe operation of the any burner, it is important that the fuel be shut-off in the event of a flameout. The monitoring device for flame sensing is the flame rectification method using a control circuit and a flame rod.

Flame rectification, well known in the art, is one flame sensing approach for the small, high efficiency gas burners. The device uses a single flame rod to detect the flame. The flame rod is relatively smaller than the grounded heater head and it is positioned within the combustion flame. In this flame rectification embodiment, the control unit electronics are manufactured by Kidde-Fenwal, Inc., and the flame rod is commercially available from International Ceramics and Heating Systems Preferably, the flame-monitoring device uses the hot surface igniter as the flame rod. Alternatively, the flame-monitoring device may be either remote from the hot surface igniter, or packaged with the igniter as a single unit.

Alternatively, an optical sensor may be used to detect the presence of a flame. A preferred sensor is an ultraviolet sensor with a clear view of the flame brush through an ultraviolet transparent glass and a sight tube.

It is to be understood that the various fuel burner embodiments described herein may be adapted to function in a multiple burner configuration as disclosed in U.S. patent application Ser. No. 13/447,990, filed Apr. 16, 2012, and incorporated herein.

Some embodiments my control or modulate the flow of gaseous fuel to the burner with reciprocating pumps as disclosed in U.S. patent application Ser. No. 13/447,990, filed Apr. 16, 2012, and incorporated herein.

Figure 35:
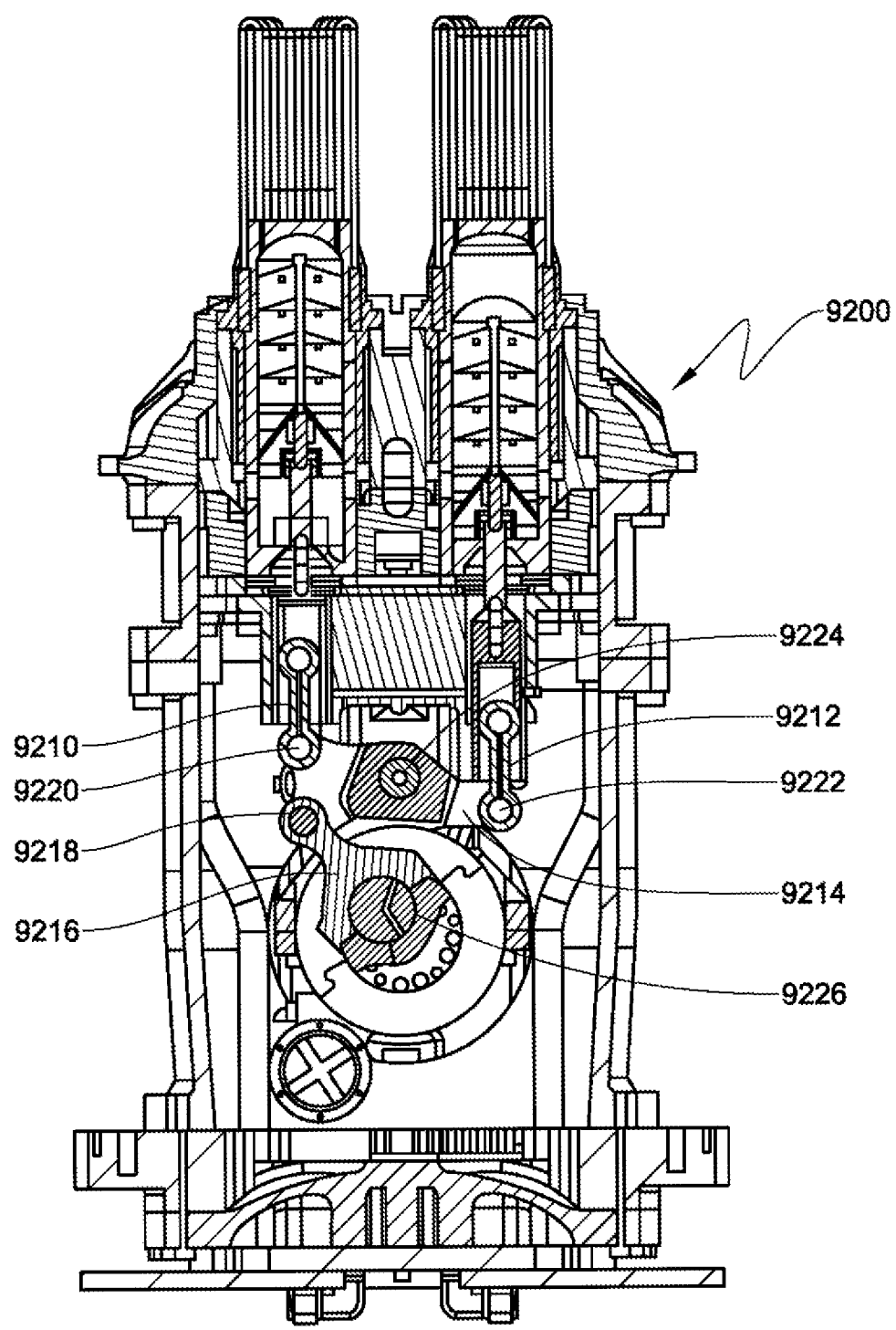
FIG. 35 shows a cross section of an engine in accordance with one embodiment.

Referring now to FIG. 35, a cross section of an engine 9200 is shown. The engine 9200 is similar to the one described above with respect to FIG. 4, however, includes another embodiment of the rocking drive mechanism. The engine 9200 shown in FIG. 35 includes a rocking drive mechanism including link rods 9210, 9210, a rocking beam 9214, a rocking pivot 9224, a connecting rod 9216, a connecting pivot 9218, end pivots 9220, 9222, and a crankpin 9226. Although this engine 9200 is an example of another embodiment of the rocking drive mechanism as discussed above, the components function in a similar fashion however, this embodiment includes a number of additional benefits.

The configuration of the connecting rod 9216, rocking beam 9214, and connecting pivot 9218 limit the loads on the connecting rod. This configuration additionally allows for the use of larger bearings, including standard sized tri-metal bearings. Additionally, the increased distance between the rocking pivot 9224 and the connecting pivot 9218 increases the mechanical advantage of the rocking pivot 9224, thus reducing the loads on the connecting rod bearings In this embodiment of the engine 9200, the side loads on the link rods 9210, 9210 has been increased. However, as discussed above, the engine 9200 is an oil lubricated engine, thus, concern with limiting the side loads on the link rods 9210, 9210 has been reduced. Thus, in the embodiment shown in, for example, FIG. 4, the link rods are longer and the loads on the connecting rod are higher. In the embodiment shown in FIG. 35, the link rods 9210, 9210 are shorter and the load on the connecting rod 9216 is decreased.

In some embodiments, the oil pump is a Gerotor pump driven by the crankshaft through a spline connection. In some embodiments, the oil pump is driven by the crankshaft by a gear.

Figure 36A:
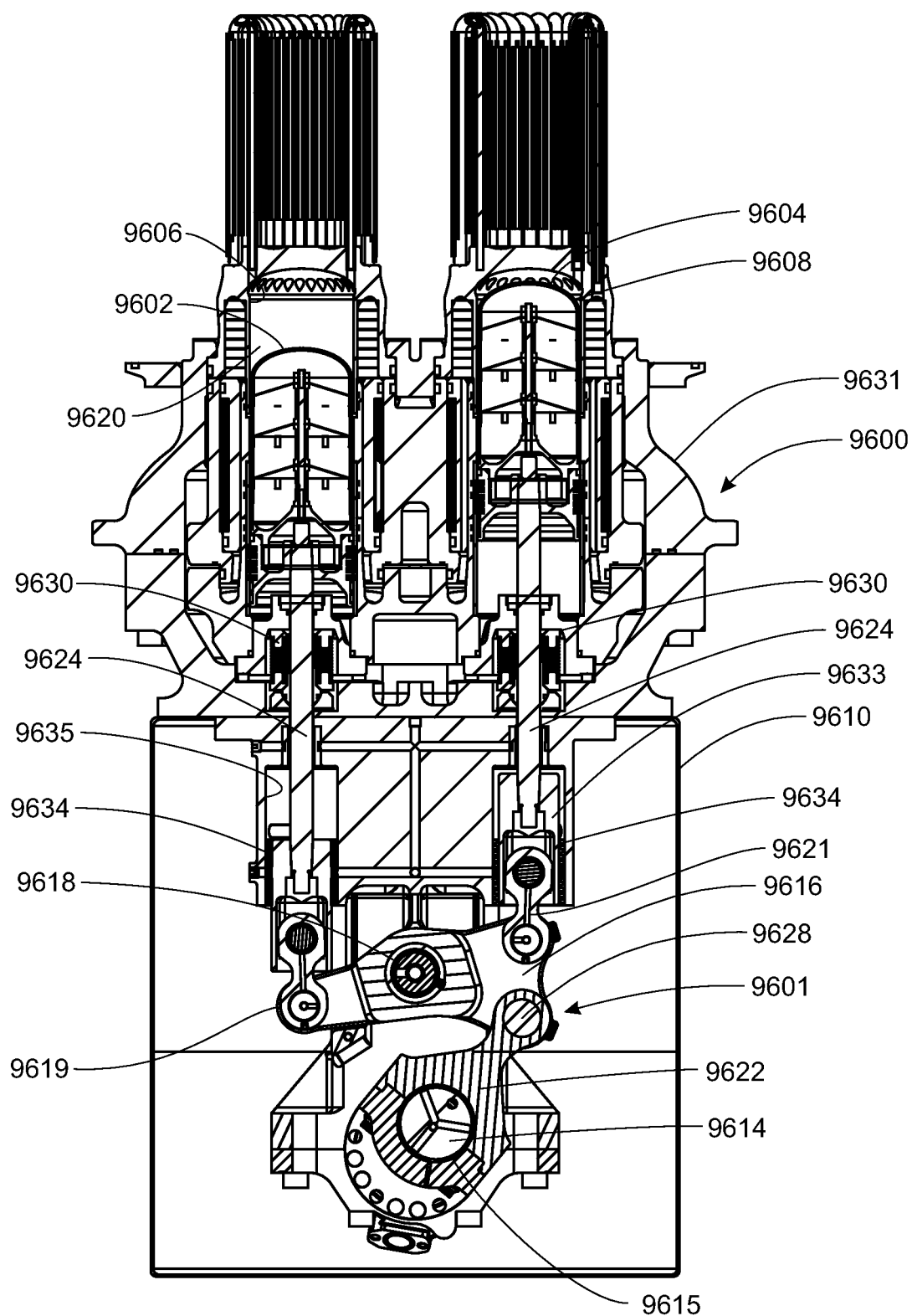
FIGS. 36A and 36B show a cross-sectional view of a Stirling cycle machine having an inverted rocking beam design in accordance with one embodiment.

Referring now to FIG. 36A, an embodiment of a Stirling cycle machine is shown in cross-section and designated generally by numeral 9600. While the Stirling cycle machine 9600 will be described generally with reference to the embodiment shown in FIGS. 36A and 36B, it is to be understood that many types of machines and engines, including but not limited to refrigerators and compressors may similarly benefit from various embodiments and improvements which are described herein, including but not limited to, external combustion engines and internal combustion engines. In particular, the present embodiment of the Stirling cycle machine is directed to improving the efficiency and operation of a 10 Kilowatt (Kw) Stirling cycle machine, although any other power output level are certainly contemplated and encompassed within the following disclosure of a machine or engine, that achieves high efficiency, long durability and low cost targets based on simultaneously utilizing optimized mechanical and operational control systems with existing Stirling cycle machine platforms.

The engine 9600 shown in cross-section in FIG. 36A includes generally a crankcase 9610 housing the drive components of the engine and a work space 9620 containing the working gas and/or fluid and gas and/or fluid compression and expansion related components. Inside the crankcase 9610 is an embodiment of a rocking beam drive mechanism 9601 (the term "rocking beam drive" is used synonymously with the term "rocking beam drive mechanism") for an engine, such as a Stirling engine, having linearly reciprocating pistons 9602 and 9604 housed within cylinders 9606 and 9608, respectively. As discussed previously, rocking beam drive 9601 converts linear motions of pistons 9602 and 9604 into the rotary motion of a crankshaft 9614. Rocking beam drive 9601 has a rocking beam 9616, rocker pivot 9618, a first coupling assembly 9619, and a second coupling assembly 9621. Pistons 9602 and 9604 are coupled to rocking beam drive 9601, respectively, via first coupling assembly 9619 and second coupling assembly 9621. The rocking beam drive 9601 is coupled to and drives crankshaft 9614 via a connecting rod 9622.

Figure 36B:
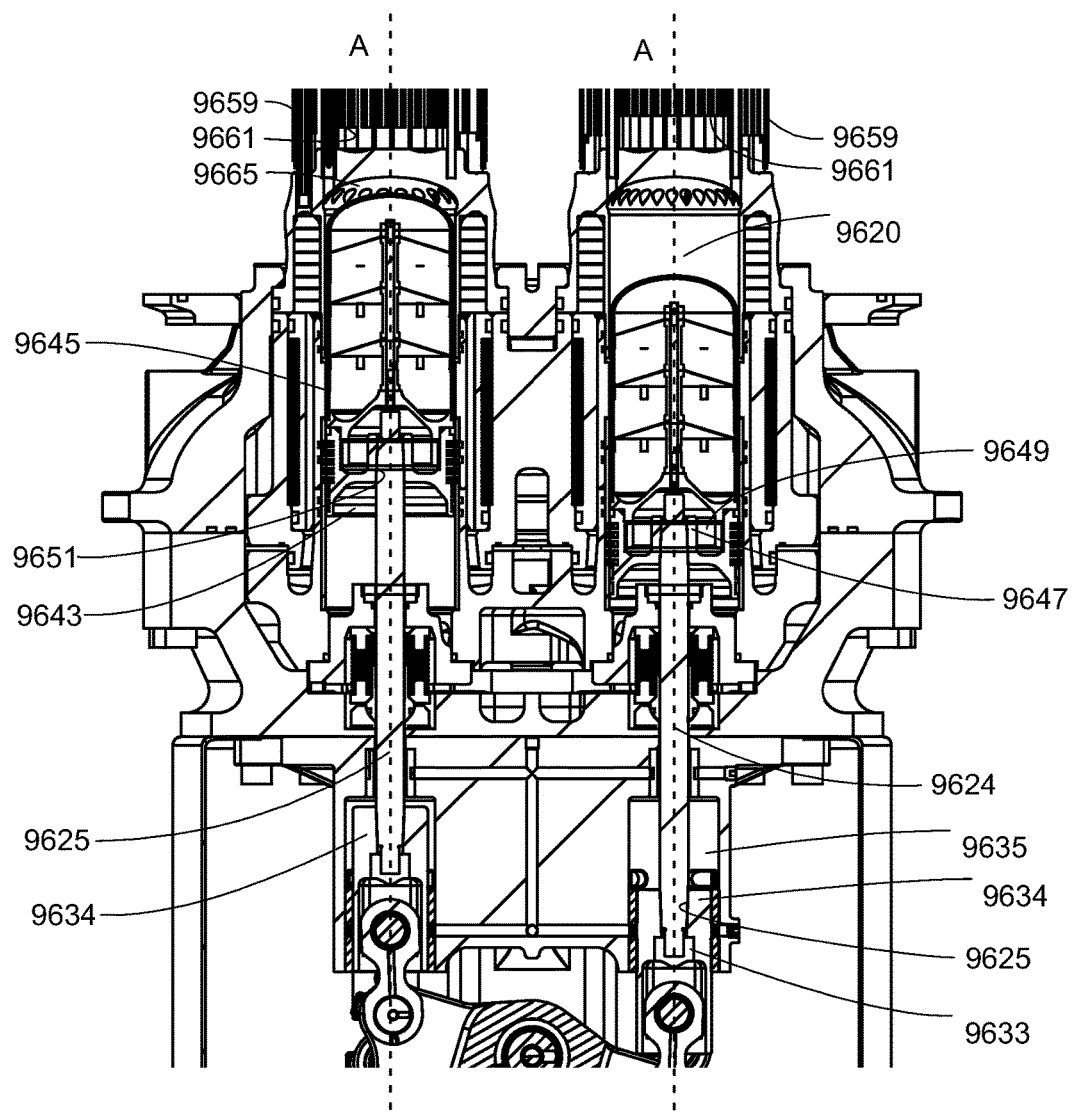

This embodiment shown in FIGS. 36A and 36B is an inverted rocking beam design similar to that disclosed in FIG. 35 and incorporates the same advantages and benefits as discussed therein. An important advantage of the inverted rocking beam arrangement having the crankshaft 9614 located relatively below the rocking beam mechanism 9601 of the machine ensures that the structural arrangement and alignment of the piston rods 9624 and cross-head coupling means 9634 which connect the piston rods 9624 to the rocking beam drive 9601 do not have to account for the size of the crankshaft 9614 and related components. This arrangement facilitates a larger load carrying capacity conrod bearing 9615 on the connecting rod 9622, better mechanical advantage developed by the rocking beam 9616 and space for such larger conrod bearings 9615. The arrangement also relieves space constraints of the pistons 9602 and 9604, piston rods 9624 and cylinders 9606 and 9608 which can occur with the crankshaft located above the rocking beam drive and between the piston shafts 9624. With the rocking beam 9616 now located above the crankshaft 9614, there are no longer space restrictions around the crankshaft rocking beam 9616 and a larger wrist pin bearing 9628 can be provided to better support the connecting rod 9622 and rocking beam connection 9601.

Figure 37A:
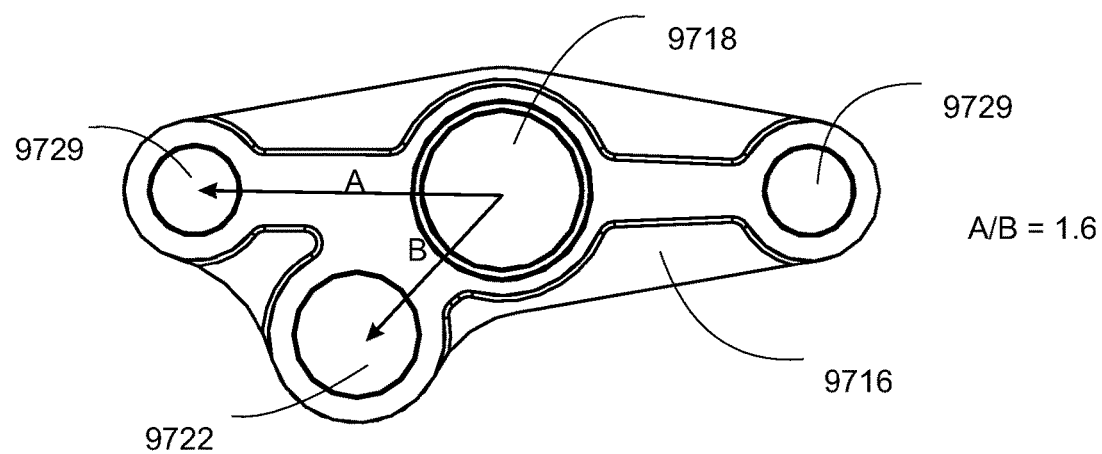
FIG. 37A shows a view of an embodiment of the rocking beam with a conrod bearing ratio of 1.6.
Figure 37B:
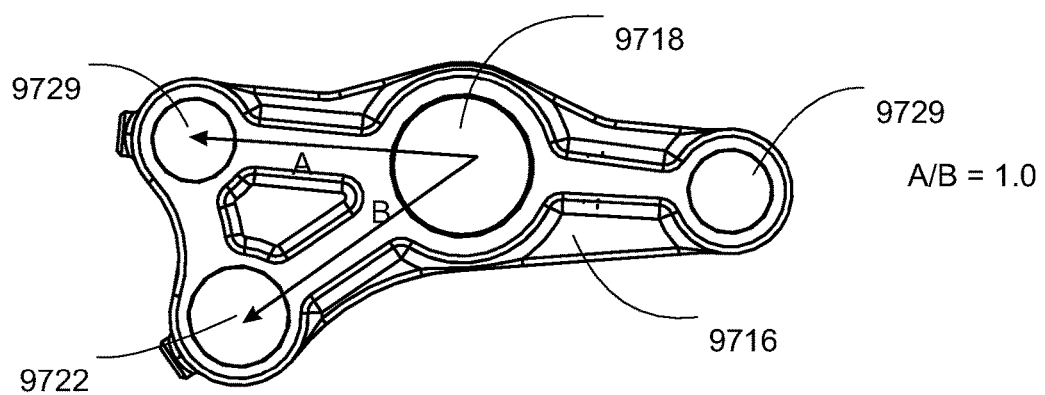
FIG. 37B shows a view of an embodiment of the rocking beam with a conrod bearing ratio of 1.0.

Also, with the inverted design, the rocking beam 9616 can be designed to reduce the load on the connecting rod 9622 wrist pin bearing 9628 and conrod bearing 9615 by adjusting the lever arm ratio A and B seen in FIGS. 37A and 37B between the rocking shaft pivot 9718, the connecting rod wrist pin bearing 9728 and between the rocker shaft pivot 9718 and the lever arm of the piston acting at 9729. For example, as seen in FIG. 37A, the bearing load on the connection rod 9728 is greater where the conrod bearing ratio A/B is 1.6 relative to the piston connection. In FIG. 37B, the rocking beam 9616 is shown having a 1.0 ratio which essentially equates the distances of the two connection points 9728' and 9729 about the rocking shaft pivot 9718 and therefore correspondingly balances the load on the crankshaft 9614 to be the same or similar to that developed by the piston shaft 9624 and significantly lower than the load transmitted with the bearing ratio A/B of 1.6. It is to be appreciated that other embodiments of a rocking beam drive besides the inverted rocking beam drive may also incorporate the benefits of the disclosed rocking beam 9616 as well.

Referring also to FIGS. 36A-36E, the alignment of the pistons 9602 and 9604, piston rods 9624 and cylinders 9606 and 9608 in conjunction with the crankcase 9610 is of critical importance for power transmission through the pistons 9602 and 9604 and piston rods 9624, providing for reduced wear on the piston rings and to the dynamic alignment and reciprocating nature of the piston rods and high pressure piston rod bearings 9630. The crankcase 9610 contains most of the rocking beam drive 9601 and is positioned below the cylinder housing 9631. The crankcase 9610 defines a space to permit operation of rocking beam drive 9601 having the crankshaft 9614 located below rocking beam 9616, a connecting rod 9622, and first and second coupling assemblies 9619 and 9621. Pistons 9602 and 9604 reciprocate in respective cylinders 9606 and 9608 as also shown in FIG. 36 and cylinders 9606 and 9608 extend above crankcase 9610, through the cylinder housing 9631, and into the heater heads.

The cross-heads 9634 and cross-head bores 9635 have a tolerance that is difficult to align with that of the mating cylinder liners in the cylinder housing 9631 during what is referred to as "stack up" i.e. the joining of the separate parts of the vessel, and therefore any difference in concentricity between these two elements when they are assembled together, creates a potential for misalignment, where potentially, the piston rod 9624 could sit askew, or at an angle and therefore the piston may reciprocate non-coaxially to the cross-heads 9634. The cylinder liner bores 9606, 9608, the cylinder gland locating diameter and the cross-head locating diameter of the cross-head bore 9635 all must be in alignment. To alleviate this issue and potential for misalignment, all three of these diameters are bored together in the same set-up and essentially simultaneously in the same operation resulting in very close tolerances of the diameters and the concentricity of these elements is maintained as closely as possible based on machining tolerances. These elements may also be manufactured and bored in other ways as well including but not limited to with alignment jigs and separate boring process that can produce the requisite tolerances to ensure that any angular deviation of the piston is maintained within an acceptable range.

Also as shown in another embodiment in FIG. 36B, to improve the concentricity of the piston and piston rod 9624, each piston rod 9624 is provided with a tapered end 9625 at each end of the rod 9624 to wedge the first end of the piston rod into the cross-head 9634. The tapered end 9625 facilitates the location, resting and clamping (L, R, C) between all elements for a proper location of the piston rod 9624 with the diameter doing the locating, the taper 9625 doing the resting, and a nut 9633 of the end doing the clamping. In the wedge connection provided by the taper, the wedge can lock itself in place because of the loads developed by the piston. The wedge or tapers on the ends of the piston rods are essentially jammed more and more firmly into the crossheads 9634 at the lower end of the piston rods 9624 and correspondingly into the piston at the upper end of the piston rod. A nut 9633 may be used to facilitate the connection with the cross-head 9634 in case the rod comes loose, but in almost every case the wedge will maintain the appropriate connection of the piston rod 9624 to the piston above, and the cross-head 9634 below.

To facilitate the assembly of the tapered piston rods 9624 where the taper is essentially a reduction in diameter of the ends of the piston rod 9624 along a portion of the piston rod, the piston 9602, 9604 is manufactured from two separate parts, a piston base 9643, and a piston shell 9645 better shown in FIGS. 36C, D and E. The piston base and shell can be matingly threaded where the piston base 9643 defines a threaded inner diameter surface wall 9647 corresponding to a threaded outer surface wall 9649 of the piston shell 9645. Other connection arrangements between the base and shell are possible as well to facilitate the connection of the two piston elements. The piston base 9643 is provided with a receiving bore 9651 which may be a constant diameter bore, or a tapered bore to receive the tapered end of the piston rod 9624. To assemble these elements, the tapered piston rod 9624 is inserted into the piston base 9643, clamped in place with a desired pre-load, and then the shell 9645 is threaded onto the base 9643 to complete the assembly. The reason for the two-part piston is that to appropriately clamp and pre-load the piston rod 9624 to the base 9643, the assembly process necessitates access to the inside of the piston, and hence the two-part shell and based design facilitates the clamping process. Other manufacturing techniques may also be used to appropriately attach the tapered piston rod 9624 and piston 9602, 9604 without the necessity for a two-part piston as described above.

Another important aspect of the present embodiment is an increased volume of the combustion space in the heater head. To provide more volume for the combustion of the burner to take place and heat the tubes, an upper most portion 9655 of the cylinders 9606, 9608 is provided with a larger diameter than the remainder lower portion of the cylinders, giving the cylinders 9606, 9608 to some extent a mushroom-shaped profile. The benefit of this includes but is not limited to the ability to move the heater tubes 9659 farther out from an axial center of the cylinders 9606, 9608, thereby increasing the diameter and combustion volume above the cylinder inside the heater tubes 9659 and/or to accommodate a larger diameter tube to handle more working gas and fluid through the heater tubes 9659.

Figure 38B:
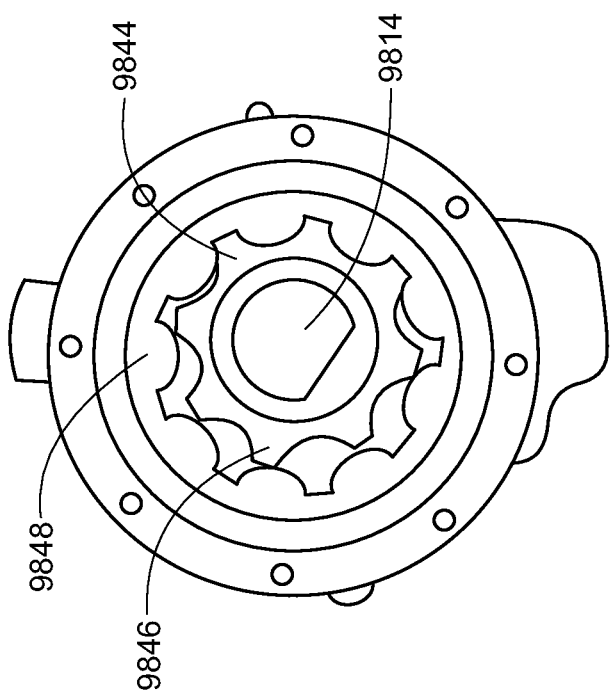
FIG. 38B shows a Gerotor displacement pumping unit according to one embodiment.
Figure 38A:
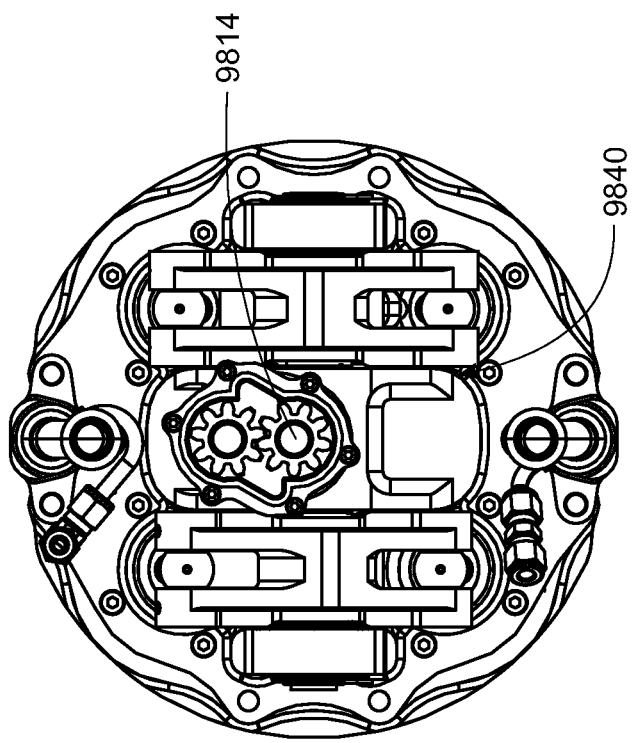
FIG. 38A shows an oil pump according to one embodiment.

In another embodiment shown in FIG. 38B, a Gerotor displacement pumping unit is driven by the crankshaft 9814. The Gerotor pump uses an inner rotor 9844 having one less gear tooth 9846 than the surrounding outer rotor 9848. During part of the rotation cycle, the area between the inner and outer rotor increases, creating a vacuum that draws fluid through an intake. The area between the rotors then decreases, causing compression allowing oil to be pumped out to the mechanical parts of the engine. The Gerotor pump is driven coaxially and directly from the crankshaft 9814 without the transmission losses of the helical drive gear, making the engine construction and assembly more efficient and less expensive than the construction and components of the helical drive gear to the gear pump. The construction and assembly is easier because the Gerotor pump is directly driven by the crankshaft 9814, whereas there are significant mechanical losses associated with the previous gear pump. In other embodiments different pumps besides a Gerotor pump may be used, which include but are not limited to, gear pumps, piston pumps, rotary gear pumps, hydraulic pumps and diaphragm pumps for example and that other embodiments of a rocking beam drive besides the inverted rocking beam drive may incorporate the benefits of the Gerotor pump or similar direct drive pump.

High Pressure Rod Seals

The present embodiment of the Stirling cycle engine maintains the working space 9620 and the working gas and/or fluid at a relatively high pressure, generally in the range of 1200-1800 psi, and more preferably about 1500 psi. It is of course necessary to ensure that the working gas and/or fluid is essentially sealed in the working space 9620 so that it does not escape into the crankcase 9610 and the environment. A critical place for such leakage of working fluid to occur is around the piston rods 9624, which extend and reciprocate between the working space 9620 and the crankcase 9610. To minimize such leakage, a high pressure piston rod seal 9630 is provided below the respective cylinders 9606 and 9608 and between the working space 9620 and the crankcase 9610.

With a significantly higher pressure in the working space 9620 relative to the crankcase 9610, a certain amount of working gas is anticipated to leak through the high pressure rod seals 9630. However, it is imperative to minimize the leakage without significantly affecting the reciprocating efficiency of the pistons and the engine. Also, as will be discussed in further detail below, an airlock and working fluid recapture system may be used in conjunction with the high pressure seals to capture certain amounts of such leaking working gas and/or fluid. Any working gas which leaks into the air lock between the working space 9620 and the crankcase 9610 can be drawn into an accumulator and supplied back into the workspace when necessary. Before more completely discussing such an airlock and recapture of working fluid, the present discussion is focused on the use of the high pressure rod seals 9630 between the working space 9620 and the crankcase 9610 to ensure the most effective working fluid pressure and gas containment.

Figure 39:
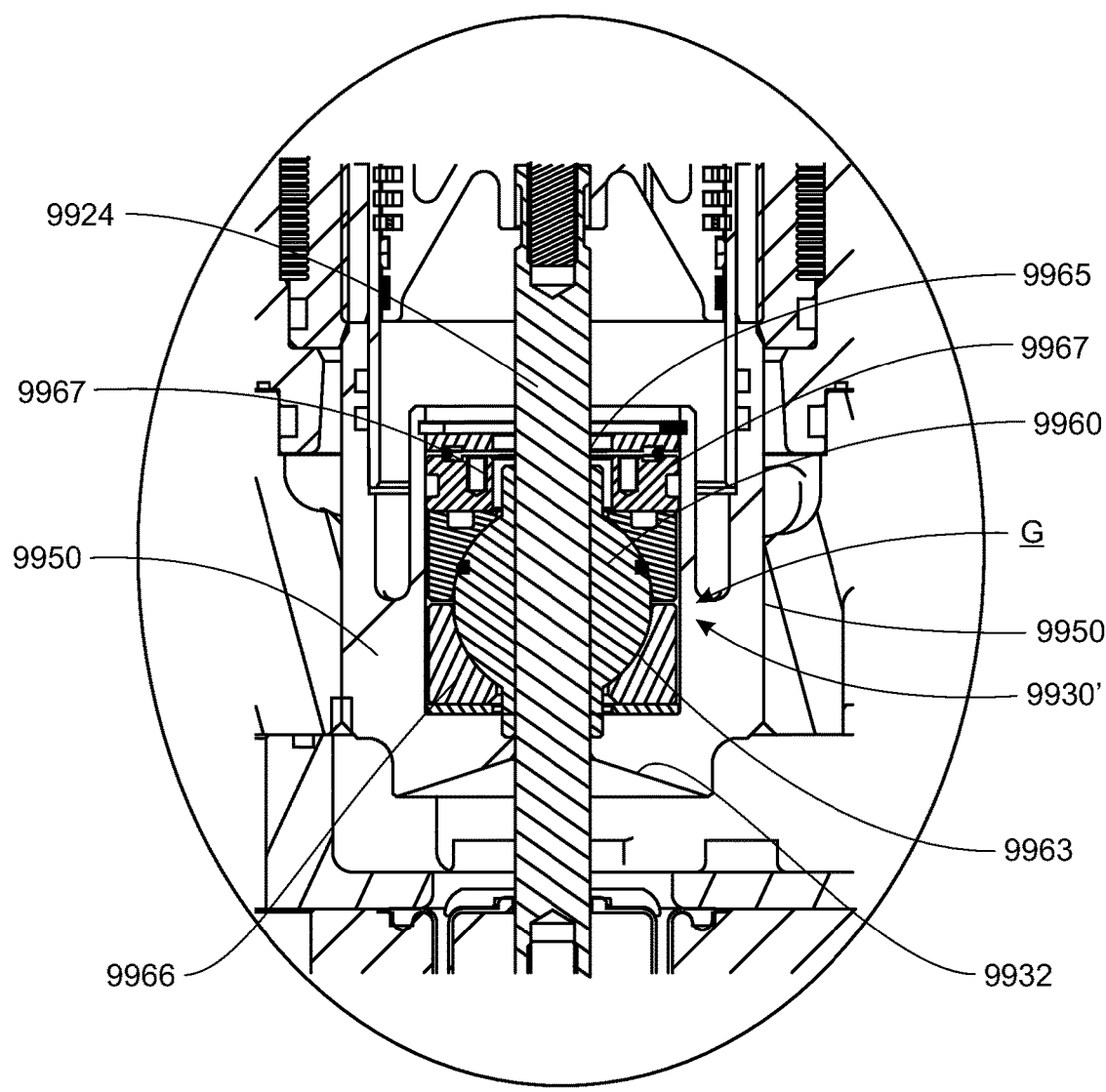
FIG. 39 shows an embodiment of a high pressure rod seal.

A mechanical embodiment of the high pressure rod seal 9930 is in FIG. 39. It should be understood that such a rod seal is intended to be utilized not only in the Stirling engine embodiments described herein but also in other engines or mechanisms with similar reciprocating pistons.

In a mechanical embodiment of the high pressure piston rod seal 9930', shown in better detail in FIG. 39, a substantially symmetrical hemispherical shaped piston sleeve 9960 is supported by an upper seal support 9965 and a lower seal support 9966 inside a seal cavity defined inside a seal housing 9951. The symmetry of this hemispherical shaped piston sleeve 9960 provides more consistent wear across the length of the sleeve 9960 as compared to the wedge rod seal 9930 described above which focuses the radial wear at one end of the sleeve. The hemispherical surface 9963 of the piston sleeve 9960 bears on an inner respective bearing surface of each of the upper and lower seal supports 9965, 9966. A wear support clamp 9967 is provided axially disposed above the upper seal support 9965 which forces the upper and lower seal supports 9965, 9966 into biased contact with the piston sleeve 9960. A gap G may be provided between the upper and lower seal supports 9965, 9966 to accommodate any wear that may occur on abutting surfaces in the seal. As wear occurs, the abutting surfaces in the seal may be reduced so that as the sleeve bearing wears, the upper and lower seal supports 9965, 9966 are biased towards one another by the support clamp 9967. The gap G permits the upper and lower seal supports 9965, 9966 to move closer to one another as the seal wears without interfering with one another and so maintaining contact with the hemispherical shaped outer surface 9963 of the piston sleeve 9960.

Figure 40A:
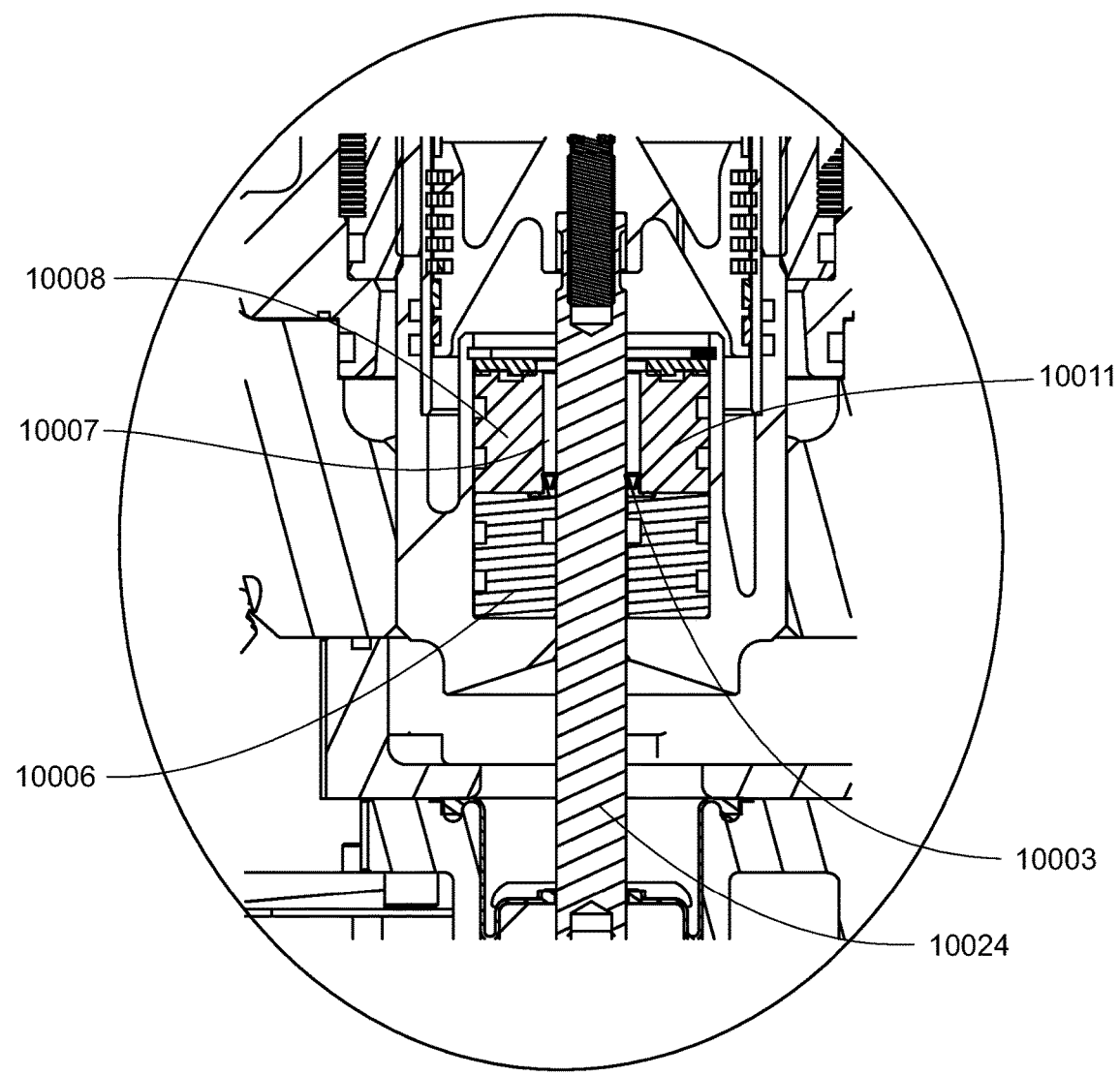
FIG. 40A shows another embodiment of a high pressure rod seal including a spring energized lip seal.

A still further embodiment of a high pressure rod seal shown in FIG. 40A incldes a spring energized lip seal 10003 generally comprising a seal jacket, made from PTFE or graphite for example, and a spring (not shown) circumferentially secured within a groove or between lips 10007 of the seal 10003. When the spring energized lip seal 100003 is seated in the housing, the spring lip seal 10003 is under compression, forcing the jacket lips 10007 against the respective adjacent walls of the seal block 10011 and the surface of the reciprocating piston 10024, thereby creating a leak free seal. The lip seal 10003 provides permanent resilience to the seal jacket 10005 and compensates for jacket wear and hardware misalignment or eccentricity. System pressure also assists in energizing the seal jacket 10005. Spring loading assisted by system pressure provides effective sealing at both high and low pressures. Spring energized lip seals are highly durable and designed for static, rotary and reciprocating applications in temperatures from cryogenic to +600 F as well as pressures from vacuum to 25,000 psi, and to survive most corrosive environments.

A spring cup retaining cylinder 10008 is set around the piston rod 10024 and supported on a lower collar 10006. The retaining cylinder 10008 maintains a circumferential space about the piston rod 10024 in which the lip seal 10003 is maintained. The lip seal 10003 can be a PTFE and graphite ring supported around an outer circumference by the retaining cylinder 10008 and frictionally slidably engages the piston rod 10024 to create the high pressure spring energized lip seal. The spring (not shown) inside the lip seal 10003, along with the higher pressure of the working space, forces the lip seal 10003 against the respective piston rod 10024 and retaining cylinder wall, and also maintains the lip seal 10003 set down in the retaining cylinder 10008 generally against the lower collar 10006.

Figure 40B:
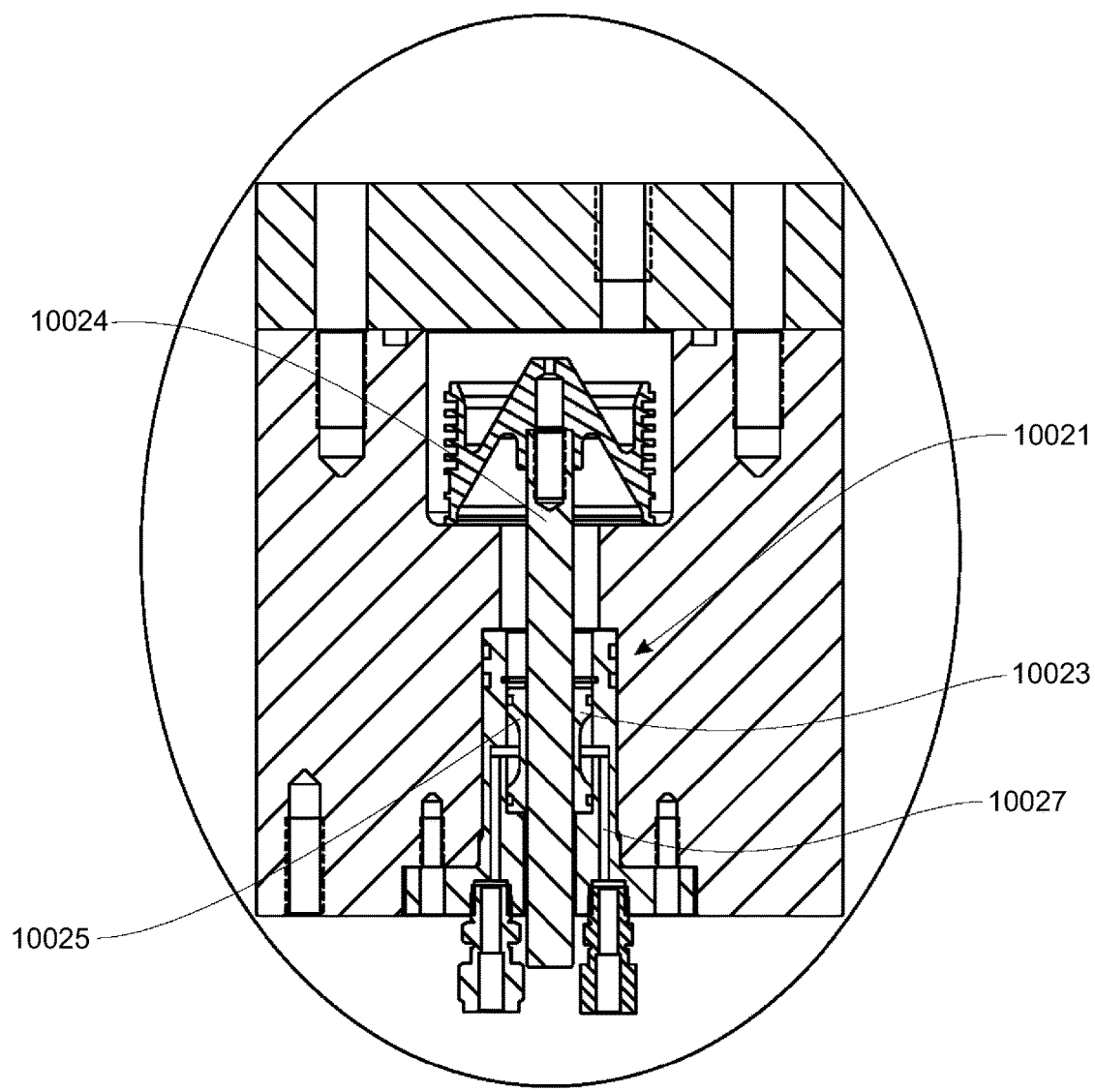
FIG. 40B is a hydraulic high pressure piston rod seal set inside the rod seal cavity of a test rig according to one embodiment.

A hydraulic embodiment of a high pressure piston rod seal can facilitate an efficient and long term seal between the working space and the airlock. FIG. 40B discloses a hydraulic high pressure piston rod seal 10021 set inside the rod seal cavity of a test rig. A rod seal sleeve 10023 circumferentially encompasses the piston rod 10024 and defines a pressure space 10025 between a wall of the test rig and an outer surface of the rod seal sleeve 10023. A hydraulic fluid pressure line 10027 communicates with pressure space 10025 to provide the appropriate fluid pressure to maintain the rod seal sleeve 10023 in sealing engagement with the piston rod 10024. A sensor (not shown), such as a piezoelectric pressure sensor, can be provided in the pressure space 10025 and on the rod seal sleeve 10023 to ensure that the appropriate pressure and flexure is actuating the rod seal sleeve 10023 and providing the appropriate sealing pressure against the piston rod 10024. The inner surface of the rod seal sleeve 10023 slidably engages along the piston rod 10024 as the rod reciprocates and the rod seal sleeve 10023 is influenced radially inwards by the hydraulic pressure fluid in the pressure space 10025. As the rod seal sleeve 10023 wears, the hydraulic fluid pressure in the pressure space 10025 can be increased to ensure that the rod seal sleeve 10023 is motivated radially towards the piston rod 10024 to maintain slidable engagement with the piston rod.

It is to be appreciated that the above disclosed embodiment of high pressure rod seals are intended only as examples and that the machines described herein are not limited to these examples, and that other embodiments of high pressure rod seals may also be used to ensure that the high pressures used in Stirling engines, or any other engine for that matter, are maintained in the appropriate working space, crankcase and other engine compartments as necessary.

Rolling Diaphragm Seal

Figure 41B:
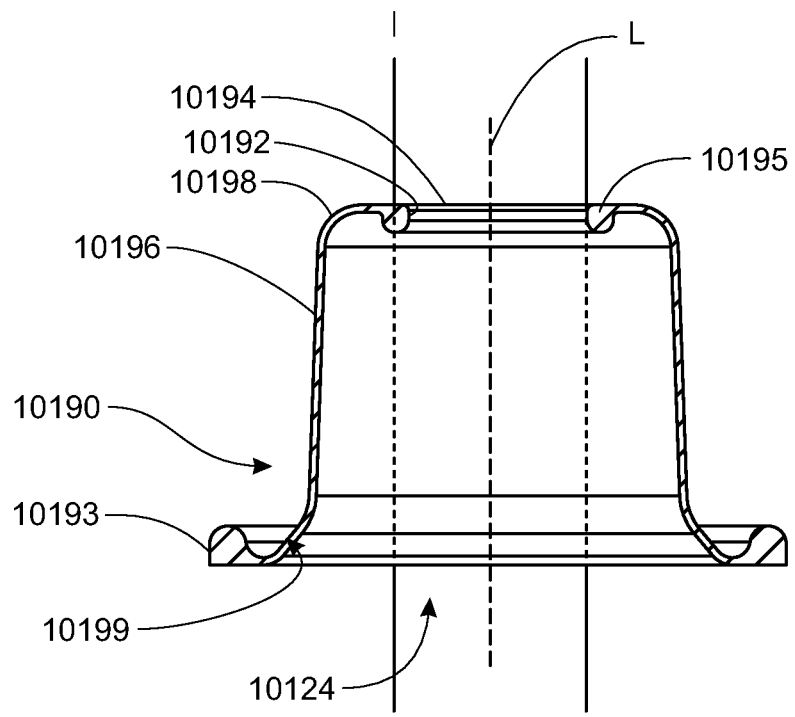
FIGS. 41A and 41B show views of a rolling diaphragm in accordance with one embodiment.
Figure 41A:
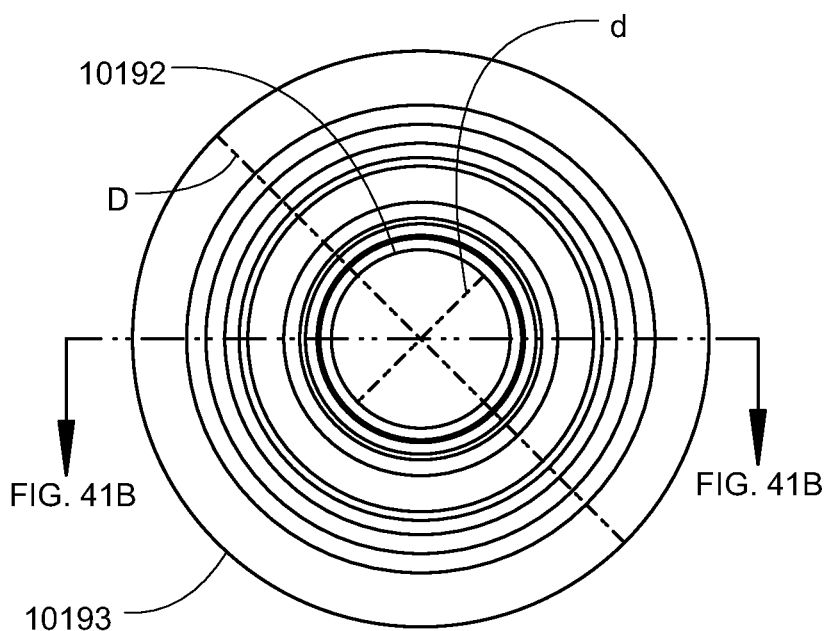

Turning to FIGS. 41A and 41B, and referring back also to FIGS. 10A-D, in certain embodiments a rolling diaphragm 10190 is used in conjunction with the piston rods 10124 to prevent the escape of lubricating fluid from the crankcase 10110 up past the rods 10124 and into the working space 10120 and regenerator. If the lubricating fluid necessary for the rocking drive can bypass the piston rod seals, it can potentially damage the working space, clog the regenerator and contaminate the working fluid or gas of the engine in the cylinders.

To facilitate the appropriate rolling and flexing of the diaphragm 10190, a pressure differential is maintained across the rolling diaphragm 10190 so that preferably the pressure above the diaphragm 10190 is slightly greater than the pressure in the crankcase. The seal is thus essentially inflated into the crankcase, which facilitates the diaphragm 10190 maintaining its desired form as it rolls and flexes with the reciprocating piston rod 10124. This alleviates stresses on the circumferential sealing points so the seal is not compromised. It is generally necessary to place a differential of approximately 15 PSI across the diaphragm 10124 to properly inflate the seal so that it conforms to the shape of the bottom seal piston 10195 as it moves with the piston rod 10124. It is to be appreciated that the pressure differential maintained across the rolling diaphragm 10190 is not limited to 15 PSI. Rolling diaphragms made of stronger materials or having a particular shape may be able to sustain a higher differential or operate at a lower differential as the case may be. In embodiments of the stirling cycle engine where the working space 10120 is at a relatively high pressure 1500 PSI-1800 PSI, the crankcase 10110 must be charged with a pressure for instance of 1485 PSI, which is approximately 10-15 PSI less than that of the working space at 1500 PSI. Although it is possible to regulate these larger pressures to maintain the 10-15 PSI difference across the diaphragm, it is difficult and adds to the complexity of the machine.

The rolling diaphragm 10190 may be manufactured by injection molding or hot compression molding. In hot compression molding of the rolling diaphragm 10190, it can be more difficult to control material properties but injection molded diaphragms have shown in testing a better transition of dynamic stresses across the profile of the rolling diaphragm 10190 as it transitions and rolls with the reciprocation of the piston rod 10124. Testing on the materials used to fabricate the rolling diaphragm 10190 indicate chopped fiber is most successful for example but not limited to, nitrile with Kevlar fiber or Fab-Air®.

FIGS. 41A and 41B disclose an embodiment of the rolling seal or diaphragm 10190 having a profile which facilitates the dynamic rolling translation of the diaphragm. As discussed in previously herein, and incorporated herein by reference in its entirety in the present discussion, the pressure differential that is placed across the seal allows the seal to act dynamically to ensure that the rolling diaphragm 10190 maintains its form throughout its dynamic range of motion. As previously discussed, the pressure differential causes the rolling diaphragm 10190 to conform to the shape of the bottom seal piston 1310 with reference to FIG. 10A as it moves with the piston rod 10124, and prevents separation of the diaphragm 10190 from the surface of the piston rod 10324 during operation. It is desirable to lower the amount of inflation of the rolling diaphragm 10190 without the diaphragm buckling or separating, i.e., deviating from a consistent dynamic axial and radial rolling of the diaphragm 10190 along the diaphragm profile with the axial reciprocation of the piston rod 10124. As discussed above, the inflation of the diaphragm is provided by the pressure differential across the rolling diaphragm 10190. To accomplish this, it has been found that particular structural profiles facilitate the conservation of material and consistent rolling of the diaphragm.

The cross-section in FIG. 41A-B shows a profile view of the molded form of the diaphragm of the present embodiment about a diaphragm axis L. For purposes of describing the diaphragm structure the inner edge 10192 as being the top 10194 of the diaphragm and the outer edge 10193 is the bottom of the diaphragm as shown in the figures. The diaphragm has a lateral wall 10190 extending axially and radially relative to axis L from the inner edge 10192 to the outer edge 10193; the lateral wall is composed of several sections. A top fillet section 10198 turns the material approximately 90 degrees from the top of the diaphragm 10190 as shown, to a sidewall section 10196 substantially parallel to the piston rod 10124 and axis L. The sidewall section 10196 in turn then turns towards the outer edge 10193. Before reaching the outer edge 10193, the sidewall section merges contiguously into a chamfer section 10199, which while still depending axially from the sidewall section 10196, extends from the sidewall 10190 in a greater radial degree relative to axis L to connect with the outer edge of the diaphragm 10193. The sidewall section 10196 may be parallel to the axis L or may also have a radial component which slightly angles the sidewall section 10196 radially away from the axis L. In either case the chamfer section 10199 extends to a greater radial degree from axis L than the sidewall section 10196. A bottom fillet 10197 connects to the outer edge 10193 defining the bottom of the diaphragm as drawn. The outer edge 10193 like the inner edge 10192 is provided with a thickened circumferential lip, which can be secured inside a matching groove formed in the vessel joint.

Figure 42B:
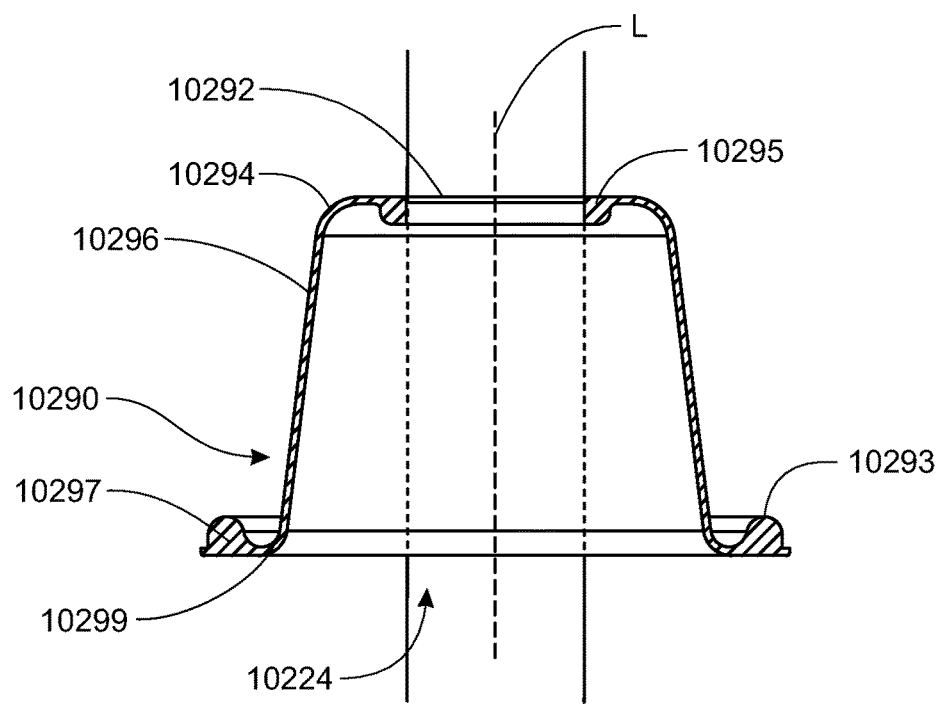
FIGS. 42A and 42B show views of a rolling diaphragm in accordance with another embodiment.
Figure 42A:
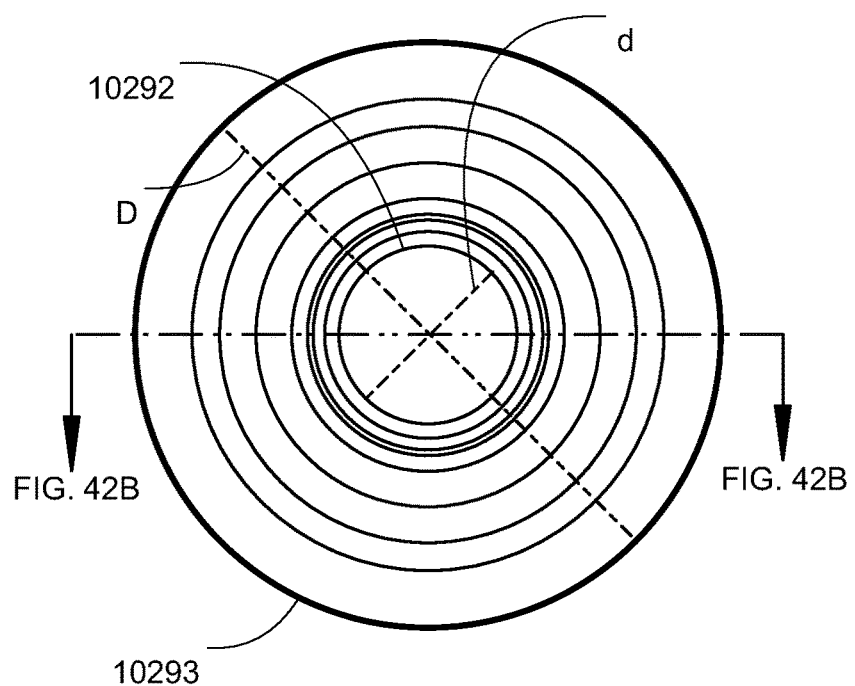

The cross-section shown in FIGS. 42A and 42B is a profile view of the molded form of another embodiment of the rolling diaphragm 10290 of the present embodiment about a diaphragm axis L. Like reference numbers for this embodiment correspond to the same or similar elements in the previous rolling diaphragm embodiment. For purposes of describing the diaphragm structure, the inner edge 10292 is the top of the diaphragm and the outer edge 10293 is the bottom of the diaphragm 10290 as shown in the figures. The diaphragm 10290 has a lateral wall 10296 extending axially and radially relative to axis L from the inner edge 10292 to the outer edge 10293; the lateral wall here is again composed of several sections. A top fillet 10294 section turns the material approximately 90 degrees from the top of the diaphragm 10290 as shown, to the sidewall section 10296, which depends both axially and radially outwards towards the bottom of the diaphragm along the axis L. Before reaching the outer edge 10293, the sidewall section 10296 merges contiguously into a bottom fillet 10299 to extend towards the outer edge 10293 of the bottom of the diaphragm as drawn. An outer lip 10197 similar to the thickened circumferential lip 10295 of the inner edge 10192 is provided, which are secured inside a matching groove formed in the vessel or crankcase joint which secures and seals the outer edge 10293 of the diaphragm.

The injection molding of the diaphragm is important because the gating methods and other molding techniques, characteristics, methods and specifications can affect the fiber alignment and molecular alignment of the diaphragm material during the molding process. These material characteristics are important because this can affect the hoop stress of the diaphragm. For example, if the material is gated at one end and overruns an opposing end of the mold, the fibers can be aligned in a particular direction to optimize the hoop strength of the diaphragm while potentially enhancing the flexible and rolling characteristics of the final diaphragm element.

It is very important in the dynamic rolling actuation of the diaphragms 10190, 10290 that no imperfections or particles including fluid particles such as oil droplets are disposed on the surfaces of the bottom seal piston or on the adjacent vessel wall surrounding the bottom seal piston. Such fluid particles, most likely oil, are detrimental to the rolling actuation of the diaphragm against the respective crankcase surfaces, because they cause stress points on the diaphragm.

Figure 43:
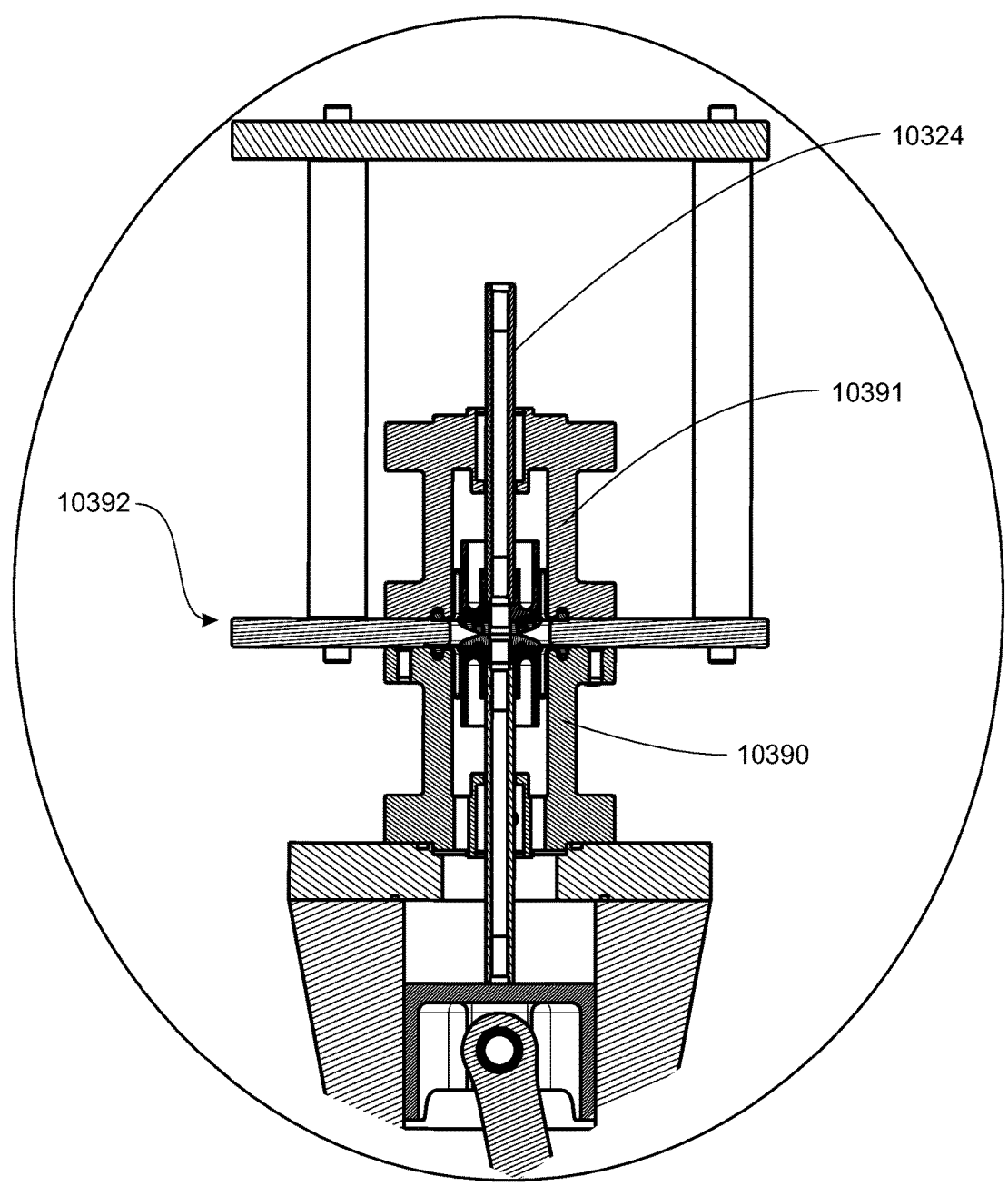
FIG. 43 shows a view of a double bellows system in accordance with one embodiment.

Turning to FIG. 43 another embodiment of the rolling diaphragm includes a first and second rolling diaphragm 10391, 10393 to make what is essentially a double bellows system 10392. A double bellows system 10392 can facilitate the elimination of the 10-15 PSI pressure differential between working space and airlock and/or crankcase by providing the appropriate expansion pressure between the double bellows themselves. The double bellows include first and second rolling diaphragms 10391, 10393 which are oppositely and axially aligned along the piston rod, and define a space therebetween with a light oil contained between the diaphragms and pressure charged between the double bellows. The incompressible oil prestresses the diaphragms and facilitates the consistent rolling of the diaphragm as the piston rod 10324 reciprocates along its axis.

Airlock and Working Fluid Recapture System

The power, life and value of a Stirling engine can be maximized by building an oil lubricated drive and sealing the work-space from the oil. Oil lubricated drives allow high powers and are inexpensive compared to drives based on rolling elements. It is essential to isolate the oil in the drive from the workspace. Even oil mist will migrate to the hot end of the working space, where the oil will breakdown and the resulting carbon will clog the heat exchanger. Flexible membranes or bellows such as the rolling diaphragms discussed above that attach to the moving piston rod and the structure provide an oil and gas tight seal between the oil filled crankcase and the workspace, ensuring that the lubricant is maintained in the crankcase. In order to function for thousands and millions of cycles, a small pressure difference must be maintained across the bellows.

Figure 44A:
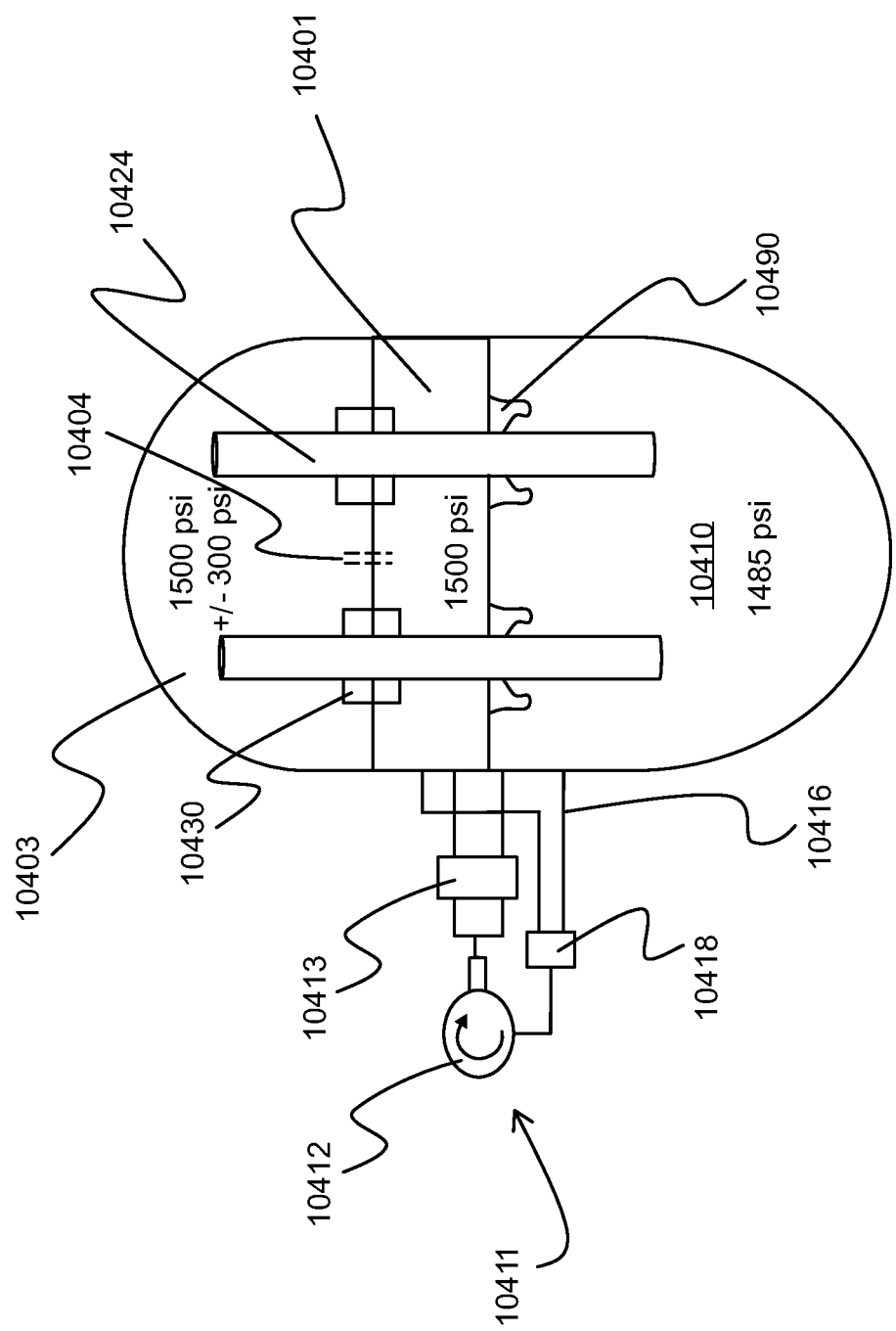
FIGS. 44A and 44B show views of an airlock pressure regulation system in accordance with one embodiment.
Figure 44B:
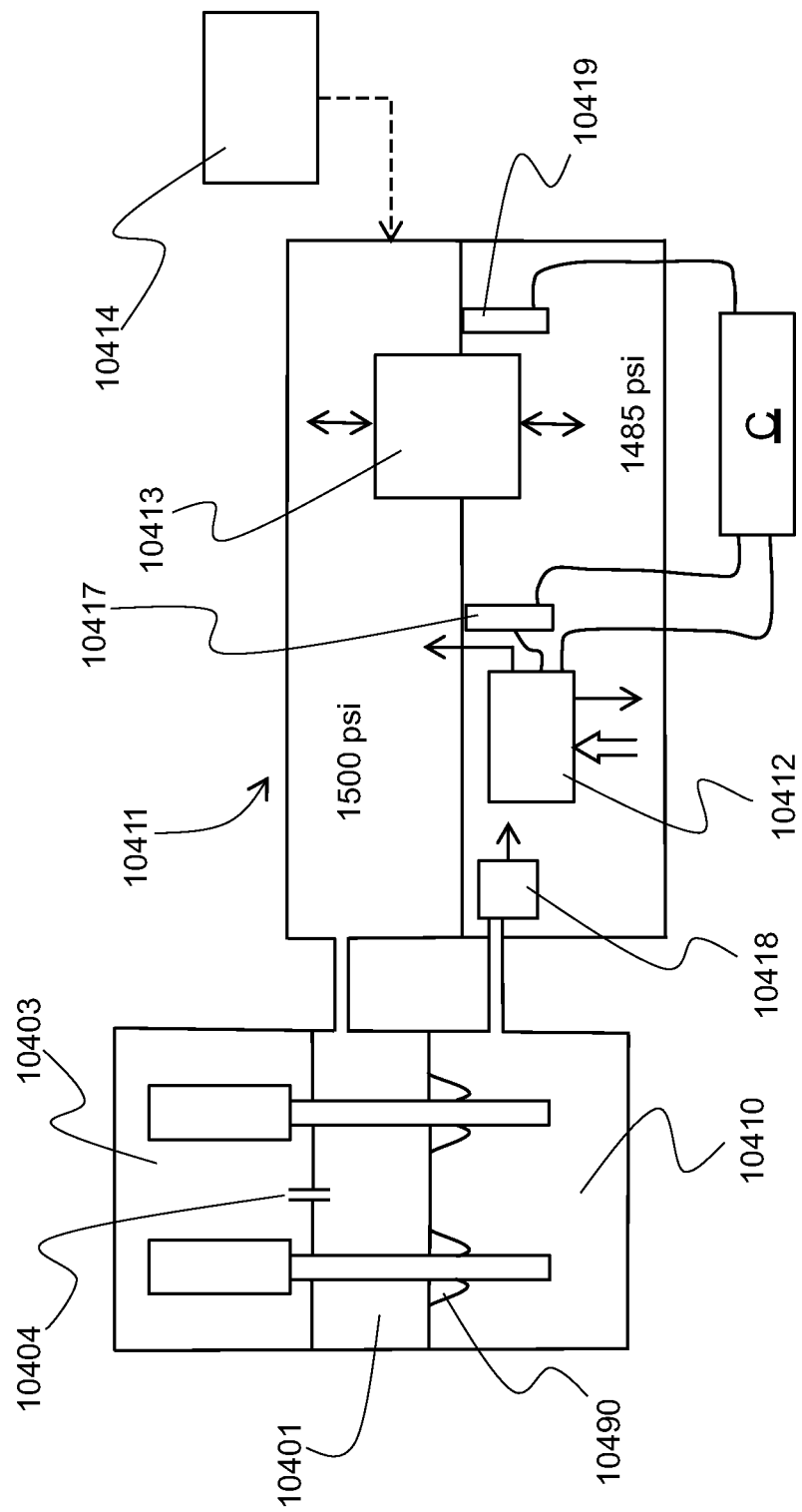

An important aspect of the rolling diaphragm and oil lubricated crankcase relates to the use of an airlock 10401 and an airlock pressure regulation system 10411 as shown in FIGS. 44A and 44B. The airlock pressure regulation system 10411 provides the benefit of ensuring working gas escaping from the working space 10403 is returned to the working space, provided that the working gas does not leak into the environment or atmosphere, which would require replenishment of the working gas, and that an appropriate pressure differential is maintained across the rolling diaphragms as described above. The airlock pressure regulation system 10411 permits an easily serviceable bottom end i.e. crankcase 10410 if, as in the embodiment disclosed in FIG. 48, the crankcase is intended to be maintained essentially at atmospheric pressure.

As shown in FIG. 44A relating to a pressurized crankcase 10410 at approximately 1485 PSI, in order to maintain an appropriate working space pressure and airlock pressure regulation, an airlock space 10401 is provided between the working space 10403 and the crankcase 10410 at a pressure of, for example 1500 PSI, so that the substantially greater pressures in the working space 10403 should not significantly influence the air lock space 10401 and any pressure and working gas leaking from the working space 10403 into the air lock can be captured and accumulated as described below with respect to the airlock pressure regulator and returned to the airlock and working space and not merely escape into the crankcase and environment.

It is to be understood that airlock space 10401 is intended to maintain a constant volume and pressure necessary to create the pressure differential necessary for the function of rolling diaphragm 10490 as previously described. In the present embodiment the airlock 10401 may or may not be sealed off from working space 10403 with high pressure rod seals 10430. In any case, the pressure of airlock space is desired to be maintained at essentially 1500 PSI and equal to the mean pressure of working space 10403. The pressure in the working space 10403 may vary at least +/−300 PSI so the intention of the airlock space 10401 is to insulate the diaphragms from such fluctuations and maintain itself at around the necessary pressure, by way of example here 1500 PSI, relative to the 1485 PSI charged in the crankcase 10410. To facilitate the equalization of pressures between the working space 10403 and the airlock space 10401, a small opening or pressure equalization orifice 10404 communicates between the working space 10403 and the airlock space 10401. The crankcase 10410 must be charged to 1485 PSI, and be maintained at approximately 15 PSI less than the airlock space 10401 so that the appropriate pressure is applied to the rolling diaphragm 10490 to ensure the proper dynamic movement of the diaphragm.

In this pressurized crankcase 10410 embodiment an airlock pressure regulator 10411, a pump 10412 and relief valve system is provided between the crankcase 10410 and the air lock space 10401 to maintain the exemplary 15 PSI pressure differential therebetween. Other predetermined pressure differentials may also be maintained depending on the diaphragm material and the design of the entire airlock pressure regulation system. In its most general form, an uptake line 10416 communicates from the pressurized crankcase 10410 to a filter 10418, a pump 10412 (having a check valve on its outlet), and a pressure regulator 10413 in parallel with the pump 10412 and filter 10418 for returning pressurized working gas back to the air lock 10401 and so maintains the pressure differential between the airlock space 10401 and the crankcase 10410 and consequently across the rolling diaphragm 10490. This airlock pressure regulator system 10411 is described more completely with respect to FIG. 44B.

The airlock pressure regulator 10411 regulates the pressure difference between the airlock 10401 and the crankcase 10410. When the engine is turning, the airlock pressure regulator 10411 keeps the airlock pressure preferably 10 to 14 PSI above the crankcase pressure although a range of 5 to 20 PSI is possible and other pressure differentials can be accomplished by the regulator as well. When the engine is off, the airlock pressure regulator 10411 keeps the airlock pressure preferably less than 15 PSI above the crankcase pressure and not more than 5 PSI below crankcase pressure. It is permissible to have a greater fluctuation of pressure differential when the engine is off since there is little or no dynamic forces being applied to the rolling diaphragms 10490 via moving pistons.

The airlock pressure regulator 10411 performs several important functions. The airlock pressure regulator 10411 uses a pump 10412 to move pressurized gas from the lower pressure crankcase 10410 into the airlock 10401, thereby maintaining the airlock 10401 at a higher pressure. The airlock pressure regulator 10411 relieves excess pressure between the airlock 10401 and crankcase 10410 volumes. A bidirectional regulator 10413 vents some of the airlock gas into the crankcase 10410, when the airlock pressure is preferably 15 PSI above the crankcase and vents in the opposite direction, venting gas from the crankcase 10410 to airlock 10401, when the airlock pressure is more than 5 PSI below the crankcase pressure. Also, a filter 10418 in the airlock pressure regulator 10411 filters out the oil from the crankcase gas before it enters the airlock volume.

The components of the preferred embodiment are the mechanical pump 10412, the bidirectional pressure regulator 10413, an oil filter 10418, a pump pressure switch 10417 to control the pump 10412 and a controller pressure switch 10419 to signal the engine controller C. An example of the mechanical pump is the Linear AC 0410A pump by Medo. Other pumps could certainly be used as well. The important qualities of the pump are the ability to operate in a high pressure inert environment, long life, no maintenance and quiet. Solberg Mfg. produces a line of oil-mist eliminators, i.e. filters, that are compact, effective and can hold enough oil for several thousand hours of operation. In a preferred embodiment, the bidirectional regulator 10413 allows pressure flow when the design pressure difference has been exceeded in either direction. Pump pressure switch 10417 operates the pump when the pressure difference between the airlock 10401 and the crankcase 10410 is preferably less than 10 PSI for example. Pump pressure switch 10417 includes a predetermined dead band, or range, that keeps the pump 10412 on until the airlock pressure is for example 14 PSI above the crankcase pressure. Controller pressure switch 10419 signals to the controller C that the airlock pressure is at least 5 PSI, for example, above the crankcase pressure. This insures that the engine will not turn until the airlock pressure is sufficiently greater than the crankcase pressure. The rolling diaphragms 10490 could tear if moved without such pressure difference across them. A fill source 10414 may be connected with the airlock to replenish the pressurized vessel charging and working gas/fluid if necessary.

Figure 46A:
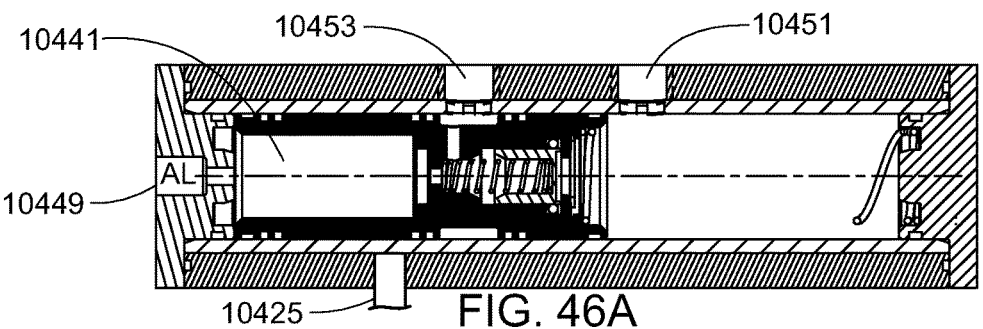
FIGS. 46A-46E show various positions of a spool valve in a bidirectional regulator in accordance with various embodiments.
Figure 46B:
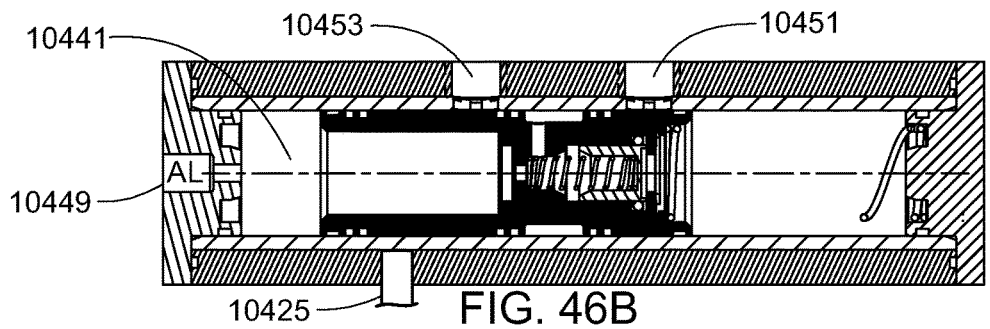
Figure 46C:
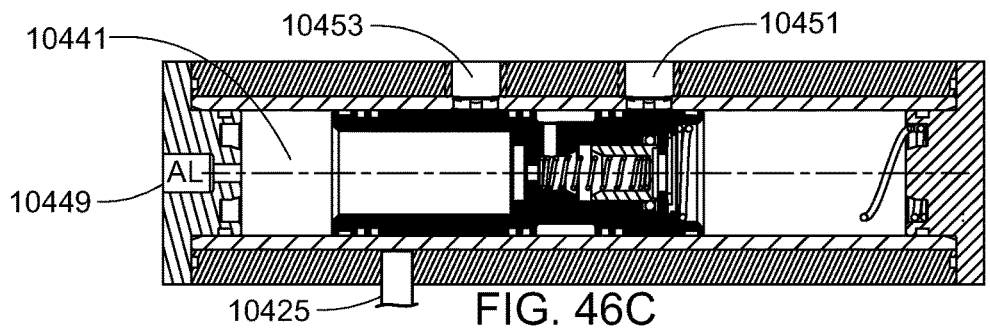
Figure 46D:
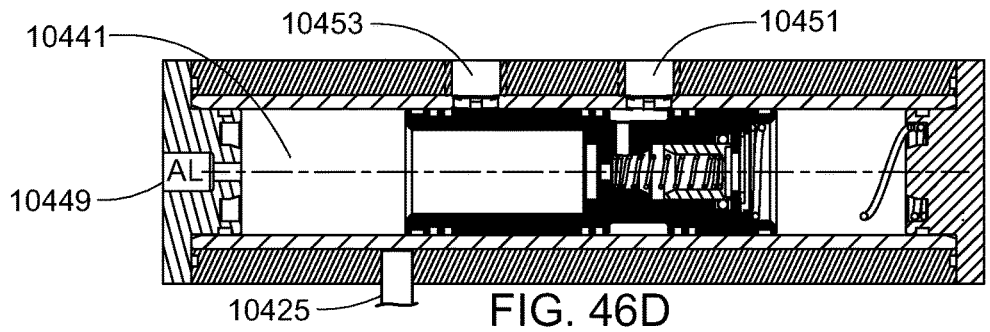
Figure 46E:
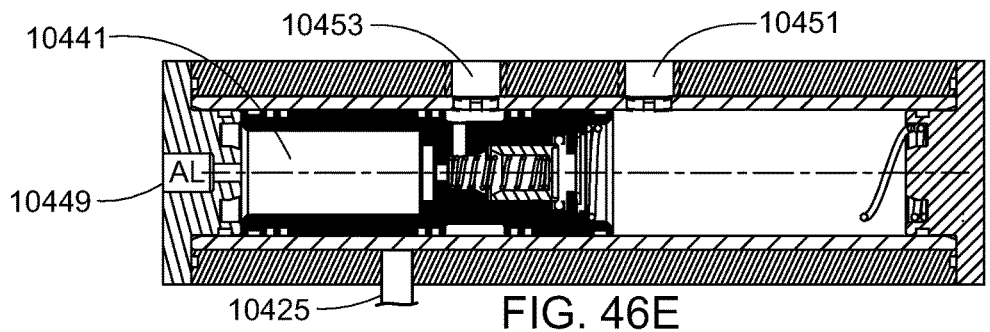

FIG. 45 is a specific embodiment of the bidirectional regulator 10413 showing the pump 10412, oil filter 10418 and a spool valve 10441 which operates between an airlock port 10449, a crankcase port 10451 and a pump port 10453 according to the pressure differentials between the crankcase pressure and airlock pressure. In this case, alternative to the pressure switches 10417, 10419 described above a proximity sensor 10425 for determining location of the spool 10441 via a target magnet 10426 is used to control the pump 10412 and if necessary to signal the engine controller C. The spool valve 10441 is biased by a primary spring 10443 against the airlock over-pressure and an underpressure relief valve 10445 is biased by an inner spool spring 10447. Observing FIGS. 46A-A6E the spool is shown in certain positions: in (1) is shown the spool influenced open by the spring where the airlock pressure is low so that the airlock port 10449 now communicates to pump port 10453 to receive pressurized gas from the pump 10412, in (2) the spool 10441 is shown where the airlock pressure is within normal limits so the airlock port 10449 is closed by spool 10441 and the spool is still displaced enough according to the proximity sensor 10425 to cause operation of the pump 10412, even without flow from the pump to the airlock. In (3) the spool 10441 is shown where the airlock pressure is again within normal limits so the airlock port 10449 is closed by spool 10441 and the spool is now displaced so that the proximity sensor 10425 does not turn on the pump. Either one or two proximity sensors 10425 are shown in FIGS. 45-D, however any desired number and type of proximity sensors may be used in normal operation in other embodiments. In (4) the spool 10441 is shown with the airlock pressure is high so that the airlock port 10449 is connected to crankcase port 10451 and pump is disabled while airlock pressure is reduced. (5) is a case where the engine is shut down so there is no power to the pump and the airlock pressure is extremely low and to keep the diaphragms from being damaged, the airlock port 10449 is connected directly to the crankcase through the underpressure relief valve 10445 which opens to provide direct pressure relief through the spool 10441 so that the crankcase pressure and airlock pressure are at least equalized.

Figure 47:
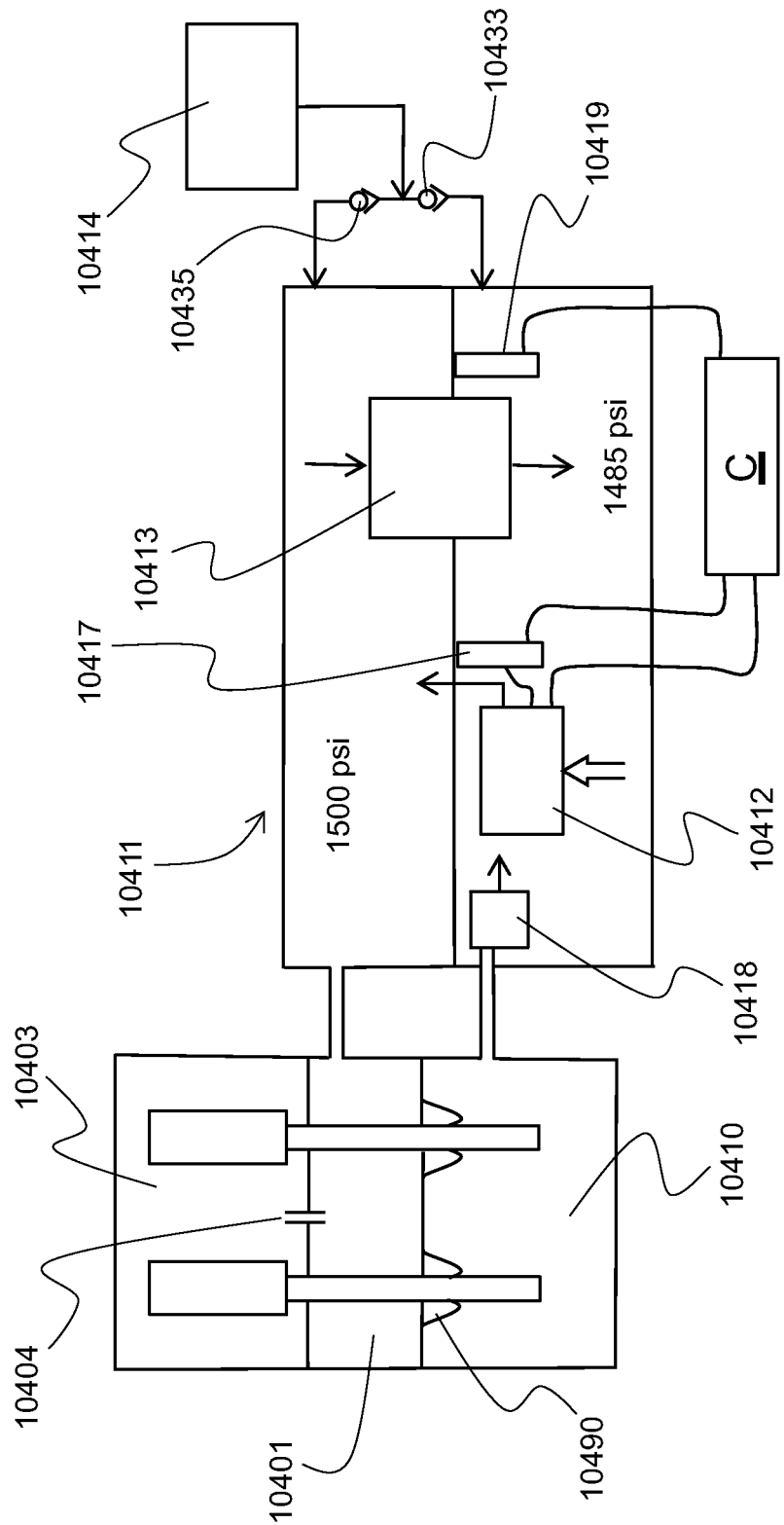
FIG. 47 shows a view of an airlock pressure regulation system in accordance with one embodiment.
Figure 48:
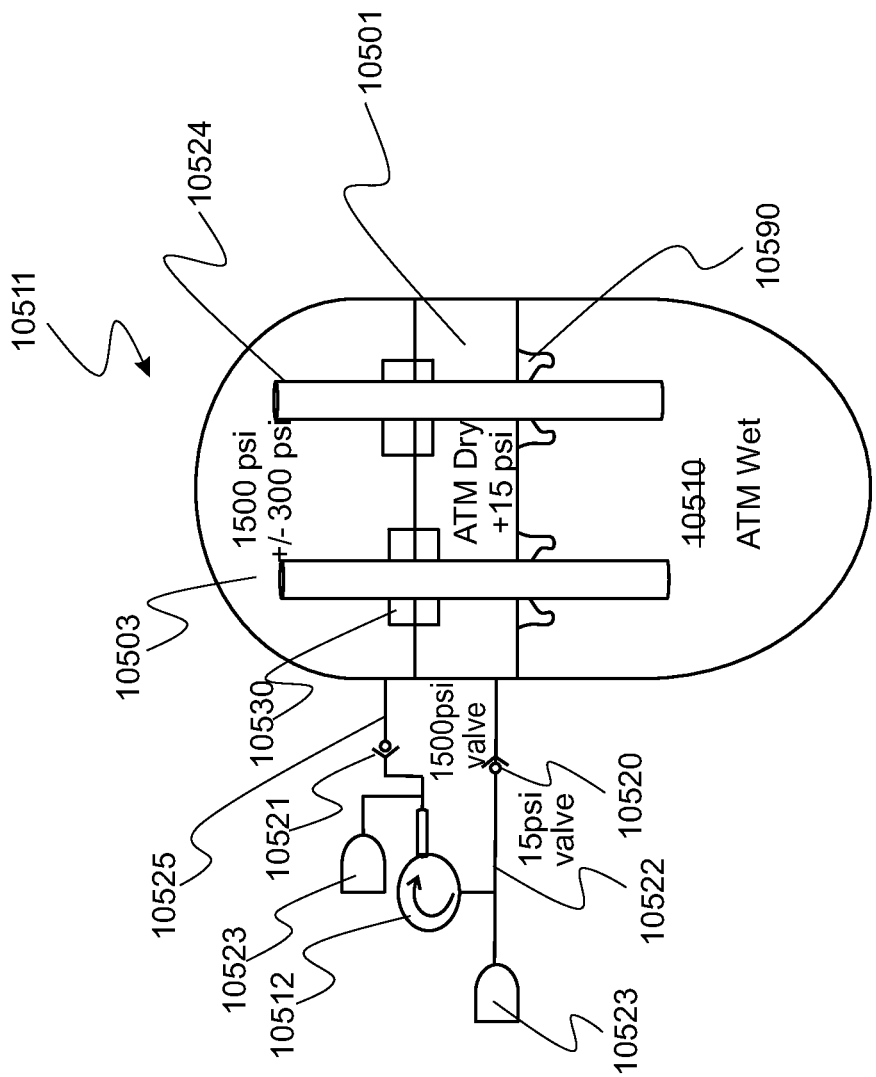
FIG. 48 shows a view of an airlock pressure regulation system in accordance with one embodiment.

In another embodiment of the pressure regulator 10401 shown in FIG. 47, the bidirectional regulator 10413 is replaced with a back pressure regulator 10431 which provides for one way pressure flow from the airlock 10401 into the crankcase 10410 should the pressure differential exceed for instance 15 PSI. To accommodate flow in the other direction from the crankcase to the airlock, a check valve, or pair of check valves 10433, 10435 can be provided in a separate path. This ensures that the crankcase will not be pressurized higher than the airlock. In FIG. 48, the crankcase 10510 is intended to be maintained at atmospheric pressure. This is a critical improvement as it provides for a more easily serviceable lower unit on the vessel without the need to recharge the crankcase 10510 should work need to be done inside the crankcase 10510 and also provides that a significantly lighter crankcase housing is necessary to contain the drive components. In this embodiment of the airlock pressure regulator system 10511 the airlock space 10501 is maintained essentially at atmospheric plus 15 PSI and therefore any pressurized working gas which escapes from the working space 10503 into the airlock 10501 needs to be removed from the airlock 10501 and returned to the working space 10503. To accomplish this, in its simplest form a first relief valve 10520 means is provided in an uptake line 10522 communicating with the airlock space 10501 so that any pressure greater than 15 PSI is relieved from the airlock 10501 and passed via a pump 10512 into an accumulator 10523 outside the working space 10503, airlock space 10501 and crankcase 10510. From the accumulator 10523 a return line 10525 includes a second relief valve 10521 means which opens to permit recharging of the working space 10503 with pressurized gas from the accumulator 10523 should the pressurized working gas in the working space 10503 fall below 1500 PSI. It is to be appreciated that the balancing of this pressurized system may include other pressure considerations across the first and second relief valves 10520, 10521, particularly with respect to the variation which can occur in the working space 10503 where the pressure can swing plus or minus 300 PSI during the Stirling cycle itself.

Figure 49:
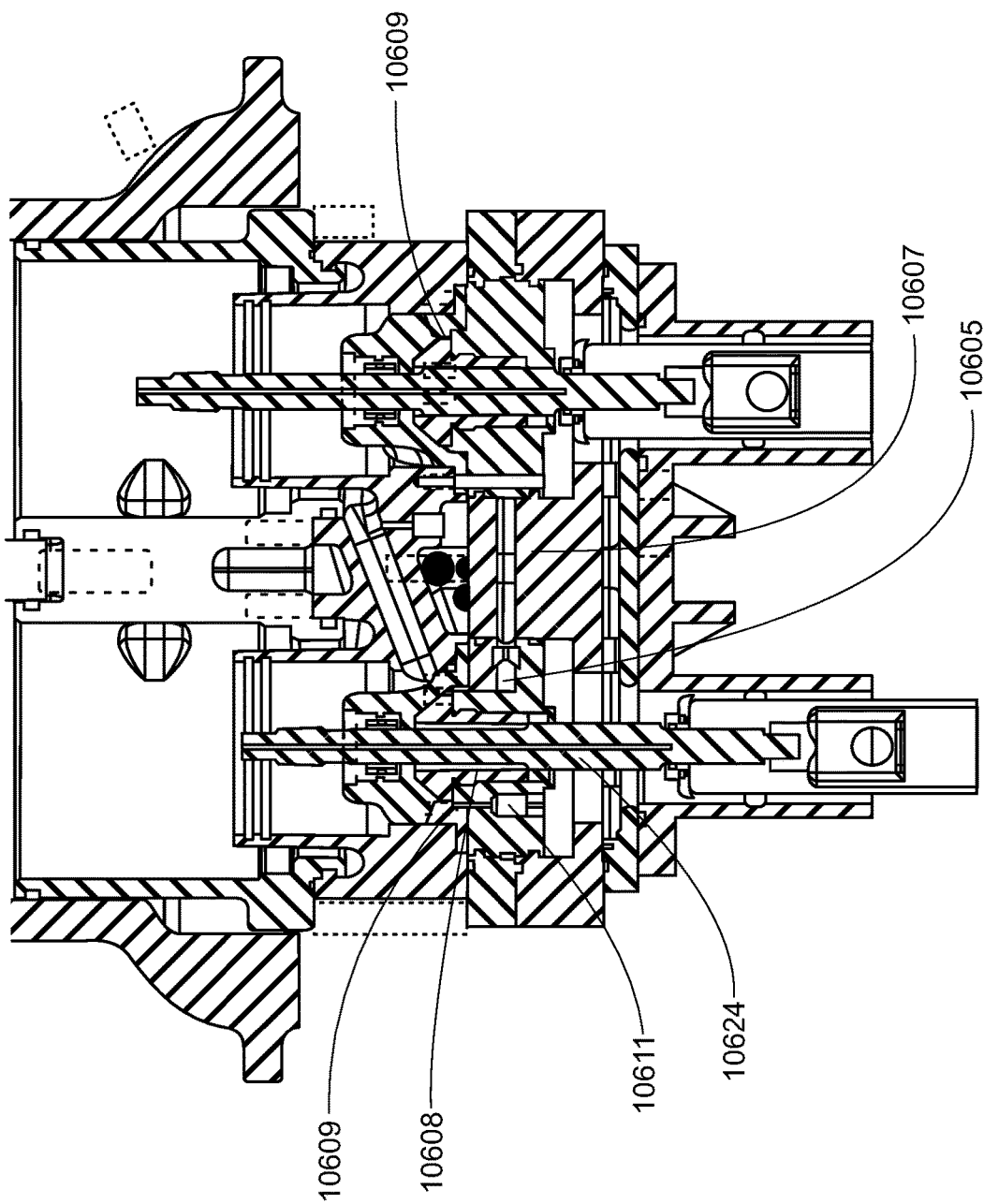
FIG. 49 shows a view of a mechanical pump for regulating airlock pressure in accordance with one embodiment.

When the engine is running, a mechanical pump 10612 defined by a cavity 10608 in the piston rod may be utilized to reduce the load and work done by the above described airlock pressure regulator system. As seen in FIG. 49, the mechanical pump 10612 of the piston rod 10624 is added to the airlock pressure regulation system to reduce the load on the electrical system during operation. A check valve 10605 receives crankcase pressure through an intermediate passage 10607 from the crankcase. The check valve 10605 opens when the airlock pressure has dropped too low relative to the crankcase pressure and pressurized gas from the crank case is drawn into the piston cavity 10608 as the piston rod 10624 reciprocates. The piston rod cavity 10608 is defined by a reduced diameter portion of the piston rod which essentially defines the mechanical pump 10612 itself. As the piston rod 10624 reciprocates the piston rod cavity 10608 is reduced in size as shown by the right-hand piston, pumping the pressurized gas into the airlock space 10609. In this way during engine operation the airlock can be efficiently replenished with sufficient pressurized gas should its pressure drop too low. An outlet check valve 10611 is provided between the airlock and the crankcase so that pressure in the airlock which exceeds the desired differential can be reduced from the airlock space 10609 into the crankcase. The mechanical pump 10612 defined by movement of the piston rod 10624 does not operate at engine startup because there is no mechanical operation of the engine, however the airlock pressure regulator system must be operational during startup operations.

Cooler Liner Diameter Reduction

Figure 50A:
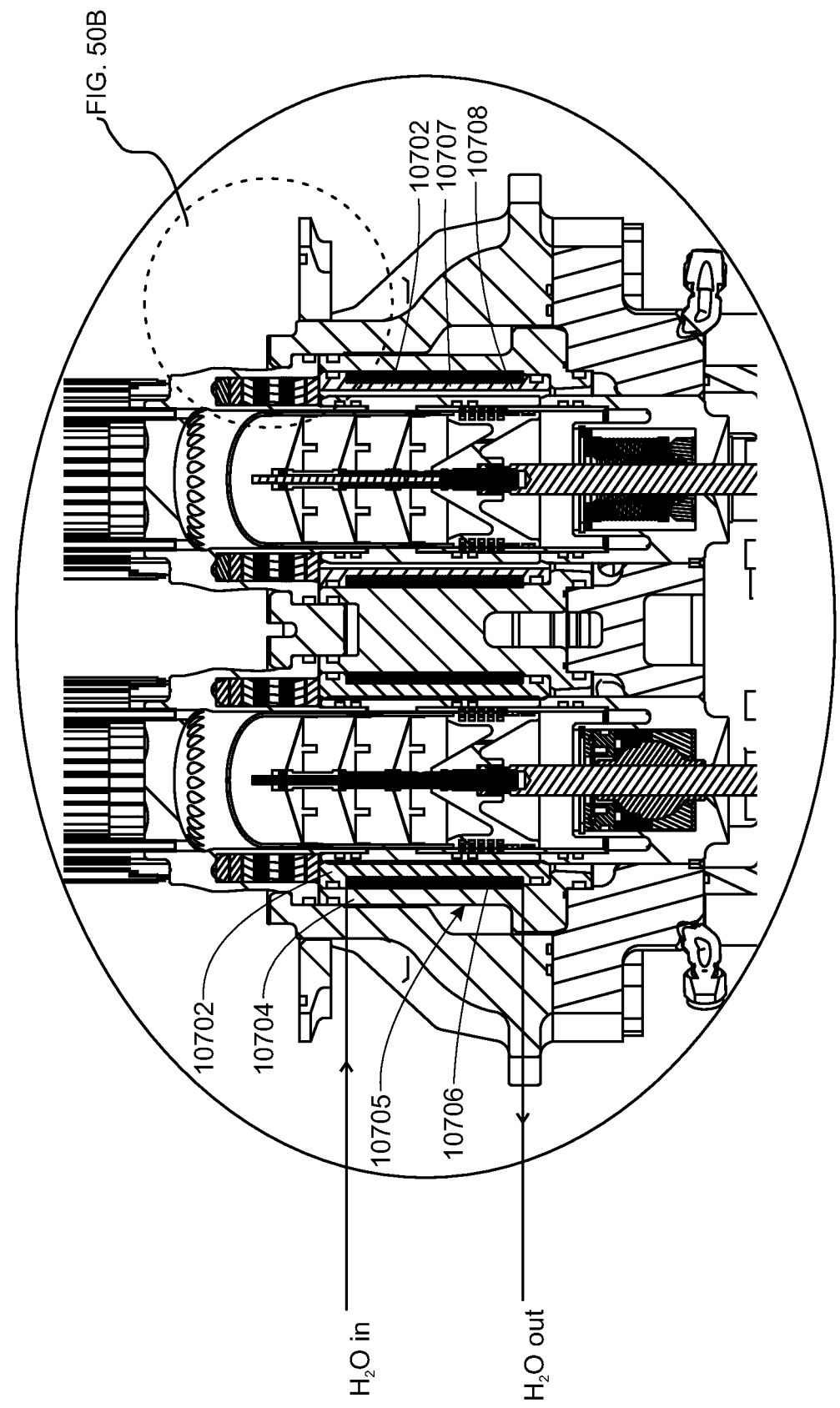
FIGS. 50A and 50B show views of a heat exchanger in accordance with one embodiment.

As explained previously with respect to FIGS. 1, 4-9C and 19, the heater tubes communicate with a heat exchanger which circumferentially surrounds each cylinder. The heat exchanger of the present embodiment described in FIG. 50A provides cooling for the working gas/fluid during the appropriate portion of the stirling cycle. The heat exchanger 10705 is supplied with cooling water through coolant tubing which communicates with a heat sink such as the environment via a radiator (not shown). Generally, the coolant water picks up heat through the heat exchanger in the vessel from the hot working gas, and the coolant water then is pumped to the radiator where the heat is transferred to the environment.

The heat exchanger 10705 shown in FIG. 50A surrounding each respective cylinder is provided with a water jacket sleeve 10704 having an inner surface defining a channel to allow passage of the cooling water through an interfacial area 10706 between the inner surface of the water jacket sleeve 10704 and an outer surface of a cooler liner 10702. The cooler liner 10702 also has an inner surface 10708 which directs the flow of hot working gas along the inner surface to facilitate the transfer of the heat through the cooler liner 10702 to the coolant water in the interfacial area. A goal of the described structure is to increase the heat transfer surfaces within the interfacial area 10706 for absorbing heat from the hot working gas and the heat exchanger so as to improve heat transfer between the working gas and the coolant water.

The water jacket sleeve 10704 surrounds the cooler liner 10702 and forms the heat exchanger 10705 which cools the working fluid during the appropriate portion of the Stirling cycle. The cooler liner 10702 directs the flow of the working gas along the inner surface of the cooler liner 10702. An improvement of the presently described engine is an increased heat transfer surface area in the heat exchanger where the outer diameter of the cooler liner 10702 is reduced to increase the interfacial area 10706 with a plurality of extended surfaces, for instance, longitudinal arranged fins 10707, or pins, provided around the outside diameter of the cooler liner 10702 and extending into the interfacial area 10706 between the inner surface of the water jacket sleeve 10704 to increase the surface area of the heat exchanging surfaces and provide more efficient cooling of the working gas/fluid. The outer diameter of the cooler liner wall 10708 can be reduced to an extent so that the cooler liner wall 10708 is relatively thin, as compared to the radial length of the longitudinal fins 10707, or pins in the interfacial region 10706 between the cooler liner 10702 and the inner surface of the heat exchanger 10705. The inner wall 10708 of the cooler liner is generally maintained an appropriate diameter to accommodate the working gas flow from the heater head and cylinder. The inner diameter of the liner is provided with axially arranged fins 10707 to direct the flow of gas along the inner wall of the liner and facilitate the transfer of heat out of the working gas, through the cooler liner and into the coolant water.

Figure 50B:
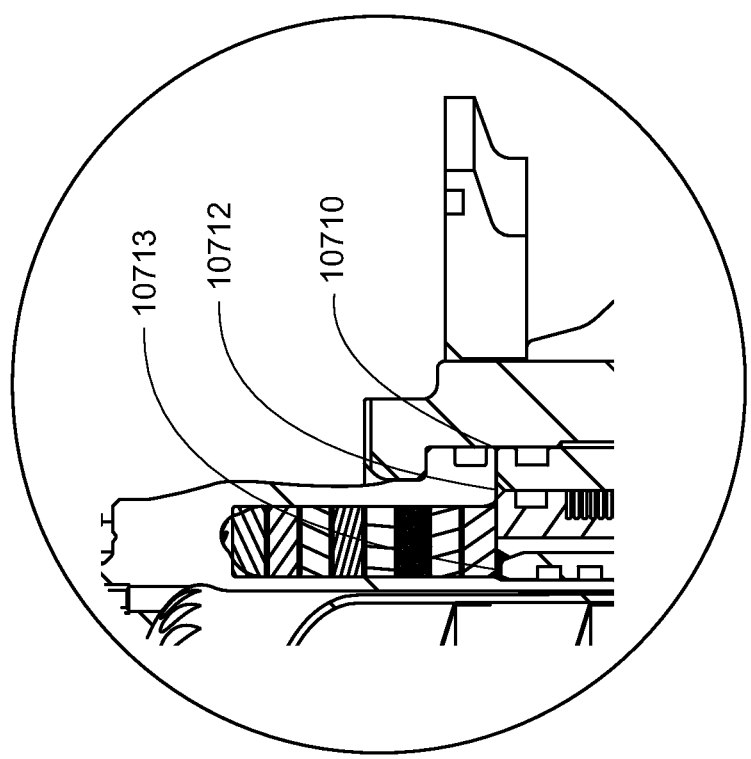

It is also important to ensure that the stationary seals utilized in the heat exchanger are to the extent possible redundant and not compromised, particularly where the water jacket sleeve 10704 and cooler liner 10702 should sufficiently maintain the coolant water in the interfacial region 10706 between these elements and the working fluid inside the coolant line 10702r. As shown in FIG. 50B, the heat exchanger 10705 in the present embodiment has an outer surface which abuts the inner surface of the vessel and is sealed with respect to the vessel by an upper stationary seal 10710 and a lower stationary seal 10711. Similarly the cooler liner 10702 inside the heat exchanger 10705 is sealed with respect to the inner surface of the heat exchanger by an upper seal 10713 and a lower seal 10715. A top surface of each of the cooler liner 10702 and the heat exchanger 10705 are formed and both support the base of the heater heads 10703 and provide the communicating interface for the working gas between the heater tubes 10709 and the heat exchanger 10705. An additional or redundant seal can be added at the intersection between the cooler liner 10702 and the heat exchanger 10705 adjacent the top surface of each element which supports the heater heads 10703. This redundant seal 10712, for example a 45 degree o-ring, is located axially spaced above the upper stationary cooler liner sealer 10710 and extends circumferentially around the entire joint between the heat exchanger 10705 and the cooler liner 10702. The addition of the heater head base as it is supported on the top surfaces of the liner 10702 and heat exchanger 10705 compresses the redundant seal into the joint and adds redundancy to the system to prevent the escape of cooling water and/or working gas/fluid from the working space.

Figure 53D:
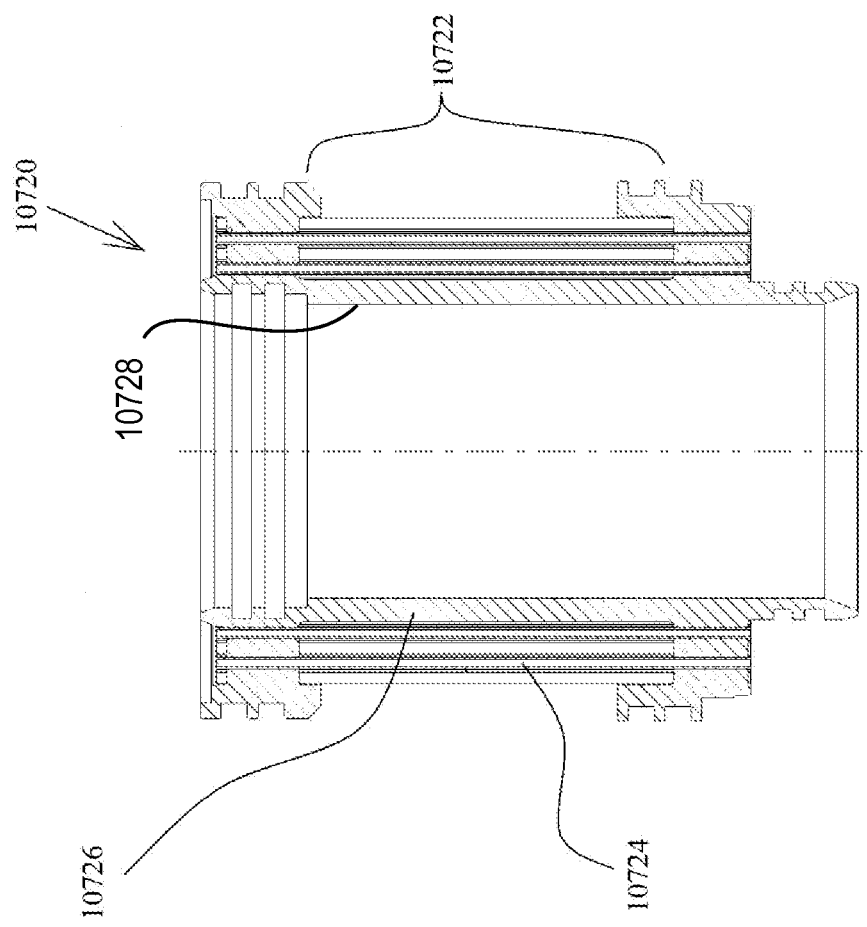
FIGS. 53C and 53D show views of a tube based heat exchanger according to one embodiment.
Figure 53C:
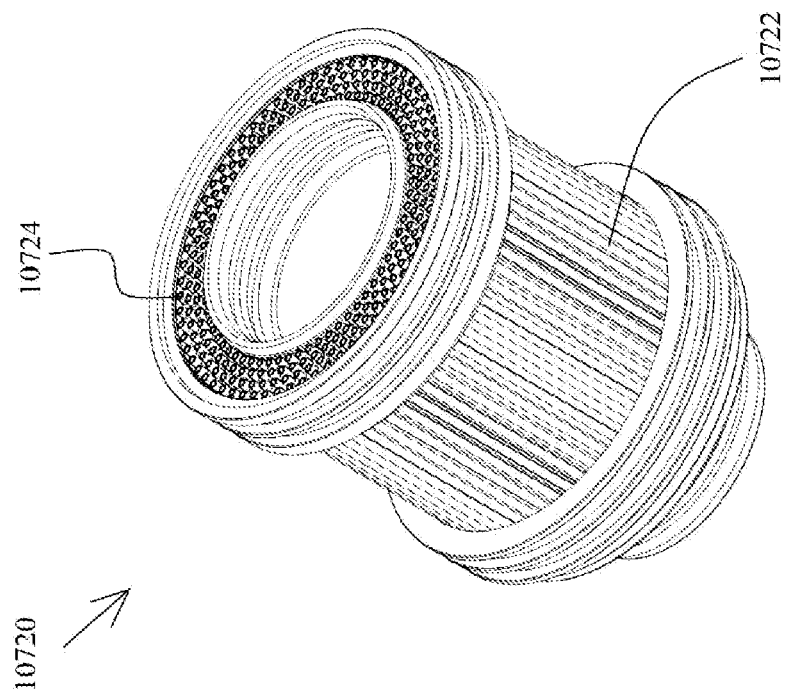

In a further embodiment, as seen in FIGS. 53C and 53D, the heat exchanger 10720 has a circumferentially disposed interfacial area 10722 comprising a plurality of longitudinally extending tubes 10724 provided around the outside diameter of the heat exchanger body 10726. The tubes 10724 extend through the interfacial area 10722 to increase the surface area of the heat exchanging surfaces and provide more efficient cooling of the working gas/fluid. This is accomplished by routing the working fluid through the tubes 10724 that are surrounded by the cooling fluid in the interfacial area 10722 instead of on the opposite side of the cooler liner as in the above described embodiments. The tubes 10724 may be assembled onto the heat exchanger 10720 through a brazing process wherein the completed assembly is run through a brazing oven to solidify the connection between the tubes 10724 and the heat exchanger body 10726.

In the current embodiment, the tubes 10724 and the heat exchanger body 10726 are constructed of the same material to simplify the assembly process. In one example, the tubes 10724 and heat exchanger body 10726 are fabricated from 300 series stainless steel. In another example, the tubes 10724 and exchanger body 10726 are fabricated from an aluminum alloy such as one of the following but not limited to AL7075-T6, In an alternate embodiment, the tubes 10724 are constructed of a 300 series stainless steel while the body 10726 is constructed of a 400 series stainless steel, such that the tubes 10724 have a lower coefficient of thermal expansion. The tubes' 10724 lower coefficient of thermal expansion may cause the tubes to not expand as much during the heating period as the body 10726. The braze will join the tubes 10724 to the body 10726 at the highest cycle temperature, when the tubes have not lengthened as much as the body. Subsequently during cooling the heater tubes will be compressed as the length of the body is reduced by more than the tubes. However, as the tubes are soft due to the high temperature, some or all of the tubes may buckle slightly due to the compression force. The buckling is not enough to weaken the tube or restrict flow through the tube. One benefit is that during operation, when the body 10726 and tubes 10724 are heated to a lower temperature, the greater thermal expansion of the body will not break tubing/body braze joint because the buckled tubes provide structural elasticity. In other words, during use, unbuckled tubes 10724 are colder, less elastic and thus can apply a greater and repeated load on the braze joint which can lead to failure. The buckled tube is less stiff, due to the new shape of the tube and applies a lower load on the braze joint during use, which may lead to less failures and longer periods between failures, and during use at lower temperatures, the now stronger and less elastic tubes. In an embodiment, the heat exchanger assembly may go through a second heating phase and possibly a second brazing after the initial brazing process. This second heating phase or brazing will again join the tubes 10724 to the body 10726, when the tubes 10724 have not extended as much as the body 10726. The cooling process from a brazing temperature which is above the annealing temperature may allow longitudinally compressed tubes 10724 to slightly deform away from a completely vertical structure, as in a slight bend, such that the deformation eliminates any pre-compression in each tube 10724.

Figure 51A:
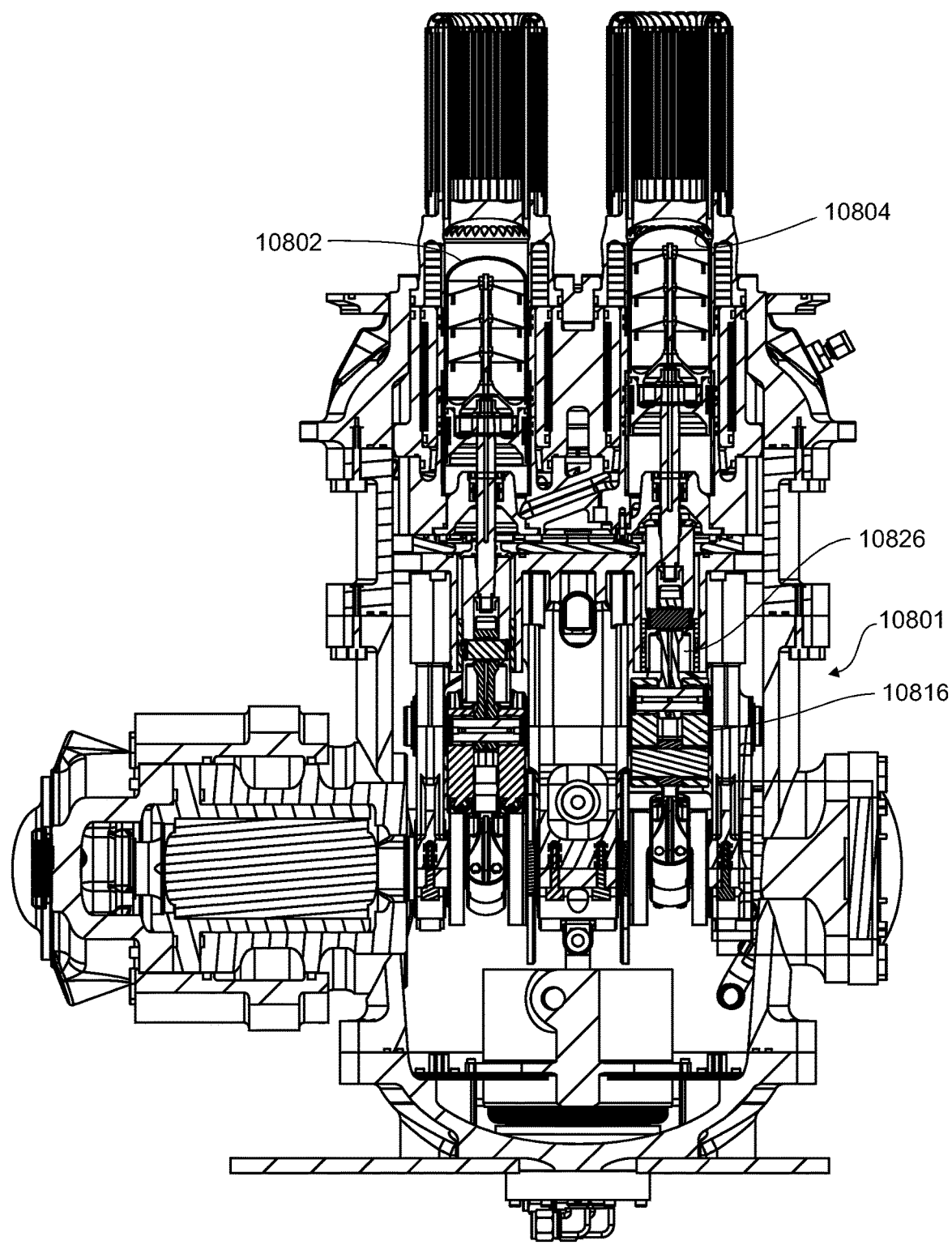
FIGS. 51A and 51B show views of a rocking beam mechanism in accordance with one embodiment.

In a further improvement to the drive system a more easily constructed and easy to maintain connection between the link rod 10826 and the rocking beam 10816 is described. Referring now to FIG. 51A, a rocking beam drive mechanism 10801 is shown. In this embodiment, the rocking beam drive mechanism has pistons 10802 and 10804 coupled to two rocking beam drives 10801. In the exemplary embodiment shown more clearly in FIG. 51B, the link rod 10826 is coupled at a first end to the piston rod via a link rod upper pin 10832, and a second end of the link rod 10826 may be coupled to one end of a link rod lower pin 10832 attached to the yolk of the rocking beam 10816. The link rod lower pin 10832 had been previously accomplished by press fitting a pin 10823 into a passage of the link rod 10826, and with bearings provided on either side of the link rod 10826 and around the pin 10823, the second end of the link rod is secured to the rocking beam drive 10801 in a yolk 10825. The pin 10823 extends into respective pin passages in the yolk 10825 of the rocking beam 10816 in order to complete the link rod lower pin 10832 structure. A bearing is also provided between the pin passages in the rocking beam 10816 and the pin 10823 to facilitate the pivoting of the link rod and pin relative to the rocking beam 10816.

Figure 51B:
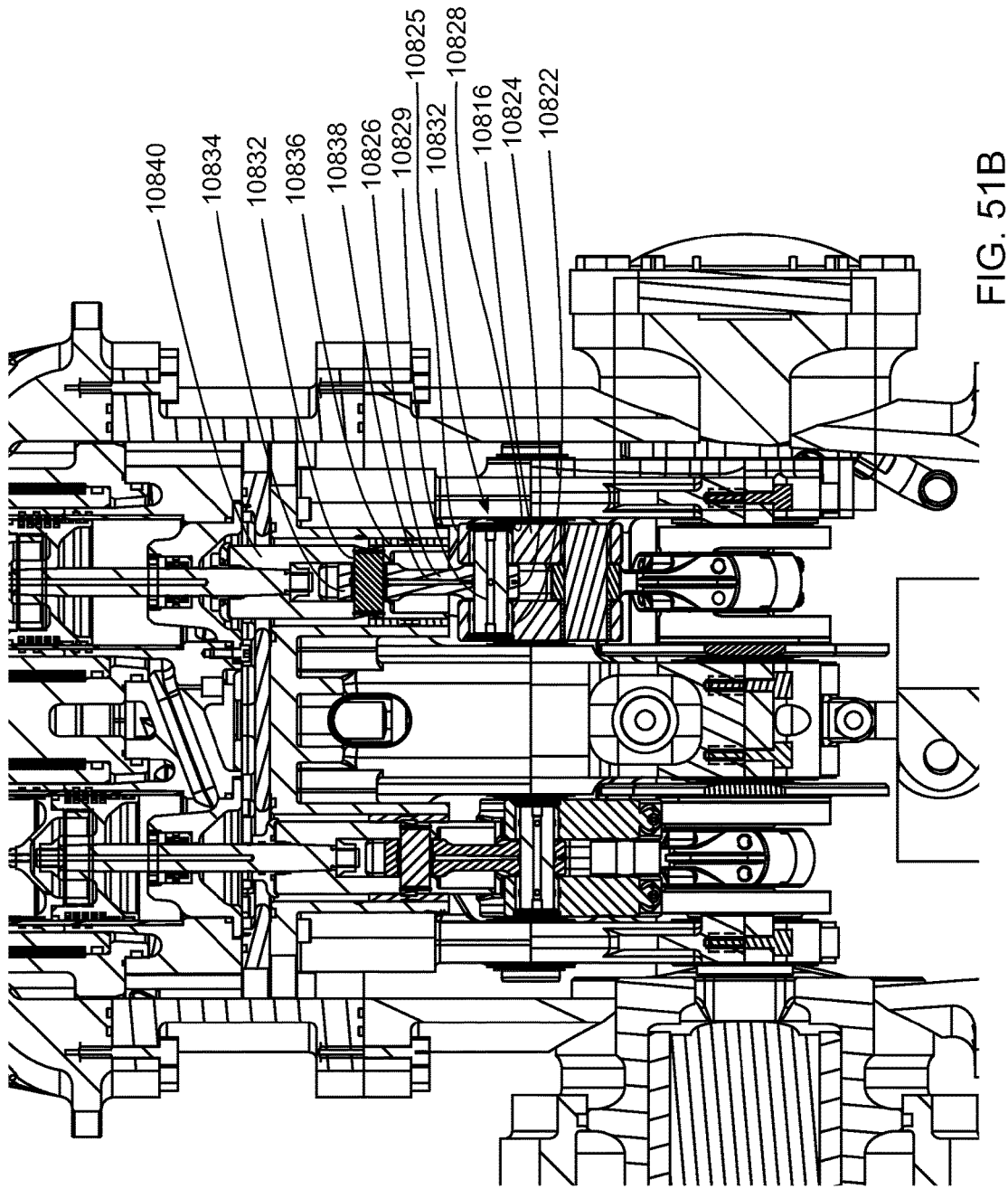

The present embodiment eliminates the need for a press fit of the pin into the passage in the second end of the link rod 10825. The press fit made it difficult to maintain, fix assemble and disassemble in any manner this end pivot structure during maintenance of the engine. As seen in FIG. 51B the link rod lower pin 10823 is provided to be inserted with a loose fit into and through the passage in the second end of the link rod 10826. A bearing 10822 may be provided around the link rod lower pin 10823 on either side of the link rod 10826, and the width of the bearing 10822 is reduced in order to fit a retaining ring 10828 onto the pin 10823 adjacent each bearing to retain the pin 10823 and bearings axially aligned in the passage of the link rod 10826 and in the yolk 10826. With the pin 10823 and bearings essentially axially fixed by the retaining rings 10828 to the link rod 10826, the pin 10823 and link rod passage can have a loose fit so that the pin 10823 can be easily removed from the link rod 10826, when disassembly is necessary, merely by removing the retaining rings 10828 and sliding the pin 10823 out of the link rod passage. A lubricating oil passage 10829 may be provided in the link rod lower pin 10823 to communicate with a oil passage 10838 in the link rod 10826 and provide oil to the bearings 10822 and the respective surface of these pivoting components.

The link rod upper pin 10832 is similarly arranged with a loose fit with the first or upper end of the link rod 10826. A bearing 10834 in this case is provided directly between the bearing surface of the upper pin 10832 and an inner surface of the upper link rod passage. A pair of retaining rings 10836 are applied to grooves in the ends of the upper pin 10832 to maintain the pin in its axial placement in the cross head 10840. The bearing 10834 and respective bearing surfaces can be supplied with lubricating oil via the oil passage 10838 in the link rod 10826

Figure 52A:
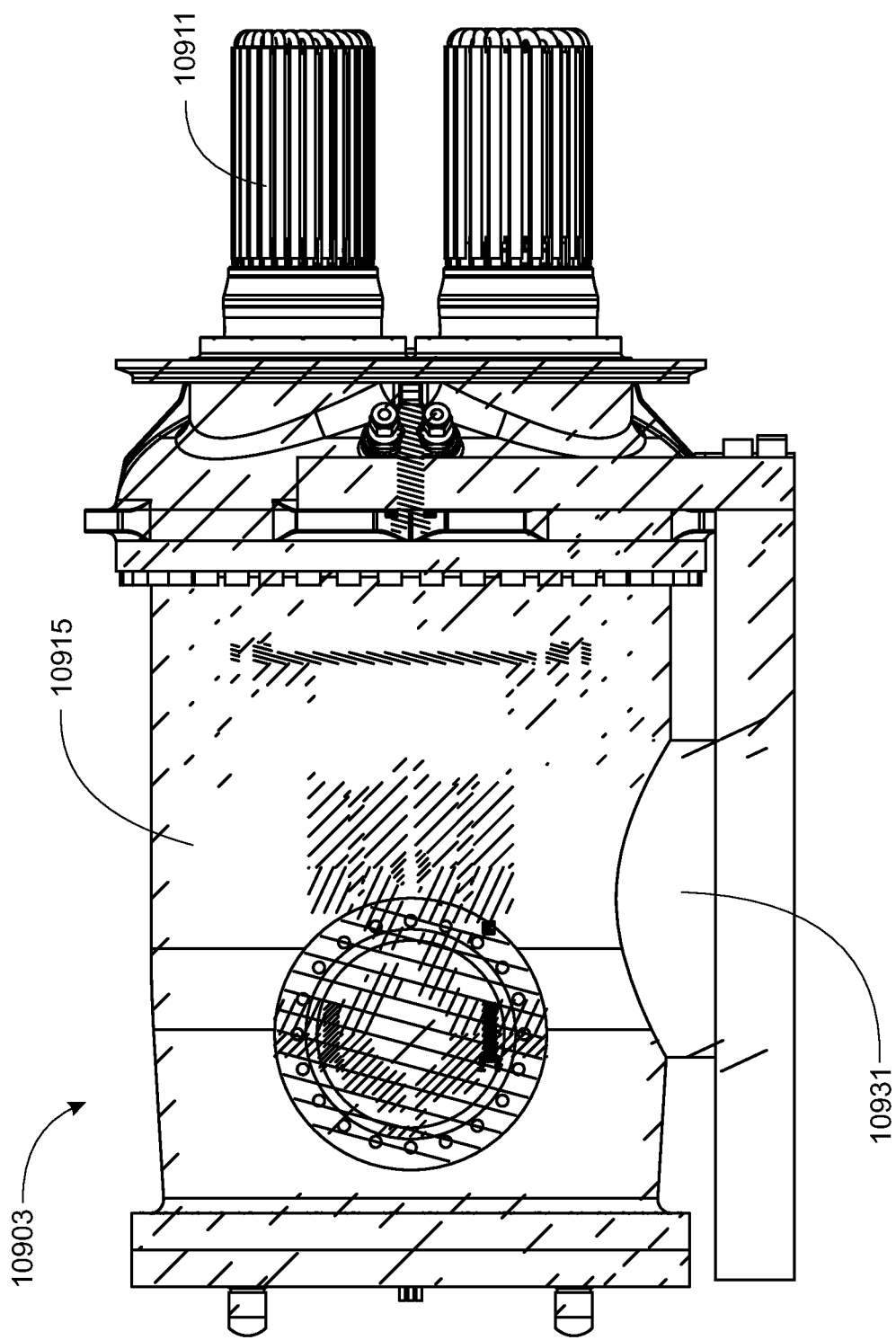
FIGS. 52A and 52B show views of a horizontally supported Stirling cycle engine in accordance with one embodiment.

The arrangement of the Stirling machine discussed above is generally referred to and shown as having a vertical orientation, i.e. with the pistons reciprocating generally perpendicularly aligned relative to a horizontal support surface or ground surface. In another embodiment of the present Stirling cycle engine 10903 shown in FIGS. 52A and 52B the engine may be horizontally arranged, i.e. with the pistons 10905, piston rods 10907, heater heads 10911, cross heads 10913 etc., being arranged and reciprocating in a horizontal orientation relative to a ground support surface as opposed to the vertical orientation discussed above. One of the significant challenges in such a design is the arrangement and structure of the oil cooling system in the crankcase 10915 where it imperative to ensure that the mechanical elements of such a horizontal crankcase such as the cross heads 10913, rocking beam 10919 and other crankcase components and drive elements are sufficiently supplied with a free flow of oil through the crankcase and back to the oil sump and pump.

Figure 52B:
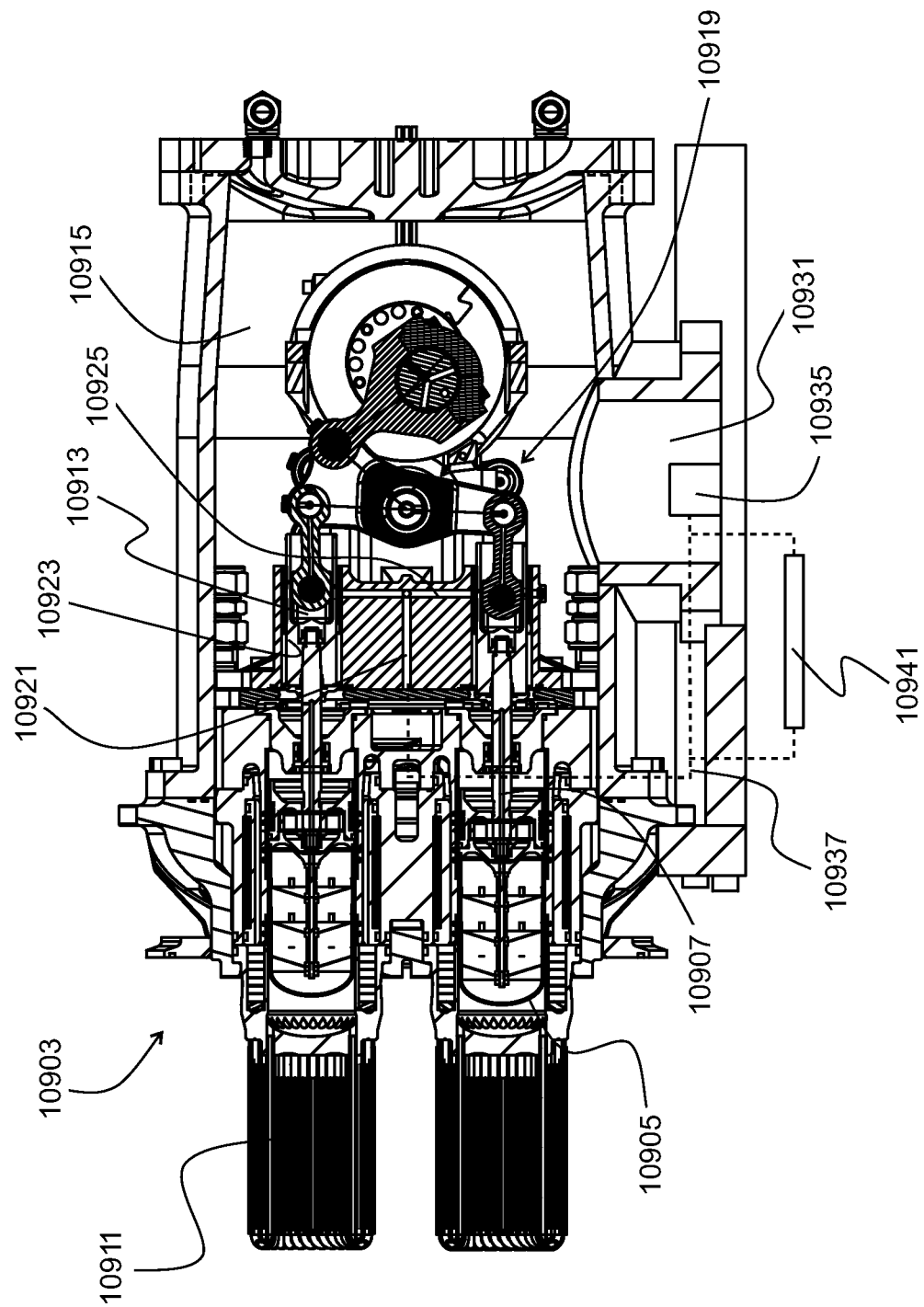

As seen in FIG. 52B and by way of general example, the oil cooling system comprises a central oil supply line 10921 disseminating a flow of oil directly to each of the cross head bores 10923 through radial oil passages 10925. Oil drains down by gravity in the crankcase 10915 into oil sump 10931 which can then be re-circulated back to the central oil supply line 10921 via a pump 10935 through main line 10937 which communicates eventually with central oil supply line 10921. It is to be appreciated that other oil supply arrangements and orientations can also be accomplished, and that the embodiment described with respect to FIGS. 52A-B and the horizontal arrangement of the engine and crankcase components is merely exemplary with respect to these figures.

In another embodiment of the engine it is also beneficial to cool the crankcase by cooling the oil in the crankcase. An oil cooler 10941 shown diagrammatically in FIG. 52B is designed to pick up a substantial amount of the heat generated in the crankcase, and with a co-axial (or a tube-in-tube) heat exchanger 11043 shown specifically in FIGS. 53A-B, oil from the crankcase passes through an outer oil channel 11045 over a series of fins 10947 positioned along the outer surface of a cooling tube 11049 containing flowing cooling water from a cool water source 11046. The fins 11047 can be radial fins or axially aligned fins relative to the cooling tube 11049 depending upon the necessity for a desired oil flow along the outer surface of the coolant tube. After taking up heat from the oil, the cooled oil returns to the main line 11037 and the heated water can be dumped to a heat sink 11051. Methods or apparatus are disclosed for external starters, both manual and powered, in U.S. patent application Ser. No. 13/447,990, filed Apr. 16, 2012 and entitled Stirling Cycle Machine, which is hereby incorporated herein by reference in its entirety.

B-Burner

FIGS. 54-60 disclose a further embodiment of a burner 11201 for use in conjunction with a multiple heater head and piston engine described previously in FIGS. 4, 35, 36A. The present burner 11201 is specifically directed to the independent heating of multiple heater heads, in this case four (4) heater heads, each heated by an individual burner and flame and having a single air inlet 11223, single outer wall 11212, and two exhaust openings 11225.

Figure 55:
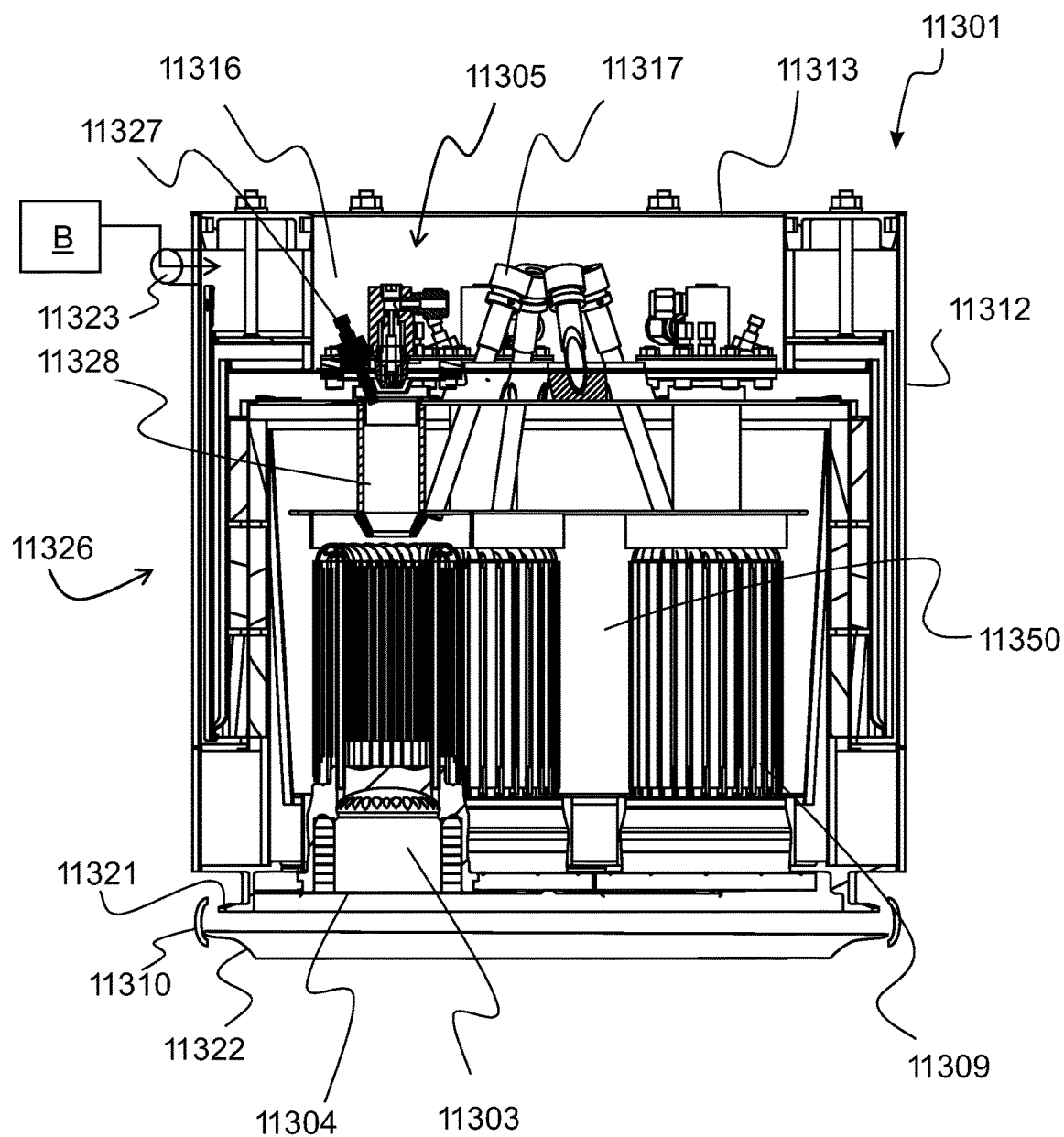

Turning to FIG. 55 the four burner design 11301 of the present embodiment includes a single blower B providing air for the fuel/air mixture in the ignition process of all the burner head assemblies 11305 as shown in FIG. 55. The heater heads 11303 as also discussed above, may be any of the various embodiments described in the preceding sections, including, but not limited to, tube heater heads, or pin or fin heater heads as disclosed in U.S. patent application Ser. No. 13/447,990, filed Apr. 16, 2012 and entitled Stirling Cycle Machine, which is hereby incorporated herein by reference in its entirety. By way of example, the present embodiment is contemplated utilizing heater tubes 11309 through which flow the working gas, for example helium, which must be heated by the burner head assemblies 11305 during the appropriate portion of the Stirling cycle.

Figure 54:
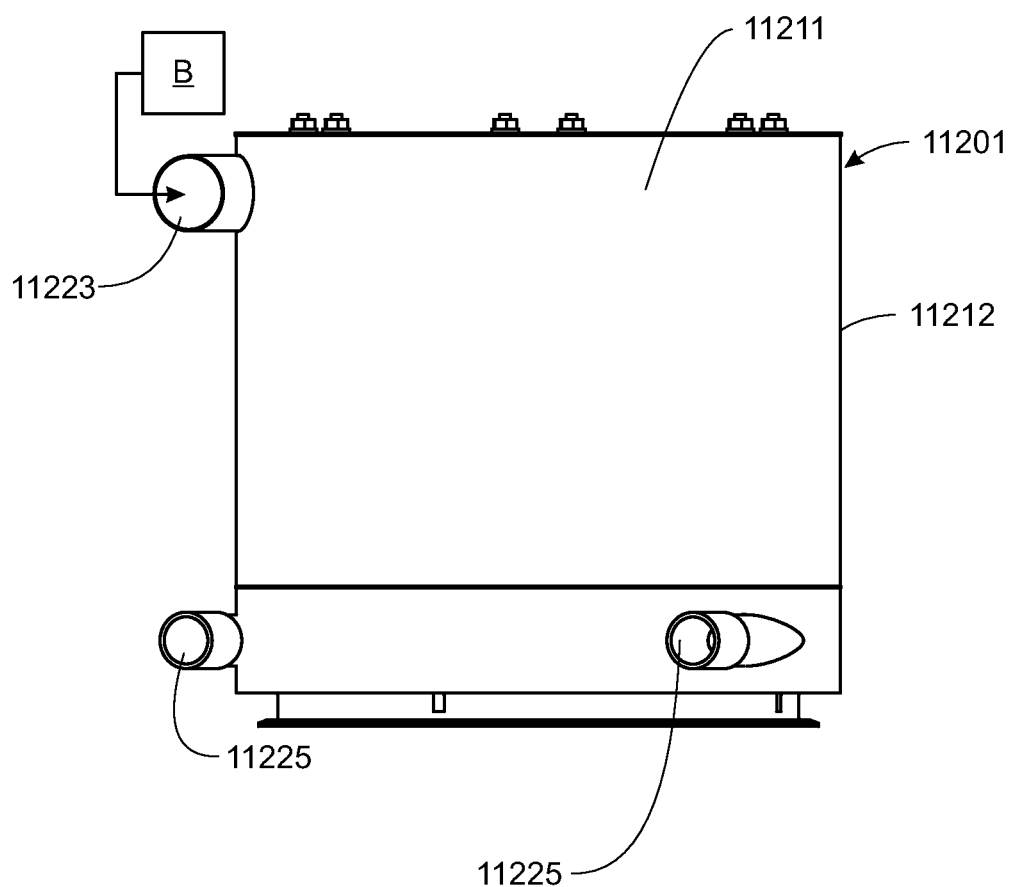
FIGS. 54-59 show various views of a burner in accordance with one embodiment.

By way of more detailed description and referring back to FIG. 54 as well, the burner 11301 includes multiple burner head assemblies 11305, one for each of the heater heads 11303, in the case of the present embodiment there are four (4) heater heads and hence four (4) burner head assemblies 11305. The cross-section of FIG. 55 shows three (3) of the burner head assemblies 11305. Generally, the burner 11301 is defined by a burner housing as shown in FIG. 54 having a substantially cylindrical outer wall 11312, although other geometrical configurations could be imagined. The blower B pumps air into the burner 11301 through air intake 11223 for purposes of ignition and combustion, and exhaust gases are ejected from the burner via the two exhaust outlets 11225 adjacent the base of the burner.

Figure 56:
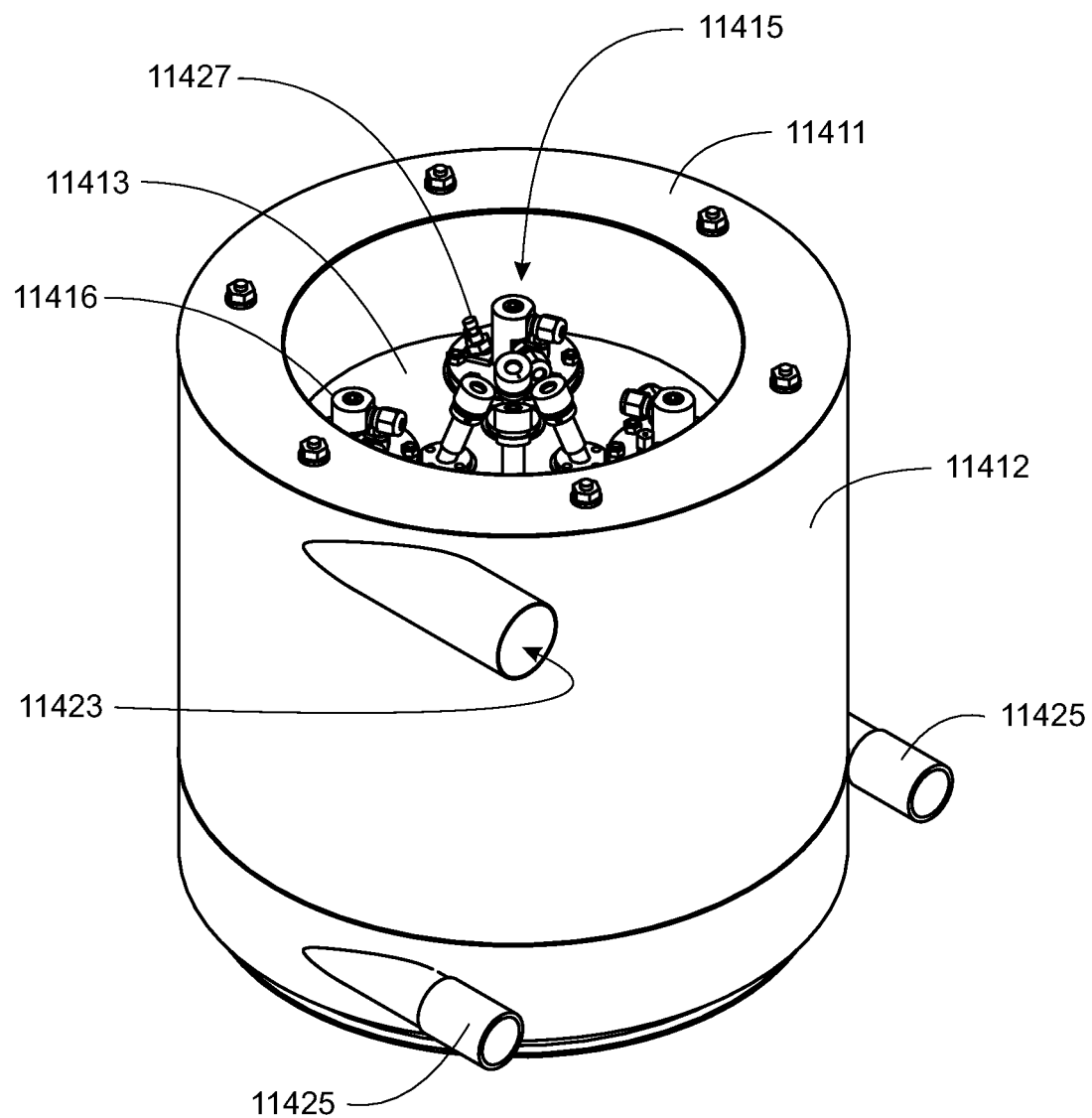
Figure 57:
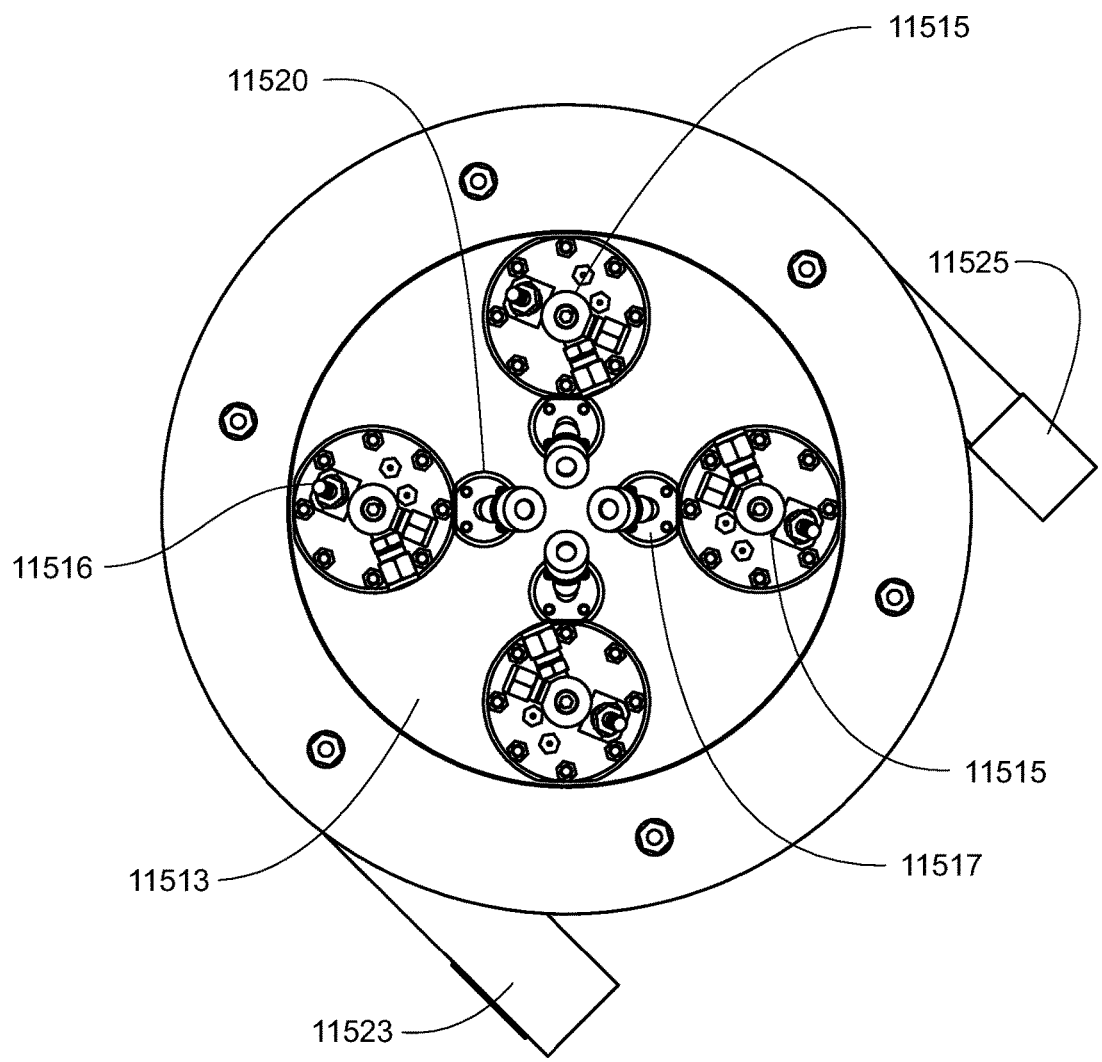

Turning to FIGS. 56 and 57 a top surface 11413 of the burner housing includes a number of ports 11415 for receiving fuel inputs 11416, igniters 11427, flame and possibly temperature sensors or flame viewing elements. The ports 11415 also facilitate access to a particular burner head 11405, as discussed in detail below, without having to remove the entire burner 11401 from the vessel stack-up for maintenance. As seen in FIG. 57, associated with each burner port 11515 on the top surface 11513 of the burner is a secondary port 11517 which can serve a number of purposes for instance a flame viewing element such as a viewing window for viewing the flame of the burner head, or alternatively a spark plug 11520 for igniting the fuel/air mixture and/or a sensor for sensing UV light used in flame detection.

Figure 58:
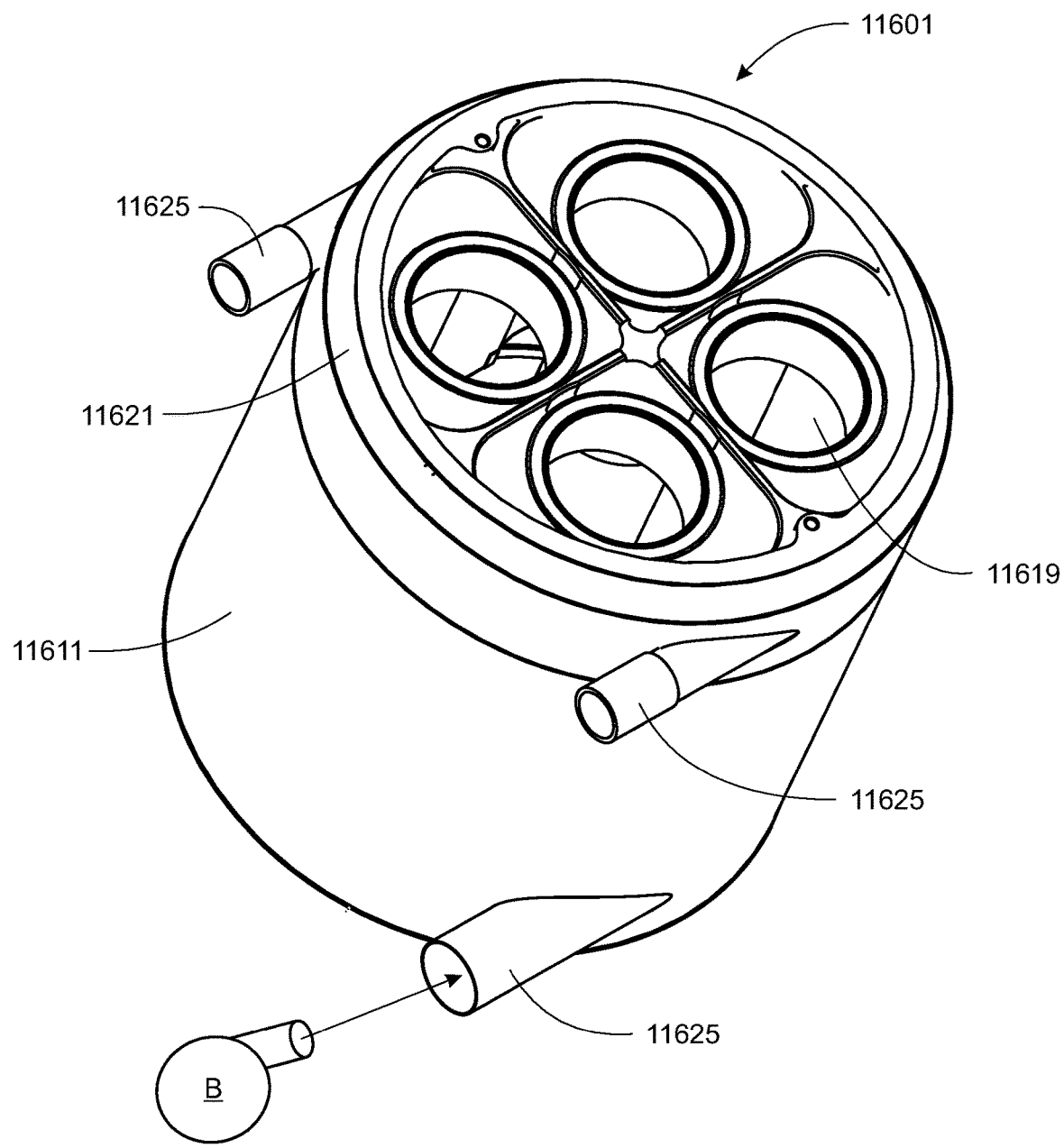
Figure 59:
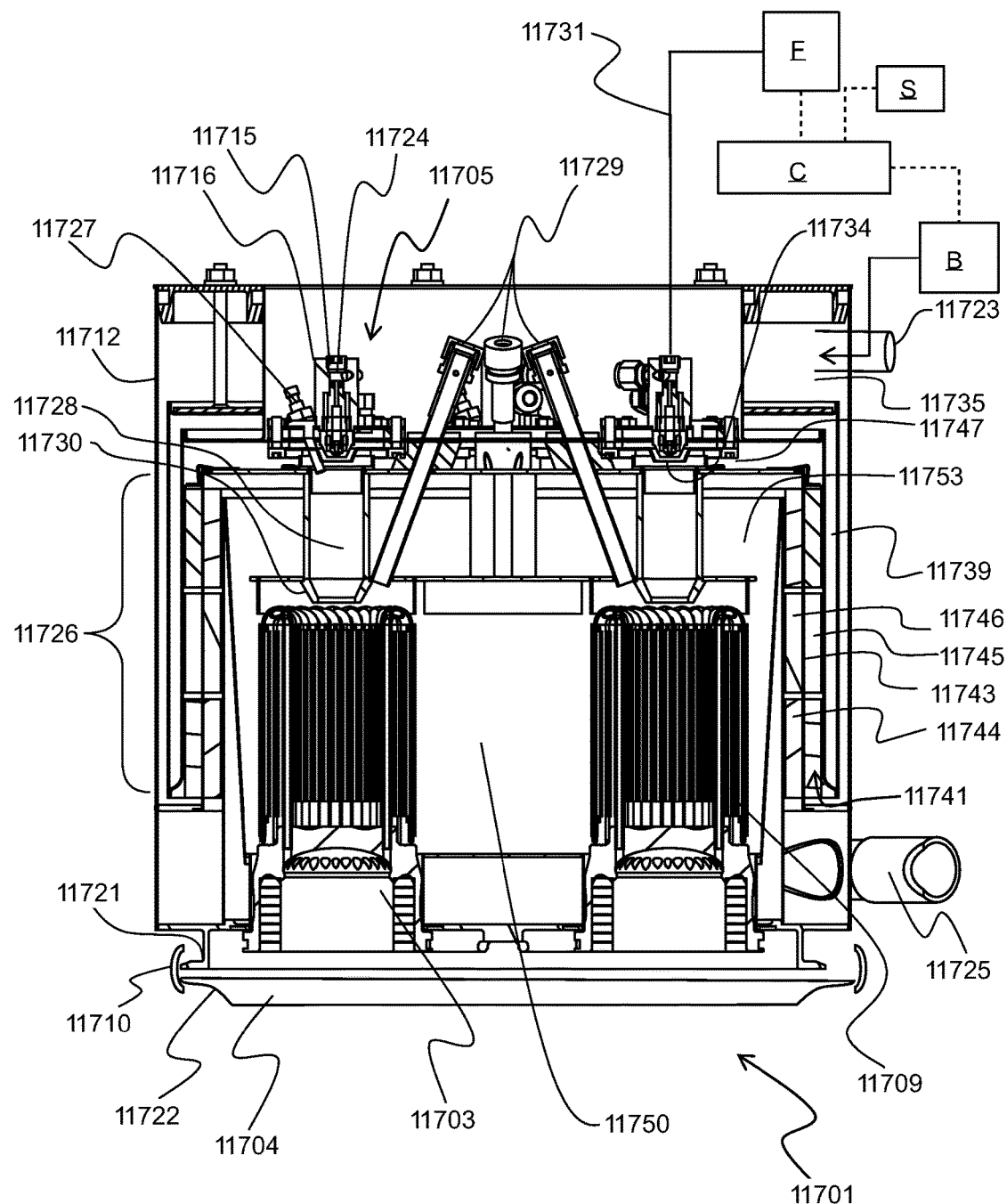

The base of the burner 11601 best seen in FIGS. 58 and 59, is provided with heater head openings 11619 to accommodate the entrance of the heater heads and respective heater tubes since the burner as a whole is set over and stacked up on a cooling plate 11604 of the vessel so that the heater heads 11603 are within and substantially sealed inside or encompassed by a lower region of the burner 11601. The base of the burner 11701 is secured to the mounting plate 11704 in the vessel stack-up by a circumferential band clamp 11710, such as a Marmon clamp, which is provided for securing and critically circumferentially centering the burner relative to the cooling plate and lower stack-up of the pressure vessel. The centering of each burner head assemblies 11705 relative to each of the associated heater heads 11703 is critical because if the flame from the burner head assembly is nearer one side of the heater heads 11703 and heater tubes 11709 than another, there will be not only inefficient heating of the working gas/fluid in the heater tubes 11709, where one set of heater tubes is heated to a higher temperature than other tubes.

The clamp 11710 extends circumferentially and radially around the entire base of the burner 11701 and provides both radial and axial compressive forces between the burner base plate and the mounting plate to ensure that there is both a critical axial sealing pressure to contain the hot exhaust gases in the burner and a radial circumferential alignment of the burner heads with the heater heads. The base of the burner housing 11711 may be provided in this regard with a circular sealing edge 11721 as shown in FIG. 59 which is angled relative to the vertical axial arrangement of the vessel stack-up to create the axial compressive force and for mateably engaging with an oppositely angled circular sealing edge 11722 of the mounting plate. The circumferential clamp 11710 and the mating angled circular sealing edges 11721, 11722 of both the burner and the cooling plate ensure the critical circumferential, i.e. radial alignment of the burner housing 11711 and burner head assemblies 11705 with the mounting plate and heater heads 11703 in the vessel stack-up so that the burner head assemblies 11705 are appropriately aligned with the heater heads 11703 and there is sufficient axial force between the burner 11701 and cooling plate 11704 to contain the hot exhaust gas generated in the burner 11701. The circular sealing edge 11721 may include a graphite seal (not shown) between the burner and cooling plate to ensure that the hot gases which are at around 1000 C, where the flame temperature is around 1200 C, do not leak out between the burner 11701 and the mounting plate 11704.

The single blower B as shown in FIG. 59 provides air into the burner housing 11711 adjacent the top surface 11713 for the fuel/air mixture to the burner head assemblies. The air intake 11723 is provided at essentially a normal angle to the circular burner housing 11711 and provides air inside the burner 11701 for combustion as described in detail below. This arrangement of the air intake 11723 at a normal angle to the cylindrical burner housing 11711, better seen in FIG. 58, facilitates air entering the burner 11701 with a designed pressure drop which is important for incoming air to the burner to maintain a desired air velocity for maximizing heat transfer efficiencies as the air passes through the air intake manifold and into a preheater 11726 where the incoming (cold) air is warmed by the exiting (hot) exhaust gasses. A single blower B is placed in communication with the single air intake 11723 to provide air to all the burner head assemblies 11705 in the burner 11701. A pair of exhaust outlets 11725 are also connected normal to the substantially cylindrical burner 11701 and spaced approximately 180 degrees apart around the base of the burner 11701. Prior to exiting through the exhaust outlets 11725 the exiting exhaust from the burner 11701 preheats the incoming air in the preheater 11726 described in detail below, then exits the burner 11701 from one of the two exhaust outlets 11725.

Observing FIG. 59, each burner head assembly 11705 has a fuel injector 11724, an igniter 11727 of one kind or another, for instance a sparkplug or glow-plug, a flame detection device 11729 which may also be provided in the secondary port 11717 as shown. Fuel, either liquid fuel or gaseous fuel is fed to the fuel injector 11724 via a fuel line 11731 from a fuel source F and is dispersed as a fine mist or vapor by the nozzle 11734 of the fuel injector 11724 into a prechamber 11728 of the burner head assembly 11705. In the prechamber 11728 the dispersed fuel is combined with a desired volumetric flow of air from the preheater 11726, preferably preheated to a desired ignition temperature by the exhaust as discussed in detail below, to form a desirable fuel/air mixture for ignition. The fuel/air mixture then is ignited by the igniter 11727 and combusts at least partly inside the prechamber 11728, but more complete combustion may occur after the fuel/air mixture exits, or is pushed, from the prechamber 11728 through the prechamber nozzle 11730 of the prechamber 11728 to form a flame which extends from the prechamber 11728 and is directed into a center combustion chamber inside the heater tube arrangement of each respective heater head 11703. Exhaust from the combustion in the burner 11701 exits the burner via the preheater 11726 and exhaust manifold 11714 described in detail below.

In the present embodiment of the burner, the single blower B, shown here diagrammatically, may be incorporated to maintain a consistent average air ratio supplied to the burner 11701 and hence to each of the individual burner head assemblies 11705. The blower B pumps air at a desired velocity depending on instructions from a controller C for purposes of ignition, then once ignition has occurred, the desired air flow rate may be regulated by the controller C dependent on data received from sensors including but not limited to an oxygen sensor. A more complete description of the burner control algorithm is provided below. The single blower B is also controlled dependent on the data from individual burner head assemblies, for example in the case of at least one burner head assembly being extinguished or not igniting the controller may decrease the blower rate to facilitate ignition in the extinguished burner head assembly. The fuel input may be correspondingly controlled in the remaining burner head assemblys 11705 to accommodate such an air velocity decrease. In any event, the blower B is intended to provide a consistent flow rate to each of the multiple burner head assemblys 11705 in the burner after passing through the preheater 11726. An important aspect of the present embodiment is the consistent flow and velocity of cold air developed by the blower B and the efficient heating of the incoming air through the extraction of waste heat from in the preheater 11726, to raise the cold air temperature thereby improving the efficiency of combustion processes and the burner unit.

The blower B connects through the air intake 11723 in the outer wall 11712 of the burner housing into a cold air channel 11735 of the preheater 11726. The cold air channel 11735 extends circumferentially around the burner inside the outer wall 11712 of the burner 11701 and directs the cold air developed by the blower B down around an insulated intermediate baffle 11739 and up into the preheater. The intermediate baffle 11739 is insulated to protect the outer wall 11712 of the burner 11701, and anyone or thing that comes in contact with the outer wall, from the intense high temperatures inside the burner 11701. Also, the insulated baffle 11739 ensures that heat captured by the incoming air in the preheater 11726 is not lost directly to the outer wall 11712 of the housing 11711.

The preheater 11726 essentially begins where the cold air from the blower B drops down through the cold air channel 11735 and enters into a preheater channel 11741 in which the cold air is preheated in order to raise its mean temperature which increases the efficiency of the burner combustion. The preheater channel 11741 is defined by the intermediate baffle 11739 on one side, and on the inner side, an exhaust manifold wall 11743. The exhaust manifold wall 11743 directly separates the incoming cold air from the exhaust air exiting the burner and provides for the heat transfer from the exiting exhaust to the incoming cold air in the preheater channel 11741. The heat transfer efficiency through the manifold wall 11743 in the preheater 11726 is critical because the hotter the incoming cold air can be raised by the preheater 11726, the less fuel is necessary to get the gas up to desired ignition and combustion temperatures. The preheater channel 11741 also extends circumferentially around the entire burner 11701 which provides for a maximum surface are which in some embodiments may produce better heat exchange with the exhaust flowing out of the burner through an exhaust channel 11744. Inside the preheater channel 11741 are a series of radially extending fins 11745 which are directly connected to the exhaust manifold wall 11743 and assist in efficient heat transfer from the exiting exhaust air through the manifold wall 11743 into the air in the preheater channel 11741. Exhaust side fins 11746 may also be connected to the exhaust manifold wall 11743 extending into the exhaust channel 11744.

The cold incoming air is preheated to a desired temperature, for example, but not limited to 600-750 C, in the preheater 11726 which facilitates ignition and combustion as the air is directed to the burner head assemblys. The amount of preheating which may be accomplished is primarily based on the efficiency of heat transfer from the exiting exhaust so that as the exhaust temperature is raised during operation of the engine, the incoming cold air can be accordingly preheated to a higher temperature. The preheated air exits the preheater channel 11741 and is directed radially into a hot air chamber 11747 which communicates with each of the multiple burner head assemblies 11705. It is to be appreciated that the preheated air enters the hot air chamber 11747 through a substantially 360 degree circumferential opening around the exit of the preheater channel 11741 so that a consistent flow rate of preheated air is delivered to each of the burner head assemblies 11705. While additional channels or passageways (not shown) may be provided in the hot air chamber 11747 to direct the preheated air in the hot air chamber to a specific burner head, the 360 degree output from the preheater channel of the present embodiment is important since there is only one blower B developing the air flow into the engine. In previous engines a multitude of blowers delivered a desired air flow to each of the burner head assemblies, for instance where there were four (4) burner head assemblies, there were four (4) blowers, one directed to each burner head. However, having a blower associated with each burner head 11705 on a multiple burner head engine is expensive and adds a significant amount of weight to the engine. In any event, a single preheater is much less expensive and less complicated from a control standpoint than separate preheaters of each heater head.

The preheated air is directed in the hot air chamber 11747 to the individual burner head assemblies 11705 and specifically to an intersection with a nozzle 11734 of each fuel injector 11724 in each burner head 11705 and an igniter 11727. The fuel injectors 11724 may use either liquid fuel or gaseous fuel but in either case the fuel is ejected from the injector into the prechamber 11728 where the fuel mixes with the preheated air to attain a desired fuel/air ratio or mixture for either ignition of the burner head 11705, or, combustion where the burner head 11705 is currently supporting a flame. The fuel injectors 00024 inject the fuel into the prechamber 11728 directly below the fuel injector 11724 and the preheated air is combined in the prechamber 11728 with the liquid or gaseous fuel. The fuel may be delivered as a mist or vapor, combined with the preheated air and ignited in the prechamber 11728 by the igniter 11727. While ignition of the fuel/air mixture may occur to some extent in the prechamber 11728, the flame derived from the ignition and combustion of fuel/air in the prechamber 11728 needs to be pushed out of the prechamber 11728 to be more efficient and provide the requisite thermal output. It is preferable that the constant combustion flame which heats the heater heads 11703 and heater tubes 11709 be pushed out of the prechamber 11728 and actually extend beyond the end cone 11730 of the prechamber 11728 and into the combustion chamber 11750. This is accomplished by providing appropriate adjustment to the fuel/air mixture by the controller and by the prechamber and nozzle geometry to properly control the shape of the flame. Structural elements may be added to the prechamber to improve the shape of the flame in the combustion chamber as disclosed in U.S. patent application Ser. No. 13/447,990, filed Apr. 16, 2012 and entitled Stirling Cycle Machine, which is hereby incorporated herein by reference in its entirety.

Figure 60:
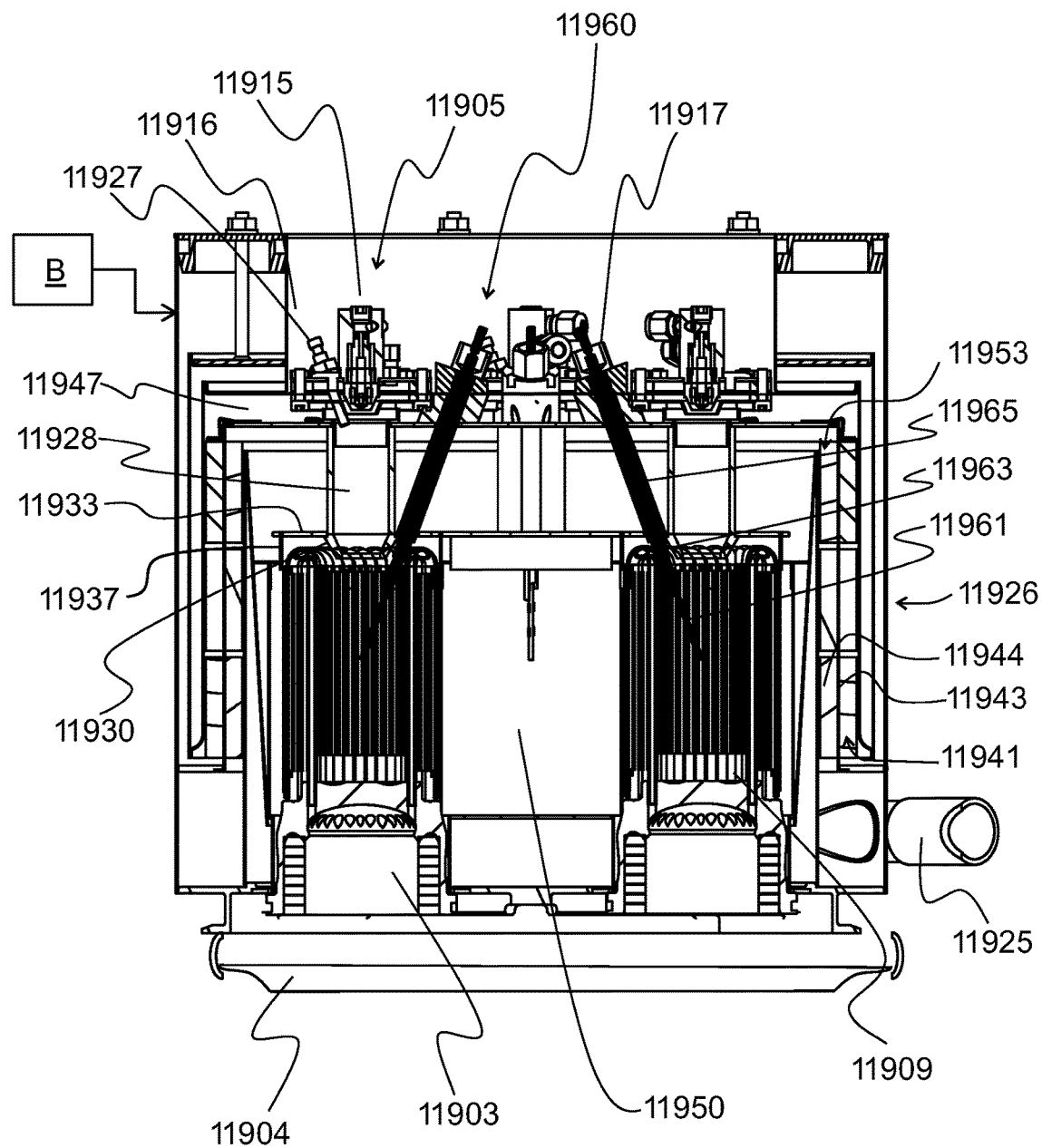
FIG. 60 show views of a burner in accordance with one embodiment.

Another aspect of the present embodiment shown in FIG. 60 is the prechamber support which extends around the outermost wall of the prechamber 11928 adjacent the exit cone 11930 and includes a heater head restrictor 11937 restricting the flame exhaust gases from passing over the heater head 11903. The restriction increases the pressure drop at the top of the heater head 11903 and improves heat transfer from the hot gas to the helium inside the heater tubes 11909 by encouraging the hot gas to flow through the heater tubes.

A substantial amount of the heat not used to heat the working fluid remains in the exhaust gases and thus the efficiency of the entire engine can be increased by using the excess exhaust gas heat to preheat the incoming air. After heating the heater head 11903 and heater tubes 11909 the hot combustion gases are forced out an exhaust inlet 11953 by newer combusted gases into the exhaust channel 11944 defined partly by an inner wall 11942 of the exhaust manifold. The exhaust passes down along the exhaust channel 11944 exchanging a substantial amount of heat through the preheater wall 11943 to the incoming cold air entering the preheater 11926 via the preheater channel 11941. The exhaust gases should flow as quickly as possible through the preheater 11926 as the heat transfer from the exhaust gases is dependent upon the velocity of the exhaust. Another aspect of the present embodiment limits the pressure drop of the exhaust gases by allowing the exhaust gases flow out from two exhaust outlets 11925, as opposed to one exhaust outlet, arranged around the bottom of the exhaust manifold 11914. The shorter flow path provided by the two exhaust outlets 11925 for the exhaust leaving the exhaust manifold 11914 lowers the pressure drop for the exhaust, the blower does not have to work as hard, and thus the blower load is reduced on the engine.

FIG. 60 also discloses the use of spark plugs 11960 in the secondary port 11917 (rather than a UV viewing window) through the burner housing. In certain cases a flame sensor may also be inserted through the secondary port 11917 which extends into the burner adjacent each of the prechamber nozzle so that flame detection can occur. In any event, the secondary port 11917 provides for access to the burner head 11905 so that a sensor or window, or ignition components for instance glo-plugs or spark plugs as shown here can be inserted down into the burner head 11905 to ignite different gases and fuels. Gaseous fuel use may necessitate the spark plug 11960 to ignite the fuel air mixture adjacent the nozzle of the prechamber whereas liquid fuel uses glow plugs and are generally located closer to the fuel injector itself. In the embodiment shown here a high voltage conductive element 11961 is encased within and insulative layer 11963 and a ground layer 11965 and inserted through the secondary port so that the exposed conductive element 11961 is exposed in the combustion chamber to ignite the fuel/air mixture exiting the prechamber 11928.

The ability to see and/or detect each flame is important so that each of the four individual burner head assemblies 11905 and respective flame can be appropriately adjusted by the controller. It is to be appreciated that such flame detection and viewing may be accomplished by many embodiments, including but not limited to an actual viewing window for example having appropriate lenses in the tube which allow a human operator to look through the tube and visually identify a flame within the range of visible wavelengths in the combustion chamber. Alternatively, the viewing window may include a camera or other image data receiving and recording device such as a UV light sensor and display for visually displaying a received representation of the flame in the combustion chamber. Other types of heat sensors including but not limited to thermocouples, infrared thermometers, and thermisters, may be used to identify and quantify the flame and flame characteristics in the combustion chamber.

With only a single blower providing air to four burner head assemblies 11905, generally a variable in addition to air, such as fuel, must be altered to obtain a desired flame quality. Keeping one blower providing air to all four burner heads is especially helpful for cost and for blower power consumption.

With liquid, diesel or other gaseous fuel, the UV viewing window will be compromised because the fuel vapor tends to absorb the UV radiation from the flame. Without the UV window as in the previous embodiment it may still be important to detect the flame and the temperatures in the combustion chamber. The electrode of the sparkplug may be utilized as a sensor in some cases to detect the flame. Such data can be forwarded to the controller to determine the flame and combustion disposition in the combustion chamber 11950. Another method of flame detection obtains temperatures with temperature sensors inside the heater head, for example a thermocouple attached on the walls of the heater tubes can provide data to the controller to alter the operational conditions of the engine. This temperature data is used to judge the temperature and/or flame quality based on temperature/flame data and helps the controller decide what operational mode, as discussed in further detail below, to set for each burner head 11905 and for the engine as a whole.

Burner Control

Figure 61:
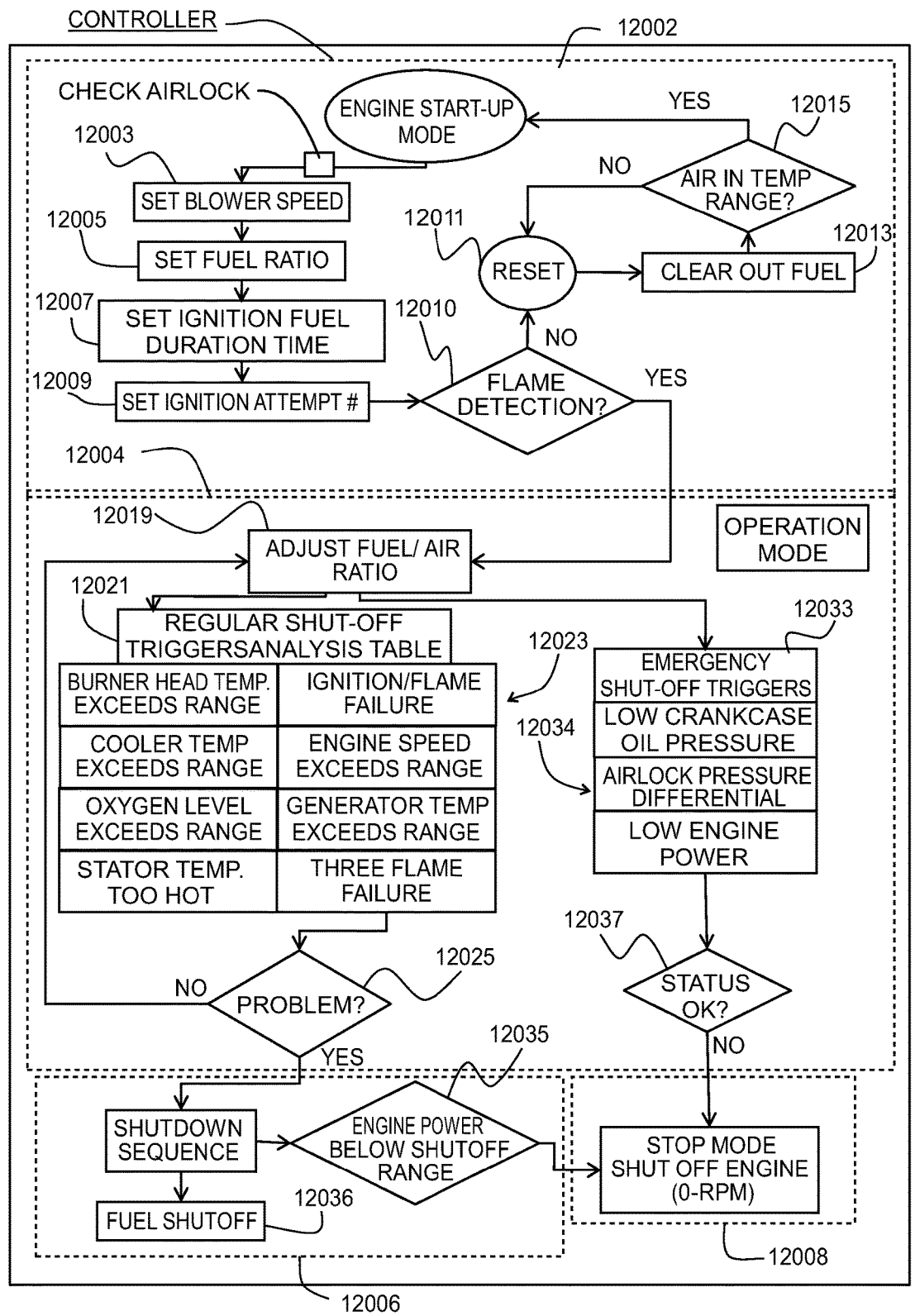
FIG. 61 is a diagram of a control burner scheme in accordance with one embodiment.

The burner may be operated in several modes as shown in FIG. 61, and referring in part to FIG. 60, according to predetermined electronics and software programs embodied in an electronic controller. The operation modes evaluated by the controller include at least a start-up mode 12002, normal operation mode 12004, shut-down mode 12006 and a stop mode 12008. The start-up mode includes the initial ignition of a richer fuel mixture in the prechamber 11928 to ease ignition as colder mixtures have a narrower ignition range of fuel/air ratio that are ignitable compared to the range of fuel/air ratios that maintain combustion. With a desired fuel/air ignition mixture present in the prechamber 11928, the igniter 11927 is actuated and the ignition mixture is ignited. A thermocouple (not shown) in the prechamber 11928 detects what is referred to as a diffusion flame in the prechamber 11928 and once the incoming air is hot enough from the preheater 11926, the flame is pushed out of the prechamber 11928 by either increasing the air flow from the blower B, or increasing fuel so the flame travels out of the prechamber 11928 and forms in the combustion area adjacent the heater head 11903.

Generally in the start-up mode 12002 as shown in FIG. 61 a user sets a desired blower speed 12003 and fuel/air ratio 12005 for a certain time period 12007, for example 30 seconds. After the predetermined time period the blower shuts off and resets 12011 the start-up phase which may include blowing out 12013 any remaining fuel in the engine and exhaust system so that there are no backfires or other damaging events from residual fuel. The start-up phase may also include for instance a number of ignition attempts 12009 before resetting and providing the user with an error A sensor (not shown) within the prechamber 11928 or a visual sensor using the secondary port 11917 detects if a flame 12010 is present within the prechamber 11928 or the combustion chamber 11950. If a flame is not detected the system is reset 12011 or if a flame is detected the temperature readings are taken 12015 from the heater head and oxygen levels are measured 12017 from the exhaust gases. The fuel/air ratio is then adjusted 12019 based on these readings.

Once the flame is supportable out of the prechamber 11928 and is heating the heater head 11903, the control system and operation mode 12004 include a number of failsafe triggers 12023 based on sensor data and controller evaluation algorithms which evaluate the system and determine if the system should be turned to the shut-down or stop mode. The operation mode 12004 monitors levels of heat, power and oxygen for example and perform shut-down or stopping of the engine, or other modifications to the system and engine if a temperature reading is too high, or exhaust oxygen level is too high or if engine speed exceeds a desired value, or the differential pressure within the air lock is too low. These are just exemplary triggers for starting shut-down or stop procedures, other triggers could be used as well or in combination with these examples.

During normal engine operation, the blower is operated at least partially by a control loop which measures the excess oxygen 12017 in the exhaust to determine blower speed. The failsafe triggers 12023 shown in the flowchart and operation analysis table 12021 in FIG. 61 include: Engine speed exceeds predetermined range; Oxygen levels in exhaust exceed a predetermined range; Generator temperature exceeds a predetermined range; Burner temperature exceeds a predetermined range; Cooler temperature exceeds a predetermined range; Flame/Ignition failure; repeatable Failure of flame ignition. It is to be appreciated that the described control method is not limited to the disclosed triggers 12023 and that other triggers, factors and variables may also be analyzed by the controller under the start-up and operation modes 12002 and 12004.

A failure of the engine in one of these failsafe triggers 12023 directs the controller C to adjust the fuel/air ratio 12019 and continue acquisition of sensor readings. A preset number of a repeated failure 12025 of the engine to run within a predetermined range for any of these triggers leads to a shutdown sequence with an immediate fuel turn off 12029. The engine however can continue to run in the shut-down mode 12006 in many cases. On the other hand, certain events may cause complete engine stoppage (i.e. shut-off as opposed to shut down) so that damage to the engine is minimized. A status check 12037 on system components is repeatedly run. These shut-off triggers 12034 are for example, low oil pressure, low airlock pressure differential, and low engine power levels will ensure complete engine stoppage to prevent damage. During a shut-down mode 12006, the fuel and burner is turned off but the engine keeps running until the heater head 11903 is cooled to a desired temperature. A system shut-down may also be caused by excessive heat measurements in a number of components such as the Generator, the burner, or a cooler, or a system shut down may occur if there is a failure to ignite. A shut down due to system failure may trigger a safe mode where fuel is pumped out of the system. Any fault or system failure or trigger, will kill the fuel delivery immediately 00036, but the engine will continue to run to cool down the system. The engine runs until it reaches a predetermined power level 12035 in the shut down mode 12006, or in the event of the more dangerous fail safe triggers the engine is stopped 12008, i.e. the RPMs are set to 0. The shut-down mode helps engine efficiency since the engine, burner and heater heads remain hot for a while, even while there is no fuel supplied, the engine will continue to run producing power until the predetermined low power level is reached. This recovers some of the energy put in at start-up mode which improves efficiency. Methods to concentrate exhaust gases near heater tubes is disclosed in U.S. patent application Ser. No. 13/447,990, filed Apr. 16, 2012 and entitled Stirling Cycle Machine, which is hereby incorporated herein by reference in its entirety.

Venturi Burner

FIGS. 62A-62D disclose a further embodiment of a burner 12901 for use in conjunction with a multiple heater head and piston engine as described previously in FIGS. 54-60. This embodiment of the burner 12901 is also specifically directed to the independent heating of multiple heater heads 12903. In this embodiment there are four (4) heater heads 12903 and respective burner assemblies 12907, although only two (2) are visible in the cross-section of FIG. 62A, and more or less heater heads are of course also possible for the engine. As in the previously discussed embodiments the heater heads 12903 and burner assemblies 12907 are encompassed by a burner housing 12911 and each heater head 12903 is heated by an individual burner assembly 12907 and flame supplied with a fuel/air mixture for combustion via a blower B and air inlet 12923 and a fuel injector 12927. As described in further detail below the exhausting combustion gases are used to pre-heat the incoming air and, following combustion, one or more exhaust outlets are provided through exhaust opening(s) 12925 (not shown) to finally exhaust the combustion gases from the burner housing 12911.

Figure 62A:
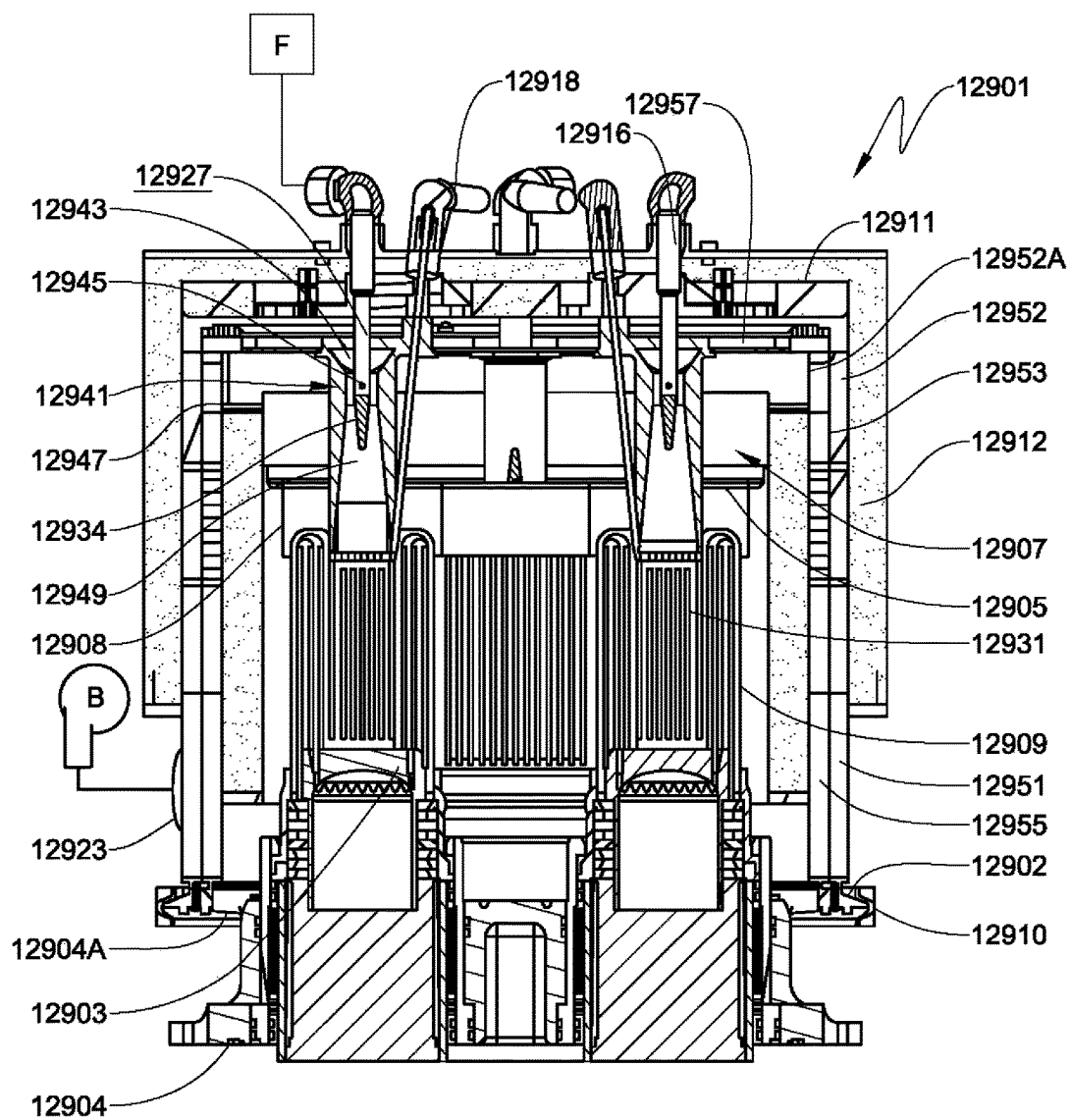
FIGS. 62A-62D are a further embodiment of a venturi-type burner for use in conjunction with the multiple heater head in accordance with one embodiment.
Figure 62B:
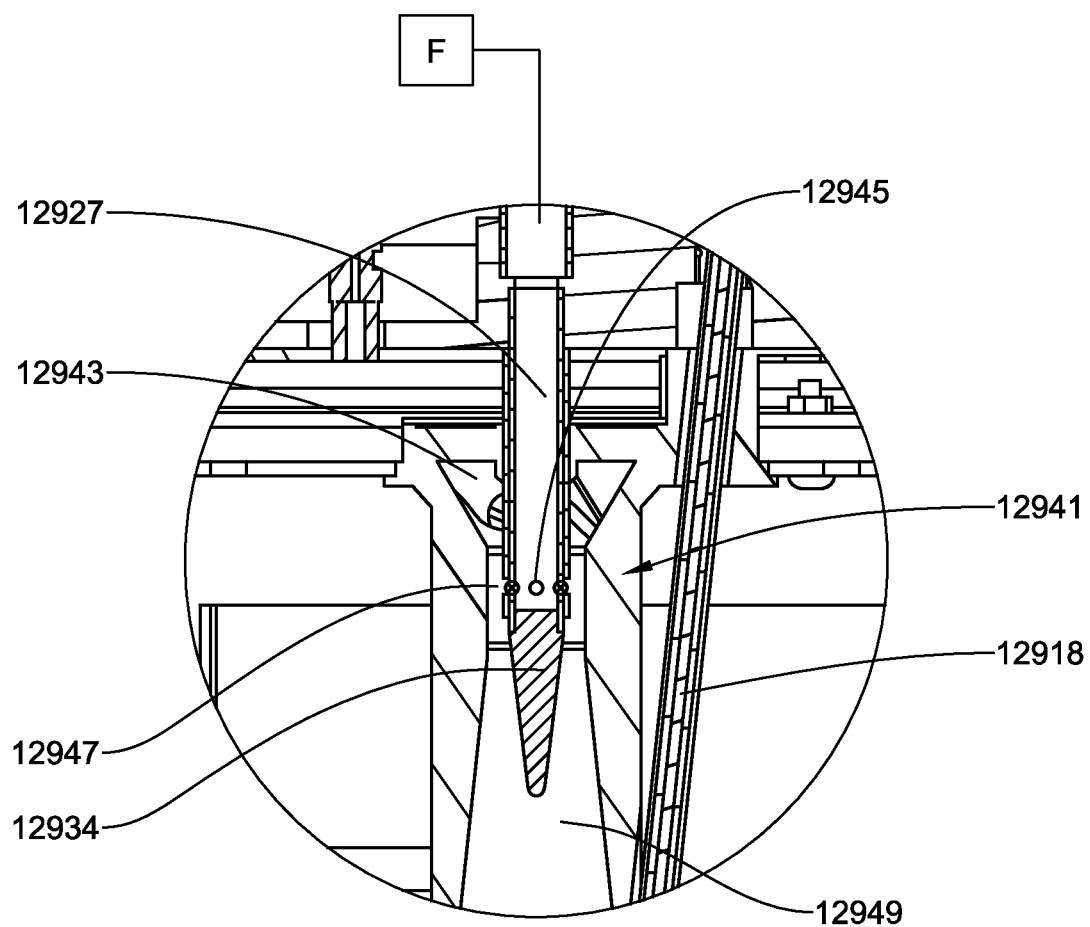

More specifically observing FIG. 62A, the four burner design 12901 of the present embodiment includes the single blower B connected to the housing 12911 providing air for the fuel/air mixture in the ignition process of each the burner assemblies 12907 as shown. The heater heads 12903 themselves may be any of the various embodiments of tube heater heads described in the preceding sections, including, but not limited to, straight tube heater heads or helical tube heater heads as disclosed in U.S. patent application Ser. No. 13/447,990, filed Apr. 16, 2012, and incorporated herein. By way of example, the present embodiment is contemplated utilizing heater tubes 12909 through which flow the working gas, for example helium, which is heated by the respective burner assemblies 12907.

Figure 62C:
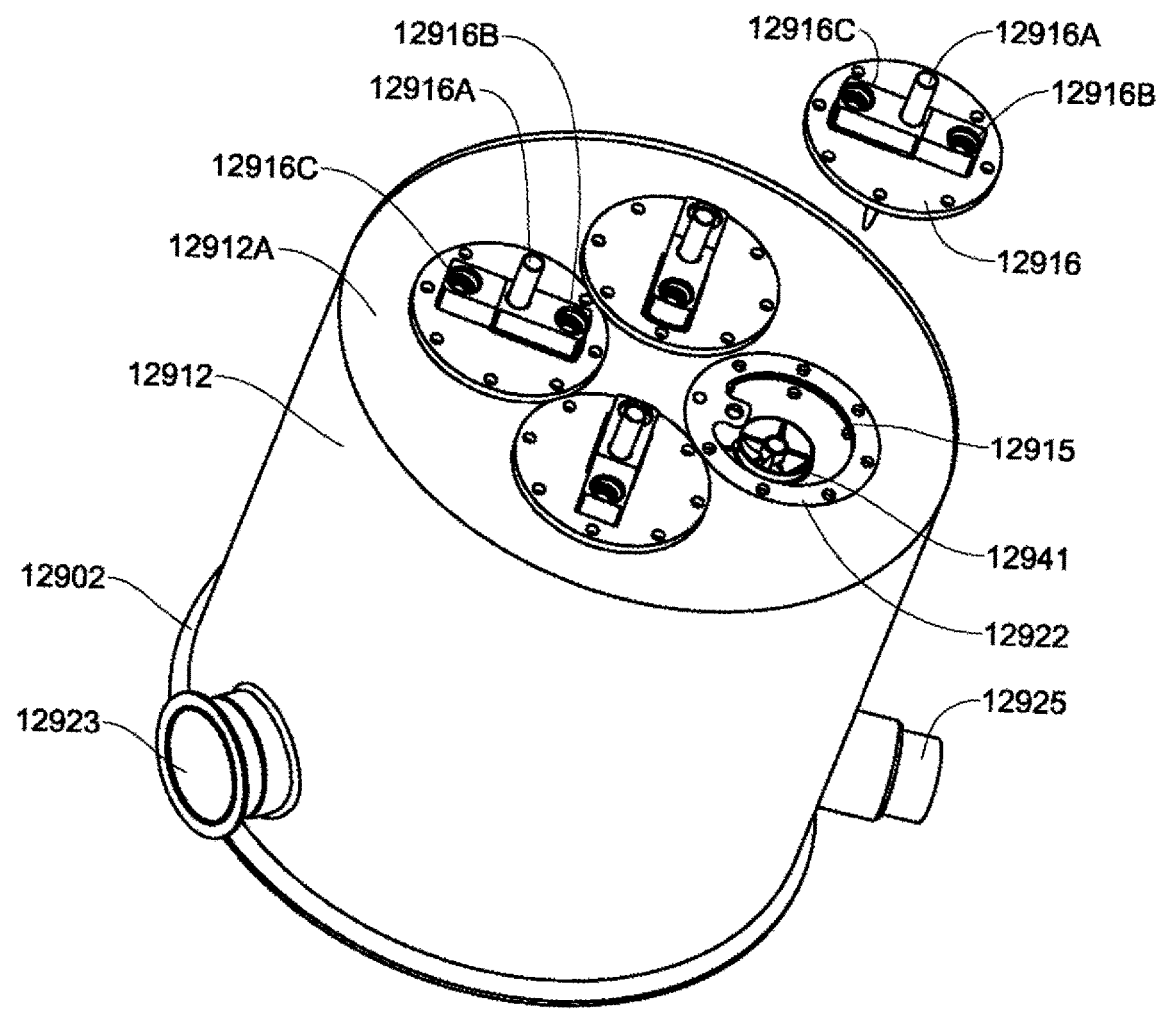
Figure 62D:
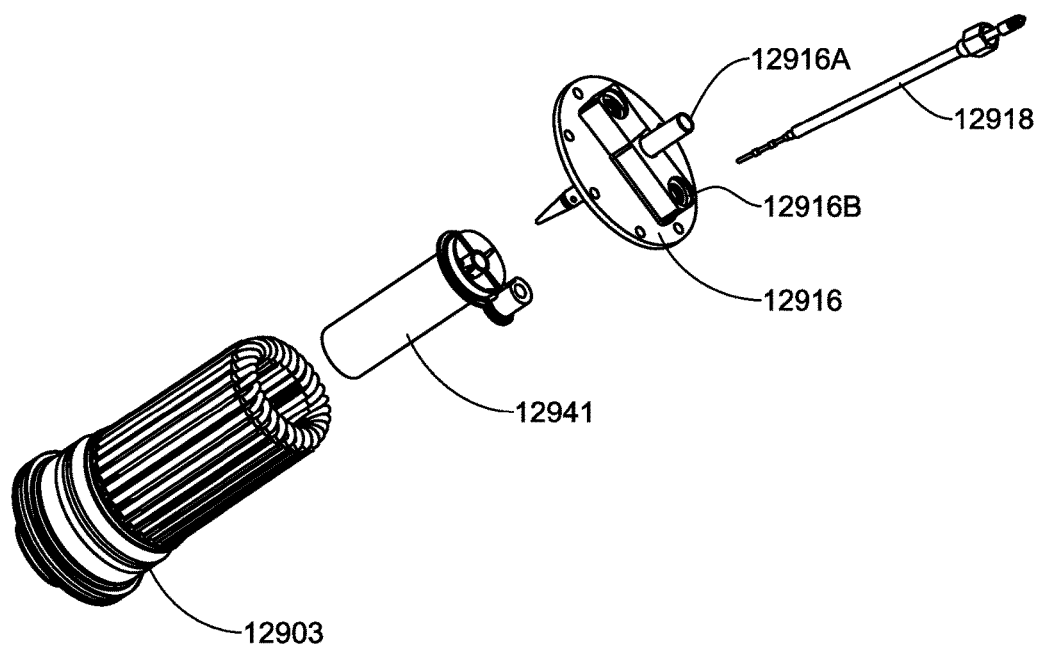

By way of more detailed description, the burner 12901 includes multiple burner assemblies 12907, one for each of the heater heads 12903. In the case of the present embodiment there are four (4) heater heads 12903 and hence four (4) burner assemblies 12907. FIG. 62C discloses the burner housing 12911 having a substantially cylindrical outer wall 12912, although other geometrical configurations could be accomplished. The blower B pumps air into the burner 12901 through air intake 12923 for purposes of ignition and combustion, and exhaust gases are ejected from the burner via the exhaust outlet 12925 adjacent the base of the burner.

As shown in FIG. 62C, the top of the burner housing provides one or more ports 12915 in the top of the burner 1212A for receiving fuel injector assemblies 12916. The injector assembly 12916 may provide a port for fuel 12916A, a port to mount an ignitor 12916B and a sensor port 12916C to monitor the hot combustion air. The ignitor 12918 may be a spark plug and may function as the high voltage electrode of a flame ionization flame detector. In other embodiments, the ignitor 12918 may be a hot surface ignitor. In other embodiments the port 12916B may be used for a vision based flame detection circuit including but not limited to one or more of the following: IR flame detector, visible light flame detector and/or UV flame detector. Injector assembly 12916 may be removably connected to burner 12901. This arrangement may be beneficial for many reasons, including, but not limited to, to allow the injector assembly 12916 to be changed, cleaned and/or modified. Fuels with different energy densities may require a different sized port 12945. Alternatively, the fuel ports 12945 may be made very small or fitted with nozzles for liquid fuels. In some embodiments, liquid fuels may be atomized by forcing the liquid through very small orifices. In some embodiments, the liquid fuel may be atomized by a number of nozzle geometries including, but not limited to, one or more of pressure nozzles, and/or air blast nozzles. In some embodiments, the injector assembly may be sealed to the burner housing 12911 with exhaust gaskets 12922. In some embodiments, the fuel injector assembly 12916 may be brazed or welded to the burner top 12912A.

In some embodiments, the burner as a whole is set over and stacked up on a cooling plate 12904 of the vessel so that the heater heads 12903 are within and/or are substantially sealed inside and/or are encompassed by a lower region of the burner 12901. In some embodiments, the burner base 12902 may be secured to the cooling plate mount 12904A in the vessel stack-up by a circumferential band clamp 12910, such as, in some embodiments, a Marmon clamp, which is provided for securing and critically, circumferentially centering the burner relative to the cooling plate 12904. However, in various embodiments, the burner base 12902 may be secured using another securing apparatus/device. In some embodiments, the burner base 12902 may include one or more pins (not shown) that mate to holes in the cooling plate mount 12904A to orient the burner such that each burner assembly 12907 may be substantially centered over each heater head 12903. As previously discussed, the centering of each burner assembly 12907 relative to each of the associated heater heads 12903 is critical for many reasons, including, but not limited to, if the flame from the burner assembly is nearer one side of the heater heads 12903 and heater tubes 12909 than another, there may be inefficient heating of the working gas/fluid in the heater tubes 12909, and a potential for certain heater tubes to be heated to a higher temperature than other tubes. As discussed in further detail below, the efficiency of the engine may be improved when even and consistent heating of the heater tubes and the working gas/fluid is accomplished in the engine.

Referring again to FIG. 62A, in various embodiments, each burner assembly 12907 has a fuel injector assembly 12916, an igniter, which, in some embodiments, may be a sparkplug 12918 or glow-plug or another igniter, and a flame detection device which may also be provided in a secondary port. Fuel, which may be, in various embodiments, either liquid fuel or gaseous fuel, is fed to the fuel port 1216A via a fuel line from a fuel source F and is dispersed as a fine mist/mist or vapor through the multiple fuel ports into an ejector 12941 of the burner assembly 12907. The ejector 12941 in this embodiment is a venturi type ejector as disclosed for example in U.S. patent application Ser. No. 12/829,320 filed Jul. 1, 2010, now U.S. Publication No. US-2011-0011078-A1 published Jan. 20, 2011 and entitled Stirling Cycle Machine, which is hereby incorporated herein by reference in its entirety. In some embodiments the venturi 12941 may be beneficial for many reasons, including, but not limited to, providing the benefit of reducing or eliminating the need for a completely separate fuel control scheme as regulation of the airflow changes the vacuum which, in turn, correspondingly affects the fuel flow and regulates the burner power. In some embodiments, the venturi allows use of typical gas pressures in buildings, e.g., 7 inches of water column, without a compressor. The blower B forces air into an initial swirler portion 12943 of the venturi 12941. The flow of swirled air through the venturi draws in a proportional amount of fuel through the fuel inlet ports 12945 on the fuel injector assembly 12916 which, in various embodiments, may be positioned at, or in, the venturi throat 12947. This swirling fuel/air mixture exits the venturi and forms a swirl stabilized flame in the combustion chamber 12931.

The fuel/air mixture is ignited by the igniter or spark plug 12918 and may combust partly inside the diverging section of the venturi 12949. More complete combustion may occur in the combustion chamber 12931 extending down inside the heater tube 12909 arrangement of each respective heater head 12903. The hot combustion gas then passes between the heater tubes 12909 and collects on the outside of the heater heads 12903. In various embodiments, exhaust shields 12908 direct the hot combustion gases to flow through the outer row of heater tubes 12909. The now cooled exhaust exits the burner via the preheater and exhaust manifold described in greater detail below.

In various embodiments of the burner 12901, the single blower B, shown here diagrammatically, may be incorporated to maintain a consistent average air flow supplied to the burner 12901 and hence to each of the individual burner assemblies 12907. In some embodiments, the blower B may also produce a variable air flow when necessary to control the fuel/air mixture in the venturi 12941. The blower B may pump air at a desired velocity depending on instructions from a controller for purposes of ignition, then once ignition has occurred, the desired air flow rate may be regulated by the controller dependent on data received from sensors, which may include, but not limited to, an oxygen sensor sampling the cooled exhaust gas. In some embodiments, a fuel system with variable flow valves for each heater head, which, in some embodiments, may be a Maxitrol EXA-40 valves for example, as manufactured by the Maxitrol Company, Southfield, Mich., USA, may control the fuel flow to achieve the commanded temperature on each heater head. The blower may be adjusted to achieve the desired fuel/air ratio.

An important aspect of the present embodiment is the efficient heating of the incoming air through the extraction of waste heat in the exhaust to raise the incoming air temperature thereby improving the efficiency of combustion processes and the burner 12901. The blower B connects through the air inlet 12923 in the outer wall 12912 of the burner housing into an air channel 12951. The air channel 12951 extends circumferentially around the burner inside the outer wall 12912 of the burner 12901 and directs the air developed by the blower B across an intermediate baffle 12953 and up into the hot manifold 12957 before entering the swirlers 12943 of the venturi ejectors 12941. The intermediate baffle 12953 directly separates the incoming air from the exhaust gases exiting the burner through an exhaust channel 12955 and provides for the heat transfer from the exiting exhaust to the incoming air in the air channel 12951. The heat transfer efficiency across the intermediate baffle 12953 is critical because the hotter the incoming air can be heated, the less fuel is necessary to reach the desired combustion temperatures.

The incoming air is preheated to a desired temperature, for example, but not limited to 600-750° C. These are many reasons preheating the incoming air may be beneficial and these include, but are not limited to, facilitating ignition and combustion as the air is directed to the burner assemblies 12907 and/or increasing the thermal efficiency of the burner by capturing some of the thermal energy in the combustion gases exiting the heater heads. In some embodiments, preheating of the air may reduce the hot exhaust temperature from 900° C. to 300° C. In some embodiments, the amount of preheating which may be accomplished may be related to the efficiency of heat transfer from the exiting exhaust to the incoming air. The heat transfer across the intermediate baffle 12953 may be improved by adding rows of folded fins 12952 on the air side and folded fins 12952a on the exhaust side of the intermediate baffle 12953. The folded fins may be brazed to the intermediate baffle 12953 to assure good thermal attachment. In various embodiments, the material properties of the folded fins may be optimized for the operating temperature. For example, in some embodiments, the rows of folded fins near the top may be heat resistant metals, which may include, but is not limited to, INCONEL 625, while lower and cooler folded fins may have higher thermal conductivity but lower operating temperature. In various embodiments, the materials for these folded fins may include, but is not limited to, stainless steel 409 or Ni 201 for example. The preheated air exits the air channel 12951 and is directed radially into a hot air manifold 12957 which communicates with each of the multiple burner assemblies 12907 specifically directing the preheated air to the swirler portion 12943 of the venturi 12941. In various embodiments, the preheated air enters the hot air chamber 12957 through a substantially 360 degree circumferential opening around the exit of the air channel 12951. In some embodiments, this may result in a consistent flow rate of preheated air delivered to each of the burner assemblies 12907. In various embodiments, additional channels or passageways (not shown) may be provided in the hot air chamber 12957 to direct the preheated air in the hot air chamber to a specific burner head. In various embodiments, the 360 degree output from the air channel 12951 is used when there is only one blower B developing the air flow into the engine.

Airlock and Working Fluid Repressurization System

As described previously in this application, the power, life and value of a Stirling engine may be maximized, in some embodiments, by building an oil lubricated drive contained in a pressure vessel, generally referred to herein as the crankcase, and sealing the working space of the Stirling engine which contains the working fluid, for example helium, from the crankcase oil with flexible membranes or bellows such as the rolling diaphragms also discussed above. The rolling diaphragms attach to the moving piston rod and the engine casing structure enable the piston rod to move relative to the casing and to provide an oil tight seal between the oil filled crankcase and the workspace, ensuring that the lubricant is maintained in the crankcase and does not disperse into the working fluid of the Stirling. Dispersion of the oil from the crankcase into the working fluid would lead to engine failure. In order for the bellows to function for thousands and millions of cycles, as necessary, a small pressure difference must be maintained across the bellows. An airlock is provided between the constant pressure crankcase and oscillating pressure workspace to create a volume at the mean pressure of the workspace. The pressure of this airlock may be controlled to provide a constant pressure difference across the bellows. This is described in more detail above.

An important aspect of the rolling diaphragm and oil lubricated crankcase relates to the use of an airlock 10401 and an airlock pressure regulation system 10411 as shown previously in FIGS. 44A and 44B. By way of review, the airlock pressure regulation system 10411 provides the benefit of ensuring that an appropriate/desired pressure differential is maintained across the rolling diaphragms 10490 and that working gas escaping into the crankcase is cleaned of lubricating oil returned to the working space.

Figure 63:
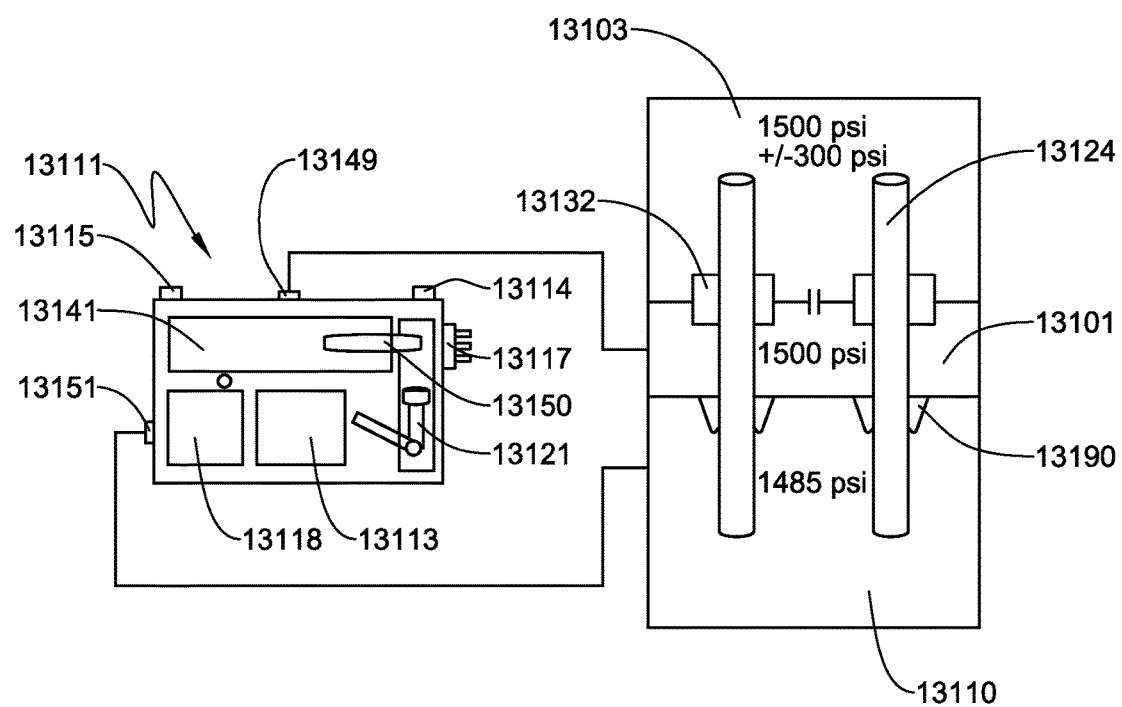
FIG. 63 shows a further embodiment of an airlock pressure regulation system.

Referring now to FIG. 63, as previously discussed, the pressure of airlock space 13101 is desired to be maintained at essentially 1500 PSI and equal to the mean pressure of working space 13103. Other pressures are of course possible with 1500 psi being an example of one embodiment of the airlock. In various embodiments, the pressure in the working space 13103 may vary approximately +/−300 psi so the function of the airlock space 13101 is to insulate the diaphragms 13190 from such fluctuations and maintain itself at around the necessary pressure, by way of example here 1500 psi, relative to the 1485 PSI charged in the crankcase 13110 so that there is approximately about a 15 psi difference between airlock space 13101 and crankcase space 13110. In various embodiments, the crankcase, workspace and air lock are initially charged, at room temperature, to a pressure well below the desired operating pressures because the pressure rises as the gas in the three volumes, i.e., workspace, crankcase and air lock, heat up during engine startup. In addition, during different operating conditions, the temperature of one or more of the three volumes may change causing changes in pressure across the bellows. In some embodiments, an Airlock delta Pressure Regulation (AdPR) block 13111 is provided between the crankcase 13110 and the airlock space 13101 to create and maintain the exemplary 15 psi pressure differential (and/or the desired pressure differential) therebetween in all operating conditions including but not limited to engine starup, engine shutdown, changes in temperature or speed, leaks from one volume to another or leaks from one volume to ambient.

The embodiment as shown in FIGS. 63 and 132 A-C is referred to hereinafter in general as the "AdPR block" or "AdPR system". In these embodiments the AdPR block 13111 is connected between the crankcase 13110 and the airlock 13101. The AdPR block regulates the pressure difference between the airlock 13101 and the crankcase 13110. When the reciprocating pistons 13124 of the Stirling cycle machine are moving, the AdPR block 13111 keeps the airlock pressure preferably 10 to 15 PSI above the crankcase pressure so that the rolling diaphragms are maintained in a desired arrangement, essentially bellowing into the crankcase. It is to be appreciated that a range of 5 to 20 PSI is possible and other pressure differentials can be accomplished by the regulator as well. The desired pressure difference across the bellow seal may depend on the material and physical dimensions of the bellows, so that other bellows may require other pressure differences. While the Stirling cycle machine engine is off, in various embodiments, the AdPR block 13111 keeps the airlock pressure preferably less than 15 PSI above the crankcase pressure and not more than 5 PSI below crankcase pressure. It is permissible to have a greater fluctuation of pressure differential when the engine is off since there are little or no dynamic forces being applied to the rolling diaphragms 13190 via moving piston rods. In various embodiments, the desired pressure difference may vary.

Figure 64A:
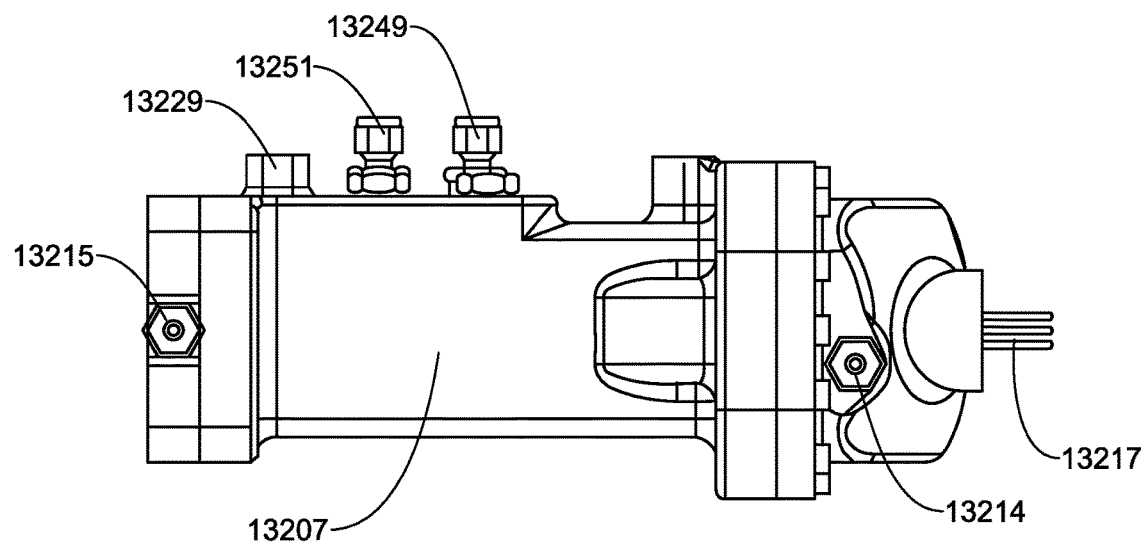
FIGS. 64A-64F present an embodiment of an Airlock delta Pressure Regulation (AdPR) block.
Figure 64B:
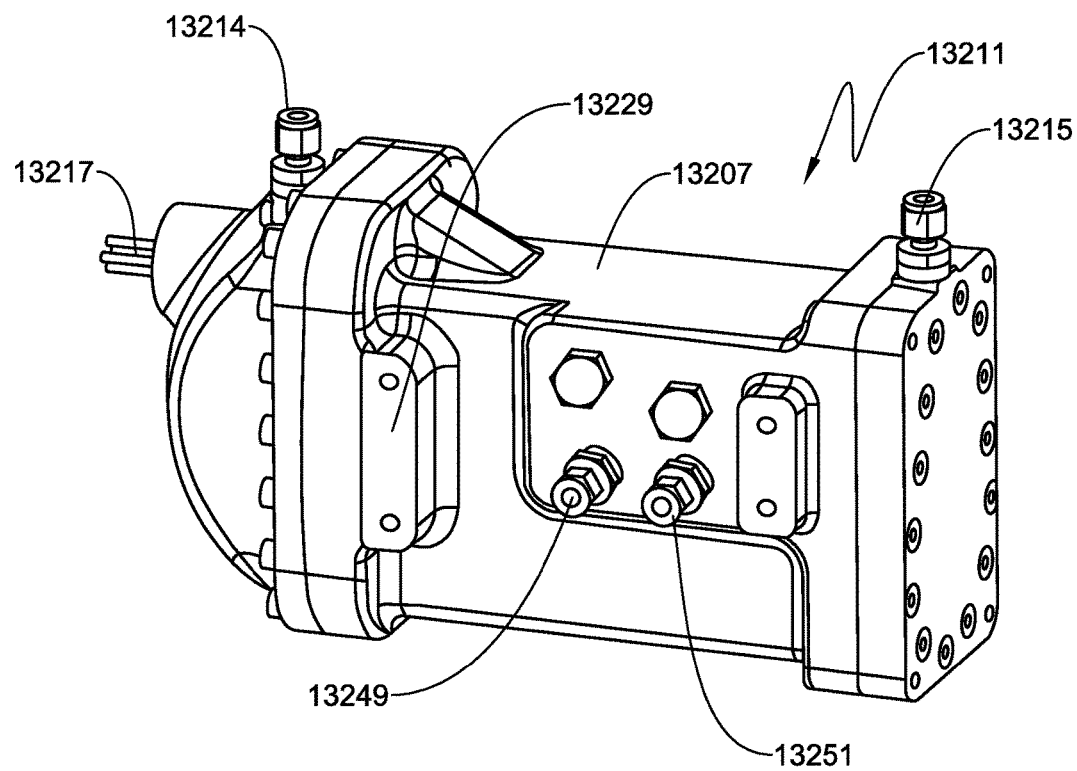
Figure 64C:
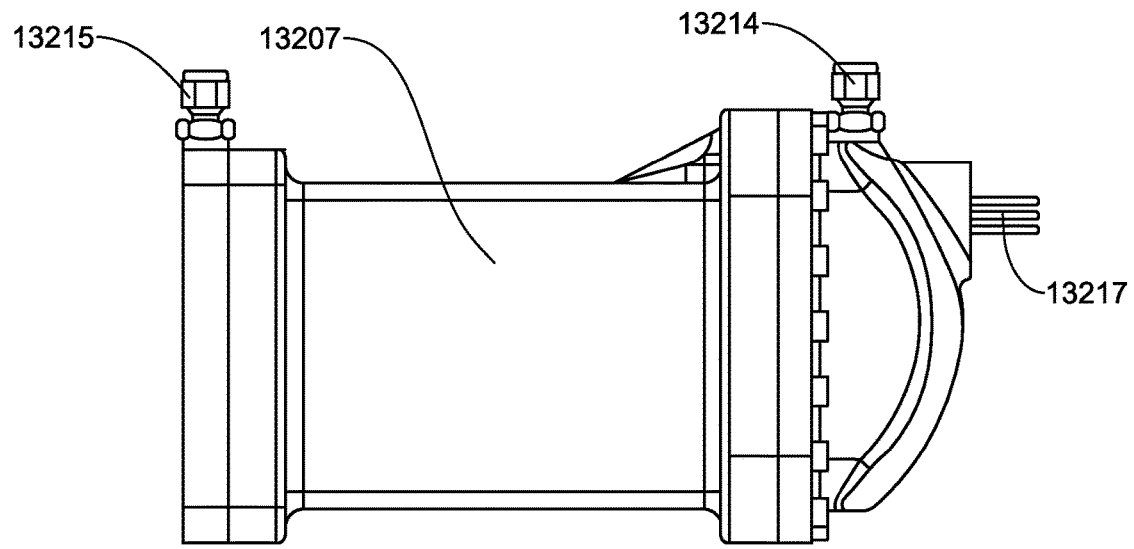
Figure 64D:
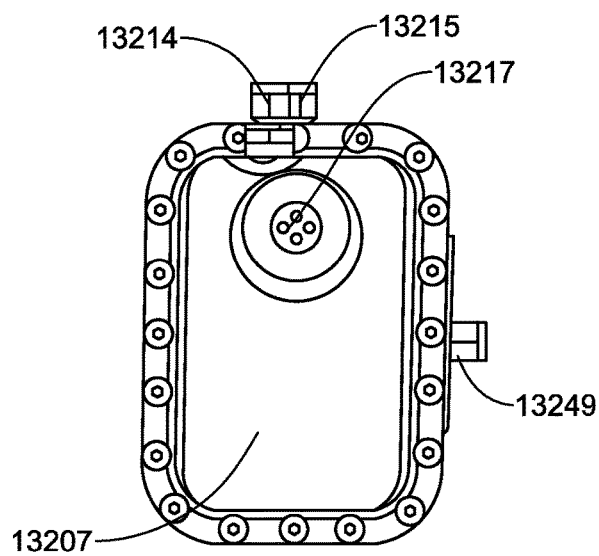
Figure 64E:
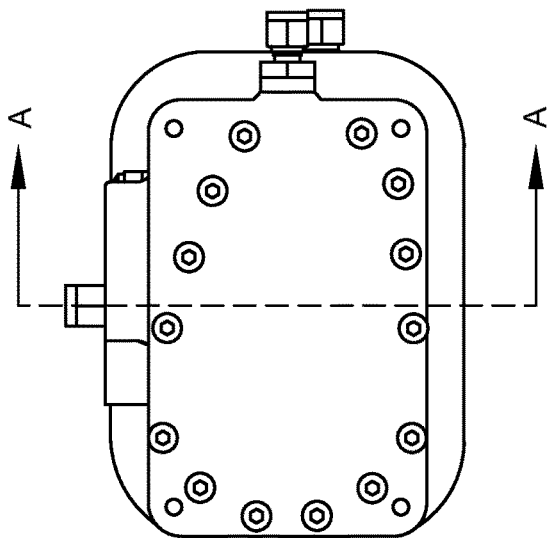
Figure 64F:
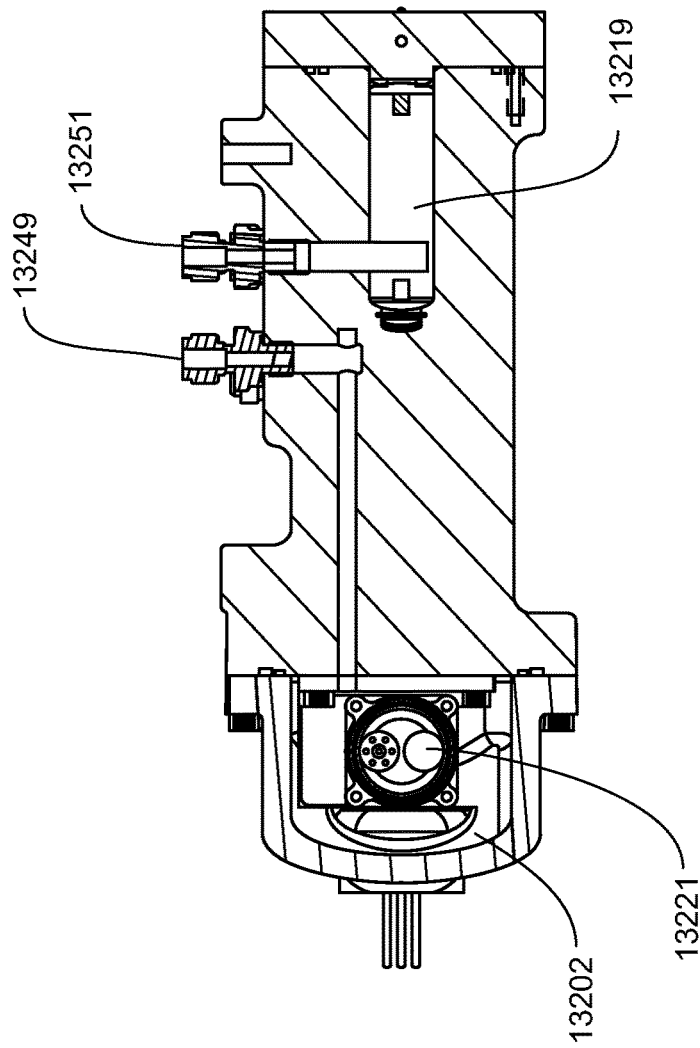

In some embodiments of the AdPR block 13111, for example, as shown in FIGS. 64A-C, the AdPR block 13111 has an outer housing 13207 having mounting brackets 13229 or other attachment fixtures to secure the AdPR block 13211 on or near to the Stirling cycle machine. Along the center of the housing 13207 one or more ports may be positioned with at least one port connected to the crankcase designated as crankcase port 13251 and at least one port connected to the airlock designated as airlock port 13249. The crankcase port 13251 is connected to the oil filter volume 13219. The airlock port 13249 is connected to the AdPR airlock space 13202 surrounding the pump 13221 (FIGS. 64D, 64E, 64F).

Figure 65B:
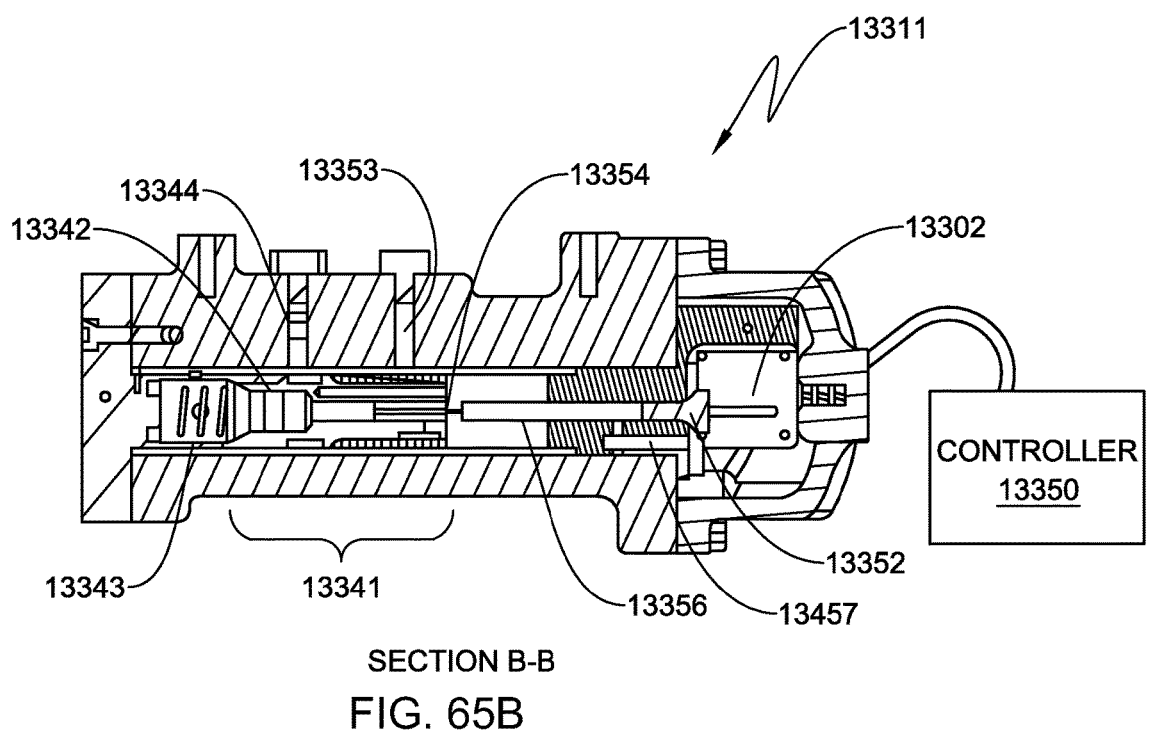
FIG. 65A-65D is an embodiment of an Airlock delta Pressure Regulation (AdPR) block.
Figure 65A:
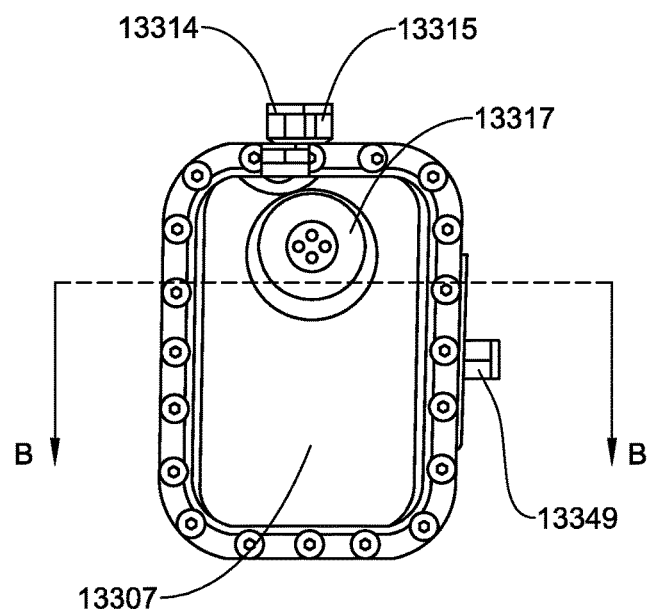
Figure 65D:
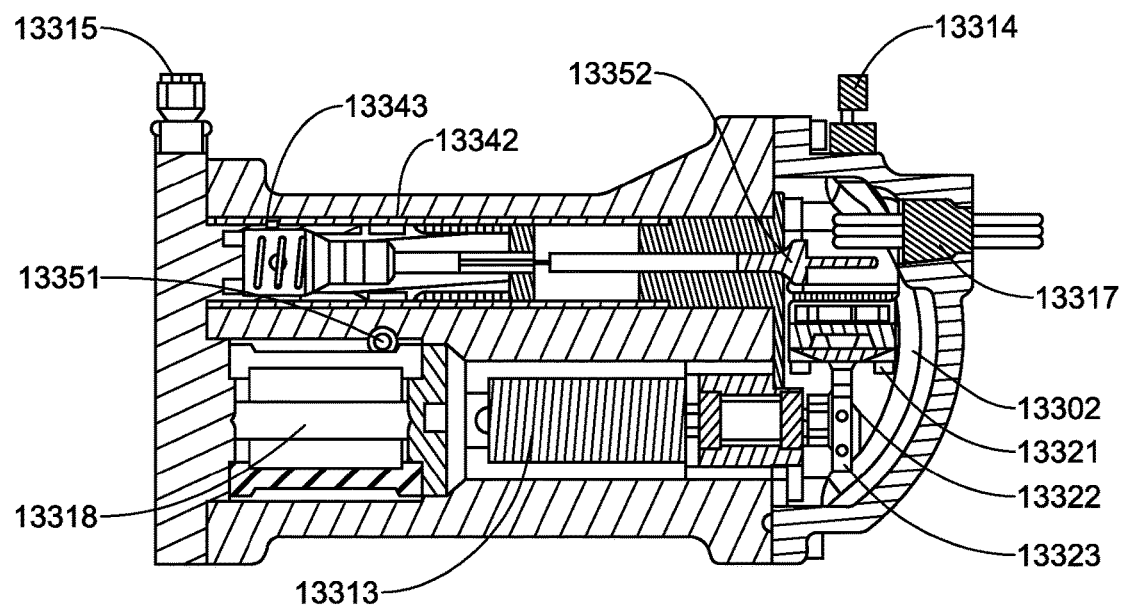

A port 13457 in FIGS. 65A, 65B connects the AdPR airlock space with the airlock side of the spool valve 13342. A working gas fill port 13214 and drain port 13215 may be positioned as shown at either end of the block 13211 with a first end of the housing having an electrical conduit and wire feed-thru 13317 necessary to drive a pump motor 13313 shown in FIGS. 65C, 65D.

Turning to the cross-section seen in FIG. 65B, in various embodiments, the AdPR block 13311 may include a spool valve regulator 13341 with appropriate passages 13353, 13344 to the pump (not shown) and components of a linear position sensor 13352. The passage labeled 13344 operates at approximately the crankcase pressure and connects the spool valve to the pump inlet port 13439 as shown in FIGS. 65G, 65H. The passage labeled 13353 operates at approximately the airlock pressure and connects the spool valve to the pump outlet port 13438 as shown in FIGS. 65G, 65J. An AdPR pump controller 13350 is provided in some embodiments and in some embodiments, the AdPR pump controller 13350 may prevent premature wear of the pump components and reduce airlock pressure variations. The AdPR pump controller 13350 communicates with at least the spool position sensor elements 13352 and may operate the pump only when needed to increase the pressure difference between the crankcase volume 13110 and the airlock volume 13101 as sensed by the position of the spool valve. In some embodiments, the AdPR controller 13350 may stop the pump 13312 when the spool position indicates that the air lock pressure is sufficiently above the crankcase pressure. In one example, the AdPR controller 13350 may change the speed of the pump 13321 proportionally to the spool valve position in order to achieve a more constant pressure difference across the bellows 13190. In an example, the AdPR controller 13350 may run the pump at maximum speed for spool valve positions beyond a given value. In an example the AdPR may command the engine to zero speed for spool positions beyond a second given value where that level indicates the airlock pressure is not sufficiently greater than the crankcase pressure. In various embodiments, the position sensor 13352 may be a proximity sensor that senses an absolute position or, may be a relative, i.e. differential, position sensor. In various embodiments, the sensor may be any other type of sensors. Depending on the location of the spool 13342, the position sensor 13352 may sense the position of the spool 13342 and transmits that data to the controller 13350.

In some embodiments, the position sensor 13352, shown herein, may be an LVDT (Linear Variable Differential Transducer) linear position sensor which is a type of electrical transformer used for measuring linear displacement. Various embodiments of an LVDT generally have three solenoidal coils (not shown) placed end-to-end around a tube. The center coil is the primary, and the two outer coils are the secondaries. A cylindrical ferromagnetic core 13354, attached to the object whose position is to be measured, slides along the axis of the tube 13356. An alternating current is driven through the primary, causing a voltage to be induced in each secondary proportional to its mutual inductance with the primary. The frequency is usually in the range of about 1 to 10 kHz. As the core 13354 moves, these mutual inductances change, causing the voltages induced in the secondaries to change. The coils are connected in reverse series, so that the output voltage is the difference (hence "differential") between the two secondary voltages.

By way of further explanation, in some embodiments, when the core 13354 is in its central position, e.g., equidistant between the two secondaries, equal but opposite voltages are induced in these two coils, so the output voltage is zero. If the core 13354 is displaced in one direction, the voltage in one coil increases as the other decreases, causing the output voltage to increase from zero to a maximum. This voltage is in phase with the primary voltage. When the core 13354 moves in the other direction, the output voltage also increases from zero to a maximum, but its phase is opposite to that of the primary. The magnitude of the output voltage is proportional to the distance moved by the core (up to its limit of travel), which is why the device may be described as "linear". The phase of the voltage indicates the direction of the displacement. Because the sliding core 13354 does not touch the inside of the tube 13356, it may move without friction, making the LVDT 13352 a highly reliable device. The absence of any sliding or rotating contacts allows the LVDT 13352 to be completely sealed against the environment.

Figure 65C:
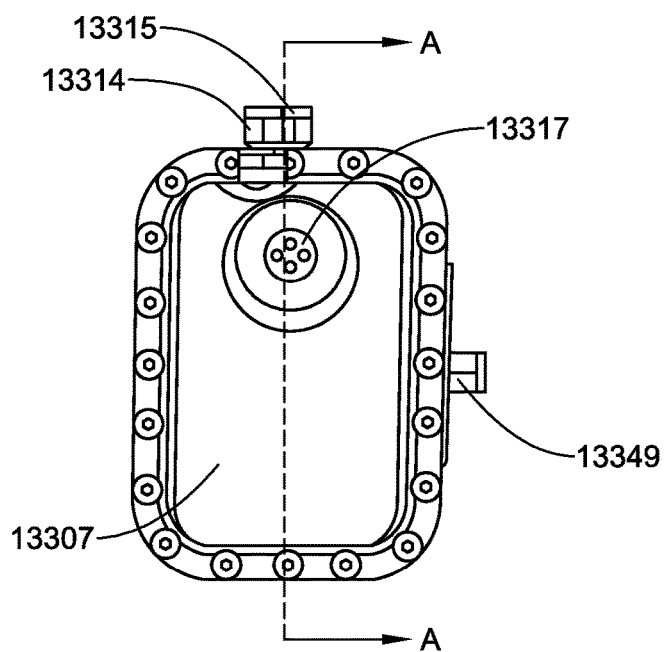

Turning to cross-section shown in FIG. 65C, in various embodiments, an electric motor 13313 may be used to drive the diaphragm pump 13321 that, depending on the position of the spool 13342, may either port to the airlock 13101 or be deadheading. In some embodiments, the seals on the spool are removed so that the pump always pumps to the air lock 13101. In these alternative embodiments, the AdPR controller varies the speed of the pump to produce the same effect on the airlock pressure as deadheading the pump. The spool valve 13341 comprises again similar components to those described previously in relation to FIGS. 45 and 46A-E. Here the spool 13342 is balanced against the pressure of the airlock by a spring 13343. A porting manifold 13302 is shown here to port the pump 13321 from the crankcase side of the spool valve 13342, and into the airlock side of the spool valve 13342. Additionally, the porting manifold 13302 mounts the pump head 13321 and LVDT position sensor 13352. The crankshaft 13322 and connecting rod assembly 13323 connects the electric motor 13313 to drive the pump 13321 and an oil scrubbing filter 13318 is provided adjacent the crankcase port 13351 to ensure that any oil which makes its way into the AdPR block 13311 via the crankcase port 13351 is filtered from the working fluid being pumped through the regulator 13341 to the airlock 13101.

Figure 65F:
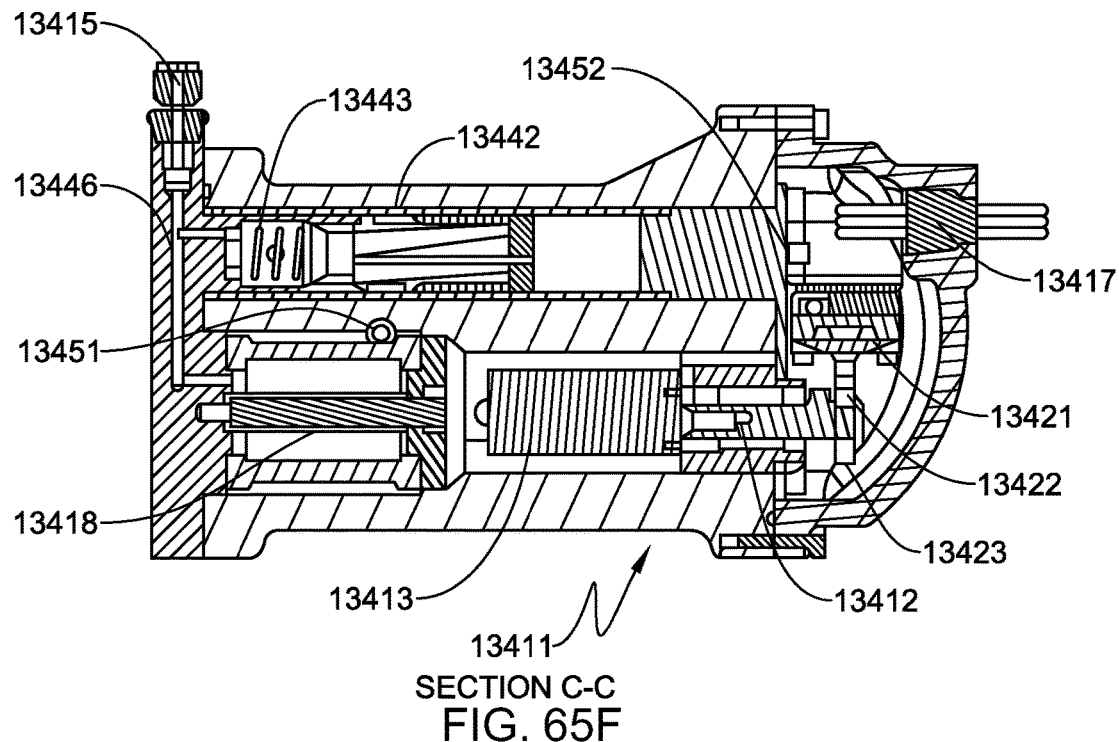
Figure 65E:
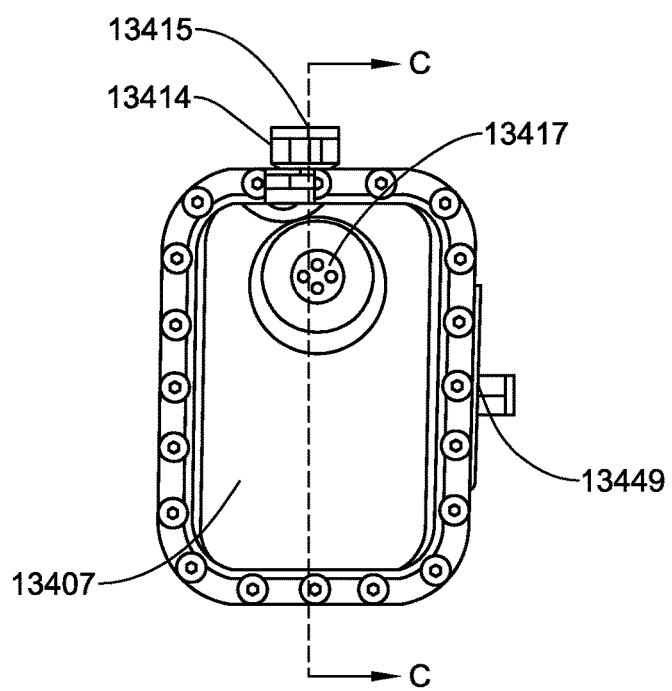
Figure 67A:
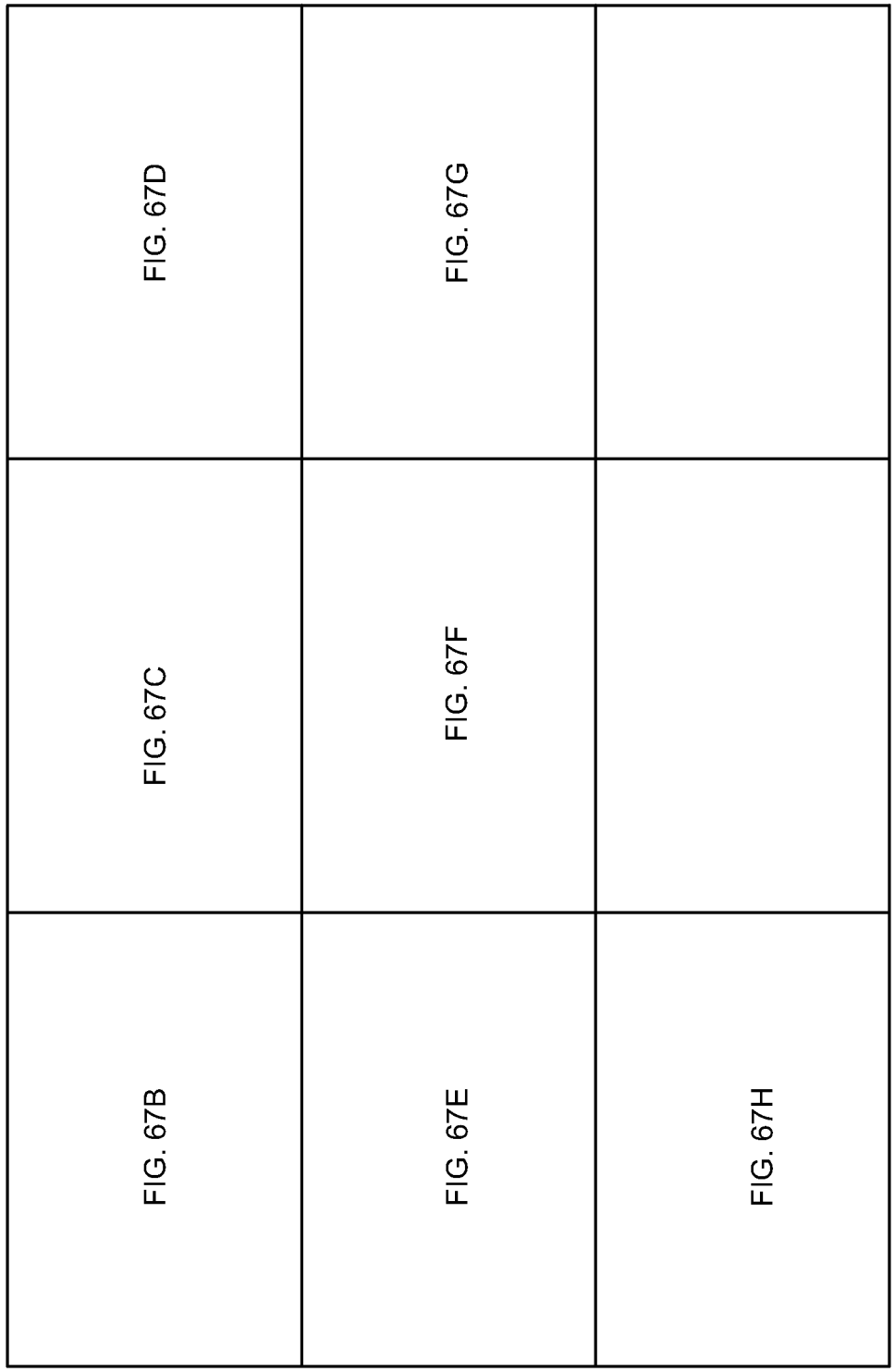
FIG. 67A shows a chart which shows the order of the embodiments as depicted in FIGS. 67B-H.
Figure 67B:
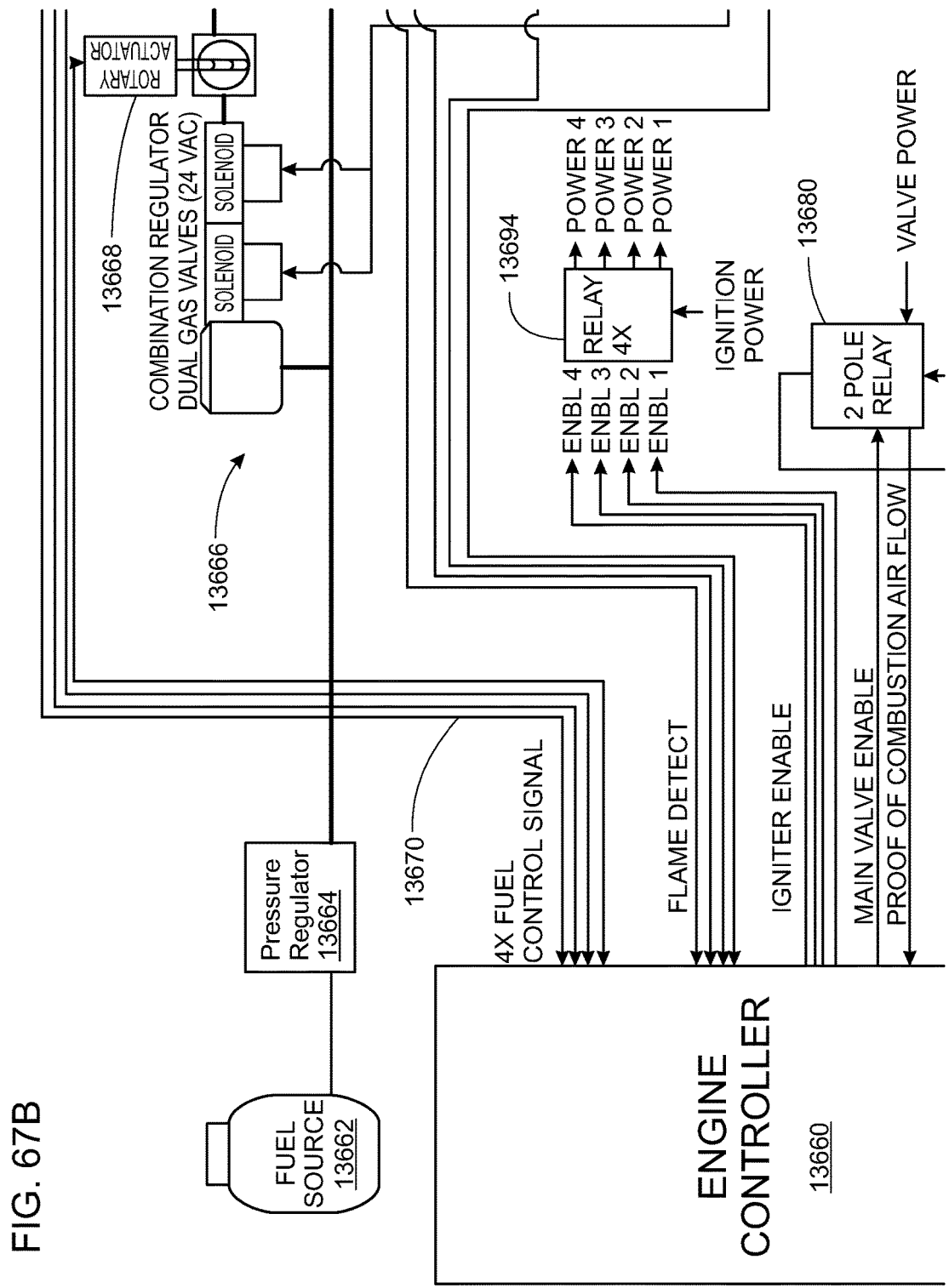
FIGS. 67 B-H illustrate an embodiment of a Stirling Engine Controller.
Figure 67C:
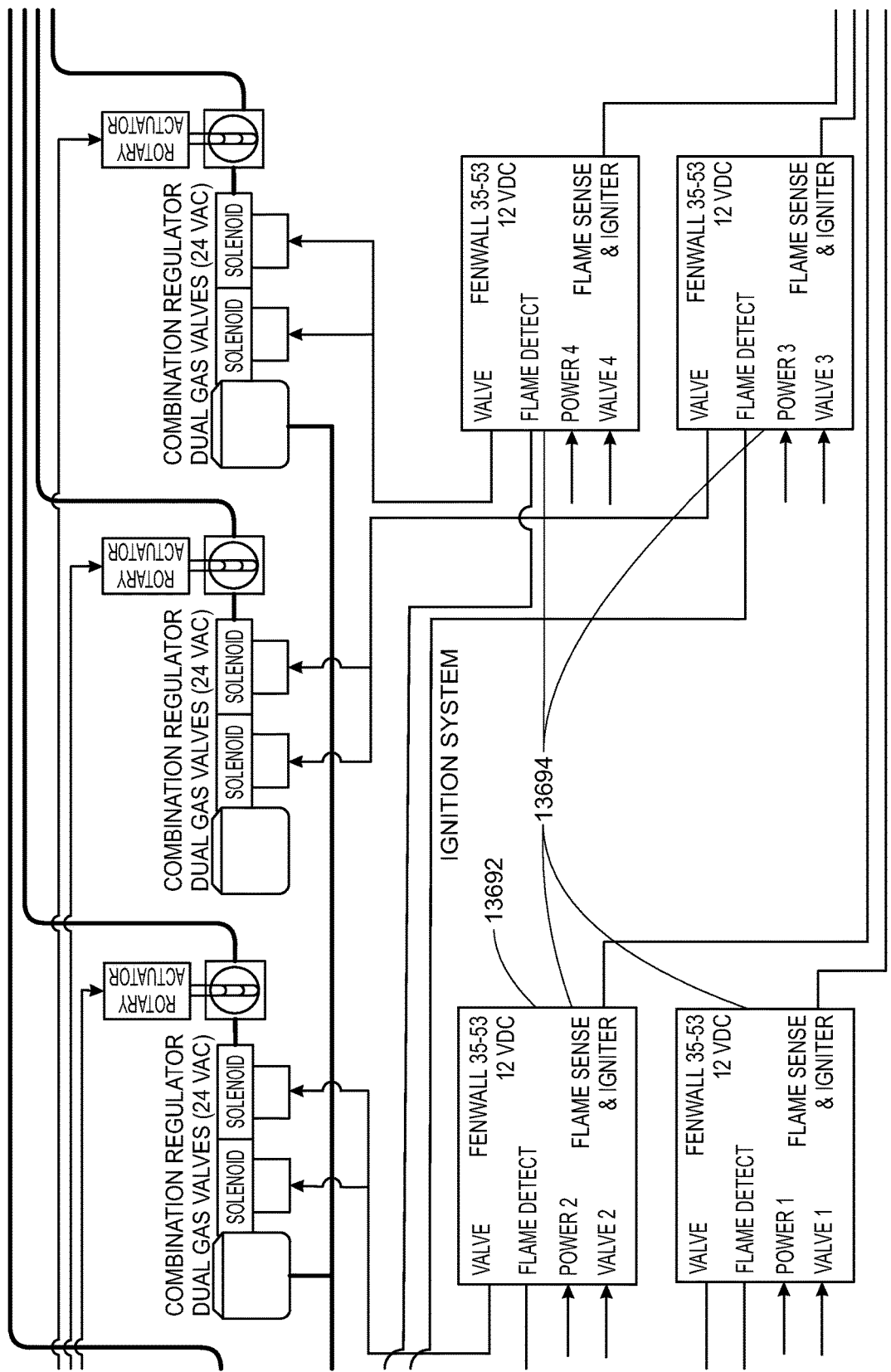
Figure 67D:
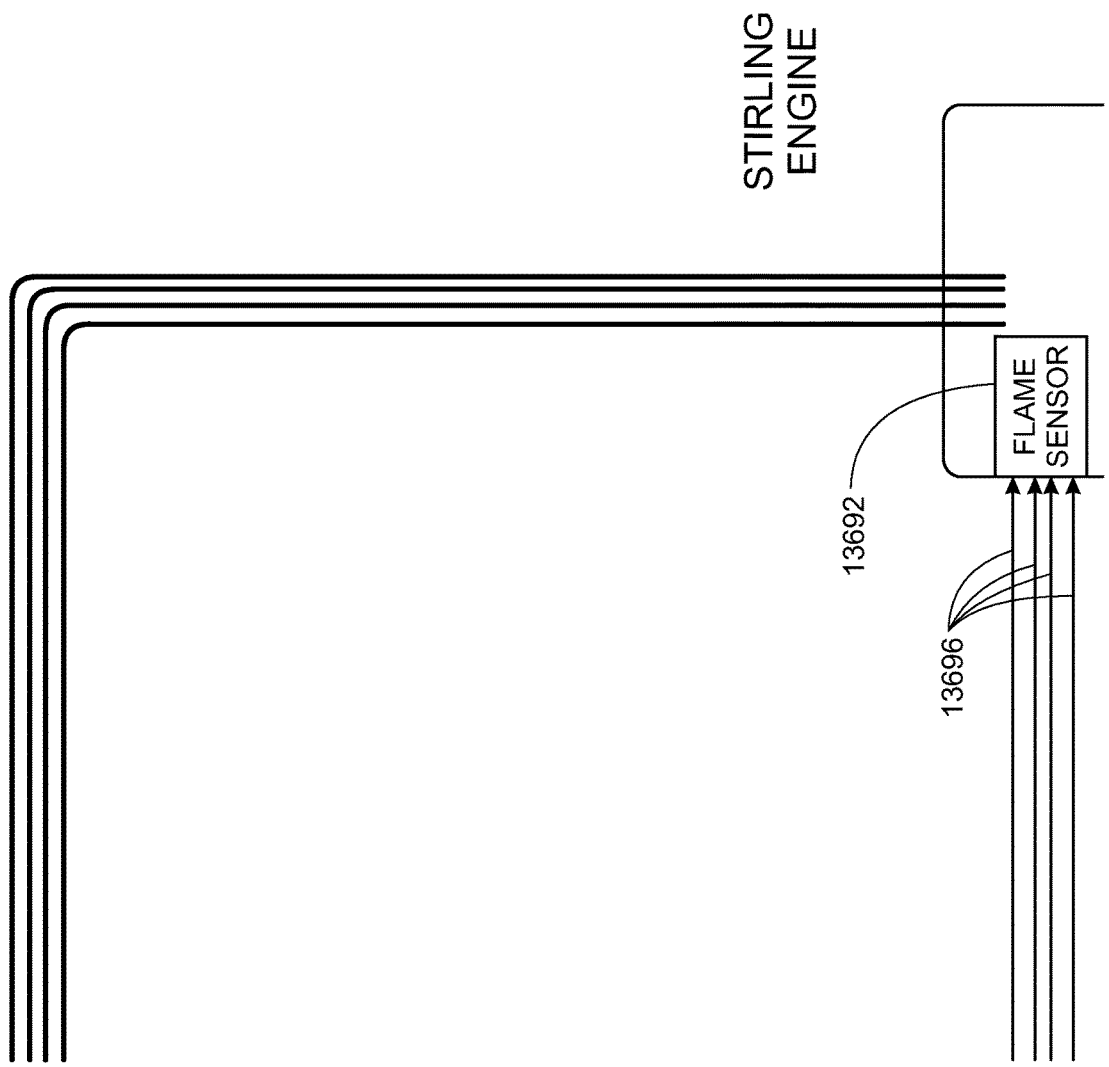
Figure 67E:
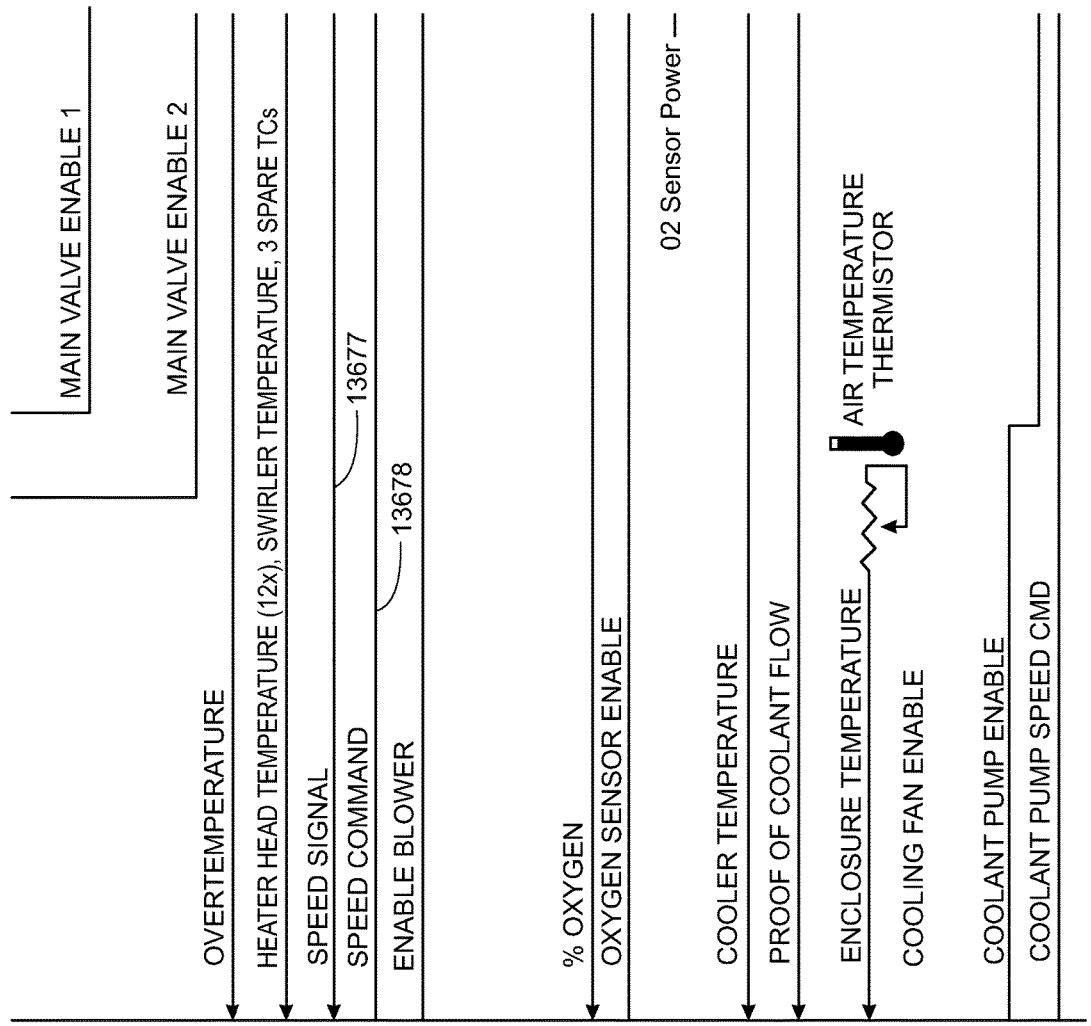
Figure 67F:
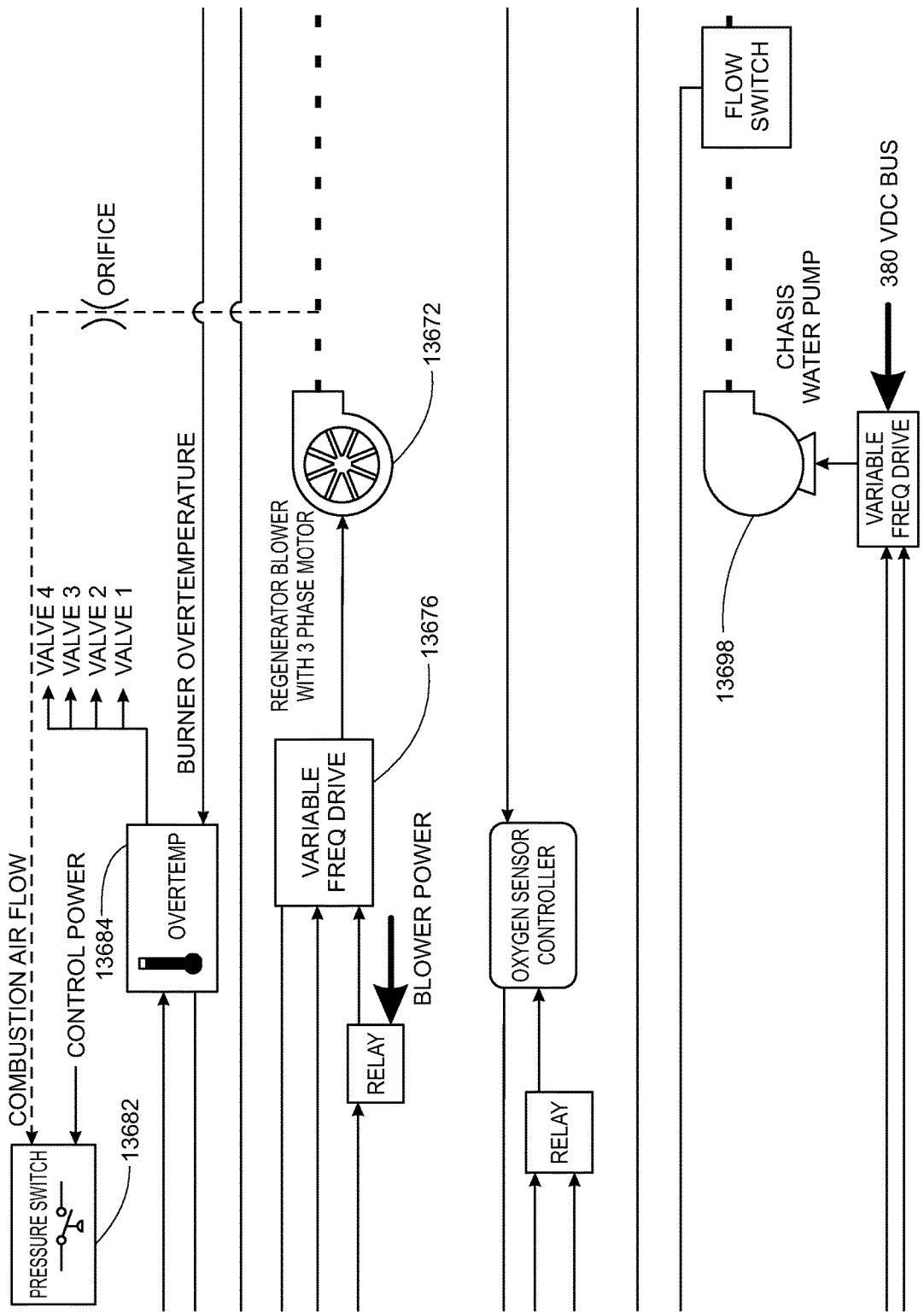
Figure 67G:
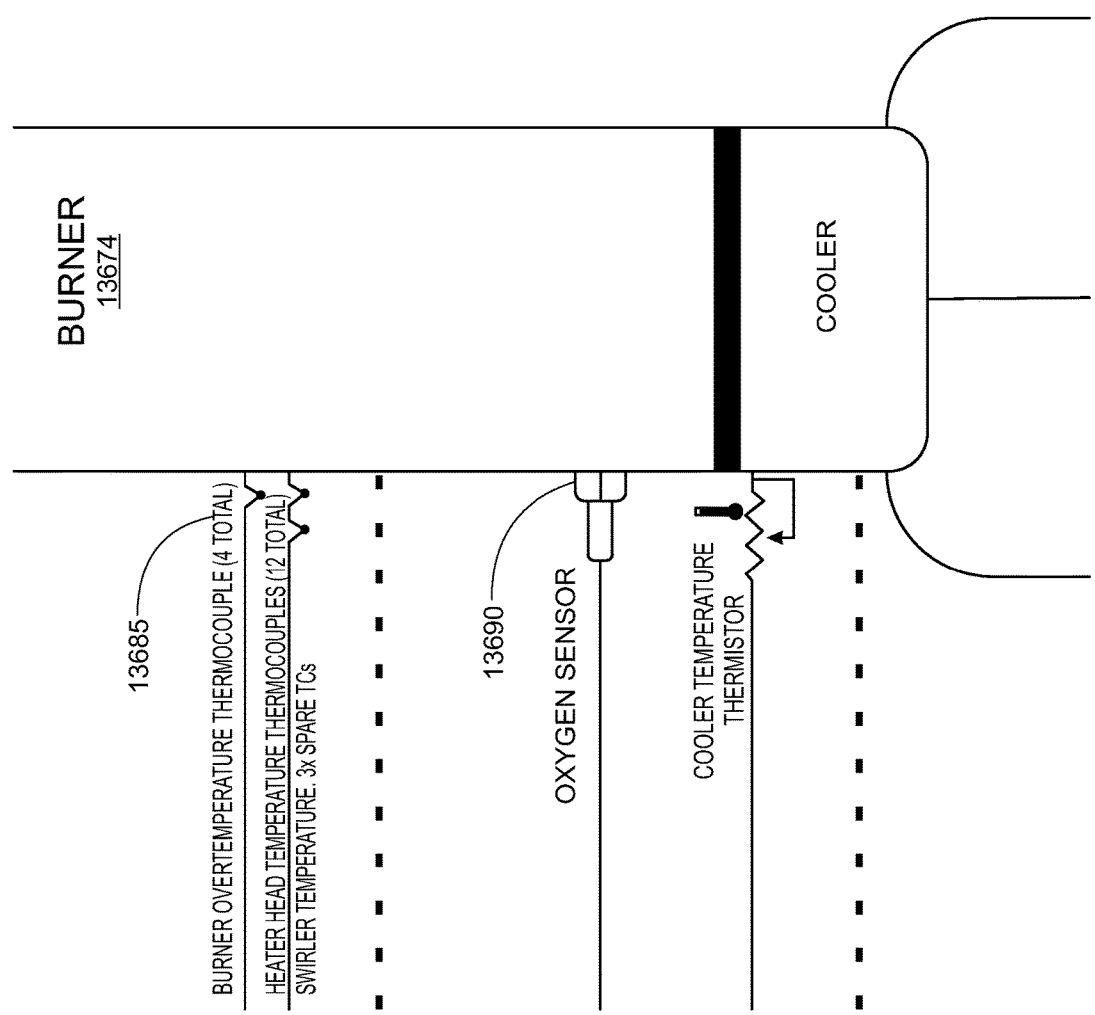
Figure 67H:
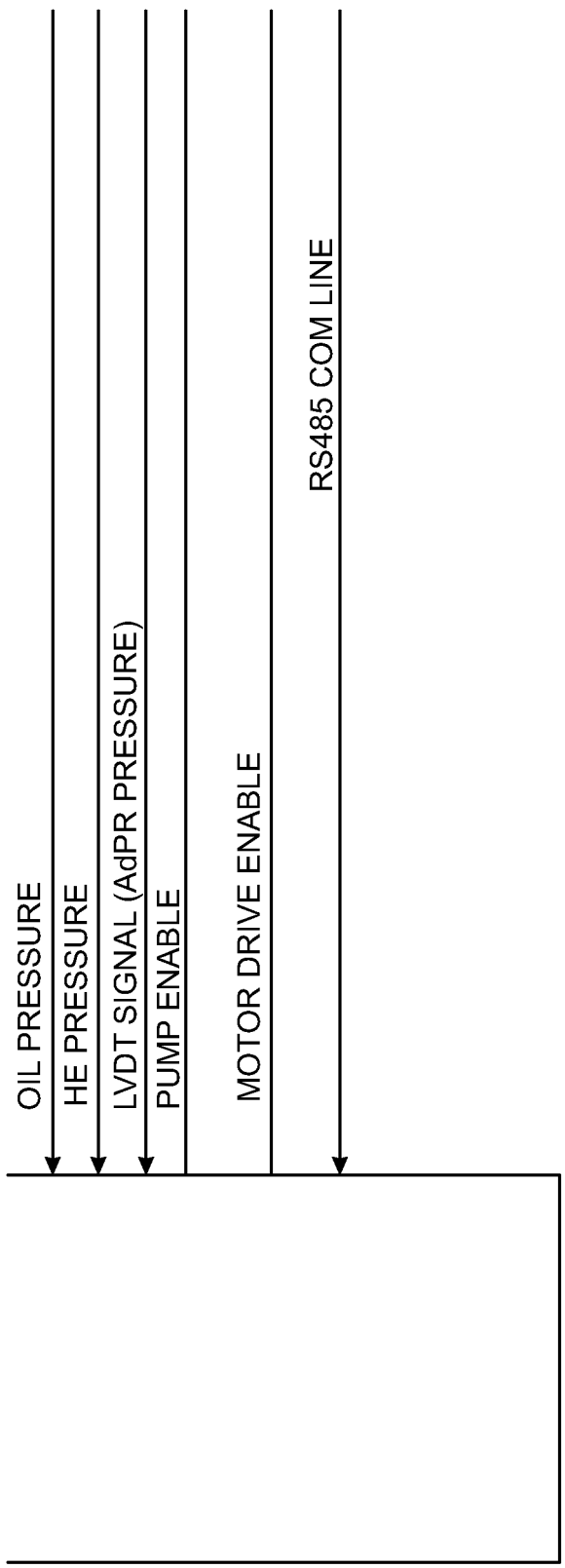

FIGS. 65E-F disclose a still further cross-section of an embodiment detailing the drain port 13415 which connects the volumes of the AdPR block 13411 and also connects the engine crankcase 13110 through the oil scrubbing filter 13418 to release pressure in the crankcase 13110, workspace 13103, airlock 13101 and AdPR block 13411. Gas from the crankcase, which may carry oil and other particles, enters the AdPR via port 13451 and flows through the oil filter 13418 before entering any other volumes of the AdPR block 13411. The crankcase gas is filtered to prevent oil and contaminants from entering the pump 1342 and airlock 13101 and workspace 13103. The filtered gas at the crankcase pressure flows into the crankcase side of the spool valve 13442 via line 13446. Filtering the gas from the crankcase allows the use of gas from the crankcase 13110 to maintain the airlock pressure above the crankcase pressure. In some embodiments, an internal valve may be positioned within the drain line 13446 to directly connect the airlock 13401 and the crankcase 13110 through the oil filter 13418 to reduce differential pressure fluctuations during fill and drain operations and when the piston rods 13124 are not moving.

Although in some embodiments the AdPR may regulate differential pressure, the rolling diaphragms 13190 may, in some embodiments, still experience fluctuations, which may be especially large during normal fill or drain operation. In some embodiments, alternatively to an internal valve, a crossover valve (not shown) may be located externally to the AdPR block. The valve may connect the two sides of the AdPR between the airlock 13401 and the crankcase 13110 to avoid a large pressure differential during a fill or drain cycle of the Stirling engine. The valve may be opened during a fill or drain cycle to greatly reduce the magnitude of these fluctuations and be closed during normal operation of the Stirling engine.

In the cross-section in FIG. 66A, the pump port 13555, connecting the diaphragm pump directly to the airlock 13101 via port 13449, may be controlled by the spool valve regulator 13541. A port 13553 connects to the pump outlet port 13438 via a check valve 13445 that redundantly prevents a leak from the airlock 13101 to the crankcase pressure side of the AdPR 13411. A port 13544 connecting the crankcase side of the spool valve to the diaphragm pump inlet 13448 is also shown.

The spool valve regulator 13541 operation is now described with reference to FIGS. 66A-E. In various embodiments, the spool valve 13542 is biased against the airlock pressure so that where the pressure difference between the crankcase and the airlock is within normal limits, e.g. 15 PSI, as shown in FIG. 63; the airlock port 13553 is closed by the spool 13542. Additionally, the position sensor 13552 tells the pump 13421 that no pumping operation is necessary and the pump does not operate. If the airlock pressure drops too low as shown by the valve spool position in FIG. 66A, the spool 13542 is biased by the spring 13543 to the left, which permits communication between the airlock port 13553 and the pump port 13553. The position sensor 13552 tells the pump 13421 to turn on and pump working fluid from the crankcase 13110 to the airlock 13101. The fluid travels first through port 13451, then through passages 13446 and 13444, through the pump 13421, past the check valve 13445, into the AdPR airlock 13402 via the passage 13453, and finally into the engine airlock 13101 through port 13449

In some embodiments, in order to get back into the Stirling cycle engine helium flows from the crankcase 13110 through the filter 13518 and the small amounts of oil in the helium are scrubbed out to keep any oil from getting into the AdPR block 13511, the pump 13421 and the Stirling engine where oil can damage the Stirling engine. In some embodiments, the Stirling engine itself may be disabled to ensure that until the pressure between the crankcase and the airlock is better equalized so that the rolling diaphragms will not be stressed. In some embodiments, the engine may be stopped if the pressure difference between the airlock and the crankcase is too low as measured by the position of the spool position sensor 13552.

In some embodiments, where the airlock pressure is too high as in FIG. 66D, the airlock port 13553 may be connected to the crankcase port 13544 and the pump 13421 may be disabled while the airlock pressure is reduced. FIGS. 66B and 66C show the airlock pressure within normal limits. In FIG. 66B, the airlock port 13553 is closed by the spool 13541 and the spool is still displaced enough according to the LVDT sensor 13552 to cause operation of the pump 13421 even without flow from the pump to the airlock. In some embodiments, within normal limits, FIG. 66C shows the airlock port 13553 closed by the spool 13541 and the spool displaced so that the LVDT sensor 13552 does not turn on the pump 13421.

In some embodiments, as shown in FIG. 66E, where the Stirling cycle engine is shut down or in the case of an airlock leak, the crankcase 13110 may be pressurized higher than airlock 13101 and workspace 13103, forcing the rolling diaphragms in a way opposite from their intended use. In some embodiments, in the event of such a leak, where an internal pressure measurement within the spool is 0-5 PSI higher than the airlock pressure, an internal spool valve seated within the main spool valve 13541 may open to equalize the pressure. As with the outer spool valve, in some embodiments, a spring balances against the pressure differential (against the crankcase pressure in this case) and would only open during a time when the engine is pressurized and off in order to reduce damage to the rolling diaphragms.

In some embodiments, the control of small pressure changes within the airlock and maintaining pressure differential of 5 to 20 PSI above the crankcase pressure may be achieved using a pump controller that may accurately vary the speed of the pump to run faster-slower when necessary. In some embodiments, using the LVDT sensor and a suitable pump controller, a desired range and/or threshold range may be determined. In some embodiments, where the pressure differential is outside the desired/threshold range, the pump may cycle at a higher rate. In some embodiments, where the differential is closer to or within the desired/threshold range, the pump may cycle at a slower rate thereby accurately controlling pressure within the airlock.

In some embodiments, one or more of the functional components of the ADPR module may be located within the Stirling Engine pressure vessel. In one example, the oil filter may be located between the four piston rods and either in the airlock or just below the airlock in the crankcase. The inlet line to the pump would run from the clean side of the oil filter to the pump location either in an external ADPR or to an electric pump located within the pressure vessel.

Stirling Engine Controller

Another important aspect of the present embodiment from the standpoint of controlling the actuation of the above described airlock and AdPR block, as well as the rest of the Stirling engine, is the Stirling engine controller 13660 shown diagrammatically in FIGS. 67B-67H. The engine controller 13660 itself, in some embodiments, may be separate from but connected to and in communication with a power electronics software and hardware scheme which facilitates conversion of mechanical to electrical energy essentially downstream from the Stirling. Some embodiments of the power electronics may be those described in U.S. patent application Ser. No. 13/447,897 filed on Apr. 16, 2012 and entitled "MODULAR POWER CONVERSION SYSTEM, which is hereby incorporated herein by reference in its entirety. While the two systems may share data and communications of numerous system variables in some embodiments, the engine controller 13660 is generally understood as a separate system from the power electronics. The engine controller 13660 retains responsibility for all aspects of the Stirling engine operational control including, but not limited to, regulation of the airlock as described above as well as for example the four burners 13674 in the current embodiment of the Stirling engine. Clearly a controller such as described here can accommodate control of other Stirling designs as well.

In some embodiments, and as shown in FIGS. 67B-67H, a fuel source 13662 provides fuel to each of four separate gas trains including valves 13666 and variable flow element 13668 through a main regulator 13664. In some embodiments, each valve 13666 is a dual gas valve, each shown with a combination regulator. In some embodiments the valves 13666 may be MAXITROL CV-300 valves for example, as manufactured by the Maxitrol Company, Southfield, Mich., USA or White-Rodgers 36H32-423 valves, for example, as manufactured by White-Rodgers, Saint Louis, Mo., USA. The variable flow element 13668 provides a variable flow resistance to vary the flow of fuel to each burner assembly 12907 independently of the air flow through the burner assembly 12907. In some embodiments, the modulating valve may be a MAXITROL EXA-40 as manufactured by the Maxitrol Company, Southfield, Mich., USA. Another embodiment may forgo the main regulator 13664 and regulate the gas pressure with a combination valves 13666 such the MAXITROL CV-300 as manufactured by the Maxitrol Company, Southfield, Mich., USA. In various embodiments, the fuel delivery may be controlled in part by a variable flow element 13668 which in turn may be controlled and may be monitored by the engine controller 13660 over four respective control signal lines 13670. It is to be appreciated that in some embodiments, the variable flow element may be a rotary actuator and a throttle plate. In some embodiments, the actuator 13668 may be a modulating valve such as a MAXITROL EXA-40 as manufactured by the Maxitrol Company, Southfield, Mich., USA. A blower 13672 provides the air flow for combustion in the burner(s) 13674, as well as cooling of a burner enclosure. The engine controller 13660 controls the air flow via a speed command 13678 passed to the variable frequency drive 13676. A blower speed signal 13677 may provide a feedback signal to the controller 13660 which permits, amongst other, evaluation and control of the blower drive by the engine controller 13660. The blower 13672 is shown here as a single blower but may also be a plurality of blowers. A main valve enable relay 13680 and pressure switch 13682 to enable/disable the fuel valves 13666 is provided in conjunction with the blower 13672 and with a series of heater head temperature sensors 13685 and a Programmable Logic Controller (PLC) 13684. An oxygen sensor 13690 as discussed previously in this application may also be provided in the burner as well to communicate oxygen data to the controller which may also facilitate the fuel and ignition control.

In some embodiments, for each of the four burners 13674 a flame detection sensor 13692 is provided which, as described previously in this application, is critical for safety, temperature control and the ignition process among other things. In some embodiments, the ignitor circuit 13694 for each of the burners are directly influenced by the flame sensors 13692 through the controller 13660 and the ignitor circuit 13694 are controlled via the igniter signal lines 13696 based on the flame sensor data and other data from the engine such as oxygen sensors for example. In various embodiments, ignition may be accomplished by either spark or hot surface ignitors and flame detection sensors may include a flame rod and flame rectification, as well as optical sensing of the flame or alternatively other methods of known flame detection.

In some embodiments, the ignitor circuits 13694 are commercial combustion control circuits that open the fuel valves and attempt to ignite a flame, then monitor the flame, attempt to relight the flame if it fails and closes if the fuel valves if unable to establish a flame within a given amount of amount of time. In some embodiment, the combustion control circuits are customized variants of Series 35-53 made by Fenwal Controls of Ashland Mass. In these embodiments, the engine controller 13660 enables the ignitor circuit 13694, which each close a relay to power the associated fuel valves 13666, and initiate an ignition sequence. In some embodiments, if at any time the ignitor circuit 13694 is unable to ignite and detect a flame, it will open the fuel valve relay, thereby closing the fuel valve 13666 for that burner. In some embodiments, if the pressure switch 13682 does not detect air flow, the system may interrupt power to all the fuel valves 13664 thereby ending combustion and preventing a safety hazard. In some embodiments, if the overtemp circuit 13684 detects excessive temperatures in a given heater head, then the fuel valve 13666 associated with that heater head may be closed to prevent damage to that heater head and allow it to cool.

In various embodiments, coolant flow and temperature are also inputs to the controller 13560 to control the coolant flow pump 13698 and ensure that appropriate coolant temperature is maintained in the Stirling cycle. In some embodiments, the Airlock delta Pressure Regulator (AdPR) 13611 is also directly connected and controlled via the engine controller 13660. In some embodiments, the engine controller 13660 receives the airlock pressure data from the AdPR 13611 as described above and activates the pump in the AdPR to maintain the appropriate pressure differential between the crankcase and the airlock.

In some embodiments, the engine controller 13660 may also communicate with the power electronics (not shown) over CAN bus but could also, in some embodiments, rely on wireless communications or other communications protocols such as USB. The engine controller 13660 may, in some embodiments, command the speed of a permanent magnet synchronous motor ("PMSM") motor. Embodiments of power electronics as they relate to control and monitoring of the PMSM motor may be those described in U.S. patent application Ser. No. 13/447,897 filed on Apr. 16, 2012 and entitled "MODULAR POWER CONVERSION SYSTEM, which is hereby incorporated herein by reference in its entirety. For purposes of this discussion with regards to one embodiment discussed in the present application, the engine controller 13660 and power electronics may exchange data and commands including, but not limited to, motor drive velocity command, generator velocity, Bus voltage, Bus current, motor drive IGBT bridge temp., shunt control, shunt active, battery voltage, battery temperature, inverter power, inverter enable, inverter PWM, inverter voltage inverter current, inverter temperature, converter power, converter enable, converter PWM, converter voltage, converter current and converter temperature. Here converter refers to one or more DC/DC converter circuits. Certain direct inputs into the engine controller 13660 may also be necessary and can include but are not limited to oil temperature from the crankcase, battery temperature, motor temperature and shunt temperature.

Annular Venturi Burner

FIGS. 70A-70D disclose a further embodiment of an annular-venturi burner 13801 for use in conjunction with a multiple heater head and piston engine as described previously in FIGS. 54-62. This embodiment of the burner 13801 is also specifically directed to the independent heating of multiple heater heads 13803. In this embodiment there are four (4) heater heads 13803 and respective burner assemblies 13807, although only two (2) are visible in the cross-section of FIG. 70A, and more or less heater heads are of course also possible for the engine. As in the previously discussed embodiments the heater heads 13803 and burner assemblies 13807 are encompassed by a burner housing 13811 and each heater head 13803 is heated by an individual burner assembly 13807. The burner assembly 13807 is supplied a fuel/air mixture for combustion via a blower (not shown) that supplies air through the air inlet 13823 and a fuel system (not shown) that provides fuel through the fuel inlets 13816. The flame may form within the venturi body 13847 and/or in the combustion chamber 13831 formed by an annular arrangement of the heater tubes 13809. The hot combustion gases then flow past the heater tubes 13809 before entering a recuperative preheater 13851-13855. Burner fairings 13808 in the form of metal rings mounted on a mid-burner plate 13805 direct the hot combustion gases across the heater tubes 13809 and diverts the hot combustion gases from exiting axially from the heater tubes 13809. As described previously in relation to FIGS. 59 and 62 the exhausting combustion gases pre-heat the incoming air in the recuperative heat exchanger, 13851-1385 and then exit the burner housing 13811 through exhaust outlets (not shown).

Figure 70A:
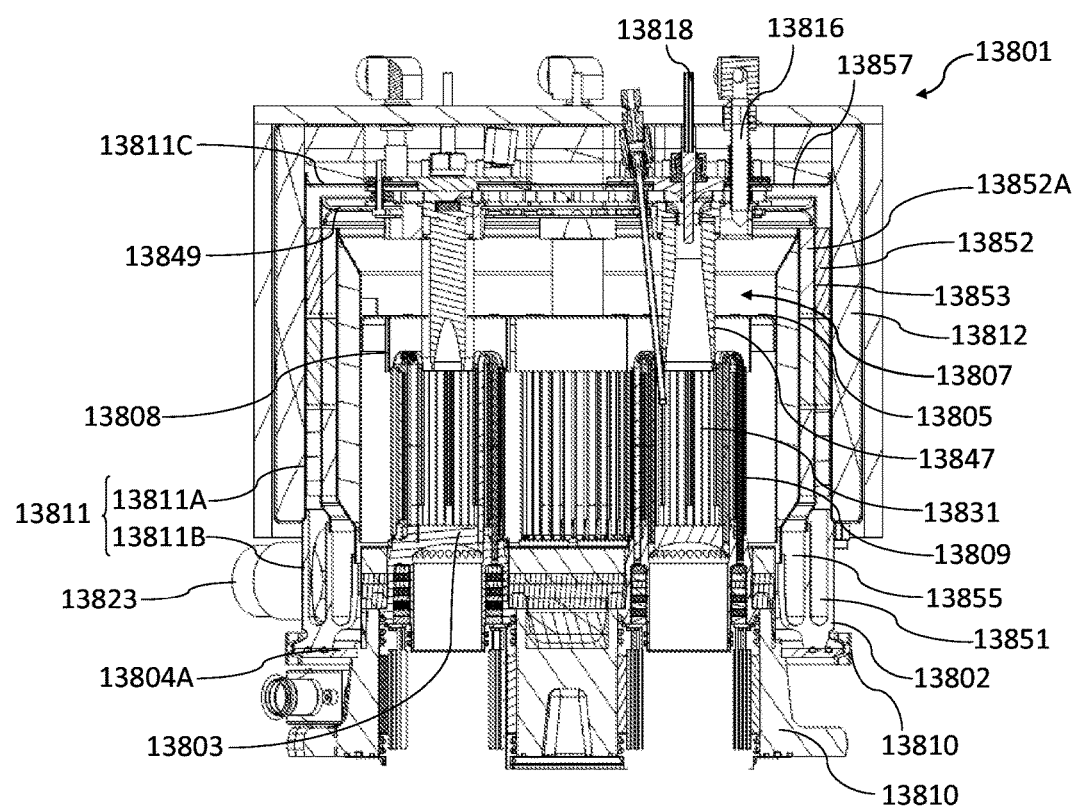
FIG. 70A is a cross-section of a further embodiment of a annular-venturi-type burner for use in conjunction with the multiple heater head in accordance with one embodiment.

More specifically, observing FIG. 70A, The burner housing 13811 is comprised of an outer wall 13811A and a manifold 13811B that connects the inlet 13823 port to the air side 13852 of the recuperative heat exchanger and the exhaust port to the exhaust side 13852A of the recuperative heat exchanger. In some embodiments, the manifold 13811B may include an interface 13804A to the stirling engine. The combustion gases exiting from the heater heads 13803 may be sealed at the interface with o-rings or other airtight seals and the manifold 13811B may be mechanically attached to the cooler plate 13810 of the Stirling engine with a marmin clamp. In other embodiments, the burner 13801 may be mechanically attached to the Stirling engine with a bolted flange or other mechanical means. The heater heads 13803 themselves may be any of the various embodiments of tube heater heads described in the preceding sections, including, but not limited to, straight tube heater heads or helical tube heater heads as disclosed in U.S. patent application Ser. No. 13/447,990, filed Apr. 16, 2012, and incorporated herein. By way of example, the present embodiment is contemplated utilizing heater tubes 13809 through which flow the working gas, for example helium, which is heated by the respective burner assemblies 13807.

In various embodiments of the burner 13801, the single blower (not shown) may be incorporated to maintain a consistent average air flow supplied to the burner 13801 and hence to each of the individual burner assemblies 13807. In some embodiments, the blower may also produce a variable air flow when necessary to control the fuel/air mixture in the venturi 13841. The blower may supply combustion air at a desired velocity depending on instructions from a controller for purposes of ignition, then once ignition has occurred, the desired air flow rate may be regulated by the controller dependent on data received from sensors, which may include, but not limited to, an oxygen sensor sampling the cooled exhaust gas. In some embodiments, a fuel system with variable flow valves for each heater head, which, in some embodiments, may be a Maxitrol EXA-40 valves for example, as manufactured by the Maxitrol Company, Southfield, Mich., USA, may control the fuel flow to achieve the commanded temperature on each heater head. The blower may be adjusted to achieve the desired fuel/air ratio.

An important aspect of the present embodiment is the efficient heating of the incoming air through the extraction of waste heat in the exhaust to raise the incoming air temperature thereby improving the efficiency of combustion processes and the burner 13801. The blower connects through the air inlet 13823 in the outer wall 13811A of the burner housing into an air channel 13851. The air channel 13851 extends circumferentially around the burner inside the outer wall 13812 of the burner 13801 and directs the air developed by the blower B across an intermediate baffle 13853 and up into the hot manifold 13857 before entering the swirlers 13882 of the venturi ejectors 13841. The intermediate baffle 13853 directly separates the incoming air from the exhaust gases exiting the burner through an exhaust channel 13855 and provides for the heat transfer from the exiting exhaust to the incoming air in the air channel 13851. The heat transfer efficiency across the intermediate baffle 13853 is critical because the hotter the incoming air can be heated, the less fuel is necessary to reach the desired combustion temperatures.

The incoming air is preheated to a desired temperature, for example, but not limited to 600-750° C. These are many reasons preheating the incoming air may be beneficial and these include, but are not limited to, facilitating ignition and combustion as the air is directed to the burner assemblies 13807 and/or increasing the thermal efficiency of the burner by capturing some of the thermal energy in the combustion gases exiting the heater heads. In some embodiments, preheating of the air may reduce the hot exhaust temperature from 900° C. to 300° C. In some embodiments, the amount of preheating which may be accomplished may be related to the efficiency of heat transfer from the exiting exhaust to the incoming air. The heat transfer across the intermediate baffle 13853 may be improved by adding rows of folded fins 13852 on the air side and folded fins 13852a on the exhaust side of the intermediate baffle 13853. The folded fins may be brazed to the intermediate baffle 13853 to assure good thermal attachment. In various embodiments, the material properties of the folded fins may be optimized for the operating temperature. For example, in some embodiments, the rows of folded fins near the top may be heat resistant metals, which may include, but is not limited to, INCONEL 625, while lower and cooler folded fins may have higher thermal conductivity but lower operating temperature. In various embodiments, the materials for these folded fins may include, but is not limited to, stainless steel 409 or Ni 201 for example. The preheated air exits the air channel 13851 and is directed radially into a hot air manifold 13857 which communicates with each of the multiple burner assemblies 13807 specifically directing the preheated air to the swirler portion 13882 of the venturi 13841. In various embodiments, the preheated air enters the hot air chamber 13857 through a substantially 360 degree circumferential opening around the exit of the air channel 13851. In some embodiments, this may result in a consistent flow rate of preheated air delivered to each of the burner assemblies 13807. In various embodiments, additional channels or passageways (not shown) may be provided in the hot air chamber 13857 to direct the preheated air in the hot air chamber to a specific burner head. In various embodiments, the 360 degree output from the air channel 13851 is used when there is only one blower B developing the air flow into the engine.

Figure 70B:
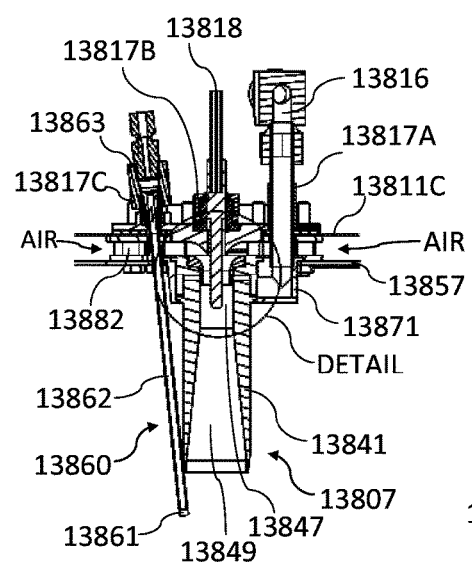
FIG. 70B is a cross-section of a the annular-venturi-type burner head.
Figure 70C:
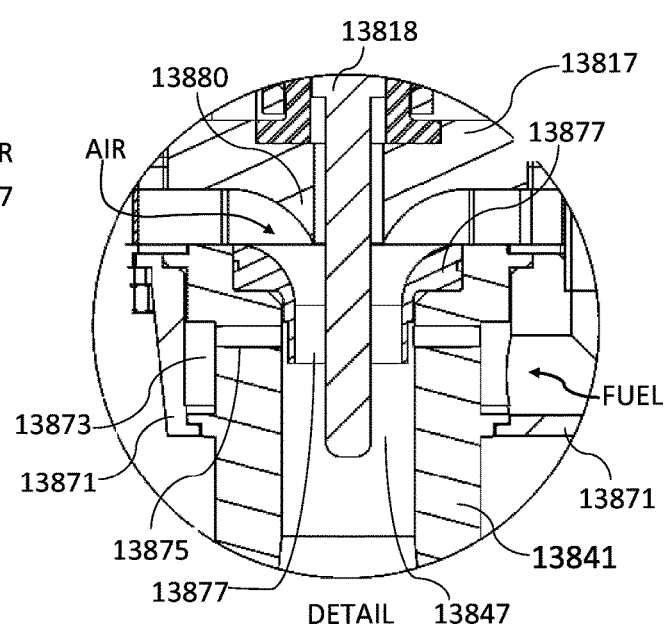
FIG. 70C is a detailed view of the annular-venturi with fuel ports and an ignitor.
Figure 70D:
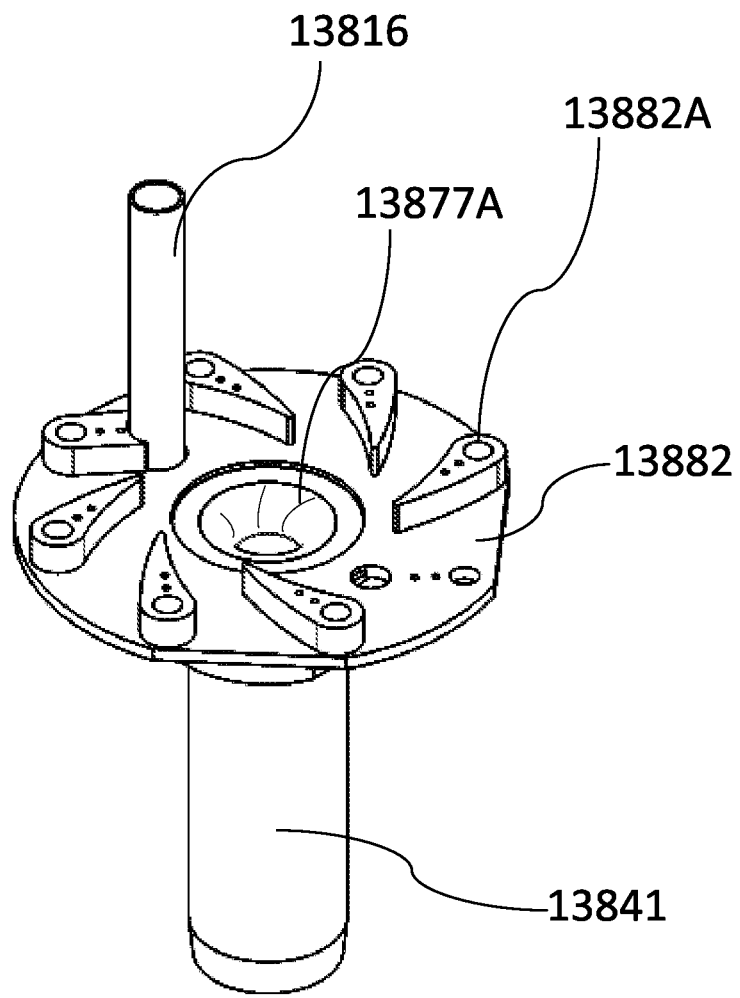
FIG. 70D is a perspective view of a radial swirler at the entrance to the annular-venturi.

The burner assembly 13807 may be further understood by referring to FIGS. 70B-70D. Several elements of the burner assembly 13807 are shown in FIG. 70B include a venturi body 13841, a fuel inlet 13816, an air swirler 13882, an ignitor 13818, and a flame detector 13860. The venturi 13841 in this embodiment is a venturi type ejector as disclosed for example in U.S. patent application Ser. No. 12/829,320 filed Jul. 1, 2010, now U.S. Publication No. US-2011-0011078-A1 published Jan. 20, 2011 and entitled Stirling Cycle Machine, which is hereby incorporated herein by reference in its entirety. In some embodiments the venturi 13841 may be beneficial for many reasons, including, but not limited to, providing the benefit of reducing or eliminating the need for a completely separate fuel control scheme as regulation of the airflow changes the vacuum which, in turn, correspondingly affects the fuel flow and regulates the burner power. In some embodiments, the venturi allows use of typical gas pressures in buildings, e.g., 7 inches of water column, without a compressor. The blower forces air through radial swirler vanes 13882. The flow of swirling air mixes with fuel in the venturi throat 13847 and from a swirl stabilized flame in the expanding section of the venturi 13849 and/or in the combustion chamber 13831 of FIG. 70C.

Referring again to FIG. 70B, the ignitor 13818 ignites the fuel-air mixture in the venturi throat 13847. The ignitor 13818 may be a spark plug and may function as the high voltage electrode of a flame ionization flame detector. In other embodiments, the ignitor 12918 may be a hot surface ignitor. In one embodiment the ignitor are Silicon Nitride Hot Surface ignitors produced by Crystal-Technica of South Grafton, Mass. The ignitor 13818 may located advantageously near the center of the venturi 13841 to promote a uniform composition and flow from the venturi 13841. The ignitor 13818 may be mounted in the ignitor port 13817B.

The flame detector 13860 mounts in the 13817C port and provides a signal to the controller indicative of the presence or absence of a flame from the burner assembly 13807. In one embodiment, the flame detector 13860 comprises a temperature sensor 13862 inside a heat resistant tube 13861. The temperature sensor 13862 may be a type K thermocouple in an inconel sheath, a type B or R thermocouple or other high temperature sensor. The heat resistant tube 13861 may be a heat resistant metal such as inconel 625, Mar-M or it may be a ceramic tube formed from zirconia or other high temperature ceramics. In other embodiments the port 13817B may be used for a vision based flame detection circuit including but not limited to one or more of the following: IR flame detector, visible light flame detector and/or UV flame detector. In another embodiment, the flame sensor may be a flame rod connected to a Series 35-52 Ignition controller as manufactured by Kidde-Fenwal Inc. of Ashland Mass.

Still referring to FIG. 70B, the fuel enters the burner assembly 13816 through the fuel inlet 13816, that is mounted in port 13817A. The fuel flows into a plenum or manifold 13871 before flowing through the fuel ports into the venturi throat 13847. The mixing of the fuel and air in the venturi throat is best shown in FIG. 70C, which is a detailed view of the venturi throat and fuel injectors. The air enters the venturi throat 13847 with an induced swirl created by radial vanes 13882 that are described in detail below. The air initial flows in radially toward the ignitor 13818 and then is directed into an axial flow by an axisymetric protrusion 13880 around the ignitor and the inlet to the venturi 13877A. In one embodiment pictured in FIG. 70C, the inlet to the venturi 13877A is part of the venturi bushing 13877. In other embodiments the inlet 13877 may be an integral part of the venturi body 13841 or the a conical or a separate piece. In some embodiments, the inlet 13877A and the protrusion 13880 may be formed to provide an approximately constant cross-section flow area as the flow changes from radial to axial. One possible benefit of an approximately constant flow area is a minimization of pressure drop through the burner assembly 13807. The protrusion 13880 may be conical or may have a surface with an increasing slope from near horizontal to approaching vertical.

Still referring to FIG. 70C, the fuel enters the fuel plenum 13873 from the fuel inlet tube 13816 that is connected to the fuel system that was described above in reference to FIG. 62. The fuel plenum forms an annular space around the outside diameter of the venturi body 13841 and supplies fuel to a plurality of fuel ports 13875. The fuel ports 13875 provide fuel to an annular space between the venturi bushing 13877 and the venturi body 13841. This annular space is mostly filled with fuel and is herein referred to as the fuel annulus. The fuel exits the fuel annulus flowing axially along the walls of the venturi throat 13847. The air flowing axially through center of the bushing 13877 and into the venturi throat 13847 creates a region of low pressure downstream of the fuel annulus that draws the fuel into venturi throat 13847 where it mixes with air. The exit of the fuel annulus is preferably upstream of the ignitor 13818 by a sufficient distance to create an ignitable mixture of fuel-air next to the hot surface or spark of the ignitor 13818. The fuel annulus may have a very thin annular opening to maximize fuel flow velocities. In other embodiments, the annulus is larger. In general, the annular exit of the fuel annulus has a constant radial gap to maximize fuel flow uniformily around the venturi throat 13847. In a preferred design, the gap is 1/20 of the venturi throat diameter or has a radial gap of 0.035". The fuel ports 13875 may be radial or may enter the fuel annulus at an angle to induce a swirl in the fuel.

FIG. 70D presents an isometric view of the swirl vane plate 13882 mounted on the venturi body 13841, where the venturi entrance 13877A is visible. The radial vanes 13882A impart a tangential velocity or swirl motion to the radially flow air. In one embodiment, the radial vanes 13882A are straight and not curved. In another embodiment the vanes are curved so that the vanes are radial at the outside diameter of the radial vane plate, the vanes curve until the flow leaves the inward edge of the vane with the desired swirl. In FIG. 70D, the vanes are curved and aerodynamic to minimize pressure drop through the burner. The vanes are essentially airfoils that are initially thick near the outside diameter of the radial venturi plate and increasingly thin toward the venturi inlet.

One theory on the advantage of injecting the fuel through and the fuel annulus is that the annulus provides a more uniform provision of fuel around the venturi throat by providing a plenum for the fuel from the plurality of fuel jets to mix and flow uniformly into the venturi throat 13847. Another theory on the advantage of the fuel annulus is that it advantageously places the fuel next to the wall, where the local air flow may be more uniform than in the center. Still another theory is that the lack of fuel jets across the airflow avoid disturbing the airflow and result in a more uniform air flow exiting from the venturi throat 13847.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. An external combustion engine containing a working fluid and comprising:
    a burner element for heating the working fluid of the engine;
    at least one heater head defining a working space containing the working fluid;
    at least one piston cylinder containing a piston for compressing the working fluid;
    at least one cooler for cooling the working fluid;
    a crankcase comprising:
        a crankshaft for producing an engine output;
        a piston rod connected to the piston;
        a drive mechanism that converts the linear motion of the piston rod to rotary motion of the crankshaft; and
        a linear cross-head bearing comprising a journal and a guide, wherein the journal has a first end rigidly attached to the piston rod and a second end attached to the drive mechanism,
        wherein the ratio of the linear cross-head bearing length over diameter is greater than 2.0,
        wherein the guide is located outside the working space, and
        wherein the linear cross-head bearing solely constrains the motion of the piston.

2. The external combustion engine of claim 1, wherein the linear cross-head bearing is a hydrodynamic bearing supplied with lubricating fluid from an annulus on the guide.

3. The external combustion engine of claim 1, further comprising a rod seal assembly that comprises:
- a housing between two spaces configured to receive the piston rod, the piston rod disposed between the crankcase and the working space;
- a floating clearance bushing configured to move axially and radially within the housing and disposed coaxially around the piston rod and forms a clearance seal with the piston rod; and
- at least one stationary annular element fixed within the housing configured to form a face seal with the floating clearance bushing.

4. The external combustion engine of claim 1 further comprising a rod seal assembly that comprises:
- a housing between two spaces configured to receive the piston rod, the piston rod disposed between the crankcase and the working space;
- floating rod seal assembly comprising at least one rod seal mounted onto the floating rod seal assembly.

5. The external combustion engine of claim 4, wherein the rod seal is a spring energized seal.

6. The external combustion engine of claim 4, the floating rod seal assembly further comprising:
- an outer ring; and
- at least one bushing.

7. The external combustion engine of claim 4, the rod seal assembly further comprising:
- a scraper ring;
- a particle trap;
- a port; and
- a filter.

8. The external combustion engine of claim 1 wherein the piston comprises a clearance seal.

9. The external combustion engine of claim 8, wherein the clearance seal is a cylinder with an inner diameter facing the piston and an outer diameter facing the cylinder, wherein the outer diameter includes a plurality of grooves on the outside diameter and the grooves are perpendicular to the piston axis.

10. The external combustion engine of claim 8, wherein the clearance seal is a cylinder with an inner diameter facing the piston, wherein at least one radial seals touches the inner diameter face and the piston.

11. The external combustion engine of claim 8, wherein the clearance seal comprises at least one of the following materials: graphite, PTFE, UHMWPE, antimony.

12. The external combustion engine of claim 8, wherein the clearance seal comprises at least graphite and antimony.

13. An external combustion engine containing a working fluid and comprising:
- a burner element for heating the working fluid of the engine;
- at least one heater head defining a working space containing the working fluid;
- at least one piston cylinder containing a piston for compressing the working fluid;
- at least one cooler for cooling the working fluid;
- a crankcase comprising:
  - a crankshaft for producing an engine output;
  - a piston rod connected to the piston;
  - a rocking beam driven by the piston rod;
  - a connecting rod connected at a first end to the rocking beam and at a second end to a crankshaft to convert rotary motion of the rocking beam to rotary motion of the crankshaft; and
  - a linear cross-head bearing comprising a journal and a guide, wherein the journal has a first end rigidly attached to the piston rod and a second end attached to the rocking beam,
    - wherein the ratio of the linear cross-head bearing length over diameter is greater than 2.0,
    - wherein the guide is located outside the working space, and
    - wherein the motion of the piston is solely constrained by the linear cross-head.

14. The external combustion engine of claim 13, wherein the linear cross-head bearing is a hydrodynamic bearing supplied with lubricating fluid from an annulus on the guide.

15. The external combustion engine of claim 13, further comprising a rod seal assembly that comprises:
- a housing between two spaces configured to receive the piston rod, the piston rod disposed between the crankcase and the working space;
- a floating clearance bushing configured to move axially and radially within the housing and disposed coaxially around the piston rod and forms a clearance seal with the piston rod; and
- at least one stationary annular element fixed within the housing configured to form a face seal with the floating clearance bushing.

16. The external combustion engine of claim 13, further comprising a rod seal assembly that comprises:
- a housing between two spaces configured to receive the piston rod, the piston rod disposed between the crankcase and the working space;
- floating rod seal assembly comprising at least one rod seal mounted onto the floating rod seal assembly.

17. The external combustion engine of claim 16, wherein the rod seal is a spring energized seal.

18. The external combustion engine of claim 16, the floating rod seal assembly further comprising:
- an outer ring; and
- at least one bushing.

19. The external combustion engine of claim 16, the rod seal assembly further comprising:
- a scraper ring;
- a particle trap;
- a port; and
- a filter.

20. The external combustion engine of claim 13, wherein the piston comprises a clearance seal.

21. The external combustion engine of claim 20, wherein the clearance seal is a cylinder with an inner diameter facing the piston and an outer diameter facing the cylinder, wherein the outer diameter includes a plurality of grooves on the outside diameter and the grooves are perpendicular to the piston axis.

22. The external combustion engine of claim 20, wherein the clearance seal is a cylinder with an inner diameter facing the piston, wherein at least one radial seals touches the inner diameter face and the piston.

23. The external combustion engine of claim 20, wherein the clearance seal comprises at least one of the following materials: graphite, PTFE, UHMWPE, antimony.

24. The external combustion engine of claim 20, wherein the clearance seal comprises at least graphite and antimony.

25. An external combustion engine containing a working fluid and comprising:

a burner element for heating the working fluid of the engine;

at least one heater head defining a working space containing the working fluid;

at least one piston cylinder containing a piston for compressing the working fluid;

at least one cooler for cooling the working fluid;

a crankcase comprising:
- a crankshaft for producing an engine output;
- a piston rod connected to the piston;
- a drive mechanism that converts the linear motion of the piston rod to rotary motion of the crankshaft; and a piston comprising:
- a piston base wherein at least one piston seal is mounted, the piston base comprising a small orifice to allow the pressure inside the piston to equalize with average pressure of the work space, the orifice diameter being between 0.002 and 0.008 inches;
- an outer shell that mounts to the base and defines the outside of the piston above the base; and
- an inner shell has is shorter and narrower than the outer shell and defines with the piston base a volume above the inner surface of the piston base.

26. The external combustion engine of claim 25, wherein the inner shell comprises a port to allow fluid communication between the volume inside the inner shell and the volume between the inner and outer shells.

\* \* \* \* \*